US009595515B2

(12) United States Patent
Becker et al.

(10) Patent No.: US 9,595,515 B2
(45) Date of Patent: Mar. 14, 2017

(54) SEMICONDUCTOR CHIP INCLUDING INTEGRATED CIRCUIT DEFINED WITHIN DYNAMIC ARRAY SECTION

(71) Applicant: Tela Innovations, Inc., Los Gatos, CA (US)

(72) Inventors: Scott T. Becker, Scotts Valley, CA (US); Michael C. Smayling, Fremont, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

(21) Appl. No.: 14/276,528

(22) Filed: May 13, 2014

(65) Prior Publication Data

US 2014/0246733 A1 Sep. 4, 2014

Related U.S. Application Data

(63) Continuation of application No. 13/047,474, filed on Mar. 14, 2011, now Pat. No. 8,756,551, which is a
(Continued)

(51) Int. Cl.
*G06F 17/50* (2006.01)
*H01L 27/02* (2006.01)
*H01L 27/118* (2006.01)

(52) U.S. Cl.
CPC ...... *H01L 27/0207* (2013.01); *G06F 17/5068* (2013.01); *H01L 27/11803* (2013.01);
(Continued)

(58) Field of Classification Search
CPC ............. G06F 17/5068; G06F 2217/12; H01L 27/0207; H01L 27/092; H01L 27/088; H01L 27/11807
(Continued)

(56) References Cited

U.S. PATENT DOCUMENTS 4,069,493 A * 1/1978 Bobenrieth ........... H01L 21/266
257/275
4,197,555 A * 4/1980 Uehara et al. ................ 257/209
(Continued)

FOREIGN PATENT DOCUMENTS

EP 0102644 7/1989
EP 0788166 8/1997
(Continued)

OTHER PUBLICATIONS

U.S. Appl. No. 60/625,342, filed May 25, 2006, Pileggi et al.
(Continued)

*Primary Examiner* — Vuthe Siek
(74) *Attorney, Agent, or Firm* — Martine Penilla Group, LLP

(57) ABSTRACT

A semiconductor chip includes four linear-shaped conductive structures that each form a gate electrode of corresponding transistor of a first transistor type and a gate electrode of a corresponding transistor of a second transistor type. First and second ones of the four linear-shaped conductive structures are positioned to have their lengthwise-oriented centerlines separated by a gate electrode pitch. Third and fourth ones of the four linear-shaped conductive structures are also positioned to have their lengthwise-oriented centerlines separated by the gate electrode pitch. The first and third ones of the four linear-shaped conductive structures are positioned to have their lengthwise-oriented centerlines co-aligned and are separated by a first end-to-end spacing. The second and fourth ones of the four linear-shaped conductive structures are positioned to have their lengthwise-oriented centerlines co-aligned and are separated by a second end-to-end spacing substantially equal in size to the first end-to-end spacing.

21 Claims, 75 Drawing Sheets

Related U.S. Application Data continuation of application No. 12/013,356, filed on Jan. 11, 2008, now Pat. No. 7,908,578.

(60) Provisional application No. 60/963,364, filed on Aug. 2, 2007, provisional application No. 60/972,394, filed on Sep. 14, 2007.

(52) U.S. Cl.
CPC .... *G06F 2217/12* (2013.01); *H01L 27/11807* (2013.01); *Y02P 90/265* (2015.11)

(58) Field of Classification Search
USPC .......................................... 716/118, 119, 122
See application file for complete search history.

(56) References Cited

U.S. PATENT DOCUMENTS

| | | | |
|---|---|---|---|
| 4,417,161 A * | 11/1983 | Uya ................................ | 326/55 |
| 4,424,460 A * | 1/1984 | Best ............................... | 326/55 |
| 4,575,648 A | 3/1986 | Lee | |
| 4,602,270 A | 7/1986 | Finegold | |
| 4,613,940 A * | 9/1986 | Shenton et al. .............. | 716/122 |
| 4,657,628 A * | 4/1987 | Holloway et al. ............ | 438/647 |
| 4,682,202 A * | 7/1987 | Tanizawa ...................... | 257/204 |
| 4,745,084 A * | 5/1988 | Rowson et al. .............. | 438/129 |
| 4,780,753 A * | 10/1988 | Ohkura et al. ................ | 257/369 |
| 4,801,986 A | 1/1989 | Chang et al. | |
| 4,804,636 A | 2/1989 | Groover, III | |
| 4,812,688 A | 3/1989 | Chu et al. | |
| 4,884,115 A | 11/1989 | Michel et al. | |
| 4,928,160 A | 5/1990 | Crafts | |
| 4,975,756 A | 12/1990 | Haken et al. | |
| 5,047,979 A | 9/1991 | Leung | |
| 5,068,603 A | 11/1991 | Mahoney | |
| 5,079,614 A | 1/1992 | Khatakhotan | |
| 5,097,422 A | 3/1992 | Corbin et al. | |
| 5,117,277 A | 5/1992 | Yuyama et al. | |
| 5,121,186 A | 6/1992 | Wong et al. | |
| 5,208,765 A | 5/1993 | Turnbull | |
| 5,224,057 A | 6/1993 | Igarashi | |
| 5,242,770 A | 9/1993 | Chen et al. | |
| 5,268,319 A | 12/1993 | Harari | |
| 5,298,774 A | 3/1994 | Ueda et al. | |
| 5,313,426 A | 5/1994 | Sakuma et al. | |
| 5,338,963 A | 8/1994 | Klaasen | |
| 5,351,197 A | 9/1994 | Upton et al. | |
| 5,359,226 A | 10/1994 | DeJong | |
| 5,365,454 A | 11/1994 | Nakagawa et al. | |
| 5,367,187 A | 11/1994 | Yuen | |
| 5,378,649 A | 1/1995 | Huang | |
| 5,396,128 A | 3/1995 | Dunning et al. | |
| 5,420,447 A | 5/1995 | Waggoner | |
| 5,461,577 A | 10/1995 | Shaw et al. | |
| 5,471,403 A | 11/1995 | Fujimaga | |
| 5,497,334 A | 3/1996 | Russell et al. | |
| 5,497,337 A | 3/1996 | Ponnapalli et al. | |
| 5,526,307 A | 6/1996 | Lin et al. | |
| 5,536,955 A | 7/1996 | Ali | |
| 5,545,904 A | 8/1996 | Orbach | |
| 5,581,098 A | 12/1996 | Chang | |
| 5,581,202 A | 12/1996 | Yano et al. | |
| 5,612,893 A | 3/1997 | Hao et al. | |
| 5,636,002 A | 6/1997 | Garofalo | |
| 5,656,861 A | 8/1997 | Godinho et al. | |
| 5,682,323 A | 10/1997 | Pasch et al. | |
| 5,684,311 A | 11/1997 | Shaw | |
| 5,684,733 A | 11/1997 | Wu et al. | |
| 5,698,873 A | 12/1997 | Colwell et al. | |
| 5,705,301 A | 1/1998 | Garza et al. | |
| 5,723,883 A | 3/1998 | Gheewalla | |
| 5,723,908 A | 3/1998 | Fuchida et al. | |
| 5,740,068 A | 4/1998 | Liebmann et al. | |
| 5,745,374 A | 4/1998 | Matsumoto | |
| 5,764,533 A | 6/1998 | deDood | |
| 5,774,367 A | 6/1998 | Reyes et al. | |
| 5,780,909 A | 7/1998 | Hayashi | |
| 5,789,776 A | 8/1998 | Lancaster et al. | |
| 5,790,417 A | 8/1998 | Chao et al. | |
| 5,796,128 A | 8/1998 | Tran et al. | |
| 5,796,624 A | 8/1998 | Sridhar et al. | |
| 5,798,298 A | 8/1998 | Yang et al. | |
| 5,814,844 A | 9/1998 | Nagata et al. | |
| 5,825,203 A | 10/1998 | Kusunoki et al. | |
| 5,834,851 A | 11/1998 | Ikeda et al. | |
| 5,838,594 A | 11/1998 | Kojima | |
| 5,841,663 A | 11/1998 | Sharma et al. | |
| 5,847,421 A | 12/1998 | Yamaguchi | |
| 5,850,362 A | 12/1998 | Sakuma et al. | |
| 5,852,562 A | 12/1998 | Shinomiya et al. | |
| 5,858,580 A | 1/1999 | Wang et al. | |
| 5,898,194 A | 4/1999 | Gheewala | |
| 5,900,340 A | 5/1999 | Reich et al. | |
| 5,905,287 A * | 5/1999 | Hirata ........................... | 257/355 |
| 5,908,827 A | 6/1999 | Sirna | |
| 5,915,199 A | 6/1999 | Hsu | |
| 5,917,207 A | 6/1999 | Colwell et al. | |
| 5,920,486 A | 7/1999 | Beahm et al. | |
| 5,923,059 A | 7/1999 | Gheewala | |
| 5,923,060 A | 7/1999 | Gheewala | |
| 5,929,469 A | 7/1999 | Mimoto et al. | |
| 5,930,163 A | 7/1999 | Hara et al. | |
| 5,935,763 A | 8/1999 | Caterer et al. | |
| 5,949,101 A | 9/1999 | Aritome | |
| 5,973,507 A | 10/1999 | Yamazaki | |
| 5,977,305 A | 11/1999 | Wigler et al. | |
| 5,977,574 A | 11/1999 | Schmitt et al. | |
| 5,998,879 A | 12/1999 | Iwaki et al. | |
| 6,009,251 A | 12/1999 | Ho et al. | |
| 6,026,223 A | 2/2000 | Scepanovic et al. | |
| 6,037,613 A | 3/2000 | Mariyama | |
| 6,037,617 A | 3/2000 | Kumagai | |
| 6,044,007 A | 3/2000 | Capodieci | |
| 6,054,872 A | 4/2000 | Fudanuki et al. | |
| 6,063,132 A | 5/2000 | DeCamp et al. | |
| 6,077,310 A | 6/2000 | Yamamoto et al. | |
| 6,080,206 A | 6/2000 | Tadokoro et al. | |
| 6,084,255 A | 7/2000 | Ueda | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A | 9/2000 | Chen et al. | |
| 6,144,227 A | 11/2000 | Sato | |
| 6,159,839 A | 12/2000 | Jeng et al. | |
| 6,166,415 A | 12/2000 | Sakemi et al. | |
| 6,166,560 A | 12/2000 | Ogura et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,255,845 B1 | 7/2001 | Wong et al. | |
| 6,262,487 B1 | 7/2001 | Igarashi et al. | |
| 6,269,472 B1 | 7/2001 | Garza et al. | |
| 6,275,973 B1 | 8/2001 | Wein | |
| 6,282,696 B1 | 8/2001 | Garza et al. | |
| 6,291,276 B1 | 9/2001 | Gonzalez | |
| 6,297,668 B1 | 10/2001 | Schober | |
| 6,297,674 B1 | 10/2001 | Kono et al. | |
| 6,303,252 B1 | 10/2001 | Lin | |
| 6,331,733 B1 | 12/2001 | Or-Bach et al. | |
| 6,331,791 B1 | 12/2001 | Huang | |
| 6,335,250 B1 | 1/2002 | Egi | |
| 6,338,972 B1 | 1/2002 | Sudhindranath et al. | |
| 6,347,062 B2 | 2/2002 | Nii et al. | |
| 6,356,112 B1 | 3/2002 | Tran et al. | |
| 6,359,804 B2 | 3/2002 | Kuriyama et al. | |

(56) References Cited

U.S. PATENT DOCUMENTS

| | | |
|---|---|---|
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,408,427 B1 | 6/2002 | Cong et al. |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,049 B1 | 9/2002 | Iranmanesh |
| 6,445,065 B1 | 9/2002 | Gheewala et al. |
| 6,467,072 B1 | 10/2002 | Yang et al. |
| 6,469,328 B2 | 10/2002 | Yanai et al. |
| 6,470,489 B1 | 10/2002 | Chang et al. |
| 6,476,493 B2 | 11/2002 | Or-Bach et al. |
| 6,477,695 B1 | 11/2002 | Gandhi |
| 6,480,032 B1 | 11/2002 | Aksamit |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,504,186 B2 | 1/2003 | Kanamoto et al. |
| 6,505,327 B2 | 1/2003 | Lin |
| 6,505,328 B1 | 1/2003 | Van Ginneken et al. |
| 6,507,941 B1 | 1/2003 | Leung et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,566,720 B2 | 5/2003 | Aldrich |
| 6,570,234 B1 | 5/2003 | Gardner |
| 6,571,140 B1 | 5/2003 | Wewalaarachchi |
| 6,571,379 B2 | 5/2003 | Takayama |
| 6,574,786 B1 | 6/2003 | Pohlenz et al. |
| 6,578,190 B2 | 6/2003 | Ferguson et al. |
| 6,583,041 B1 | 6/2003 | Capodieci |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,621,132 B2 | 9/2003 | Onishi et al. |
| 6,632,741 B1 | 10/2003 | Clevenger et al. |
| 6,633,182 B2 | 10/2003 | Pileggi et al. |
| 6,635,935 B2 | 10/2003 | Makino |
| 6,642,744 B2 | 11/2003 | Or-Bach et al. |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,664,587 B2 | 12/2003 | Guterman et al. |
| 6,673,638 B1 | 1/2004 | Bendik et al. |
| 6,677,649 B2 | 1/2004 | Minami et al. |
| 6,687,895 B2 | 2/2004 | Zhang |
| 6,690,206 B2 | 2/2004 | Rikino et al. |
| 6,691,297 B1 | 2/2004 | Misaka et al. |
| 6,700,405 B1 | 3/2004 | Hirairi |
| 6,703,170 B1 | 3/2004 | Pindo |
| 6,709,880 B2 | 3/2004 | Yamamoto et al. |
| 6,714,903 B1 | 3/2004 | Chu et al. |
| 6,732,334 B2 | 5/2004 | Nakatsuka |
| 6,732,338 B2 | 5/2004 | Crouse et al. |
| 6,732,344 B2 | 5/2004 | Sakamoto et al. |
| 6,734,506 B2 | 5/2004 | Oyamatsu |
| 6,737,199 B1 | 5/2004 | Hsieh |
| 6,737,318 B2 | 5/2004 | Murata et al. |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,750,555 B2 | 6/2004 | Satomi et al. |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B1 | 8/2004 | Samuels |
| 6,787,823 B2 | 9/2004 | Shibutani |
| 6,789,244 B2 | 9/2004 | Dasasathyan et al. |
| 6,789,246 B1 | 9/2004 | Mohan et al. |
| 6,792,591 B2 | 9/2004 | Shi et al. |
| 6,792,593 B2 | 9/2004 | Takashima et al. |
| 6,794,677 B2 | 9/2004 | Tamaki et al. |
| 6,794,914 B2 | 9/2004 | Sani et al. |
| 6,795,332 B2 | 9/2004 | Yamaoka et al. |
| 6,795,358 B2 | 9/2004 | Tanaka et al. |
| 6,795,952 B1 | 9/2004 | Stine et al. |
| 6,795,953 B2 | 9/2004 | Bakarian et al. |
| 6,800,883 B2 | 10/2004 | Furuya et al. |
| 6,806,180 B2 | 10/2004 | Cho |
| 6,807,663 B2 | 10/2004 | Cote et al. |
| 6,809,399 B2 | 10/2004 | Ikeda et al. |
| 6,812,574 B2 | 11/2004 | Tomita et al. |
| 6,818,389 B2 | 11/2004 | Fritze et al. |
| 6,818,929 B2 | 11/2004 | Tsutsumi et al. |
| 6,819,136 B2 | 11/2004 | Or-Bach |
| 6,820,248 B1 | 11/2004 | Gan |
| 6,826,738 B2 | 11/2004 | Cadouri |
| 6,834,375 B1 | 12/2004 | Stine et al. |
| 6,835,991 B2 | 12/2004 | Pell, III |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,867,073 B1 | 3/2005 | Enquist |
| 6,871,338 B2 | 3/2005 | Yamauchi |
| 6,872,990 B1 | 3/2005 | Kang |
| 6,877,144 B1 | 4/2005 | Rittman et al. |
| 6,881,523 B2 | 4/2005 | Smith |
| 6,884,712 B2 | 4/2005 | Yelehanka et al. |
| 6,885,045 B2 | 4/2005 | Hidaka |
| 6,889,370 B1 | 5/2005 | Kerzman et al. |
| 6,897,517 B2 | 5/2005 | Houdt et al. |
| 6,897,536 B2 | 5/2005 | Nomura et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,921,982 B2 | 7/2005 | Joshi et al. |
| 6,922,354 B2 | 7/2005 | Ishikura et al. |
| 6,924,560 B2 | 8/2005 | Wang et al. |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |
| 6,957,402 B2 | 10/2005 | Templeton et al. |
| 6,968,527 B2 | 11/2005 | Pierrat |
| 6,974,978 B1 | 12/2005 | Possley |
| 6,977,856 B2 | 12/2005 | Tanaka et al. |
| 6,978,436 B2 | 12/2005 | Cote et al. |
| 6,978,437 B1 | 12/2005 | Rittman et al. |
| 6,980,211 B2 | 12/2005 | Lin et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 6,998,722 B2 | 2/2006 | Madurawe |
| 7,003,068 B2 | 2/2006 | Kushner et al. |
| 7,009,862 B2 | 3/2006 | Higeta et al. |
| 7,016,214 B2 | 3/2006 | Kawamata |
| 7,022,559 B2 | 4/2006 | Barnak et al. |
| 7,028,285 B2 | 4/2006 | Cote et al. |

(56) References Cited

U.S. PATENT DOCUMENTS

| | | |
|---|---|---|
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,413 B2 | 7/2006 | Tsukamoto et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,183,611 B2 | 2/2007 | Bhattacharyya |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,257,017 B2 | 8/2007 | Liaw |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,329,953 B2 | 2/2008 | Tu |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,358,131 B2 | 4/2008 | Bhattacharyya |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,424,696 B2 | 9/2008 | Vogel et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,355 B2 | 4/2009 | Katase |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,781,847 B2 | 8/2010 | Yang |
| 7,791,109 B2 | 9/2010 | Wann et al. |
| 7,802,219 B2 | 9/2010 | Tomar et al. |
| 7,816,740 B2 | 10/2010 | Houston |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |

(56) References Cited

U.S. PATENT DOCUMENTS

| | | |
|---|---|---|
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,926,001 B2 | 4/2011 | Pierrat |
| 7,932,544 B2 | 4/2011 | Becker et al. |
| 7,932,545 B2 | 4/2011 | Becker et al. |
| 7,934,184 B2 | 4/2011 | Zhang |
| 7,939,443 B2 | 5/2011 | Fox et al. |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 | 7/2012 | Hong et al. |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,258,581 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,294,212 B2 | 10/2012 | Wang et al. |
| 8,316,327 B2 | 11/2012 | Herold |
| 8,356,268 B2 | 1/2013 | Becker et al. |
| 8,363,455 B2 | 1/2013 | Rennie |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 | 5/2013 | Becker et al. |
| 8,453,094 B2 | 5/2013 | Kornachuk et al. |
| 8,575,706 B2 | 11/2013 | Becker et al. |
| 8,667,443 B2 | 3/2014 | Smayling et al. |
| 8,701,071 B2 | 4/2014 | Kornachuk et al. |
| 8,735,995 B2 | 5/2014 | Becker et al. |
| 8,756,551 B2 | 6/2014 | Becker et al. |
| 8,836,045 B2 | 9/2014 | Becker et al. |
| 8,839,162 B2 | 9/2014 | Amundson et al. |
| 8,839,175 B2 | 9/2014 | Smayling et al. |
| 8,847,329 B2 | 9/2014 | Becker et al. |
| 8,863,063 B2 | 10/2014 | Becker et al. |
| 9,006,841 B2 | 4/2015 | Kumar |
| 9,202,779 B2 | 12/2015 | Kornachuk et al. |
| 9,269,423 B2 | 2/2016 | Sever |
| 9,336,344 B2 | 5/2016 | Smayling |
| 2001/0049813 A1 | 12/2001 | Chan et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0063582 A1 | 5/2002 | Rikino |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1 | 6/2003 | Moniwa et al. |
| 2003/0117168 A1 | 6/2003 | Uneme et al. |
| 2003/0124847 A1 | 7/2003 | Houston et al. |
| 2003/0125917 A1 | 7/2003 | Rich et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0203287 A1 | 10/2003 | Miyagawa |
| 2003/0229868 A1 | 12/2003 | White et al. |
| 2003/0229875 A1 | 12/2003 | Smith et al. |
| 2004/0029372 A1 | 2/2004 | Jang et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0164360 A1 | 8/2004 | Nishida et al. |
| 2004/0169201 A1 | 9/2004 | Hidaka |

(56) References Cited

U.S. PATENT DOCUMENTS

| | | |
|---|---|---|
| 2004/0194050 A1 | 9/2004 | Hwang et al. |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Cho et al. |
| 2005/0044522 A1 | 2/2005 | Maeda |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1 | 12/2005 | Kawachi |
| 2005/0280031 A1* | 12/2005 | Yano .................. 257/202 |
| 2006/0036976 A1 | 2/2006 | Cohn |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113533 A1 | 6/2006 | Tamaki et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0170108 A1 | 8/2006 | Hiroi |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0195810 A1 | 8/2006 | Morton |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2006/0261417 A1* | 11/2006 | Suzuki ............... H01L 27/0207 257/370 |
| 2006/0277521 A1 | 12/2006 | Chen |
| 2007/0001304 A1 | 1/2007 | Liaw |
| 2007/0002617 A1 | 1/2007 | Houston |
| 2007/0004147 A1 | 1/2007 | Toubou |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1 | 8/2007 | Tanaka |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1 | 10/2007 | Uedi et al. |
| 2007/0241810 A1* | 10/2007 | Onda .................. 327/544 |
| 2007/0256039 A1 | 11/2007 | White |
| 2007/0257277 A1 | 11/2007 | Takeda et al. |
| 2007/0264758 A1 | 11/2007 | Correale |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0001176 A1 | 1/2008 | Gopalakrishnan |
| 2008/0005712 A1 | 1/2008 | Charlebois et al. |
| 2008/0021689 A1 | 1/2008 | Yamashita et al. |
| 2008/0022247 A1 | 1/2008 | Kojima et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1 | 4/2008 | Kobayashi et al. |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0308880 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0235215 A1 | 9/2009 | Lavin |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |

(56) References Cited

U.S. PATENT DOCUMENTS

| | | |
|---|---|---|
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0115484 A1 | 5/2010 | Frederick |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0252865 A1 | 10/2010 | Van Der Zanden |
| 2010/0252896 A1 | 10/2010 | Smayling |
| 2010/0264468 A1 | 10/2010 | Xu |
| 2010/0270681 A1 | 10/2010 | Bird et al. |
| 2010/0287518 A1 | 11/2010 | Becker |
| 2010/0301482 A1 | 12/2010 | Schultz et al. |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2011/0317477 A1 | 12/2011 | Liaw |
| 2012/0012932 A1 | 1/2012 | Perng et al. |
| 2012/0118854 A1 | 5/2012 | Smayling |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |
| 2014/0197543 A1 | 7/2014 | Kornachuk et al. |
| 2015/0249041 A1 | 9/2015 | Becker et al. |
| 2015/0270218 A1 | 9/2015 | Becker et al. |
| 2016/0079159 A1 | 3/2016 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 58-215827 | 12/1983 |
| JP | 61-182244 | 8/1986 |
| JP | S63-310136 A | 12/1988 |
| JP | H01284115 | 11/1989 |
| JP | 03-165061 | 7/1991 |
| JP | H05152937 A | 6/1993 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-100872 | 4/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2006-073696 | 3/2006 |
| JP | 2005-114752 | 10/2006 |
| JP | 2006-303022 A | 11/2006 |
| JP | 2007-012855 | 1/2007 |
| JP | 2007-013060 | 1/2007 |
| JP | 2007-043049 | 2/2007 |
| JP | 2007-141971 | 6/2007 |
| JP | 2011-515841 | 5/2011 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 2000-0005660 | 1/2000 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 2004-0005609 | 1/2004 |
| KR | 10-2005-0030347 A | 3/2005 |
| KR | 2005-0037965 A | 4/2005 |

(56) References Cited

FOREIGN PATENT DOCUMENTS

| | | |
|---|---|---|
| KR | 2006-0108233 A | 10/2006 |
| TW | 386288 | 4/2000 |
| TW | 200709309 | 3/2007 |
| TW | 200709565 | 3/2007 |
| TW | 200811704 A | 3/2008 |
| TW | 200947567 A | 11/2009 |
| WO | WO 2005/104356 | 11/2005 |
| WO | WO 2006/014849 | 2/2006 |
| WO | WO 2006/052738 | 5/2006 |
| WO | WO 2006/090445 | 8/2006 |
| WO | WO 2007/014053 | 2/2007 |
| WO | WO 2007/103587 | 9/2007 |

OTHER PUBLICATIONS

Acar, et al., "A Linear-Centric Simulation Framework for Parametric Fluctuations", 2002, IEEE, Carnegie Mellon University USA, pp. 1-8, Jan. 28, 2002.

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476, Dec. 10, 1995.

Axelrad et al. "Efficient Full-Chip Yield Analysis Methodology for OPC-Corrected VLSI Design", 2000, International Symposium on Quality Electronic Design (ISQED), Mar. 20, 2000.

Balasinski et al. "Impact of Subwavelength CD Tolerance on Device Performance", 2002, SPIE vol. 4692, Jul. 11, 2002.

Burkhardt, et al., "Dark Field Double Dipole Lithography (DDL) for Back-End-Of-Line Processes", 2007, SPIE Proceeding Series, vol. 6520; Mar. 26, 2007.

Capetti, et al., "Sub k1=0.25 Lithography with Double Patterning Technique for 45nm Technology Node Flash Memory Devices at λ=193nm", 2007, SPIE Proceeding Series, vol. 6520; Mar. 27, 2007.

Capodieci, L., et al., "Toward a Methodology for Manufacturability-Driven Design Rule Exploration," DAC 2004, Jun. 7, 2004, San Diego, CA.

Chandra, et al., "An Interconnect Channel Design Methodology for High Performance Integrated Circuits", 2004, IEEE, Carnegie Mellon University, pp. 1-6, Feb. 16, 2004.

Cheng, et al., "Feasibility Study of Splitting Pitch Technology on 45nm Contact Patterning with 0.93 NA", 2007, SPIE Proceeding Series, vol. 6520; Feb. 25, 2007.

Chow, et al., "The Design of a SRAM-Based Field-Programmable Gate Array—Part II: Circuit Design and Layout", 1999, IEEE, vol. 7 # 3 pp. 321-330, Sep. 1, 1999.

Clark et al. "Managing Standby and Active Mode Leakage Power in Deep Sub-Micron Design", Aug. 9, 2004, ACM.

Cobb et al. "Using OPC to Optimize for Image Slope and Improve Process Window", 2003, SPIE vol. 5130, Apr. 16, 2003.

Devgan "Leakage Issues in IC Design: Part 3", 2003, ICCAD, Nov. 9, 2003.

DeVor, et al., "Statistical Quality Design and Control", 1992, Macmillan Publishing Company, pp. 264-267, Jan. 3, 1992.

Dictionary.com, "channel," in Collins English Dictionary—Complete & Unabridged 10th Edition. Source location: HarperCollins Publishers. Sep. 3, 2009.

Dusa, et al. "Pitch Doubling Through Dual Patterning Lithography Challenges in Integration and Litho Budgets", 2007, SPIE Proceeding Series, vol. 6520; Feb. 25, 2007.

El-Gamal, "Fast, Cheap and Under Control: The Next Implementation Fabric", Jun. 2, 2003, ACM Press, pp. 354-355.

Firedberg, et al., "Modeling Within-Field Gate Length Spatial Variation for Process-Design Co-Optimization," 2005 Proc. of SPIE vol. 5756, pp. 178-188, Feb. 27, 2005.

Frankel, "Quantum State Control Interference Lithography and Trim Double Patterning for 32-16nm Lithography", 2007, SPIE Proceeding Series, vol. 6520; Feb. 27, 2007.

Garg, et al. "Lithography Driven Layout Design", 2005, IEEE VLSI Design 2005, Jan. 3, 2005.

Grobman et al. "Reticle Enhancement Technology Trends: Resource and Manufacturability Implications for the Implementation of Physical Designs" Apr. 1, 2001, ACM.

Grobman et al. "Reticle Enhancement Technology. Implications and Challenges for Physical Design" Jun. 18, 2001, ACM.

Gupta et al. "Enhanced Resist and Etch CD Control by Design Perturbation", Oct. 4, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED), Mar. 21, 2005.

Gupta et al. "Detailed Placement for Improved Depth of Focus and CD Control", 2005, ACM, Jan. 18, 2005.

Gupta et al. "Joining the Design and Mask Flows for Better and Cheaper Masks", Oct. 14, 2004, Society of Photo-Optical Instrumentation Engineers.

Gupta et al. "Manufacturing-Aware Physical Design", ICCAD 2003, Nov. 9, 2003.

Gupta et al. "Selective Gate-Length Biasing for Cost-Effective Runtime Leakage Control", Jun. 7, 2004, ACM.

Gupta et al. "Wafer Topography-Aware Optical Proximity Correction for Better DOF Margin and CD Control", Apr. 13, 2005, SPIE.

Gupta, Puneet, et al., "Manufacturing-aware Design Methodology for Assist Feature Correctness," SPIE vol. 5756, May 13, 2005.

Ha et al., "Reduction in the Mask Error Factor by Optimizing the Diffraction Order of a Scattering Bar in Lithography," Journal of the Korean Physical Society, vol. 46, No. 5, May 5, 2005, pp. 1213-1217.

Hakko, et al., "Extension of the 2D-TCC Technique to Optimize Mask Pattern Layouts," 2008 Proc. of SPIE vol. 7028, 11 pages, Apr. 16, 2008.

Halpin et al., "Detailed Placement with Net Length Constraints," Publication Year 2003, Proceedings of the 3rd IEEE International Workshop on System-on-Chip for Real-Time Applications, pp. 22-27, Jun. 30, 2003.

Hayashida, et al., "Manufacturable Local Interconnect technology Fully Compatible with Titanium Salicide Process", Jun. 11, 1991, VMIC Conference.

Heng, et al., "A VLSI Artwork Legalization Technique Base on a New Criterion of Minimum Layout Perturbation", Proceedings of 1997 International Symposium on Physical Design, pp. 116-121, Apr. 14, 1997.

Heng, et al., "Toward Through-Process Layout Quality Metrics", Mar. 3, 2005, Society of Photo-Optical Instrumentation Engineers.

Hu, et al., "Synthesis and Placement Flow for Gain-Based Programmable Regular Fabrics", Apr. 6, 2003, ACM Press, pp. 197-203.

Hur et al., "Mongrel: Hybrid Techniques for Standard Cell Placement," Publication Year 2000, IEEE/ACM International Conference on Computer Aided Design, ICCAD-2000, pp. 165-170, Nov. 5, 2000.

Hutton, et al., "A Methodology for FPGA to Structured-ASIC Synthesis and Verification", 2006, EDAA, pp. 64-69, Mar. 6, 2006.

Intel Core Microarchitecture White Paper "Introducing the 45 nm Next-Generation Intel Core Microarchitecture," Intel Corporation, 2007 (best available publication date).

Jayakumar, et al., "A Metal and VIA Maskset Programmable VLSI Design Methodology using PLAs", 2004, IEEE, pp. 590-594, Nov. 7, 2004.

Jhaveri, T. et al., Maximization of Layout Printability/Manufacturability by Extreme Layout Regularity, Proc. of the SPIE vol. 6156, Feb. 19, 2006.

Kang, S.M., Metal-Metal Matrix (M3) for High-Speed MOS VLSI Layout, IEEE Trans. on CAD, vol. CAD-6, No. 5, Sep. 1, 1987.

Kawashima, et al., "Mask Optimization for Arbitrary Patterns with 2D-TCC Resolution Enhancement Technique," 2008 Proc. of SPIE vol. 6924, 12 pages, Feb. 24, 2008.

Kheterpal, et al., "Design Methodology for IC Manufacturability Based on Regular Logic-Bricks", DAC, Jun. 13, 2005, IEEE/AMC, vol. 6520.

(56) References Cited

OTHER PUBLICATIONS

Kheterpal, et al., "Routing Architecture Exploration for Regular Fabrics", DAC, Jun. 7, 2004, ACM Press, pp. 204-207.
Kim, et al., "Double Exposure Using 193nm Negative Tone Photoresist", 2007, SPIE Proceeding Series, vol. 6520; Feb. 25, 2007.
Kim, et al., "Issues and Challenges of Double Patterning Lithography in DRAM", 2007, SPIE Proceeding Series, vol. 6520; Feb. 25, 2007.
Koorapaty, et al., "Exploring Logic Block Granularity for Regular Fabrics", 2004, IEEE, pp. 1-6, Feb. 16, 2004.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 1, 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2, 2002, Springer-Verlag, vol. 2438 pp. 132-141.
Kuh et al., "Recent Advances in VLSI Layout," Proceedings of the IEEE, vol. 78, Issue 2, pp. 237-263, Feb. 1, 1990.
Lavin et al. "Backend DAC Flows for "Restrictive Design Rules"", 2004, IEEE, Nov. 7, 2004.
Li, et al., "A Linear-Centric Modeling Approach to Harmonic Balance Analysis", 2002, IEEE, pp. 1-6, Mar. 4, 2002.
Li, et al., "Nonlinear Distortion Analysis Via Linear-Centric Models", 2003, IEEE, pp. 897-903, Jan. 21, 2003.
Liebmann et al., "Integrating DfM Components into a Cohesive Design-to-Silicon Solution," Proc. SPIE 5756, Design and Process Integration for Microelectronic Manufacturing III, Feb. 27, 2005.
Liebmann et al., "Optimizing Style Options for Sub-Resolution Assist Features," Proc. of SPIE vol. 4346, Feb. 25, 2001, pp. 141-152.
Liebmann, et al., "High-Performance Circuit Design for the RET-Enabled 65nm Technology Node", Feb. 26, 2004, SPIE Proceeding Series, vol. 5379 pp. 20-29.
Liebmann, L. W., Layout Impact of Resolution Enhancement Techniques: Impediment or Opportunity?, International Symposium on Physical Design, Apr. 6, 2003.
Liu et al., "Double Patterning with Multilayer Hard Mask Shrinkage for Sub 0.25 k1 Lithography," Proc. SPIE 6520, Optical Microlithography XX, Feb. 25, 2007.
Mansfield et al., "Lithographic Comparison of Assist Feature Design Strategies," Proc. of SPIE vol. 4000, Feb. 27, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, Dec. 21, 2010.
Mo, et al., "Checkerboard: A Regular Structure and its Synthesis, International Workshop on Logic and Synthesis", Department of Electrical Engineering and Computer Sciences, UC Berkeley, California, pp. 1-7, Jun. 1, 2003.
Mo, et al., "PLA-Based Regular Structures and Their Synthesis", Department of Electrical Engineering and Computer Sciences, IEEE, pp. 723-729, Jun. 1, 2003.
Mo, et al., "Regular Fabrics in Deep Sub-Micron Integrated-Circuit Design", Kluwer Academic Publishers, Entire Book, Jun. 1, 2002.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE, Aug. 1, 1995.
Op de Beek, et al., "Manufacturability issues with Double Patterning for 50nm half pitch damascene applications, using RELACS® shrink and corresponding OPC", 2007, SPIE Proceeding Series, vol. 6520; Feb. 25, 2007.
Or-Bach, "Programmable Circuit Fabrics", Sep. 18, 2001, e-ASIC, pp. 1-36.
Otten, et al., "Planning for Performance", DAC 1998, ACM Inc., pp. 122-127, Jun. 15, 1998.
Pack et al. "Physical & Timing Verification of Subwavelength-Scale Designs—Part I: Lithography Impact on MOSFETs", 2003, SPIE vol. 5042, Feb. 23, 2003.
Pandini, et al., "Congestion-Aware Logic Synthesis", 2002, IEEE, pp. 1-8, Mar. 4, 2002.
Pandini, et al., "Understanding and Addressing the Impact of Wiring Congestion During Technology Mapping", ISPD Apr. 7, 2002, ACM Press, pp. 131-136.
Patel, et al., "An Architectural Exploration of Via Patterned Gate Arrays, ISPD 2003", Apr. 6, 2003, pp. 184-189.
Pham, D., et al., "FINFET Device Junction Formation Challenges," 2006 International Workshop on Junction Technology, pp. 73-77, Aug. 1, 2006.
Pileggi, et al., "Exploring Regular Fabrics to Optimize the Performance-Cost Trade-Offs, Proceedings of the 40th ACM/IEEE Design Automation Conference (DAC) 2003", Jun. 2, 2003, ACM Press, pp. 782-787.
Poonawala, et al., "ILT for Double Exposure Lithography with Conventional and Novel Materials", 2007, SPIE Proceeding Series, vol. 6520; Feb. 25, 2007.
Qian et al. "Advanced Physical Models for Mask Data Verification and Impacts on Physical Layout Synthesis" 2003 IEEE, Mar. 24, 2003.
Ran, et al., "An Integrated Design Flow for a Via-Configurable Gate Array", 2004, IEEE, pp. 582-589, Nov. 7, 2004.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 7, 2004, ACM Press, s 198-203.
Ran, et al., "The Magic of a Via-Configurable Regular Fabric", Proceedings of the IEEE International Conference on Computer Design (ICCD) Oct. 11, 2004.
Ran, et al., "Via-Configurable Routing Architectures and Fast Design Mappability Estimation for Regular Fabrics", 2005, IEEE, pp. 25-32, Sep. 1, 2006.
Reis, et al., "Physical Design Methodologies for Performance Predictability and Manufacturability", Apr. 14, 2004, ACM Press, pp. 390-397.
Robertson, et al., "The Modeling of Double Patterning Lithographic Processes", 2007, SPIE Proceeding Series, vol. 6520; Feb. 25, 2007.
Rosenbluth, et al., "Optimum Mask and Source Patterns to Print a Given Shape," 2001 Proc. of SPIE vol. 4346, pp. 486-502, Feb. 25, 2001.
Rovner, "Design for Manufacturability in Via Programmable Gate Arrays", May 1, 2003, Graduate School of Carnegie Mellon University.
Sengupta, "An Integrated CAD Framework Linking VLSI Layout Editors and Process Simulators", 1998, Thesis for Rice University, pp. 1-101, Nov. 1, 1998.
Sengupta, et al., "An Integrated CAD Framework Linking VLSI Layout Editors and Process Simulators", 1996, SPIE Proceeding Series, vol. 2726; pp. 244-252, Mar. 10, 1996.
Sherlekar, "Design Considerations for Regular Fabrics", Apr. 18, 2004, ACM Press, pp. 97-102.
Shi et al., "Understanding the Forbidden Pitch and Assist Feature Placement," Proc. of SPIE vol. 4562, pp. 968-979, Mar. 11, 2002.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Socha, et al., "Simultaneous Source Mask Optimization (SMO)," 2005 Proc. of SPIE vol. 5853, pp. 180-193, Apr. 13, 2005.
Sreedhar et al. "Statistical Yield Modeling for Sub-Wavelength Lithography", 2008 IEEE, Oct. 28, 2008.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7, 2004, ACM Press, pp. 874-877.

(56) References Cited

OTHER PUBLICATIONS

Tian et al. "Model-Based Dummy Feature Placement for Oxide Chemical_Mechanical Polishing Manufacturability" IEEE, vol. 20, Issue 7, Jul. 1, 2001.
Tong, et al., "Regular Logic Fabrics for a Via Patterned Gate Array (VPGA), Custom Integrated Circuits Conference", Sep. 21, 2003, Proceedings of the IEEE, pp. 53-56.
Vanleenhove, et al., "A Litho-Only Approach to Double Patterning", 2007, SPIE Proceeding Series, vol. 6520; Feb. 25, 2007.
Wang, et al., "Performance Optimization for Gridded-Layout Standard Cells", vol. 5567 SPIE, Sep. 13, 2004.
Wang, J. et al., Standard Cell Layout with Regular Contact Placement, IEEE Trans. on Semicon. Mfg., vol. 17, No. 3, Aug. 9, 2004.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", vol. 6156 SPIE, Feb. 19, 2006.
Wenren, et al., "The Improvement of Photolithographic Fidelity of Two-dimensional Structures Though Double Exposure Method", 2007, SPIE Proceeding Series, vol. 6520; Feb. 25, 2007.
Wilcox, et al., "Design for Manufacturability: A Key to Semiconductor Manufacturing Excellence", 1998 IEEE, pp. 308-313, Sep. 23, 1998.
Wong, et al., "Resolution Enhancement Techniques and Design for Manufacturability: Containing and Accounting for Variabilities in Integrated Circuit Creation," J. Micro/Nanolith. MEMS MOEMS, Sep. 27, 2007, vol. 6(3), 2 pages.
Wu, et al., "A Study of Process Window Capabilities for Two-dimensional Structures under Double Exposure Condition", 2007, SPIE Proceeding Series, vol. 6520; Feb. 25, 2007.
Xiong, et al., "The Constrained Via Minimization Problem for PCB and VLSI Design", 1988 ACM Press/IEEE, pp. 573-578, Jun. 12, 1998.
Yamamaoto, et al., "New Double Exposure Technique without Alternating Phase Shift Mask", SPIE Proceeding Series, vol. 6520; Feb. 25, 2007.
Yamazoe, et al., "Resolution Enhancement by Aerial Image Approximation with 2D-TCC," 2007 Proc. of SPIE vol. 6730, 12 pages, Sep. 17, 2007.
Yang, et al., "Interconnection Driven VLSI Module Placement Based on Quadratic Programming and Considering Congestion Using LFF Principles", 2004 IEEE, pp. 1243-1247, Jun. 27, 2004.
Yao, et al., "Multilevel Routing With Redundant Via Insertion", Oct. 23, 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Sep. 11, 2007, vol. 6(3), 16 pages.
Zheng, et al."Modeling and Analysis of Regular Symmetrically Structured Power/Ground Distribution Networks", DAC, Jun. 10, 2002, ACM Press, pp. 395-398.
Zhu, et al., "A Stochastic Integral Equation Method for Modeling the Rough Surface Effect on Interconnect Capacitance", 2004 IEEE, Nov. 7, 2004.
Zhu, et al., "A Study of Double Exposure Process Design with Balanced Performance Parameters for Line/Space Applications", 2007, SPIE Proceeding Series, vol. 6520; Feb. 25, 2007.
Zuchowski, et al., "A Hybrid ASIC and FPGA Architecture", 2003 IEEE, pp. 187-194, Nov. 10, 2002.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 1, 2003.
Aubusson, Russel, "Wafer-Scale Integration of Semiconductor Memory," Apr. 1, 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1, 1997.
Cao, Ke, "Design for Manufacturing (DFM) in Submicron VLSI Design," Aug. 1, 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 1, 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 1, 2007.
Deng, Liang et al., "Coupling-aware Dummy Metal Insertion for Lithography," p. 1, col. 2, Jan. 23, 2007.
Devoivre et al., "Validated 90nm CMOS Technology Platform with Low-k Copper Interconnects for Advanced System-on-Chip (SoC)," Jul. 12, 2002.
Enbody, R. J., "Near-Optimal n-Layer Channel Routing," Jun. 29, 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," Oct. 6, 2008.
Gupta et al., "Modeling Edge Placement Error Distribution in Standard Cell Library," Feb. 23, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurat et al., "A Genuine Design Manufacturability Check for Designers," Feb. 19, 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," IEDM 1998, Dec. 6, 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," Jul. 24, 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.

(56) References Cited

OTHER PUBLICATIONS

Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of ISQED," pp. 586-591, Mar. 21, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, Apr. 6, 2003.
Liebmann, Lars et al., "TCAD development for lithography resolution enhancement," Sep. 1, 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, Dec. 1, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2)," Jan. 1, 1995.
Muta et al., "Manufacturability-Aware Design of Standard Cells," pp. 2686-2690, Figs. 3, 12, Dec. 1, 2007.
Na, Kee-Yeol et al., "A Novel Single Polysilicon EEPROM Cell With a Polyfinger Capacitor," Nov. 30, 2007.
Pan et al., "Redundant Via Enhanced Maze Routing for Yield Improvement," DAC 2005, Jan. 18, 2005.
Park, Tae Hong, "Characterization and Modeling of Pattern Dependencies in Copper Interconnects for Integrated Circuits," Ph.D. Thesis, MIT, May 24, 2002.
Patel, Chetan, "An Architectural Exploration of Via Patterned Gate Arrays (CMU Master's Project)," May 1, 2003.
Pease, R. Fabian et al., "Lithography and Other Patterning Techniques for Future Electronics," IEEE 2008, vol. 96, Issue 2, Jan. 16, 2008.
Serrano, Diego Emilio, Pontificia Universidad Javeriana Facultad De Ingenieria, Departamento De Electronica, "Diseño De Multiplicador 4 X 8 en VLSI, Introduccion al VLSI," 2006 (best available publication date).
Pramanik, "Impact of layout on variability of devices for sub 90nm technologies," 2004 (best available publication date).
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," May 24, 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," Jul. 24, 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.

Tang, C. W. et al., "A compact large signal model of LDMOS," Solid-State Electronics 46(2002) 2111-2115, May 17, 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 1, 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, Jun. 6, 2001.
Torres, J. A. et al., "RET Compliant Cell Generation for sub-130nm Processes," SPIE vol. 4692, Mar. 6, 2002.
Uyemura, John P., "Introduction to VLSI Circuits and Systems," Chapters 2, 3, 5, and Part 3, Jul. 30, 2001.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," Jul. 28, 2006.
Wang, Dunwei et al., "Complementary Symmetry Silicon Nanowire Logic: Power-Efficient Inverters with Gain," Aug. 17, 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," Feb. 22, 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, Jul. 16, 2007.
Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions,, and Their Impact on Design," Micro IEEE vol. 23, Issue 2, Apr. 29, 2003.
Xu, Gang, "Redundant-Via Enhanced Maze Routing for Yield Improvement," Proceedings of ASP-DAC 2005, Jan. 18, 2005.
Yang, Jie, "Manufacturability Aware Design," pp. 93, 102, Fig. 5.2, Jan. 16, 2008.
Yongshun, Wang et al., "Static Induction Devices with Planar Type Buried Gate," Chinese Journal of Semiconductors, vol. 25, No. 2, Feb. 1, 2004.
Zobrist, George (editor), "Progress in Computer Aided VLSI Design: Implementations (Ch. 5)," Ablex Publishing Corporation, Feb. 1, 1990.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.
Kawasaki, H., et al., "Challenges and Solutions of FinFET Integration in an SRAM Cell and a Logic Circuit for 22 nm node and beyond," Electron Devices Meeting (IEDM), 2009 IEEE International, IEEE, Piscataway, NJ, USA, Dec. 7, 2009, pp. 1-4.

* cited by examiner

| Additional Interconnect Layers (225) | |
|---|---|
| Metal 4 (223) | |
| Via 3 (221) | |
| Metal 3 (219) | |
| Via 2 (217) | |
| Metal 2 (215) | |
| Via 1 (213) | |
| Metal 1 (211) | |
| Diffusion Contacts (205) | Gate Electrode Contacts (209) |
| | Gate Electrode Features (207) |
| Diffusion Regions (203) | |

Substrate (201)

Fig. 2

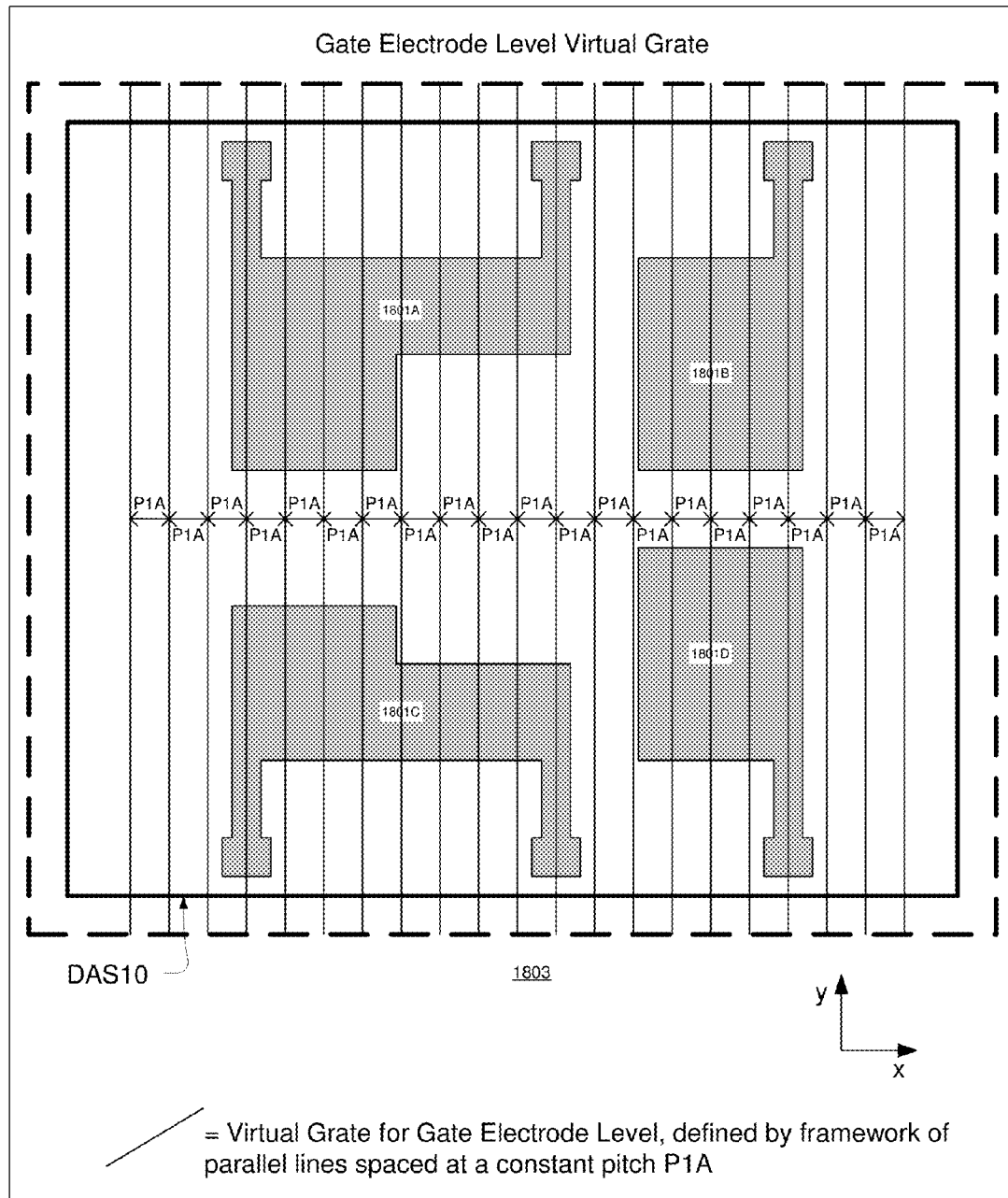
Fig. 19A1

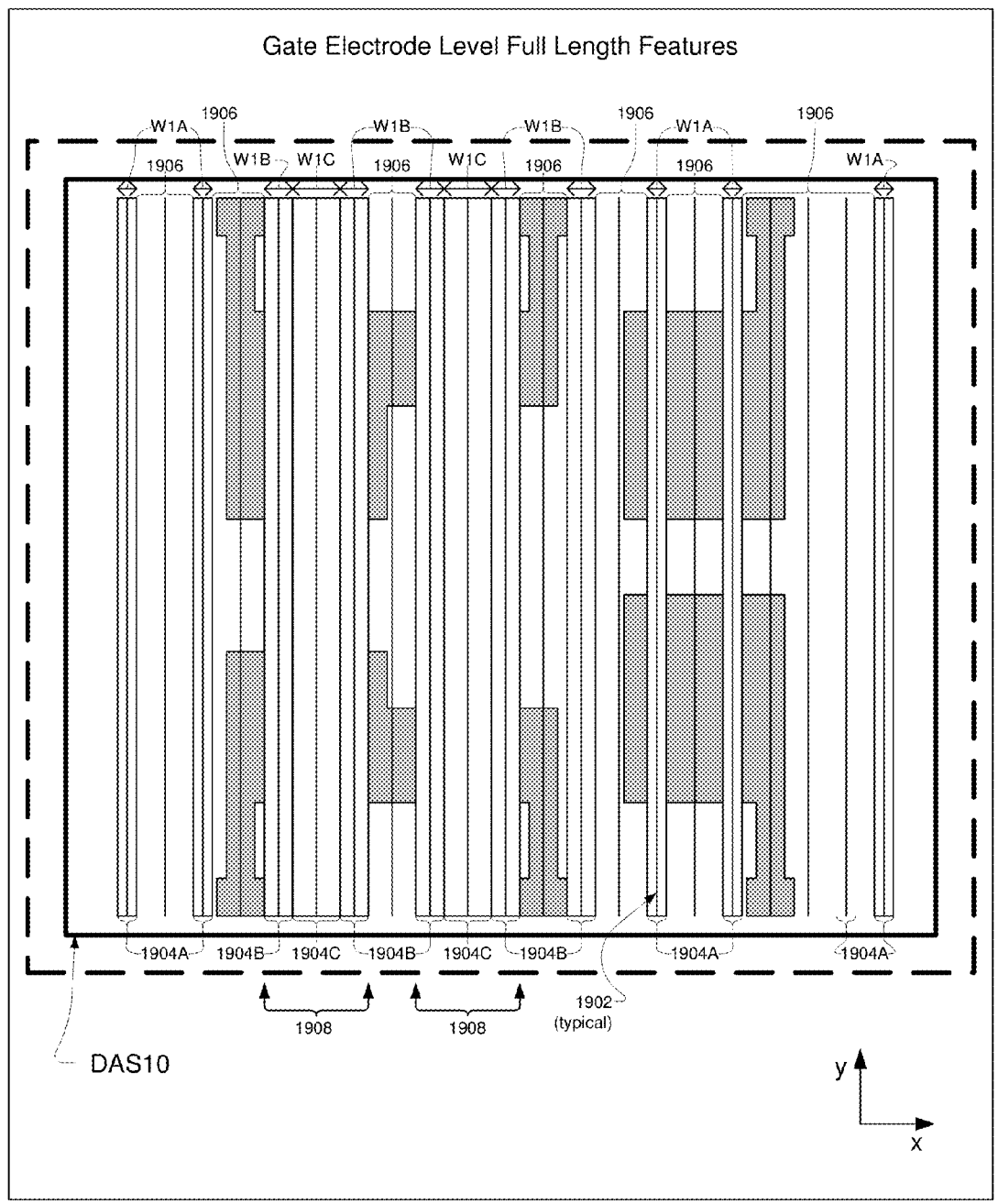
Fig. 19B1

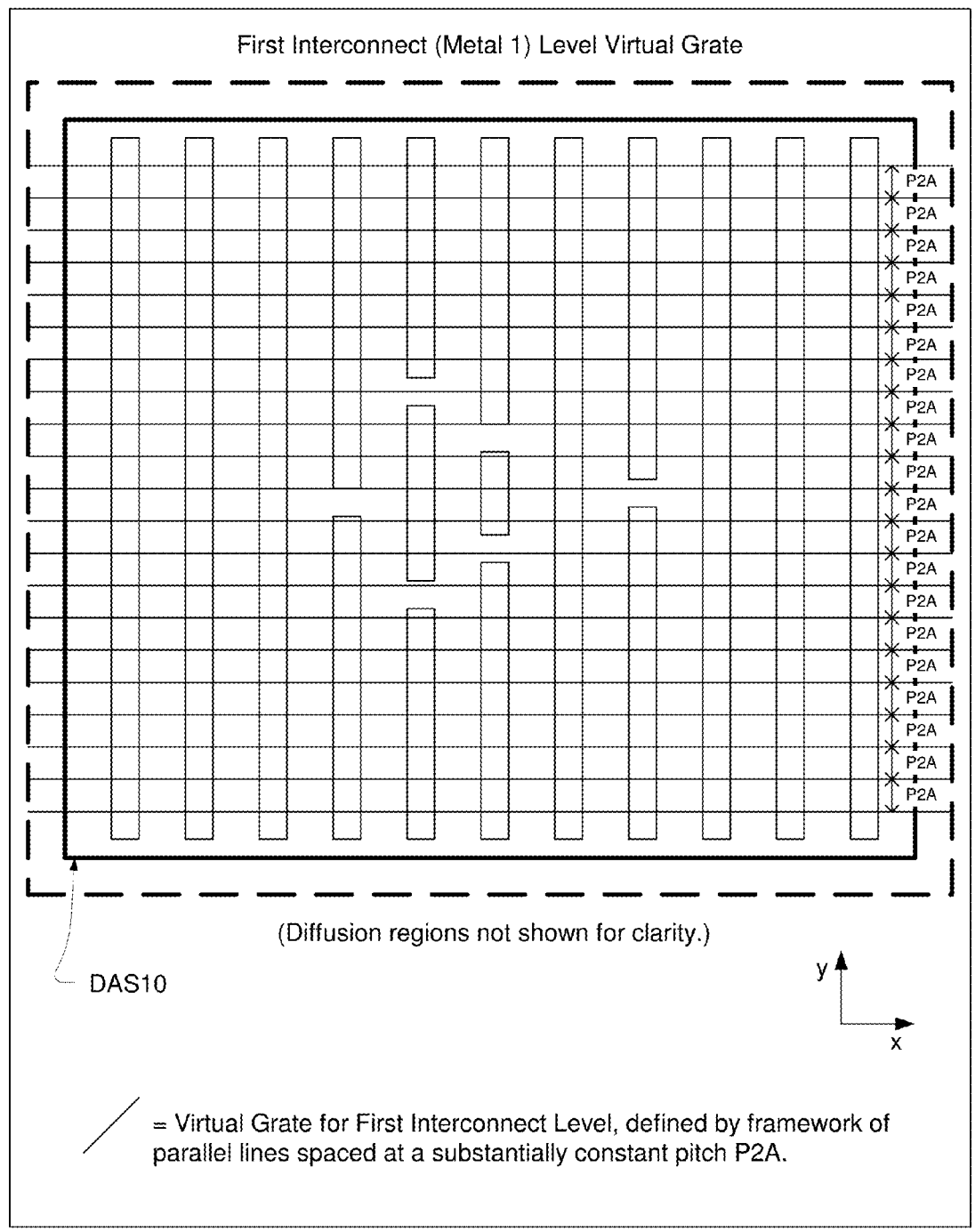
Fig. 20A1

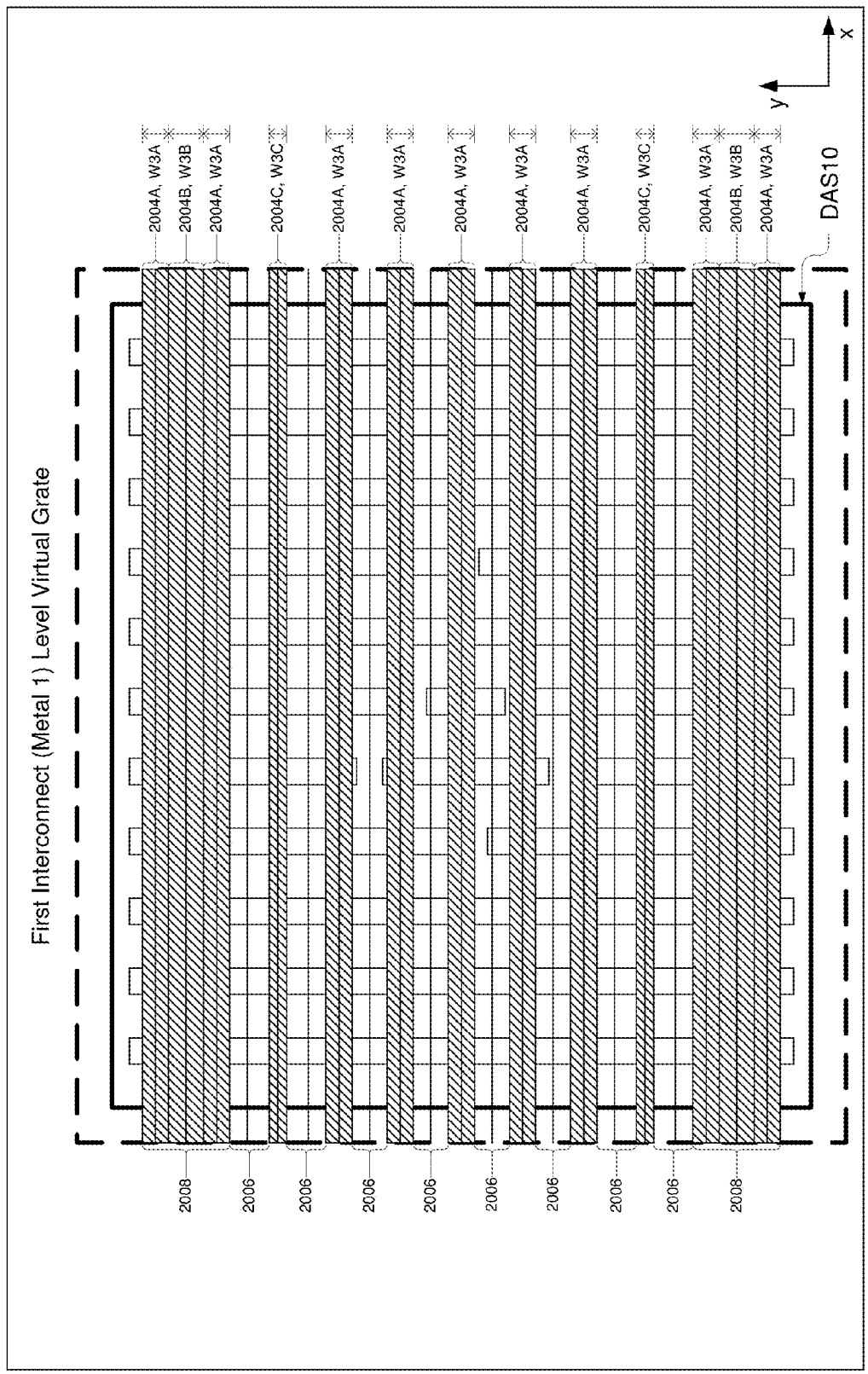
Fig. 20B1

SEMICONDUCTOR CHIP INCLUDING INTEGRATED CIRCUIT DEFINED WITHIN DYNAMIC ARRAY SECTION

CLAIM OF PRIORITY

This application is a continuation application under 35 U.S.C. 120 of prior U.S. application Ser. No. 13/047,474, filed Mar. 14, 2011, which is a continuation application under 35 U.S.C. 120 of prior U.S. application Ser. No. 12/013,356, filed Jan. 11, 2008, issued as U.S. Pat. No. 7,908,578, on Mar. 15, 2011, which 1) claims priority under 35 U.S.C. 119(e) to U.S. Provisional Patent Application No. 60/963,364, filed Aug. 2, 2007, and 2) claims priority under 35 U.S.C. 119(e) to U.S. Provisional Patent Application No. 60/972,394, filed Sep. 14, 2007. The disclosure of each above-identified patent application is incorporated herein by reference in its entirety.

CROSS-REFERENCE TO RELATED APPLICATIONS

This application is also related to U.S. patent application Ser. No. 11/683,402, filed on Mar. 7, 2007, and entitled "Dynamic Array Architecture." This application is also related to U.S. patent application Ser. No. 12/013,342, filed on Jan. 11, 2008, and entitled "Semiconductor Device with Dynamic Array Section." This application is also related to U.S. patent application Ser. No. 12/013,366, filed on Jan. 11, 2008, and entitled "Methods for Defining Dynamic Array Section with Manufacturing Assurance Halo and Apparatus Implementing the Same."

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are approaching 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. The quality of the light interaction prediction is declining as process geometries shrink and as the light interactions become more complex.

In view of the foregoing, a solution is needed for managing lithographic gap issues as technology continues to progress toward smaller semiconductor device features sizes.

SUMMARY

In one embodiment, a method is disclosed for designing a semiconductor chip having one or more functionally interfaced dynamic array sections. The method includes laying out a virtual grate for conductive features used to define a gate electrode level of a dynamic array section. The virtual grate is defined by a framework of parallel lines defined at a substantially constant pitch. The method also includes arranging one or more conductive features along a number of lines of the virtual grate. For each line of the virtual grate that has multiple conductive features arranged thereon, an operation is performed to define a gap between proximate ends of each pair of adjacent conductive features. Each gap is defined to maintain a substantially consistent separation between proximate ends of conductive features. Some of the conductive features are designed to define gate electrodes of transistor devices of the dynamic array section. The method further includes defining each conductive feature to be devoid of a substantial change in direction, such that the conductive features remain substantially aligned to the framework of parallel lines of the virtual grate.

In another embodiment, a method is disclosed for designing a semiconductor chip having one or more functionally interfaced dynamic array sections. The method includes defining a dynamic array section grid on a portion of the chip. The dynamic array section grid is defined by a virtual network of perpendicular gridlines projected upon the portion of the chip. The method also includes defining boundaries of a dynamic array section, such that each boundary of the dynamic array section aligns with a gridline of the dynamic array section grid. The dynamic array section represents a portion of the chip defined according to a dynamic array architecture. The method further includes defining one or more diffusion regions to be formed within a substrate portion of the dynamic array section. The method also includes defining a plurality of levels of the chip above the substrate portion within the dynamic array section. More specifically, a virtual grate is defined for each of the plurality of levels. The virtual grate is defined by a framework of parallel lines spaced at a substantially constant pitch. The framework of parallel lines that define the virtual grate for a particular level is oriented to be substantially perpendicular to the framework of parallel lines that define the virtual grate for either a level above or a level below the particular level. Defining the plurality of levels also includes defining a number of linear conductive features along the framework of lines that define the virtual grate in each of the plurality of levels. Some of the lines that define the virtual grates in the plurality of levels have defined thereon multiple linear conductive features having proximate ends separated by a gap. Each gap is defined to maintain a substantially uniform distance between proximate ends of linear conductive features within a portion of a given level of the chip within the dynamic array section. Each of the number of linear conductive features is defined to be devoid of a substantial change in direction relative to the line of the virtual grate along which the linear conductive feature is defined.

In another embodiment, a method is disclosed for designing a dynamic array section of a semiconductor chip. The method includes defining one or more diffusion regions to be formed within a substrate portion of the chip. The method also includes defining a plurality of levels of the dynamic array section above the substrate portion. Each level is defined to include linear conductive features arranged along a virtual grate associated with the level. The virtual grate of each level is defined by a framework of parallel lines spaced at a substantially constant pitch. The virtual grates in adjacent levels are oriented to be perpendicular to each other. The method further includes laying out a full-length linear conductive feature along a full length of a number of lines of each virtual grate of each level. The method also includes segmenting some of the full-length linear conductive features into a number of linear conductive segments. The segmenting of a given full-length linear conductive feature is performed by placing one or more gaps along the given full-length linear conductive feature, such that the gaps placed within a region of a given level are uniformly defined. A first portion of the linear conductive segments are defined to form conductive elements of an electronic circuit. A remaining portion of the linear conductive segments are defined to support manufacturing of the first portion and do not form conductive elements of the electronic circuit.

In another embodiment, a method is disclosed for designing an integrated circuit device. The method includes placing a first transistor of a first transistor type within a gate electrode level. The method also includes placing a second transistor of the first transistor type within the gate electrode level. The method also includes placing a third transistor of the first transistor type within the gate electrode level. The method also includes placing a fourth transistor of the first transistor type within the gate electrode level. Each of the first, second, third, and fourth transistors of the first transistor type includes a respective linear-shaped gate electrode segment positioned to extend lengthwise in a first direction. Also, the first, second, third, and fourth transistors of the first transistor type are placed according to a substantially equal centerline-to-centerline spacing as measured perpendicular to the first direction between centerlines of adjacently placed linear-shaped gate electrode segments. The method also includes placing a first transistor of a second transistor type within a gate electrode level. The method also includes placing a second transistor of the second transistor type within the gate electrode level. The method also includes placing a third transistor of the second transistor type within the gate electrode level. The method also includes placing a fourth transistor of the second transistor type within the gate electrode level. Each of the first, second, third, and fourth transistors of the second transistor type includes a respective linear-shaped gate electrode segment positioned to extend lengthwise in the first direction. Also, the first, second, third, and fourth transistors of the second transistor type are placed according to the substantially equal centerline-to-centerline spacing as measured perpendicular to the first direction. The method further includes placing a first linear conductive segment within the gate electrode level to electrically connect the gate electrode of the first transistor of the first transistor type to the gate electrode of the first transistor of the second transistor type. The method also includes placing a second linear conductive segment within the gate electrode level to electrically connect the gate electrode of the fourth transistor of the first transistor type to the gate electrode of the fourth transistor of the second transistor type. The method also includes placing a third linear conductive segment beside either the first linear conductive segment or the second linear conductive segment according to the substantially equal centerline-to-centerline spacing as measured perpendicular to the first direction. The first, second, and third linear conductive segments extend in the first direction parallel to each other.

In another embodiment, a method is disclosed for designing an integrated circuit device. The method includes placing a first transistor of a first transistor type within a gate electrode level. The first transistor of the first transistor type includes a linear-shaped gate electrode segment positioned to extend lengthwise in a first direction. The method also includes placing a first transistor of a second transistor type within a gate electrode level. The first transistor of the second transistor type includes a linear-shaped gate electrode segment positioned to extend lengthwise in the first direction. The linear-shaped gate electrodes of the first transistor of the first transistor type and the first transistor of the second transistor type are substantially co-aligned in the first direction. The method also includes placing a first linear conductive segment within the gate electrode level to electrically connect the linear-shaped gate electrode of the first transistor of the first transistor type to the linear-shaped gate electrode of the first transistor of the second transistor type. The method further includes placing a second linear conductive segment next to, spaced apart from, and parallel to the first linear conductive segment. The second linear conductive segment does not form a gate electrode of a transistor device.

In another embodiment, a method is disclosed for designing an integrated circuit device. The method includes placing a first transistor of a first transistor type within a gate electrode level. The first transistor of the first transistor type includes a first linear-shaped gate electrode defined to extend lengthwise in a first direction. The method also includes placing a second transistor of the first transistor type within the gate electrode level next to and spaced apart from the first transistor of the first transistor type. The second transistor of the first transistor type includes a second linear-shaped gate electrode defined to extend lengthwise in the first direction. The method also includes placing a third transistor of the first transistor type within the gate electrode level next to and spaced apart from the second transistor of the first transistor type. The third transistor of the first transistor type includes a third linear-shaped gate electrode defined to extend lengthwise in the first direction. Each of the first, second, and third transistors of the first transistor type are placed according to a substantially equal centerline-to-centerline spacing as measured perpendicular to the first direction between centerlines of adjacently placed linear-shaped gate electrodes. The method also includes placing a first linear conductive segment to extend lengthwise in the first direction from the first linear-shaped gate electrode to an end location as delineated in the first direction. The method also includes placing a second linear conductive segment to extend lengthwise in the first direction from the second linear-shaped gate electrode to the end location as delineated in the first direction. The method further includes placing a third linear conductive segment to extend lengthwise in the first direction from the third linear-shaped gate electrode to the end location as delineated in the first direction.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 2 is an illustration showing a generalized stack of layers used to define a dynamic array architecture, in accordance with one embodiment of the present invention;

FIG. 19A1 is an illustration showing a virtual grate of the gate electrode level set at a pitch equal to one-half of the minimum center-to-center spacing between adjacent contacted gate electrode features, in accordance with one embodiment of the present invention;

FIG. 19B1 is an illustration showing linear conductive features defined along various lines of the gate electrode level virtual grate of FIG. 19A1, in accordance with one embodiment of the present invention;

FIG. 20A1 is an illustration showing a virtual grate of the first interconnect level set at a pitch equal to one-half of the minimum center-to-center spacing between adjacent contacted linear conductive features of the first interconnect level, in accordance with one embodiment of the present invention;

FIG. 20B 1 is an illustration showing linear conductive features defined along various lines of the first interconnect level virtual grate of FIG. 20A1, in accordance with one embodiment of the present invention;

FIG. 26A-1 is an illustration showing a level of an exemplary DAS, in accordance with one embodiment of the present invention;

FIG. 26A-2 is an illustration showing the exemplary DAS of FIG. 26A-1 with its DAS halo region pre-defined to include a number of reinforcement features, in accordance with one embodiment of the present invention;

FIG. 26B-1 is an illustration showing a level of another exemplary DAS, in accordance with one embodiment of the present invention;

FIG. 26B-2 is an illustration showing the exemplary DAS of FIG. 26B-1 with its DAS halo region pre-defined to include a number of reinforcement features, in accordance with one embodiment of the present invention;

FIG. 26C-1 is an illustration showing an exemplary placement of the DAS of FIG. 26A-2 and the DAS of FIG. 26B-2 on a DAS grid, in accordance with one embodiment of the present invention;

FIG. 26C-2 is an illustration showing an exemplary placement of the DAS of FIG. 26A-2 and the DAS of FIG. 26B-2 on a DAS grid without regard to their respective DAS halos, in accordance with one embodiment of the present invention;

FIG. 26C-3 is an illustration showing the DAS cluster of FIG. 26C-2 having a DAS halo boundary defined around the periphery of the DAS cluster to form a DAS halo region, in accordance with one embodiment of the present invention;

FIG. 26C-4 is an illustration showing the defined content of the DAS halo region of FIG. 26C-3, in accordance with one embodiment of the present invention;

FIG. 26C-5 is an illustration showing the particular level of the DAS cluster of FIG. 26C-4 having a number of DAS interconnection segments defined therein, in accordance with one embodiment of the present invention;

FIG. 26D-1 is an illustration showing a flowchart of a method for defining a dynamic array architecture region of a semiconductor chip, in accordance with one embodiment of the present invention, in accordance with one embodiment of the present invention;

FIG. 26D-2 is an illustration showing a flowchart of a method for defining a dynamic array architecture region of a semiconductor chip, in accordance with one embodiment of the present invention;

DETAILED DESCRIPTION

Figure 1:
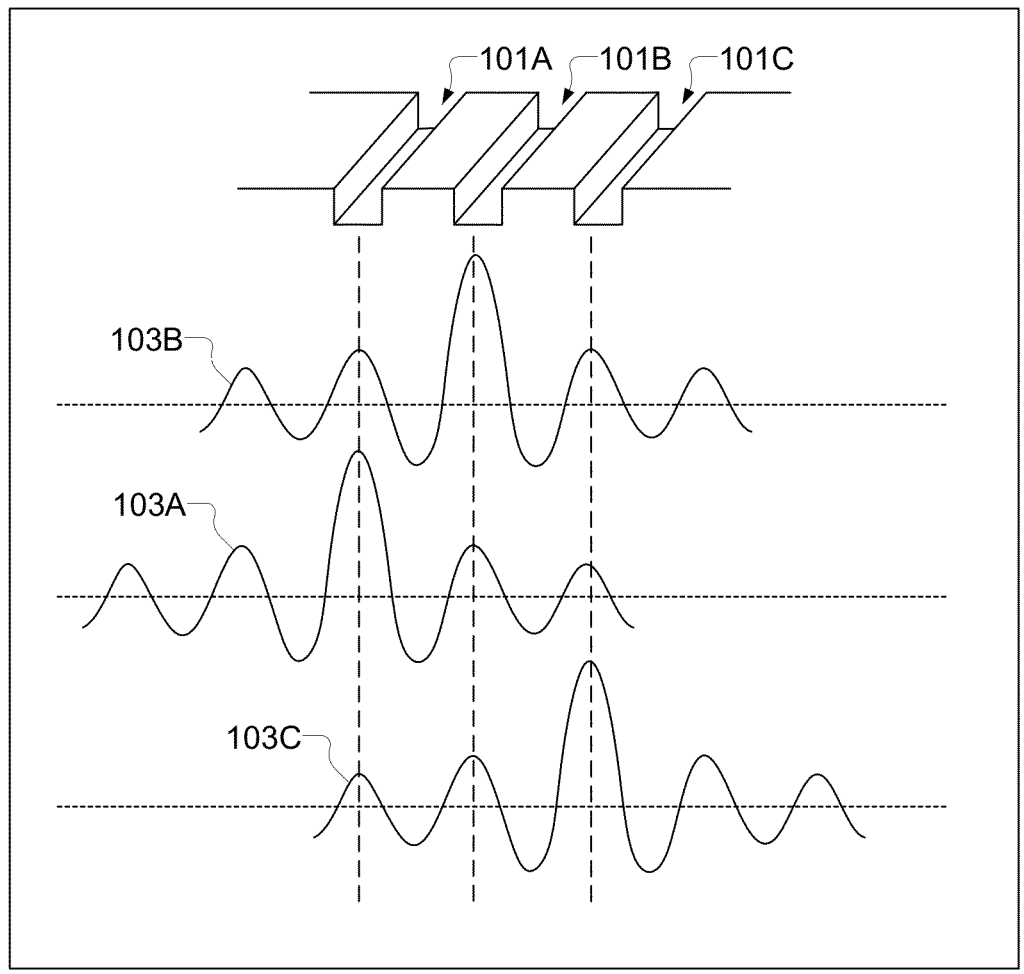
FIG. 1 is an illustration showing a number of neighboring layout features and a representation of light intensity used to render each of the layout features, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Generally speaking, a dynamic array architecture is provided to address semiconductor manufacturing process variability associated with a continually increasing lithographic gap. In the area of semiconductor manufacturing, lithographic gap is defined as the difference between the minimum size of a feature to be defined and the wavelength of light used to render the feature in the lithographic process, wherein the feature size is less than the wavelength of the light. Current lithographic processes utilize a light wavelength of 193 nm. However, current feature sizes are as small as 65 nm and are expected to soon approach sizes as small as 45 nm. With a size of 65 nm, the shapes are three times smaller than the wavelength of the light used to define the shapes. Also, considering that the interaction radius of light is about five light wavelengths, it should be appreciated that shapes exposed with a 193 nm light source will influence the exposure of shapes approximately 5*193 nm (965 nm) away. When considering the 65 nm sized features with respect to 90 nm sized features, it should be appreciated that approximately two times as many 65 nm sizes features may be within the 965 nm interaction radius of the 193 nm light source as compared to the 90 nm sized features.

Due to the increased number of features within the interaction radius of the light source, the extent and complexity of light interference contributing to exposure of a given feature is significant. Additionally, the particular shapes associated with the features within the interaction radius of the light source weighs heavily on the type of light interactions that occur. Traditionally, designers were allowed to define essentially any two-dimensional topology of feature shapes so long as a set of design rules were satisfied. For example, in a given layer of the chip, i.e., in a given mask, the designer may have defined two-dimensionally varying features having bends that wrap around each other. When such two-dimensionally varying features are located in neighboring proximity to each other, the light used to expose the features will interact in a complex and generally unpredictable manner. The light interaction becomes increasingly more complex and unpredictable as the feature sizes and relative spacing become smaller.

Traditionally, if a designer follows the established set of design rules, the resulting product will be manufacturable with a specified probability associated with the set of design rules. Otherwise, for a design that violates the set of design rules, the probability of successful manufacture of the resulting product is unknown. To address the complex light interaction between neighboring two-dimensionally varying features, in the interest of successful product manufacturing, the set of design rules is expanded significantly to adequately address the possible combinations of two-dimensionally varying features. This expanded set of design rules quickly becomes so complicated and unwieldy that application of the expanded set of design rules becomes prohibitively time consuming, expensive, and prone to error. For example, the expanded set of design rules requires complex verification. Also, the expanded set of design rules may not be universally applied. Furthermore, manufacturing yield is not guaranteed even if all design rules are satisfied.

It should be appreciated that accurate prediction of all possible light interactions when rendering arbitrarily-shaped two-dimensional features is generally not feasible. Moreover, as an alternative to or in combination with expansion of the set of design rules, the set of design rules may also be modified to include increased margin to account for unpredictable light interaction between the neighboring two-dimensionally varying features. Because the design rules are established in an attempt to cover the random two-dimensional feature topology, the design rules may incorporate a significant amount of margin. While addition of margin in the set of design rules assists with the layout portions that include the neighboring two-dimensionally varying features, such global addition of margin causes other portions of the layout that do not include the neighboring two-dimensionally varying features to be overdesigned, thus leading to decreased optimization of chip area utilization and electrical performance.

In view of the foregoing, it should be appreciated that semiconductor product yield is reduced as a result of parametric failures that stem from variability introduced by design-dependent unconstrained feature topologies, i.e., arbitrary two-dimensionally varying features disposed in proximity to each other. By way of example, these parametric failures may result from failure to accurately print contacts and vias and from variability in fabrication processes. The variability in fabrication processes may include CMP dishing, layout feature shape distortion due to photolithography, gate distortion, oxide thickness variability, implant variability, and other fabrication related phenomena. The dynamic array architecture of the present invention is defined to address the above-mentioned semiconductor manufacturing process variability.

FIG. 1 is an illustration showing a number of neighboring layout features and a representation of light intensity used to render each of the layout features, in accordance with one embodiment of the present invention. Specifically, three neighboring linear-shaped layout features (101A-101C) are depicted as being disposed in a substantially parallel relationship within a given mask layer. The distribution of light intensity from a layout feature shape is represented by a sinc function. The sinc functions (103A-103C) represent the distribution of light intensity from each of the layout features (101A-101C, respectively). The neighboring linear-shaped layout features (101A-101C) are spaced apart at locations corresponding to peaks of the sinc functions (103A-103C). Thus, constructive interference between the light energy associated with the neighboring layout features (101A-101C), i.e., at the peaks of the sinc functions (103A-103C), serves to reinforce the exposure of the neighboring shapes (101A-101C) for the layout feature spacing illustrated. In accordance with the foregoing, the light interaction represented in FIG. 1 represents a synchronous case.

As illustrated in FIG. 1, when linear-shaped layout features are defined in a regular repeating pattern at an appropriate spacing, constructive interference of the light energy associated with the various layout features serves to enhance the exposure of each layout feature. The enhanced exposure of the layout features provided by the constructive light interference can dramatically reduce or even eliminate a need to utilize optical proximity correction (OPC) and/or reticle enhancement technology (RET) to obtain sufficient rendering of the layout features.

A forbidden pitch, i.e., forbidden layout feature spacing, occurs when the neighboring layout features (101A-101C) are spaced such that peaks of the sinc function associated with one layout feature align with valleys of the sinc function associated with another layout feature, thus causing destructive interference of the light energy. The destructive interference of the light energy causes the light energy focused at a given location to be reduced. Therefore, to realize the beneficial constructive light interference associated with neighboring layout features, it is necessary to predict the layout feature spacing at which the constructive overlap of the sinc function peaks will occur. Predictable constructive overlap of the sinc function peaks and corresponding layout feature shape enhancement can be realized if the layout feature shapes are rectangular, near the same size, and are oriented in the same direction, as illustrated by the layout features (101A-101C) in FIG. 1. In this manner, resonant light energy from neighboring layout feature shapes is used to enhance the exposure of a particular layout feature shape.

Figures 1, 26A:
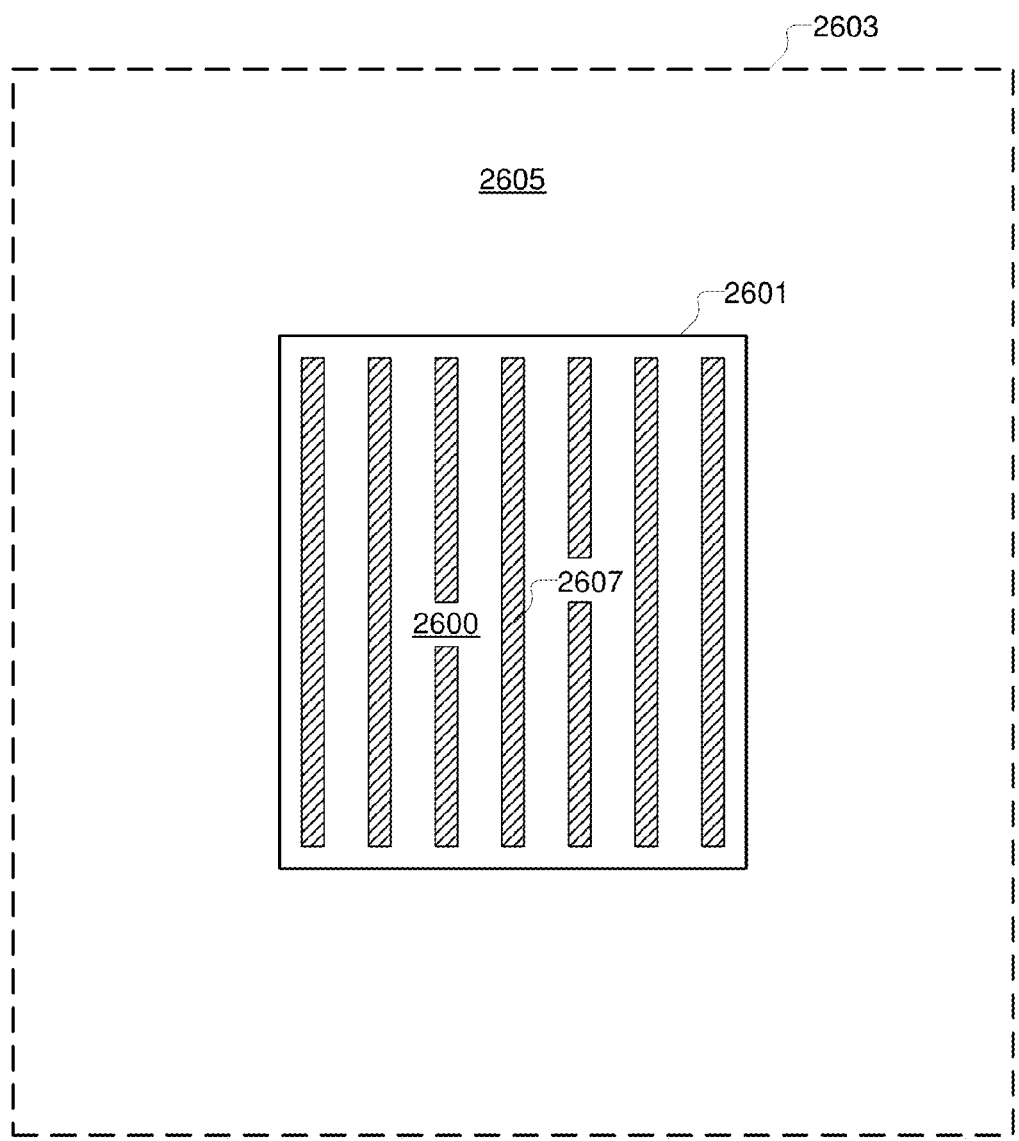
Figures 2, 26A:
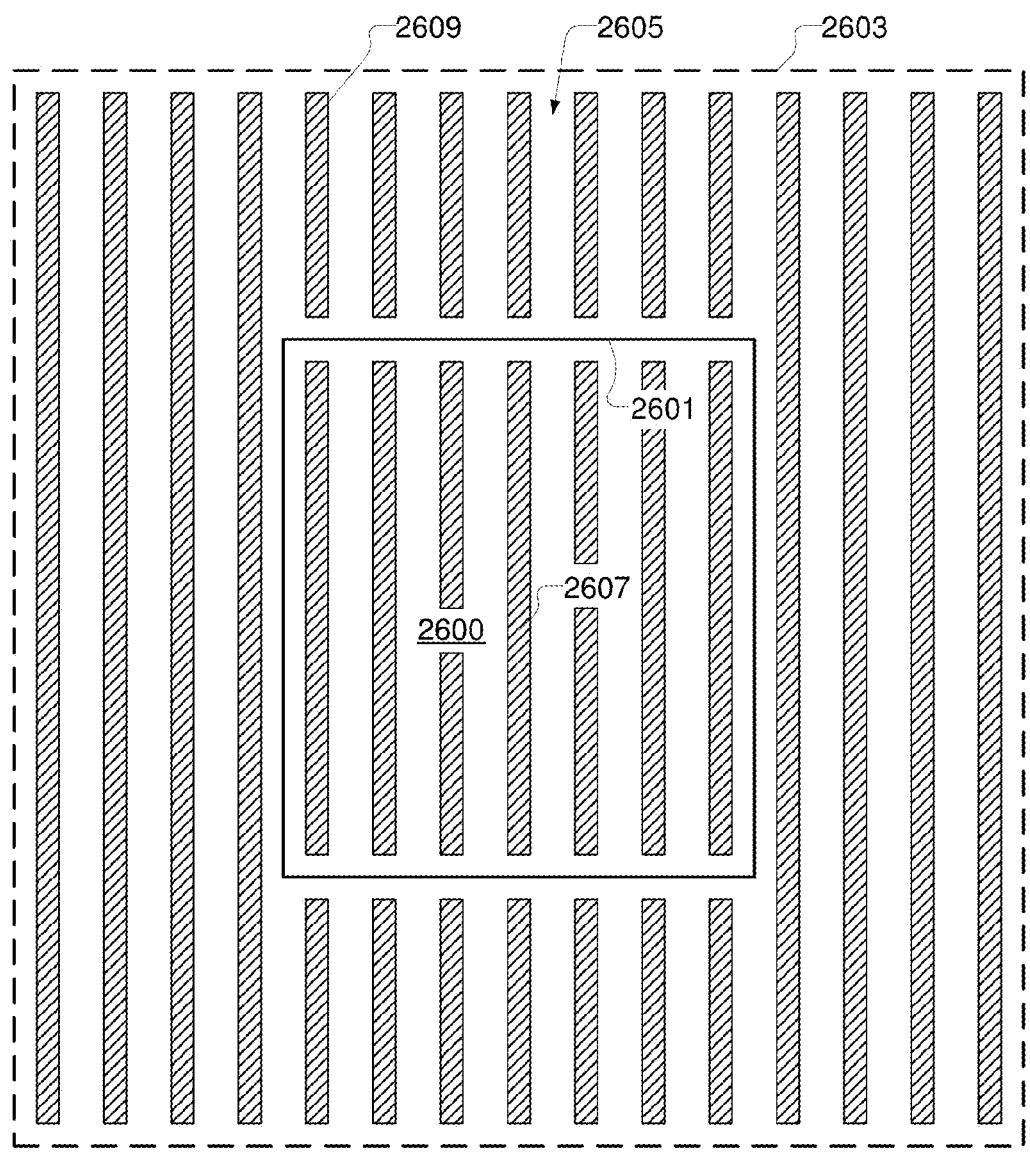

FIG. 2 is an illustration showing a generalized stack of layers used to define a dynamic array architecture, in accordance with one embodiment of the present invention. It should be appreciated that the generalized stack of layers used to define the dynamic array architecture, as described with respect to FIG. 2, is not intended to represent an exhaustive description of the CMOS manufacturing process. However, the dynamic array is to be built in accordance with standard CMOS manufacturing processes. Generally speaking, the dynamic array architecture includes both the definition of the underlying structure of the dynamic array and the techniques for assembling the dynamic array for optimization of area utilization and manufacturability. Thus, the dynamic array is designed to optimize semiconductor manufacturing capabilities.

With regard to the definition of the underlying structure of the dynamic array, the dynamic array is built-in a layered manner upon a base substrate 201, e.g., upon a silicon substrate, or silicon-on-insulator (SOI) substrate. Diffusion regions 203 are defined in the base substrate 201. The diffusion regions 203 represent selected regions of the base substrate 201 within which impurities are introduced for the purpose of modifying the electrical properties of the base substrate 201. Above the diffusion regions 203, diffusion contacts 205 are defined to enable connection between the diffusion regions 203 and conductor lines. For example, the diffusion contacts 205 are defined to enable connection between source and drain diffusion regions 203 and their respective conductor nets. Also, gate electrode features 207 are defined above the diffusion regions 203 to form transistor gates. Gate electrode contacts 209 are defined to enable connection between the gate electrode features 207 and conductor lines. For example, the gate electrode contacts 209 are defined to enable connection between transistor gates and their respective conductor nets.

Interconnect layers are defined above the diffusion contact 205 layer and the gate electrode contact layer 209. The interconnect layers include a first metal (metal 1) layer 211, a first via (via 1) layer 213, a second metal (metal 2) layer 215, a second via (via 2) layer 217, a third metal (metal 3) layer 219, a third via (via 3) layer 221, and a fourth metal (metal 4) layer 223. The metal and via layers enable definition of the desired circuit connectivity. For example, the metal and via layers enable electrical connection of the various diffusion contacts 205 and gate electrode contacts 209 such that the logic function of the circuitry is realized. It should be appreciated that the dynamic array architecture is not limited to a specific number of interconnect layers, i.e., metal and via layers. In one embodiment, the dynamic array may include additional interconnect layers 225, beyond the fourth metal (metal 4) layer 223. Alternatively, in another embodiment, the dynamic array may include less than four metal layers.

The dynamic array is defined such that layers (other than the diffusion region layer 203) are restricted with regard to layout feature shapes that can be defined therein. Specifically, in each layer other than the diffusion region layer 203, only linear-shaped layout features are allowed. A linear-shaped layout feature in a given layer is characterized as having a consistent vertical cross-section shape and extending in a single direction over the substrate. Thus, the linear-shaped layout features define structures that are one-dimensionally varying. The diffusion regions 203 are not required to be one-dimensionally varying, although they are allowed to be if necessary. Specifically, the diffusion regions 203 within the substrate can be defined to have any two-dimensionally varying shape with respect to a plane coincident with a top surface of the substrate. In one embodiment, the number of diffusion bend topologies is limited such that the interaction between the bend in diffusion and the conductive material, e.g., polysilicon, that forms the gate electrode of the transistor is predictable and can be accurately modeled. The linear-shaped layout features in a given layer are positioned to be parallel with respect to each other. Thus, the linear-shaped layout features in a given layer extend in a common direction over the substrate and parallel with the substrate. The specific configurations and associated requirements of the linear-shaped features in the various layers 207-223 are discussed further with regard to FIGS. 3-15C.

The underlying layout methodology of the dynamic array uses constructive light interference of light waves in the lithographic process to reinforce exposure of neighboring shapes in a given layer. Therefore, the spacing of the parallel, linear-shaped layout features in a given layer is designed around the constructive light interference of the standing light waves such that lithographic correction (e.g., OPC/RET) is minimized or eliminated. Thus, in contrast to conventional OPC/RET-based lithographic processes, the dynamic array defined herein exploits the light interaction between neighboring features, rather than attempting to compensate for the light interaction between neighboring features.

Because the standing light wave for a given linear-shaped layout feature can be accurately modeled, it is possible to predict how the standing light waves associated with the neighboring linear-shaped layout features disposed in parallel in a given layer will interact. Therefore, it is possible to predict how the standing light wave used to expose one linear-shaped feature will contribute to the exposure of its neighboring linear-shaped features. Prediction of the light interaction between neighboring linear-shaped features enables the identification of an optimum feature-to-feature spacing such that light used to render a given shape will reinforce its neighboring shapes. The feature-to-feature spacing in a given layer is defined as the feature pitch, wherein the pitch is the center-to-center separation distance between adjacent linear-shaped features in a given layer.

To provide the desired exposure reinforcement between neighboring features, the linear-shaped layout features in a given layer are spaced such that constructive and destructive interference of the light from neighboring features will be optimized to produce the best rendering of all features in the neighborhood. The feature-to-feature spacing in a given layer is proportional to the wavelength of the light used to expose the features. The light used to expose each feature within about a five light wavelength distance from a given feature will serve to enhance the exposure of the given feature to some extent. The exploitation of constructive interference of the standing light waves used to expose neighboring features enables the manufacturing equipment capability to be maximized and not be limited by concerns regarding light interactions during the lithography process.

As discussed above, the dynamic array incorporates a restricted topology in which the features within each layer (other than diffusion) are required to be linear-shaped features that are oriented in a parallel manner to traverse over the substrate in a common direction. With the restricted topology of the dynamic array, the light interaction in the photolithography process can be optimized such that the printed image on the mask is essentially identical to the drawn shape in the layout, i.e., essentially a 100% accurate transfer of the layout onto the resist is achieved.

Figure 3A:
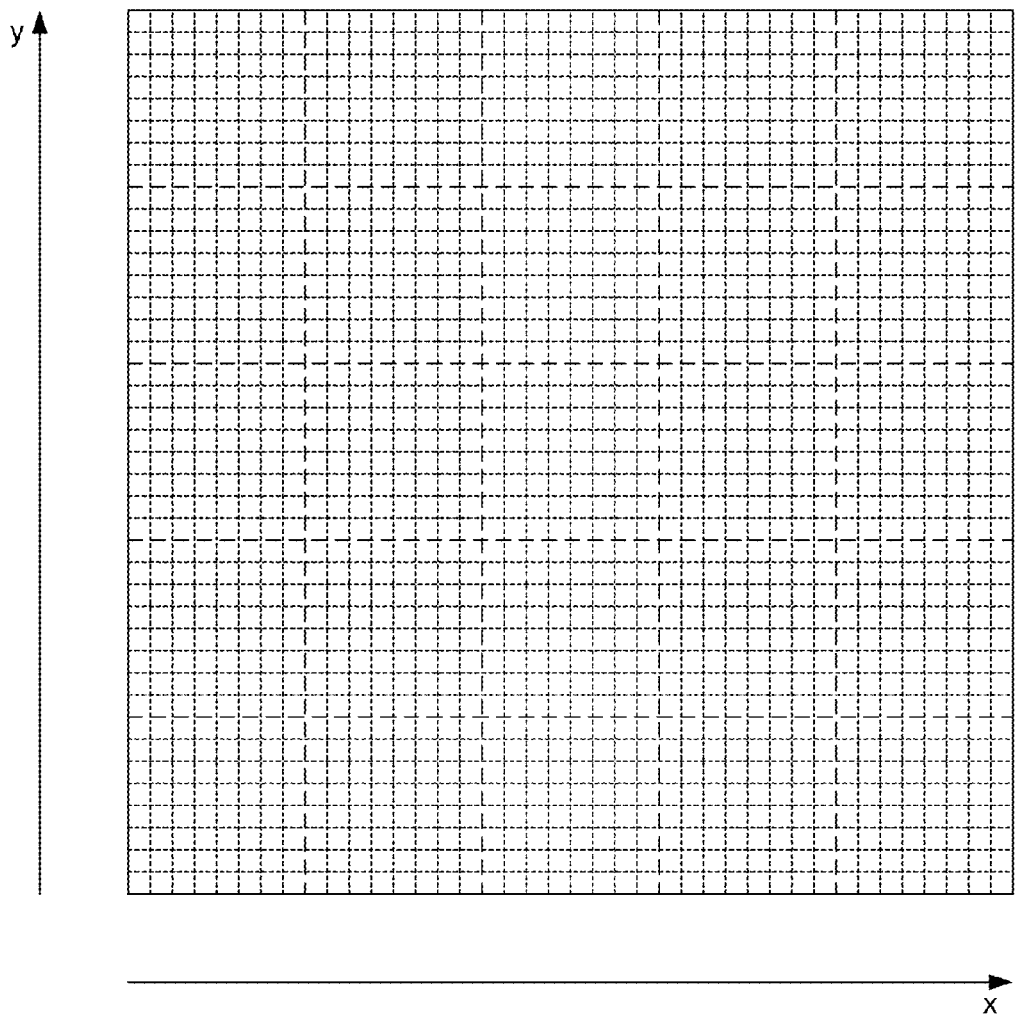
FIG. 3A is an illustration showing an exemplary base grid to be projected onto the dynamic array to facilitate definition of the restricted topology, in accordance with one embodiment of the present invention.

FIG. 3A is an illustration showing an exemplary base grid to be projected onto the dynamic array to facilitate definition of the restricted topology, in accordance with one embodiment of the present invention. The base grid can be used to facilitate parallel placement of the linear-shaped features in each layer of the dynamic array at the appropriate optimized pitch. Although not physically defined as part of the dynamic array, the base grid can be considered as a projection on each layer of the dynamic array. Also, it should be understood that the base grid is projected in a substantially consistent manner with respect to position on each layer of the dynamic array, thus facilitating accurate feature stacking and alignment.

Figure 3B:
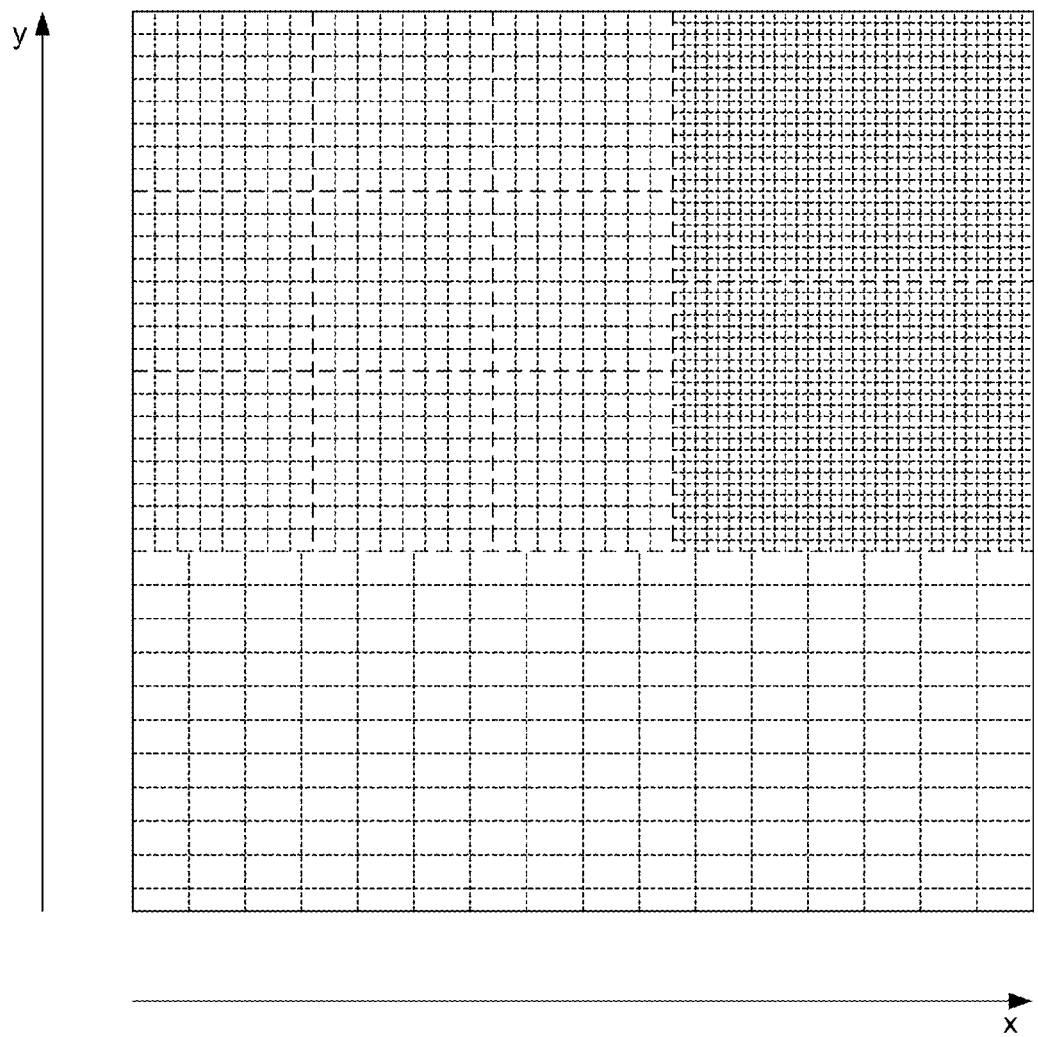
FIG. 3B is an illustration showing separate base grids projected across separate regions of the die, in accordance with an exemplary embodiment of the present invention.

In the exemplary embodiment of FIG. 3A, the base grid is defined as a rectangular grid, i.e., Cartesian grid, in accordance with a first reference direction (x) and a second reference direction (y). The gridpoint-to-gridpoint spacing in the first and second reference directions can be defined as necessary to enable definition of the linear-shaped features at the optimized feature-to-feature spacing. Also, the gridpoint spacing in the first reference direction (x) can be different than the gridpoint spacing in the second reference direction (y). In one embodiment, a single base grid is projected across the entire die to enable location of the various linear-shaped features in each layer across the entire die. However, in other embodiments, separate base grids can be projected across separate regions of the die to support different feature-to-feature spacing requirements within the separate regions of the die. FIG. 3B is an illustration showing separate base grids projected across separate regions of the die, in accordance with an exemplary embodiment of the present invention.

The base grid is defined with consideration for the light interaction function, i.e., the sinc function, and the manufacturing capability, wherein the manufacturing capability is defined by the manufacturing equipment and processes to be utilized in fabricating the dynamic array. With regard to the light interaction function, the base grid is defined such that the spacing between gridpoints enables alignment of peaks in the sinc functions describing the light energy projected upon neighboring gridpoints. Therefore, linear-shaped features optimized for lithographic reinforcement can be specified by drawing a line from a first gridpoint to a second gridpoint, wherein the line represents a rectangular structure of a given width. It should be appreciated that the various linear-shaped features in each layer can be specified according to their endpoint locations on the base grid and their width.

Figure 3C:
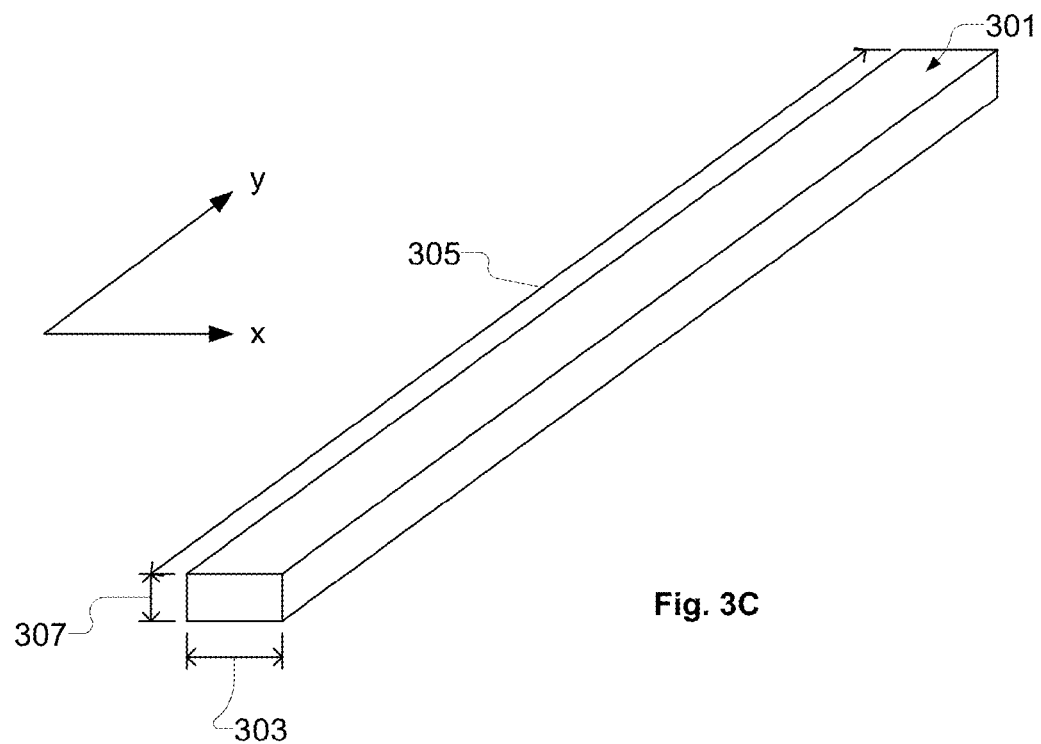
FIG. 3C is an illustration showing an exemplary linear-shaped feature defined to be compatible with the dynamic array, in accordance with one embodiment of the present invention.

FIG. 3C is an illustration showing an exemplary linear-shaped feature 301 defined to be compatible with the dynamic array, in accordance with one embodiment of the present invention. The linear-shaped feature 301 has a substantially rectangular cross-section defined by a width 303 and a height 307. The linear-shaped feature 301 extends in a linear direction to a length 305. In one embodiment, a cross-section of the linear-shaped feature, as defined by its width 303 and height 307, is substantially uniform along its length 305. It should be understood, however, that lithographic effects may cause a rounding of the ends of the linear-shaped feature 301. The first and second reference directions (x) and (y), respectively, of FIG. 3A are shown to illustrate an exemplary orientation of the linear-shaped feature on the dynamic array. It should be appreciated that the linear-shaped feature may be oriented to have its length 305 extend in either the first reference direction (x), the second reference direction (y), or in diagonal direction defined relative to the first and second reference directions (x) and (y). Regardless of the linear-shaped features' particular orientation with respect to the first and second reference directions (x) and (y), it should be understood that the linear-shaped feature is defined in a plane that is substantially parallel to a top surface of the substrate upon which the dynamic array is built. Also, it should be understood that the linear-shaped feature is free of bends, i.e., change in direction, in the plane defined by the first and second reference directions.

Figure 3D:
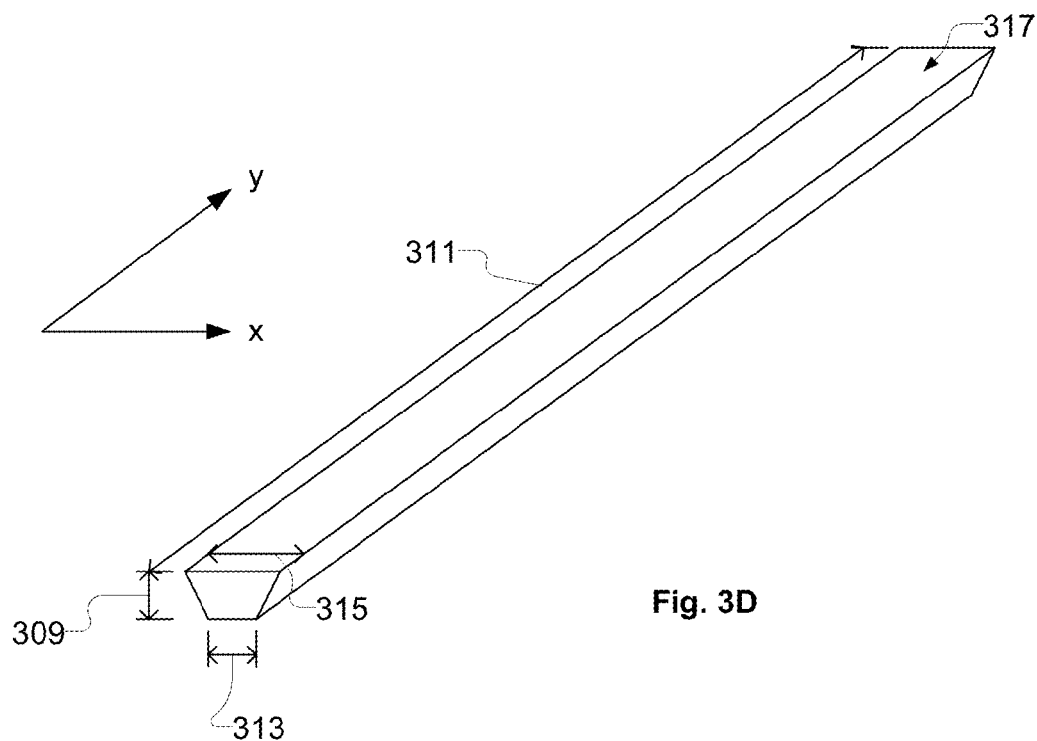
FIG. 3D is an illustration showing another exemplary linear-shaped feature defined to be compatible with the dynamic array, in accordance with one embodiment of the present invention.

FIG. 3D is an illustration showing another exemplary linear-shaped feature 317 defined to be compatible with the dynamic array, in accordance with one embodiment of the present invention. The linear-shaped feature 317 has a trapezoidal cross-section defined by a lower width 313, an upper width 315, and a height 309. The linear-shaped feature 317 extends in a linear direction to a length 311. In one embodiment, the cross-section of the linear-shaped feature 317 is substantially uniform along its length 311. It should be understood, however, that lithographic effects may cause a rounding of the ends of the linear-shaped feature 317. The first and second reference directions (x) and (y), respectively, of FIG. 3A are shown to illustrate an exemplary orientation of the linear-shaped feature on the dynamic array. It should be appreciated that the linear-shaped feature 317 may be oriented to have its length 311 extend in either the first reference direction (x), the second reference direction (y), or in diagonal direction defined relative to the first and second reference directions (x) and (y). Regardless of the particular orientation of the linear-shaped feature 317 with regard to the first and second reference directions (x) and (y), it should be understood that the linear-shaped feature 317 is defined in a plane that is substantially parallel to a top surface of the substrate upon which the dynamic array is built. Also, it should be understood that the linear-shaped feature 317 is free of bends, i.e., change in direction, in the plane defined by the first and second reference directions.

Although FIGS. 3C and 3D explicitly discuss linear shaped features having rectangular and trapezoidal cross-sections, respectively, it should be understood that the linear shaped features having other types of cross-sections can be defined within the dynamic array. Therefore, essentially any suitable cross-sectional shape of the linear-shaped feature can be utilized so long as the linear-shaped feature is defined to have a length that extends in one direction, and is oriented to have its length extend in either the first reference direction (x), the second reference direction (y), or in diagonal direction defined relative to the first and second reference directions (x) and (y).

The layout architecture of the dynamic array follows the base grid pattern. Thus, it is possible to use grid points to represent where changes in direction occur in diffusion, wherein gate electrode and metal linear-shaped features are placed, where contacts are placed, where opens are in the linear-shaped gate electrode and metal features, etc. The pitch of the gridpoints, i.e., the gridpoint-to-gridpoint spacing, should be set for a given feature line width, e.g., width 303 in FIG. 3C, such that exposure of neighboring linear-shaped features of the given feature line width will reinforce each other, wherein the linear-shaped features are centered on gridpoints. With reference to the dynamic array stack of FIG. 2 and the exemplary base grid of FIG. 3A, in one embodiment, the gridpoint spacing in the first reference direction (x) is set by the required gate electrode gate pitch. In this same embodiment, the gridpoint pitch in the second reference direction (y) is set by the metal 1 and metal 3 pitch. For example, in a 90 nm process technology, i.e., minimum feature size equal to 90 nm, the gridpoint pitch in the second reference direction (y) is about 0.24 micron. In one embodiment, metal 1 and metal 2 layers will have a common spacing and pitch. A different spacing and pitch may be used above the metal 2 layer.

The various layers of the dynamic array are defined such that the linear-shaped features in adjacent layers extend in a crosswise manner with respect to each other. For example, the linear-shaped features of adjacent layers may extend orthogonally, i.e., perpendicularly with respect to each other. Also, the linear-shaped features of one layer may extend across the linear-shaped features of an adjacent layer at an angle, e.g., at about 45 degrees. For example, in one embodiment the linear-shaped feature of one layer extend in the first reference direction (x) and the linear-shaped features of the adjacent layer extend diagonally with respect to the first (x) and second (y) reference directions. It should be appreciated that to route a design in the dynamic array having the linear-shaped features positioned in the crosswise manner in adjacent layers, opens can be defined in the linear-shaped features, and contacts and vias can be defined as necessary.

The dynamic array minimizes the use of bends in layout shapes to eliminate unpredictable lithographic interactions. Specifically, prior to OPC or other RET processing, the dynamic array allows bends in the diffusion layer to enable control of device sizes, but does not allow bends in layers above the diffusion layer. The layout features in each layer above the diffusion layer are linear in shape, e.g., FIG. 3C, and disposed in a parallel relationship with respect to each other. The linear shapes and parallel positioning of layout features are implemented in each stack layer of the dynamic array where predictability of constructive light interference is necessary to ensure manufacturability. In one embodiment, the linear shapes and parallel positioning of layout features are implemented in the dynamic array in each layer above diffusion through metal 2. Above metal 2, the layout features may be of sufficient size and shape that constructive light interference is not required to ensure manufacturability. However, the presence of constructive light interference in patterning layout features above metal 2 may be beneficial.

An exemplary buildup of dynamic array layers from diffusion through metal 2 are described with respect to FIGS. 4 through 14. It should be appreciated that the dynamic array described with respect to FIGS. 4 through 14 is provided by way of example only, and is not intended to convey limitations of the dynamic array architecture. The dynamic array can be used in accordance with the principles presented herein to define essentially any integrated circuit design.

Figure 4:
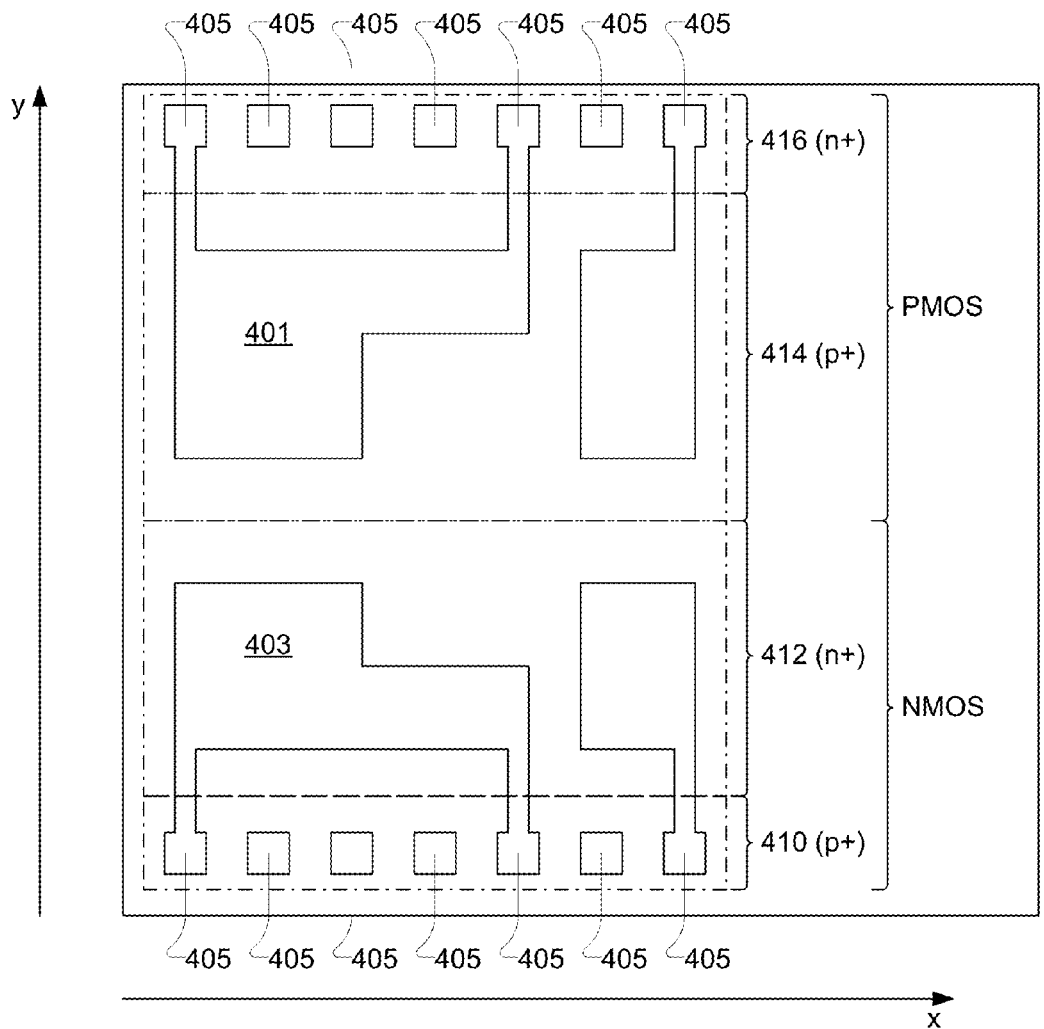
FIG. 4 is an illustration showing a diffusion layer layout of an exemplary dynamic array, in accordance with one embodiment of the present invention.

FIG. 4 is an illustration showing a diffusion layer layout of an exemplary dynamic array, in accordance with one embodiment of the present invention. The diffusion layer of FIG. 4 shows a p-diffusion region 401 and an n-diffusion region 403. While the diffusion regions are defined according to the underlying base grid, the diffusion regions are not subject to the linear-shaped feature restrictions associated with the layers above the diffusion layer. The diffusion regions 401 and 403 include diffusion squares 405 defined where diffusion contacts will be located. The diffusion regions 401 and 403 do not include extraneous jogs or corners, thus improving the use of lithographic resolution and enabling more accurate device extraction. Additionally, n+ mask regions (412 and 416) and p+ mask regions (410 and 414) are defined as rectangles on the (x), (y) grid with no extraneous jogs or notches. This style permits use of larger diffusion regions, eliminates need for OPC/RET, and enables use of lower resolution and lower cost lithographic systems, e.g., i-line illumination at 365 nm. It should be appreciated that the n+ mask region 416 and the p+ mask region 410, as depicted in FIG. 4, are for an embodiment that does not employ well-biasing. In an alternative embodiment where well-biasing is to be used, the n+ mask region 416 shown in FIG. 4 will actually be defined as a p+ mask region. Also, in this alternative embodiment, the p+ mask region 410 shown in FIG. 4 will actually be defined as a n+ mask region.

Figure 5:
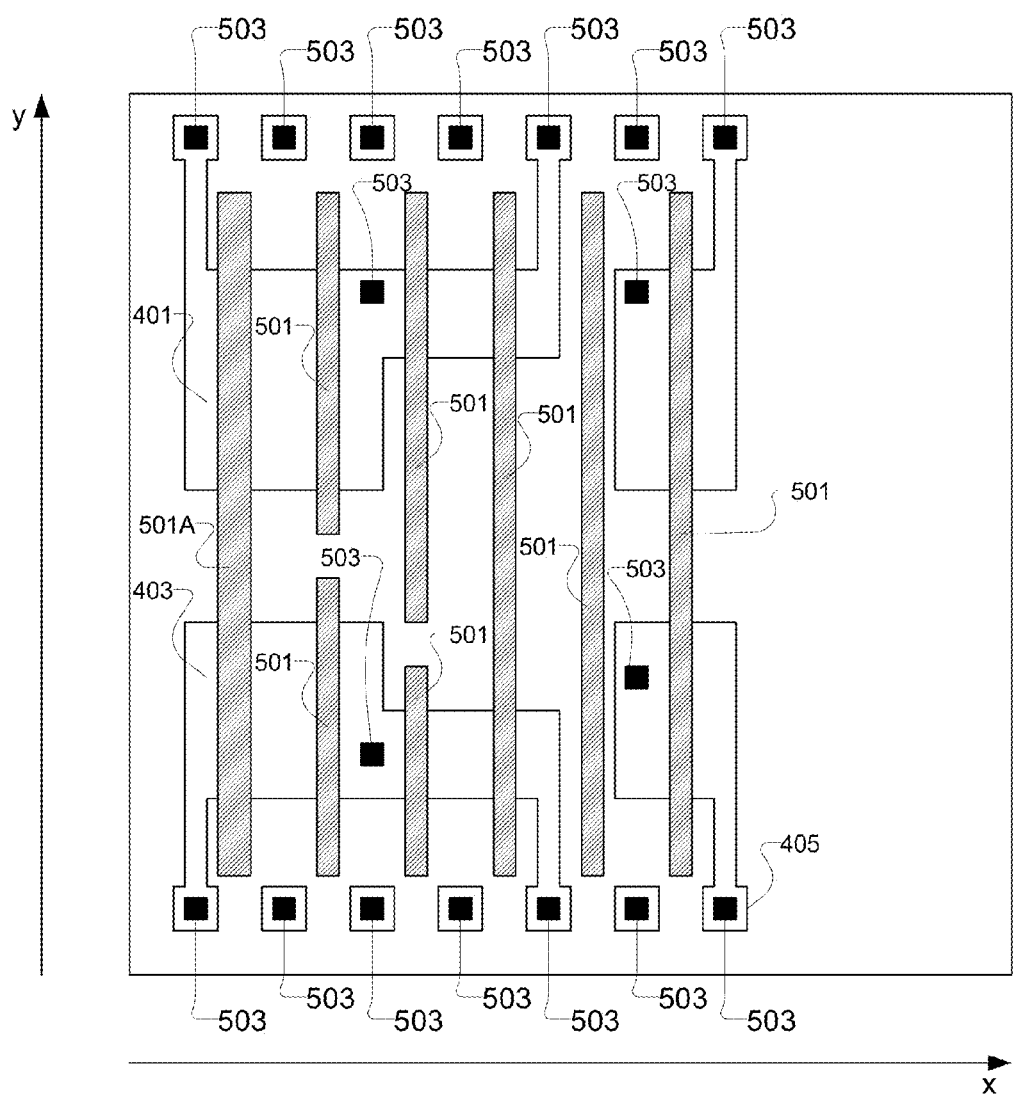
FIG. 5 is an illustration showing a gate electrode layer and a diffusion contact layer above and adjacent to the diffusion layer of FIG. 4, in accordance with one embodiment of the present invention.

FIG. 5 is an illustration showing a gate electrode layer and a diffusion contact layer above and adjacent to the diffusion layer of FIG. 4, in accordance with one embodiment of the present invention. As those skilled in the CMOS arts will appreciate, the gate electrode features 501 define the transistor gates. The gate electrode features 501 are defined as linear shaped features extending in a parallel relationship across the dynamic array in the second reference direction (y). In one embodiment, the gate electrode features 501 are defined to have a common width. However, in another embodiment, one or more of the gate electrode features can be defined to have a different width. For example, FIG. 5 shows a gate electrode features 501A that has a larger width relative to the other gate electrode features 501. The pitch (center-to-center spacing) of the gate electrode features 501 is minimized while ensuring optimization of lithographic reinforcement, i.e., resonant imaging, provided by neighboring gate electrode features 501. For discussion purposes, gate electrode features 501 extending across the dynamic array in a given line are referred to as a gate electrode track.

The gate electrode features 501 form n-channel and p-channel transistors as they cross the diffusion regions 403 and 401, respectively. Optimal gate electrode feature 501 printing is achieved by drawing gate electrode features 501 at every grid location, even though no diffusion region may be present at some grid locations. Also, long continuous gate electrode features 501 tend to improve line end shortening effects at the ends of gate electrode features within the interior of the dynamic array. Additionally, gate electrode printing is significantly improved when all bends are removed from the gate electrode features 501.

Each of the gate electrode tracks may be interrupted, i.e., broken, any number of times in linearly traversing across the dynamic array in order to provide required electrical connectivity for a particular logic function to be implemented. When a given gate electrode track is required to be interrupted, the separation between ends of the gate electrode track segments at the point of interruption is minimized to the extent possible taking into consideration the manufacturing capability and electrical effects. In one embodiment, optimal manufacturability is achieved when a common end-to-end spacing is used between features within a particular layer.

Minimizing the separation between ends of the gate electrode track segments at the points of interruption serves to maximize the lithographic reinforcement, and uniformity thereof, provided from neighboring gate electrode tracks. Also, in one embodiment, if adjacent gate electrode tracks need to be interrupted, the interruptions of the adjacent gate electrode tracks are made such that the respective points of interruption are offset from each other so as to avoid, to the extent possible, an occurrence of neighboring points of interruption. More specifically, points of interruption within adjacent gate electrode tracks are respectively positioned such that a line of sight does not exist through the points of interruption, wherein the line of sight is considered to extend perpendicularly to the direction in which the gate electrode tracks extend over the substrate. Additionally, in one embodiment, the gate electrodes may extend through the boundaries at the top and bottom of the cells, i.e., the PMOS or NMOS cells. This embodiment would enable bridging of neighboring cells.

With further regard to FIG. 5, diffusion contacts 503 are defined at each diffusion square 405 to enhance the printing of diffusion contacts via resonant imaging. The diffusion squares 405 are present around every diffusion contact 503 to enhance the printing of the power and ground connection polygons at the diffusion contacts 503.

The gate electrode features 501 and diffusion contacts 503 share a common grid spacing. More specifically, the gate electrode feature 501 placement is offset by one-half the grid spacing relative to the diffusion contacts 503. For example, if the gate electrode features 501 and diffusion contact 503 grid spacing is 0.36 μm, then the diffusion contacts are placed such that the x-coordinate of their center falls on an integer multiple of 0.36 μm, while the x-coordinate of the center of each gate electrode feature 501 minus 0.18 μm should be an integer multiple of 0.36 μm. In the present example, the x-coordinates are represented by the following:

Diffusion contact center x-coordinate=I*0.36 μm, where I is the grid number;

Gate electrode feature center x-coordinate=0.18 μm+I*0.36 μm, where I is the grid number.

The grid based system of the dynamic array ensures that all contacts (diffusion and gate electrode) will land on a horizontal grid that is equal to a multiple of one-half of the diffusion contact grid and a vertical grid that is set by the metal 1 pitch. In the example above, the gate electrode feature and diffusion contact grid is 0.36 μm. The diffusion contacts and gate electrode contacts will land on a horizontal grid that is a multiple of 0.18 μm. Also, the vertical grid for 90 nm process technologies is about 0.24 μm.

Figure 6:
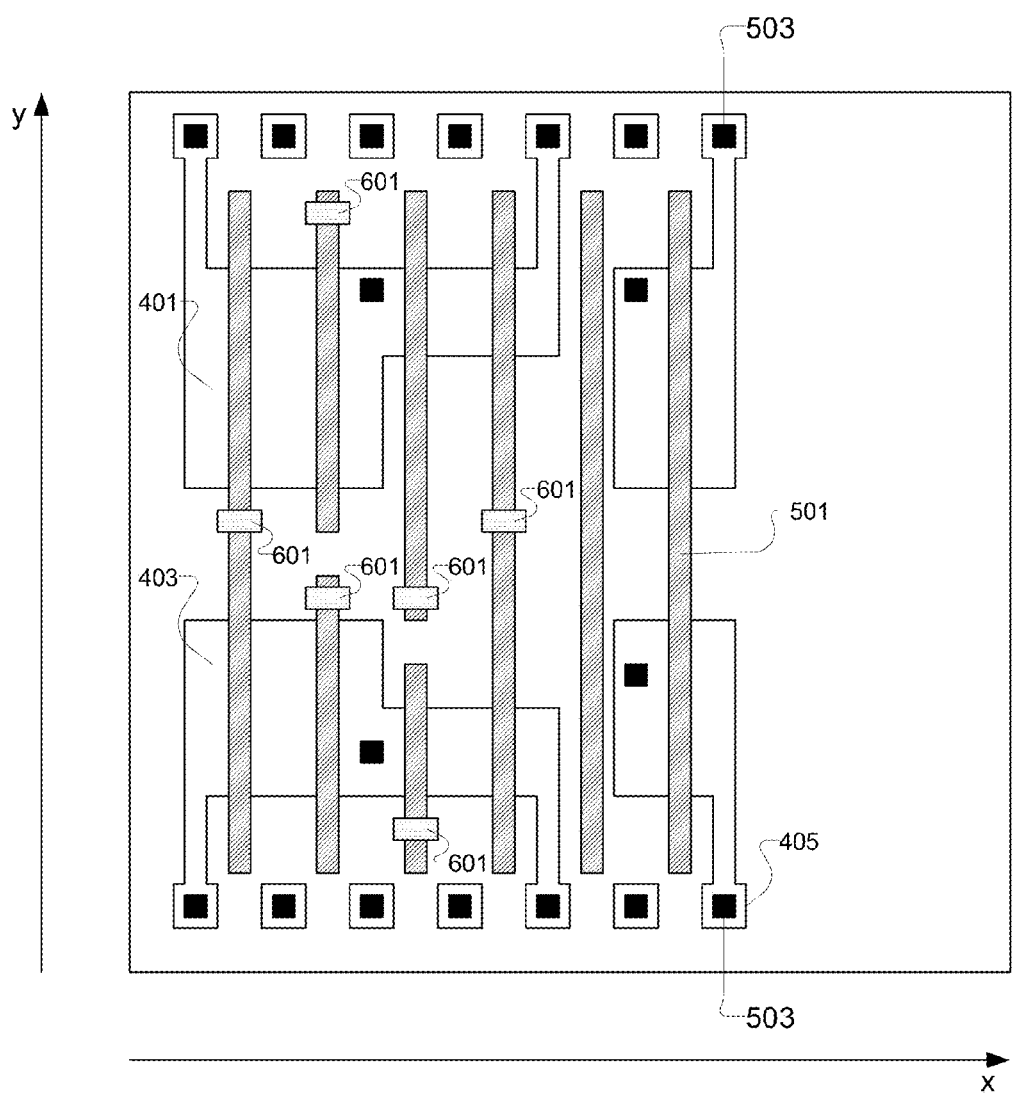
FIG. 6 is an illustration showing a gate electrode contact layer defined above and adjacent to the gate electrode layer of FIG. 5, in accordance with one embodiment of the present invention.

FIG. 6 is an illustration showing a gate electrode contact layer defined above and adjacent to the gate electrode layer of FIG. 5, in accordance with one embodiment of the present invention. In the gate electrode contact layer, gate electrode contacts 601 are drawn to enable connection of the gate electrode features 501 to the overlying metal conduction lines. In general, design rules will dictate the optimum placement of the gate electrode contacts 601. In one embodiment, the gate electrode contacts are drawn on top of the transistor endcap regions. This embodiment minimizes white space in the dynamic array when design rules specify long transistor endcaps. In some process technologies white space may be minimized by placing a number of gate electrode contacts for a cell in the center of the cell. Also, it should be appreciated that in the present invention, the gate electrode contact 601 is oversized in the direction perpendicular to the gate electrode feature 501 to ensure overlap between the gate electrode contact 601 and the gate electrode feature 501.

Figure 7A:
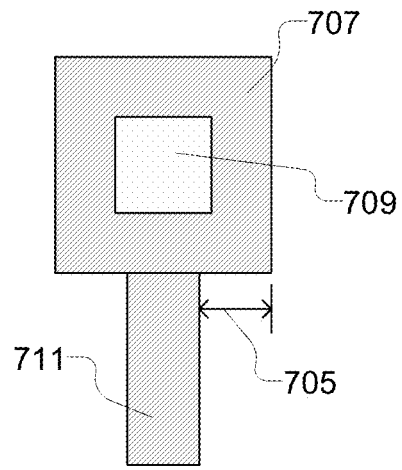
FIG. 7A is an illustration showing a traditional approach for making contact to the gate electrode.

FIG. 7A is an illustration showing a traditional approach for making contact to a gate electrode, e.g., polysilicon feature. In the traditional configuration of FIG. 7A, an enlarged rectangular gate electrode region 707 is defined where a gate electrode contact 709 is to be located. The enlarged rectangular gate electrode region 707 introduces a bend of distance 705 in the gate electrode. The bend associated with the enlarged rectangular gate electrode region 707 sets up undesirable light interactions and distorts the gate electrode line 711. Distortion of the gate electrode line 711 is especially problematic when the gate electrode width is about the same as a transistor length.

Figure 7B:
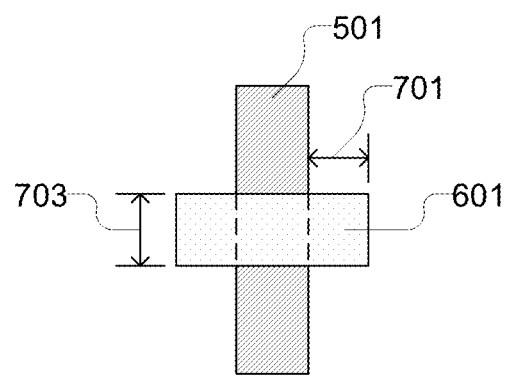
FIG. 7B is an illustration showing a gate electrode contact defined in accordance with one embodiment of the present invention.

FIG. 7B is an illustration showing a gate electrode contact 601, e.g., polysilicon contact, defined in accordance with one embodiment of the present invention. The gate electrode contact 601 is drawn to overlap the edges of the gate electrode feature 501, and extend in a direction substantially perpendicular to the gate electrode feature 501. In one embodiment, the gate electrode contact 601 is drawn such that the vertical dimension 703 is same as the vertical dimension used for the diffusion contacts 503. For example, if the diffusion contact 503 opening is specified to be 0.12 μm square then the vertical dimension of the gate electrode contact 601 is drawn at 0.12 μm. However, in other embodiments, the gate electrode contact 601 can be drawn such that the vertical dimension 703 is different from the vertical dimension used for the diffusion contacts 503.

In one embodiment, the gate electrode contact 601 extension 701 beyond the gate electrode feature 501 is set such that maximum overlap is achieved between the gate electrode contact 601 and the gate electrode feature 501. The extension 701 is defined to accommodate line end shortening of the gate electrode contact 601, and misalignment between the gate electrode contact layer and gate electrode feature layer. The length of the gate electrode contact 601 is defined to ensure maximum surface area contact between the gate electrode contact 601 and the gate electrode feature 501, wherein the maximum surface area contact is defined by the width of the gate electrode feature 501.

Figure 8A:
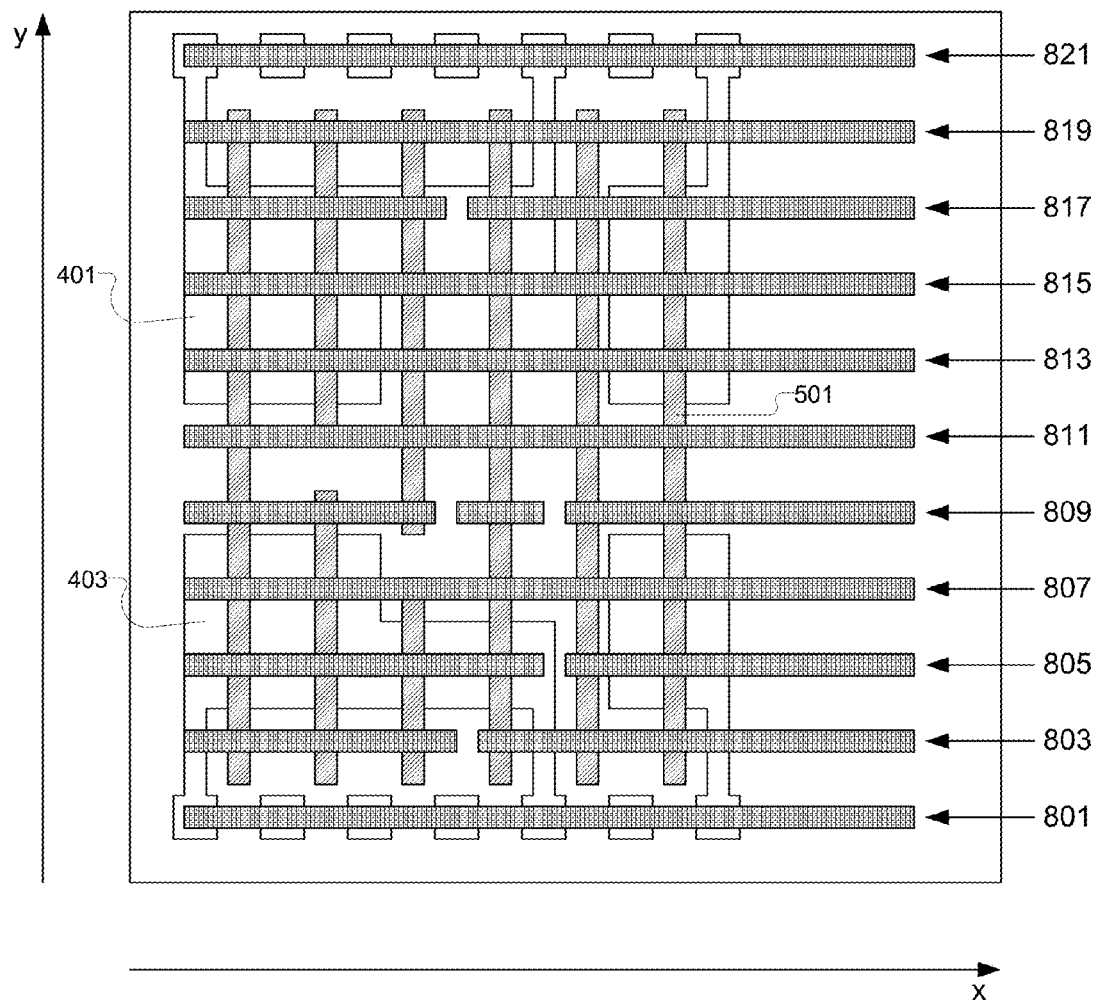
FIG. 8A is an illustration showing a metal 1 layer defined above and adjacent to the gate electrode contact layer of FIG. 6, in accordance with one embodiment of the present invention.

FIG. 8A is an illustration showing a metal 1 layer defined above the gate electrode contact layer of FIG. 6, in accordance with one embodiment of the present invention. The metal 1 layer includes a number of metal 1 tracks 801-821 defined to include linear shaped features extending in a parallel relationship across the dynamic array. The metal 1 tracks 801-821 extend in a direction substantially perpendicular to the gate electrode features 501 in the underlying gate electrode layer of FIG. 5. Thus, in the present example, the metal 1 tracks 801-821 extend linearly across the dynamic array in the first reference direction (x). The pitch (center-to-center spacing) of the metal 1 tracks 801-821 is minimized while ensuring optimization of lithographic reinforcement, i.e., resonant imaging, provided by neighboring metal 1 tracks 801-821. For example, in one embodiment, the metal 1 tracks 801-821 are centered on a vertical grid of about 0.24 μm for a 90 nm process technology.

Each of the metal 1 tracks 801-821 may be interrupted, i.e., broken, any number of times in linearly traversing across the dynamic array in order to provide required electrical connectivity for a particular logic function to be implemented. When a given metal 1 track 801-821 is required to be interrupted, the separation between ends of the metal 1 track segments at the point of interruption is minimized to the extent possible taking into consideration manufacturing capability and electrical effects. Minimizing the separation between ends of the metal 1 track segments at the points of interruption serves to maximize the lithographic reinforcement, and uniformity thereof, provided from neighboring metal 1 tracks. Also, in one embodiment, if adjacent metal 1 tracks need to be interrupted, the interruptions of the adjacent metal 1 tracks are made such that the respective points of interruption are offset from each other so as to avoid, to the extent possible, an occurrence of neighboring points of interruption. More specifically, points of interruption within adjacent metal 1 tracks are respectively positioned such that a line of sight does not exist through the points of interruption, wherein the line of sight is considered to extend perpendicularly to the direction in which the metal 1 tracks extend over the substrate.

Figure 8B:
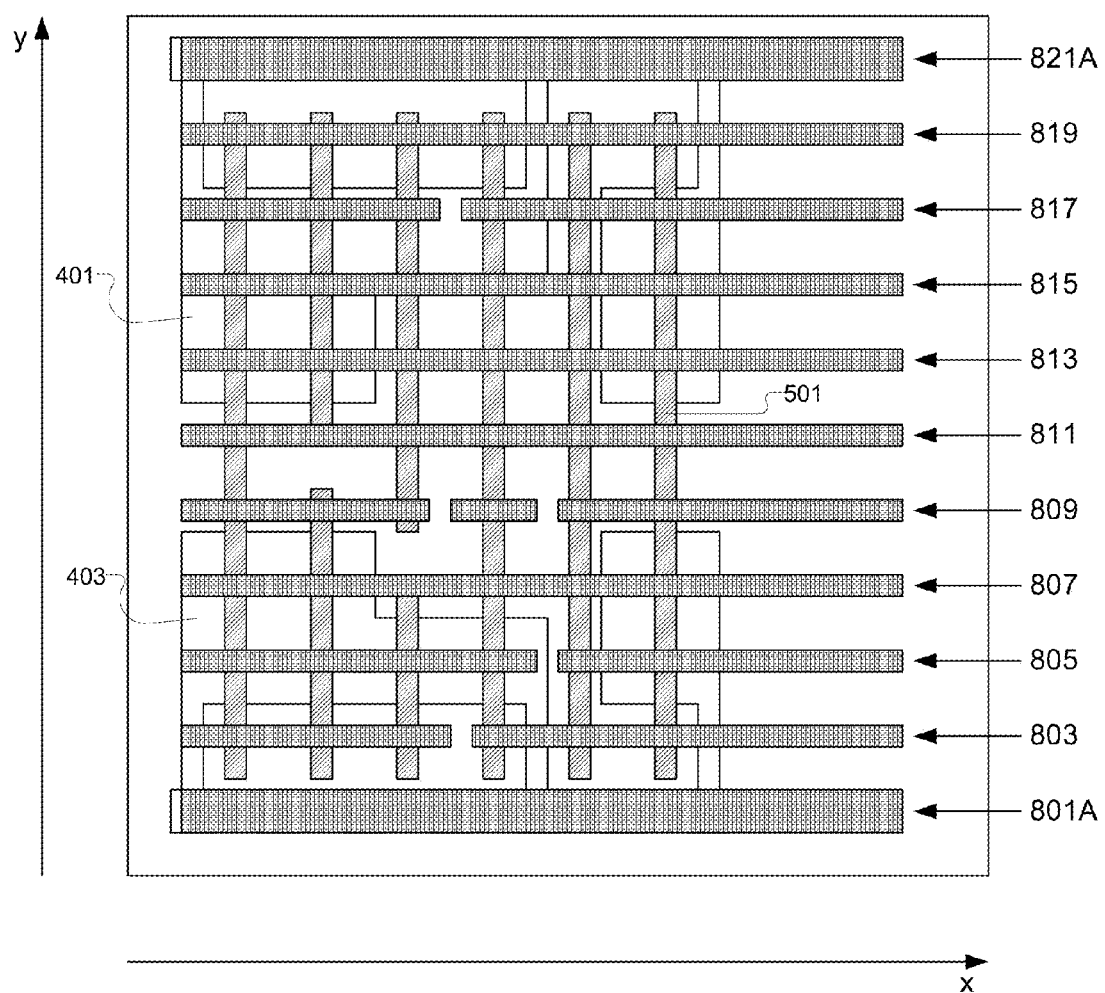
FIG. 8B is an illustration showing the metal 1 layer of FIG. 8A with larger track widths for the metal 1 ground and power tracks, relative to the other metal 1 tracks.

In the example of FIG. 8A, the metal 1 track 801 is connected to the ground supply, and the metal 1 track 821 is connected to the power supply voltage. In the embodiment of FIG. 8A, the widths of the metal 1 tracks 801 and 821 are the same as the other metal 1 tracks 803-819. However, in another embodiment, the widths of metal 1 tracks 801 and 821 are larger than the widths of the other metal 1 tracks 803-819. FIG. 8B is an illustration showing the metal 1 layer of FIG. 8A with larger track widths for the metal 1 ground and power tracks (801A and 821A), relative to the other metal 1 tracks 803-819.

The metal 1 track pattern is optimally configured to optimize the use of "white space" (space not occupied by transistors). The example of FIG. 8A includes the two shared metal 1 power tracks 801 and 821, and nine metal 1 signal tracks 803-819. Metal 1 tracks 803, 809, 811, and 819 are defined as gate electrode contact tracks in order to minimize white space. Metal 1 tracks 805 and 807 are defined to connect to n-channel transistor source and drains. Metal 1 tracks 813, 815, and 817 are defined to connect to p-channel source and drains. Also, any of the nine metal 1 signal tracks 803-819 can be used as a feed through if no connection is required. For example, metal 1 tracks 813 and 815 are configured as feed through connections.

Figure 9:
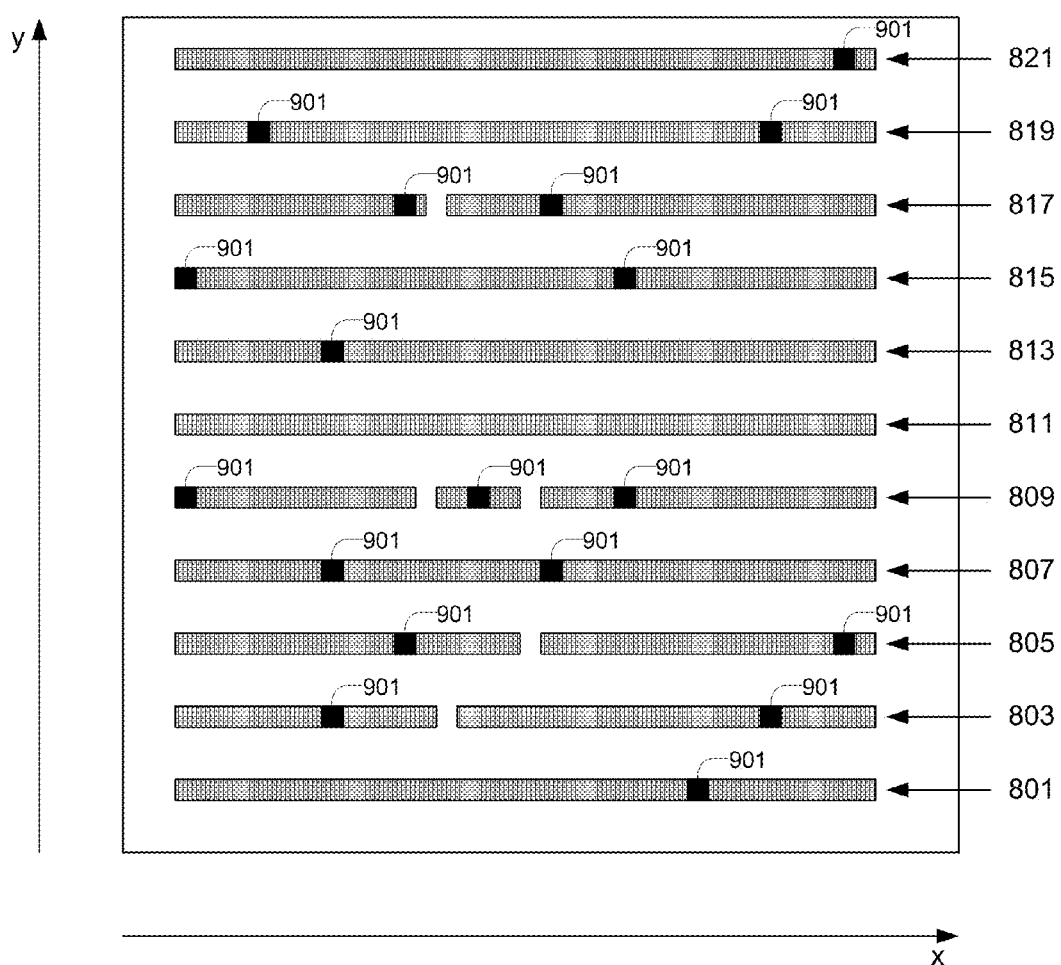
FIG. 9 is an illustration showing a via 1 layer defined above and adjacent to the metal 1 layer of FIG. 8A, in accordance with one embodiment of the present invention.

FIG. 9 is an illustration showing a via 1 layer defined above and adjacent to the metal 1 layer of FIG. 8A, in accordance with one embodiment of the present invention. Vias 901 are defined in the via 1 layer to enable connection of the metal 1 tracks 801-821 to higher level conduction lines.

Figure 10:
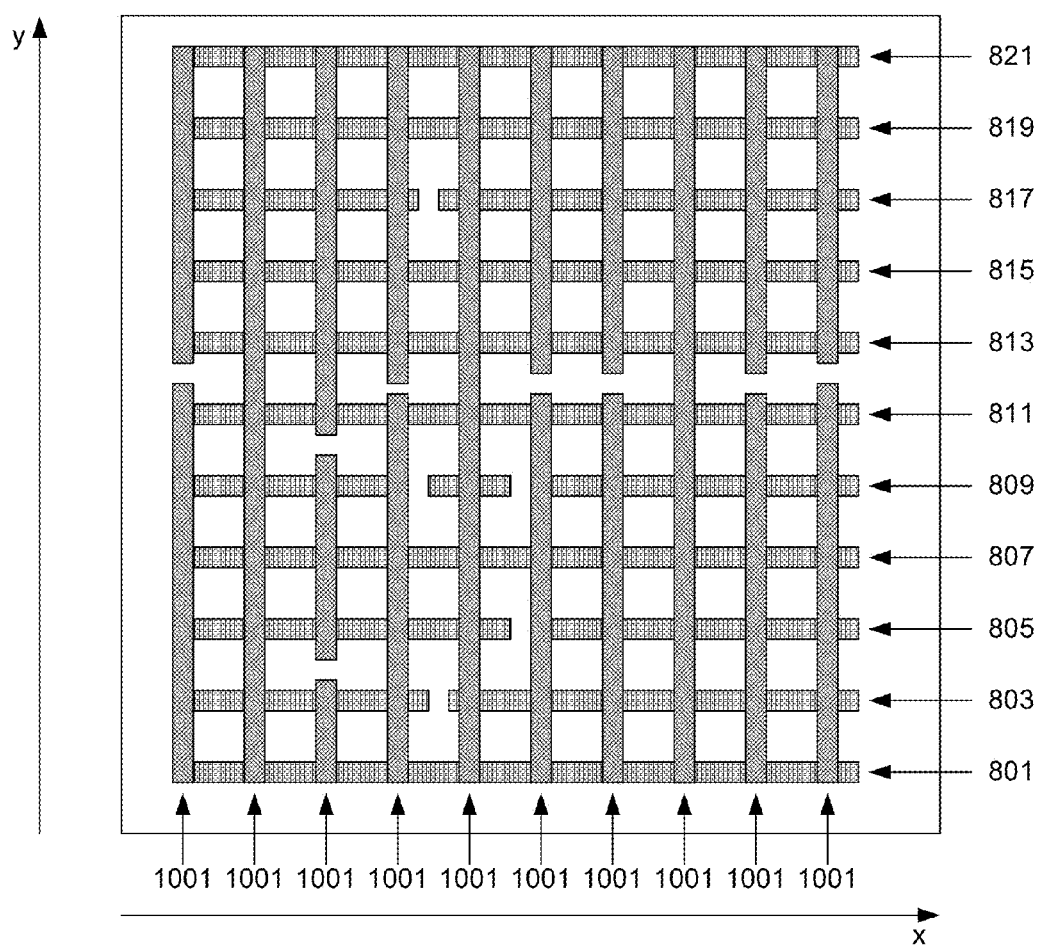
FIG. 10 is an illustration showing a metal 2 layer defined above and adjacent to the via 1 layer of FIG. 9, in accordance with one embodiment of the present invention.

FIG. 10 is an illustration showing a metal 2 layer defined above and adjacent to the via 1 layer of FIG. 9, in accordance with one embodiment of the present invention. The metal 2 layer includes a number of metal 2 tracks 1001 defined as linear shaped features extending in a parallel relationship across the dynamic array. The metal 2 tracks 1001 extend in a direction substantially perpendicular to the metal 1 tracks 801-821 in the underlying metal 1 layer of FIG. 8A, and in a direction substantially parallel to the gate electrode tracks 501 in the underlying gate electrode layer of FIG. 5. Thus, in the present example, the metal 2 tracks 1001 extend linearly across the dynamic array in the second reference direction (y).

The pitch (center-to-center spacing) of the metal 2 tracks 1001 is minimized while ensuring optimization of lithographic reinforcement, i.e., resonant imaging, provided by neighboring metal 2 tracks. It should be appreciated that regularity can be maintained on higher level interconnect layers in the same manner as implemented in the gate electrode and metal 1 layers. In one embodiment, the gate electrode feature 501 pitch and the metal 2 track pitch is the same. In another embodiment, the contacted gate electrode pitch (e.g., polysilicon-to-polysilicon space with a diffusion contact in between) is greater than the metal 2 track pitch. In this embodiment, the metal 2 track pitch is optimally set to be ⅔ or ¾ of the contacted gate electrode pitch. Thus, in this embodiment, the gate electrode track and metal 2 track align at every two gate electrode track pitches and every three metal 2 track pitches. For example, in a 90 nm process technology, the optimum contacted gate electrode track pitch is 0.36 μm, and the optimum metal 2 track pitch is 0.24 μm. In another embodiment, the gate electrode track and the metal 2 track align at every three gate electrode pitches and every four metal 2 pitches. For example, in a 90 nm process technology, the optimum contacted gate electrode track pitch is 0.36 μm, and the optimum metal 2 track pitch is 0.27 μm.

Each of the metal 2 tracks 1001 may be interrupted, i.e., broken, any number of times in linearly traversing across the dynamic array in order to provide required electrical connectivity for a particular logic function to be implemented. When a given metal 2 track 1001 is required to be interrupted, the separation between ends of the metal 2 track segments at the point of interruption is minimized to the extent possible taking into consideration manufacturing and electrical effects. Minimizing the separation between ends of the metal 2 track segments at the points of interruption serves to maximize the lithographic reinforcement, and uniformity thereof, provided from neighboring metal 2 tracks. Also, in one embodiment, if adjacent metal 2 tracks need to be interrupted, the interruptions of the adjacent metal 2 tracks are made such that the respective points of interruption are offset from each other so as to avoid, to the extent possible, an occurrence of neighboring points of interruption. More specifically, points of interruption within adjacent metal 2 tracks are respectively positioned such that a line of sight does not exist through the points of interruption, wherein the line of sight is considered to extend perpendicularly to the direction in which the metal 2 tracks extend over the substrate.

Figure 11:
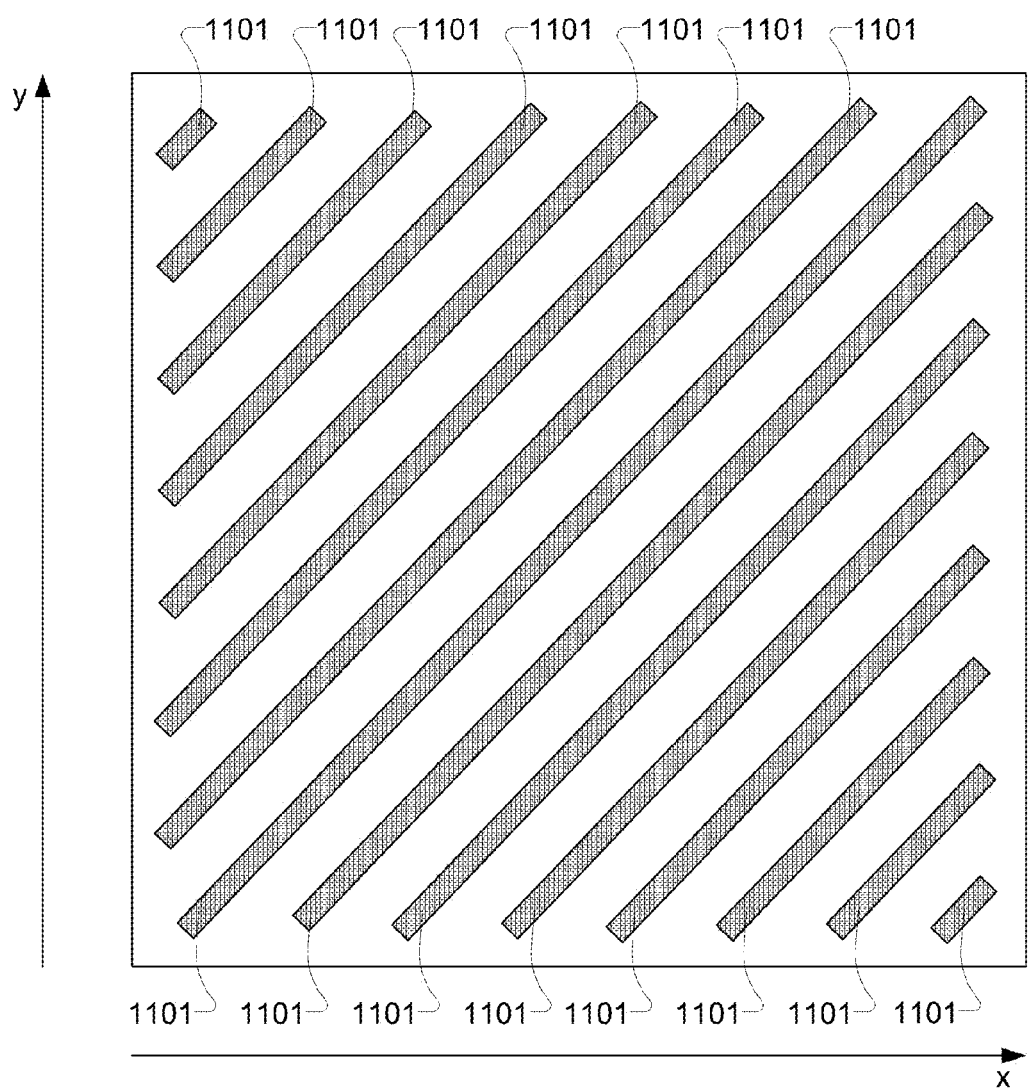
FIG. 11 is an illustration showing conductor tracks traversing the dynamic array in a first diagonal direction relative to the first and second reference directions (x) and (y), in accordance with one embodiment of the present invention.
Figure 12:
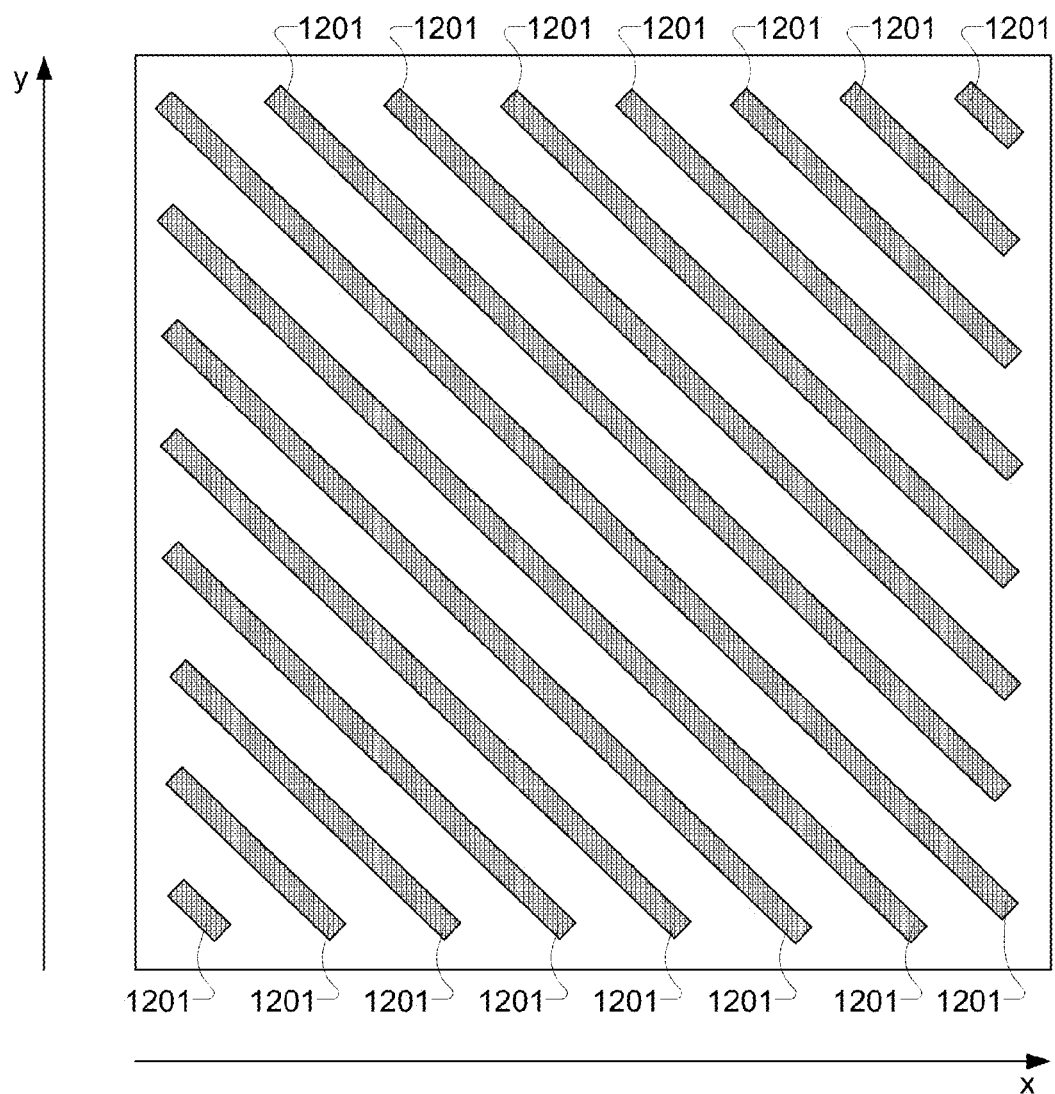
FIG. 12 is an illustration showing conductor tracks traversing the dynamic array in a second diagonal direction relative to the first and second reference directions (x) and (y), in accordance with one embodiment of the present invention.

As discussed above, the conduction lines in a given metal layer above the gate electrode layer may traverse the dynamic array in a direction coincident with either the first reference direction (x) or the second reference direction (y). It should be further appreciated that the conduction lines in a given metal layer above the gate electrode layer may traverse the dynamic array in a diagonal direction relative to the first and second reference directions (x) and (y). FIG. 11 is an illustration showing conductor tracks 1101 traversing the dynamic array in a first diagonal direction relative to the first and second reference directions (x) and (y), in accordance with one embodiment of the present invention. FIG. 12 is an illustration showing conductor tracks 1201 traversing the dynamic array in a second diagonal direction relative to the first and second reference directions (x) and (y), in accordance with one embodiment of the present invention.

As with the metal 1 and metal 2 tracks discussed above, the diagonal traversing conductor tracks 1101 and 1201 of FIGS. 11 and 12 may be interrupted, i.e., broken, any number of times in linearly traversing across the dynamic array in order to provide required electrical connectivity for a particular logic function to be implemented. When a given diagonal traversing conductor track is required to be interrupted, the separation between ends of the diagonal conductor track at the point of interruption is minimized to the extent possible taking into consideration manufacturing and electrical effects. Minimizing the separation between ends of the diagonal conductor track at the points of interruption serves to maximize the lithographic reinforcement, and uniformity thereof, provided from neighboring diagonal conductor tracks.

An optimal layout density within the dynamic array is achieved by implementing the following design rules:
- at least two metal 1 tracks be provided across the n-channel device area;
- at least two metal 1 tracks be provided across the p-channel device area;
- at least two gate electrode tracks be provided for the n-channel device; and
- at least two gate electrode tracks be provided for the p-channel device.

Contacts and vias are becoming the most difficult mask from a lithographic point of view. This is because the contacts and vias are getting smaller, more closely spaced, and are randomly distributed. The spacing and density of the cuts (contact or vias) makes it extremely difficult to reliably print the shapes. For example, cut shapes may be printed improperly due to destructive interference patterns from neighboring shapes or lack of energy on lone shapes. If a cut is properly printed, the manufacturing yield of the associated contact or via is extremely high. Sub-resolution contacts can be provided to reinforce the exposure of the actual contacts, so long as the sub-resolution contacts do not resolve. Also, the sub-resolution contacts can be of any shape so long as they are smaller than the resolution capability of the lithographic process.

Figure 13A:
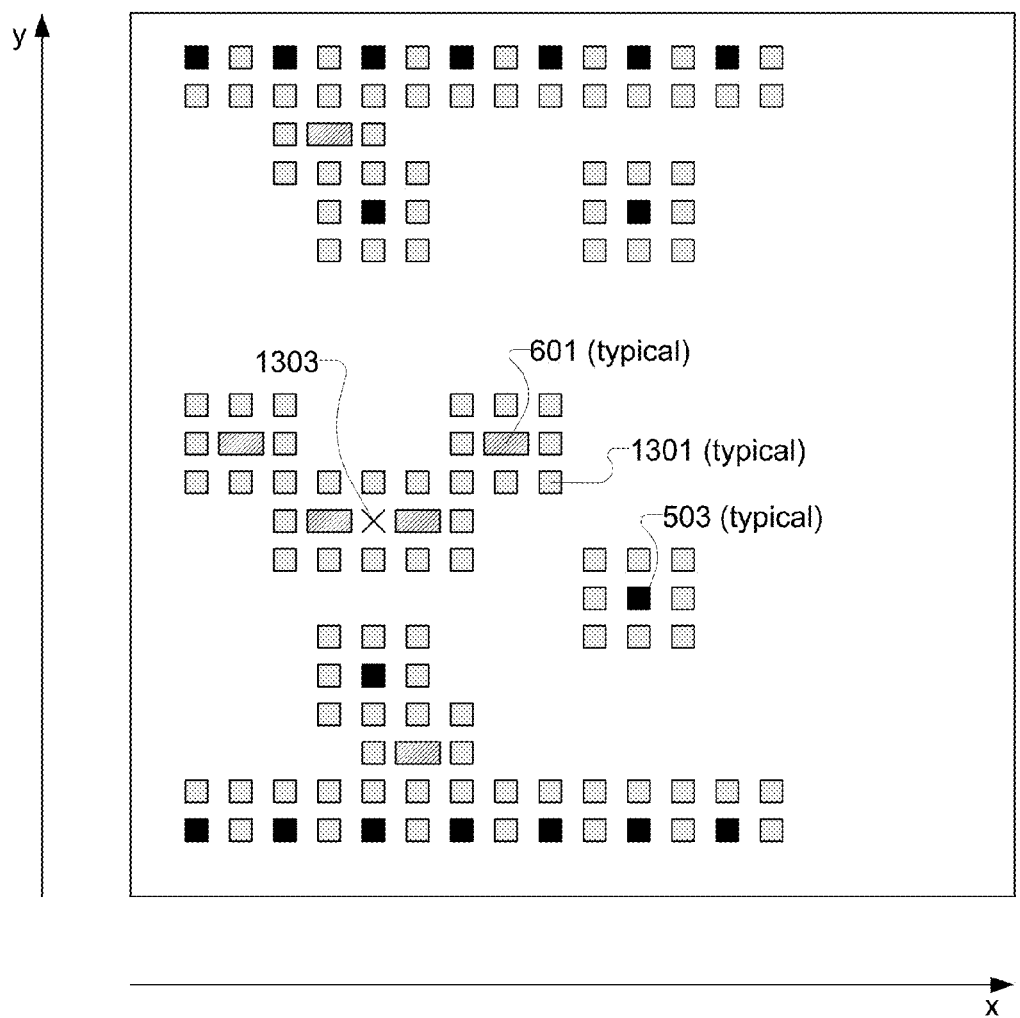
FIG. 13A is an illustration showing an example of a sub-resolution contact layout used to lithographically reinforce diffusion contacts and gate electrode contacts, in accordance with one embodiment of the present invention.

FIG. 13A is an illustration showing an example of a sub-resolution contact layout used to lithographically reinforce diffusion contacts and gate electrode contacts, in accordance with one embodiment of the present invention. Sub-resolution contacts 1301 are drawn such that they are below the resolution of the lithographic system and will not be printed. The function of the sub-resolution contacts 1301 is to increase the light energy at the desired contact locations, e.g., 503, 601, through resonant imaging. In one embodiment, sub-resolution contacts 1301 are placed on a grid such that both gate electrode contacts 601 and diffusion contacts 503 are lithographically reinforced. For example, sub-resolution contacts 1301 are placed on a grid that is equal to one-half the diffusion contact 503 grid spacing to positively impact both gate electrode contacts 601 and diffusion contacts 503. In one embodiment, a vertical spacing of the sub-resolution contacts 1301 follows the vertical spacing of the gate electrode contacts 601 and diffusion contacts 503.

Grid location 1303 in FIG. 13A denotes a location between adjacent gate electrode contacts 601. Depending upon the lithographic parameters in the manufacturing process, it is possible that a sub-resolution contact 1301 at this grid location would create an undesirable bridge between the two adjacent gate electrode contacts 601. If bridging is likely to occur, a sub-resolution contact 1301 at location 1303 can be omitted. Although FIG. 13A shows an embodiment where sub-resolution contacts are placed adjacent to actual features to be resolved and not elsewhere, it should be understood that another embodiment may place a sub-resolution contact at each available grid location so as to fill the grid.

Figure 13B:
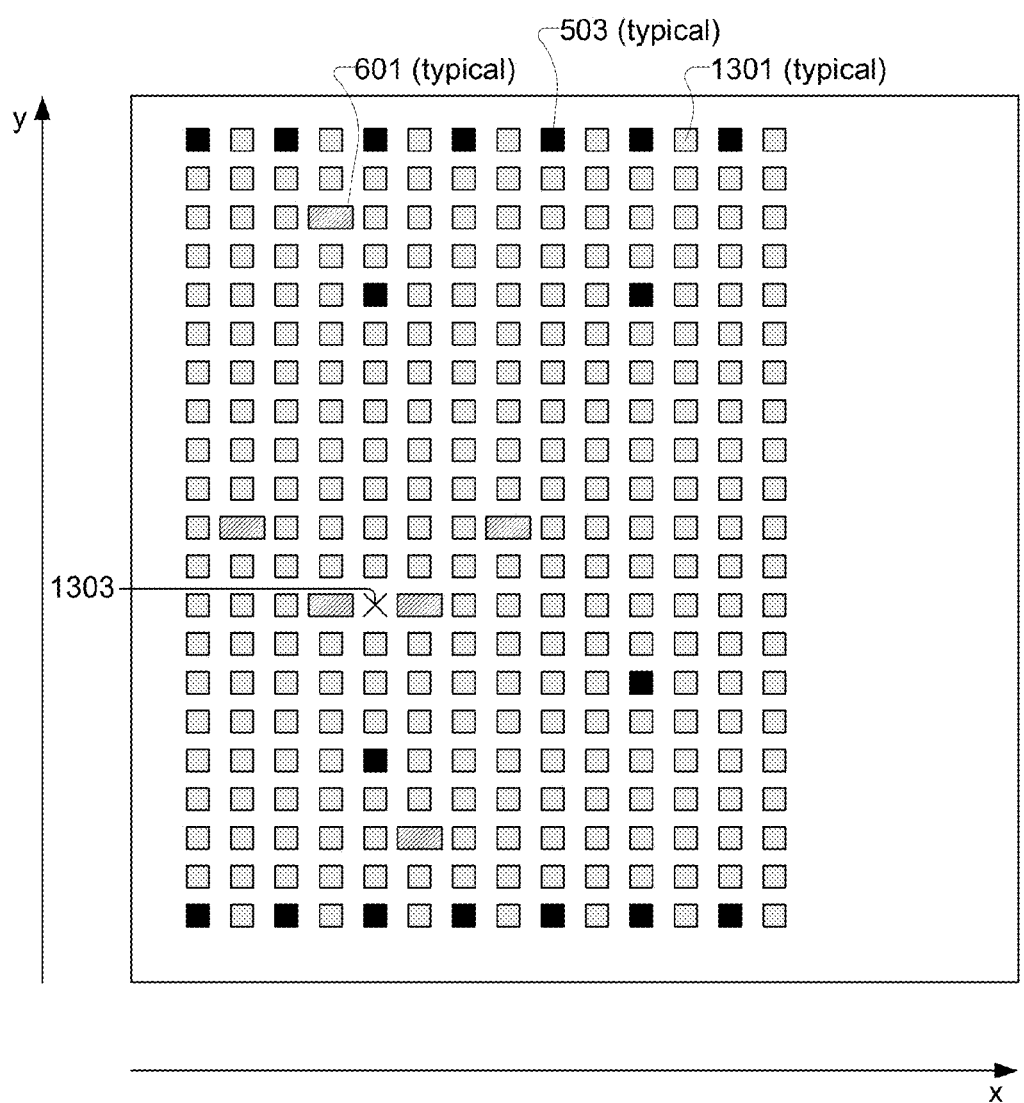
FIG. 13B is an illustration showing the sub-resolution contact layout of FIG. 13A with sub-resolution contacts defined to fill the grid to the extent possible, in accordance with one embodiment of the present invention.

FIG. 13B is an illustration showing the sub-resolution contact layout of FIG. 13A with sub-resolution contacts defined to fill the grid to the extent possible, in accordance with one embodiment of the present invention. It should be appreciated that while the embodiment of FIG. 13B fills the grid to the extent possible with sub-resolution contacts, placement of sub-resolution contacts is avoided at locations that would potentially cause undesirable bridging between adjacent fully resolved features.

Figure 13C:
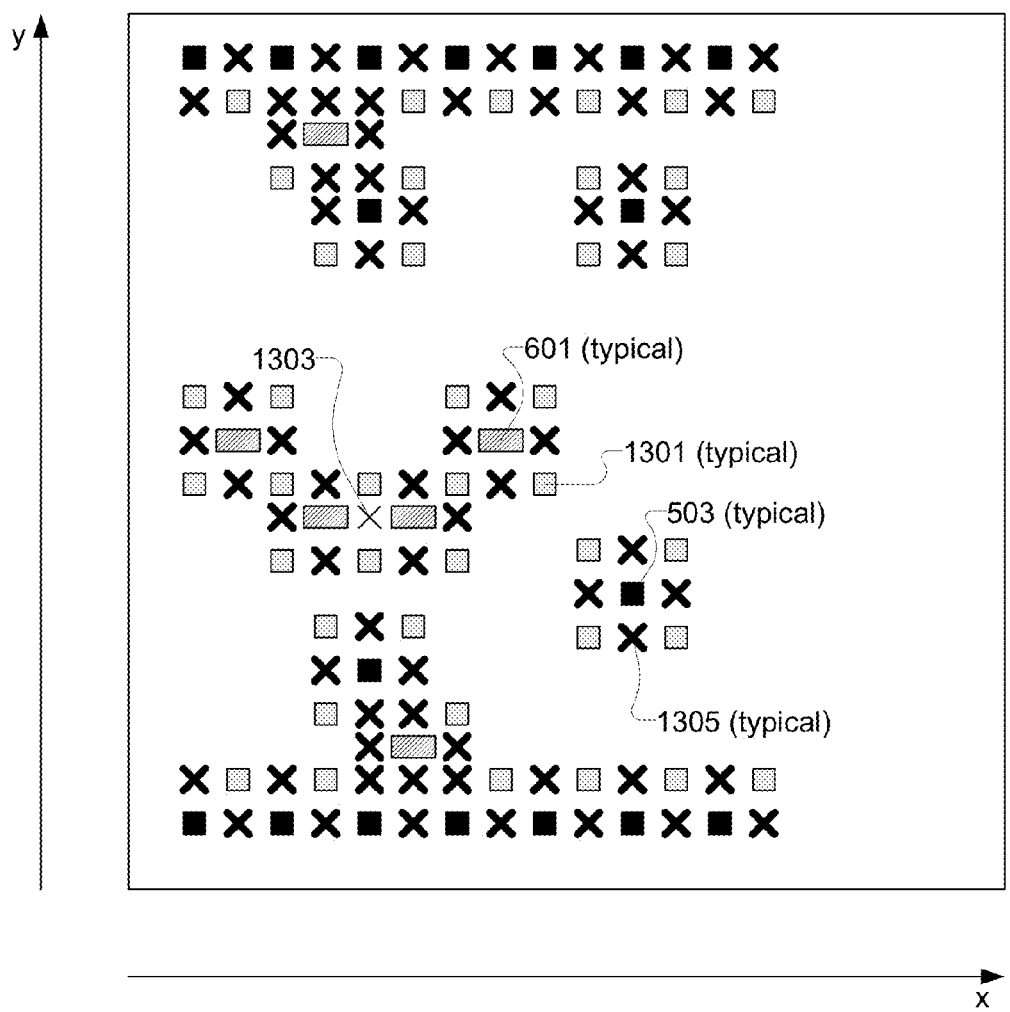
FIG. 13C is an illustration showing an example of a sub-resolution contact layout utilizing various shaped sub-resolution contacts, in accordance with one embodiment of the present invention.

FIG. 13C is an illustration showing an example of a sub-resolution contact layout utilizing various shaped sub-resolution contacts, in accordance with one embodiment of the present invention. Alternative sub-resolution contact shapes can be utilized so long as the sub-resolution contacts are below the resolution capability of the manufacturing process. FIG. 13C shows the use of "X-shaped" sub-resolution contacts 1305 to focus light energy at the corners of the adjacent contacts. In one embodiment, the ends of the X-shaped sub-resolution contact 1305 are extended to further enhance the deposition of light energy at the corners of the adjacent contacts.

Figure 13D:
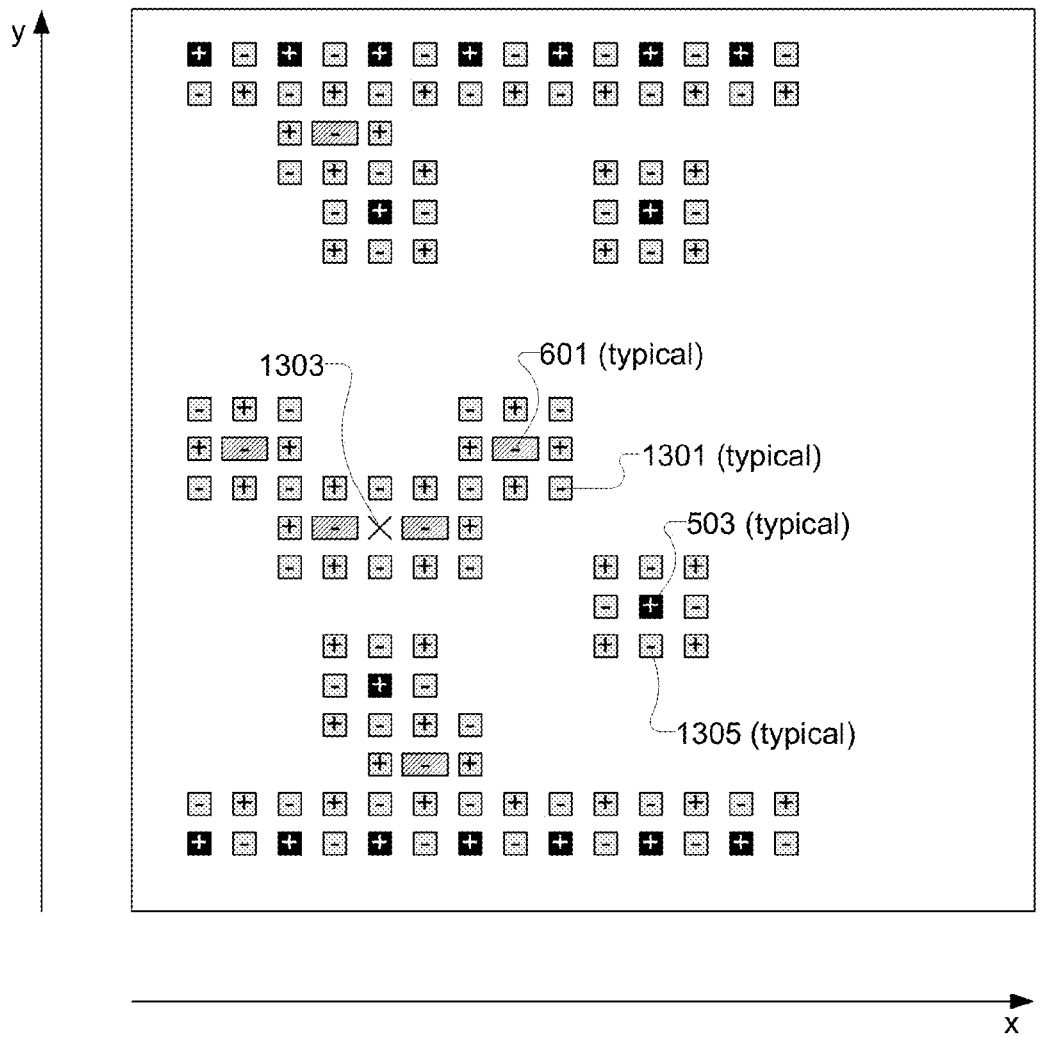
FIG. 13D is an illustration showing an exemplary implementation of alternate phase shift masking (APSM) with sub-resolution contacts, in accordance with one embodiment of the present invention.

FIG. 13D is an illustration showing an exemplary implementation of alternate phase shift masking (APSM) with sub-resolution contacts, in accordance with one embodiment of the present invention. As in FIG. 13A, sub-resolution contacts are utilized to lithographically reinforce diffusion contacts 503 and gate electrode contacts 601. APSM is used to improve resolution when neighboring shapes create destructive interference patterns. The APSM technique modifies the mask so that the phase of light traveling through the mask on neighboring shapes is 180 degrees out of phase. This phase shift serves to remove destructive interference and allowing for greater contact density. By way of example, contacts in FIG. 13D marked with a plus "+" sign represent contacts exposed with light waves of a first phase while contacts marked with a minus sign "−" represent contacts exposed with light waves that are shifted in phase by 180 degrees relative to the first phase used for the "+" sign contacts. It should be appreciated that the APSM technique is utilized to ensure that adjacent contacts are separated from each other.

As feature sizes decrease, semiconductor dies are capable of including more gates. As more gates are included, however, the density of the interconnect layers begins to dictate the die size. This increasing demand on the interconnect layers drives higher levels of interconnect layers. However, the stacking of interconnect layers is limited in part by the topology of the underlying layers. For example, as interconnect layers are built up, islands, ridges, and troughs can occur. These islands, ridges, and troughs can cause breaks in the interconnect lines that cross them.

To mitigate these islands and troughs, the semiconductor manufacturing process utilizes a chemical mechanical polishing (CMP) procedure to mechanically and chemically polish the surface of the semiconductor wafer such that each subsequent interconnect layer is deposited on a substantially flat surface. Like the photolithography process the quality of the CMP process is layout pattern dependent. Specifically, an uneven distribution of a layout features across a die or a wafer can cause too much material to be removed in some places and not enough material to be removed in other places, thus causing variations in the interconnect thickness and unacceptable variations in the capacitance and resistance of the interconnect layer. The capacitance and resistance variation within the interconnect layer may alter the timing of a critical net causing design failure.

The CMP process requires that dummy fill be added in the areas without interconnect shapes so that a substantially uniform wafer topology is provided to avoid dishing and improve center-to-edge uniformity. Traditionally, dummy fill is placed post-design. Thus, in the traditional approach the designer is not aware of the dummy fill characteristics. Consequently, the dummy fill placed post-design may adversely influence the design performance in a manner that has not been evaluated by the designer. Also, because the conventional topology prior to the dummy fill is unconstrained, i.e., non-uniform, the post-design dummy fill will not be uniform and predictable. Therefore, in the conventional process, the capacitive coupling between the dummy fill regions and the neighboring active nets cannot be predicted by the designer.

As previously discussed, the dynamic array disclosed herein provides optimal regularity by maximally filling all interconnect tracks from gate electrode layer upward. If multiple nets are required in a single interconnect track, the interconnect track is split with a minimally spaced gap. For example, track 809 representing the metal 1 conduction line in FIG. 8A represents three separate nets in the same track, where each net corresponds to a particular track segment. More specifically, there are two poly contact nets and a floating net to fill the track with minimal spacing between the track segments. The substantially complete filling of tracks maintains the regular pattern that creates resonant images across the dynamic array. Also, the regular architecture of the dynamic array with maximally filled interconnect tracks ensures that the dummy fill is placed in a uniform manner across the die. Therefore, the regular architecture of the dynamic array assists the CMP process to produce substantially uniform results across the die/wafer. Also, the regular gate pattern of the dynamic array assists with gate etching uniformity (microloading). Additionally, the regular architecture of the dynamic array combined with the maximally filled interconnect tracks allows the designer to analyze the capacitive coupling effects associated with the maximally filled tracks during the design phase and prior to fabrication.

Because the dynamic array sets the size and spacing of the linearly shaped features, i.e., tracks and contacts, in each mask layer, the design of the dynamic array can be optimized for the maximum capability of the manufacturing equipment and processes. That is to say, because the dynamic array is restricted to the regular architecture for each layer above diffusion, the manufacturer is capable of optimizing the manufacturing process for the specific characteristics of the regular architecture. It should be appreciated that with the dynamic array, the manufacturer does not have to be concerned with accommodating the manufacture of a widely varying set of arbitrarily-shaped layout features as is present in conventional unconstrained layouts.

An example of how the capability of manufacturing equipment can be optimized is provided as follows. Consider that a 90 nm process has a metal 2 pitch of 280 nm. This metal 2 pitch of 280 nm is not set by the maximum capability of equipment. Rather, this metal 2 pitch of 280 nm is set by the lithography of the vias. With the via lithography issues removed, the maximum capability of the equipment allows for a metal 2 pitch of about 220 nm. Thus, the design rules for metal 2 pitch include about 25% margin to account for the light interaction unpredictability in the via lithography.

The regular architecture implemented within the dynamic array allows the light interaction unpredictability in the via lithography to be removed, thus allowing for a reduction in the metal 2 pitch margin. Such a reduction in the metal 2 pitch margin allows for a more dense design, i.e., allows for optimization of chip area utilization. Additionally, with the restricted, i.e., regular, topology afforded by the dynamic array, the margin in the design rules can be reduced. Moreover, not only can the excess margin beyond the capability of the process be reduced, the restricted topology afforded by the dynamic array also allows the number of required design rules to be substantially reduced. For example, a typical design rule set for an unconstrained topology could have more than 600 design rules. A design rule set for use with the dynamic array may have about 45 design rules. Therefore, the effort required to analyze and verify the design against the design rules is decreased by more than a factor of ten with the restricted topology of the dynamic array.

When dealing with line end-to-line end gaps (i.e., track segment-to-track segment gaps) in a given track of a mask layer in the dynamic array, a limited number of light interactions exist. This limited number of light interactions can be identified, predicted, and accurately compensated for ahead of time, dramatically reducing or completely eliminating the requirement for OPC/RET. The compensation for light interactions at line end-to-line end gaps represents a lithographic modification of the as-drawn feature, as opposed to a correction based on modeling of interactions, e.g., OPC/RET, associated with the as-drawn feature.

Also, with the dynamic array, changes to the as-drawn layout are only made where needed. In contrast, OPC is performed over an entire layout in a conventional design flow. In one embodiment, a correction model can be implemented as part of the layout generation for the dynamic array. For example, due to the limited number of possible line end gap interactions, a router can be programmed to insert a line break having characteristics defined as a function of its surroundings, i.e., as a function of its particular line end gap light interactions. It should be further appreciated that the regular architecture of the dynamic array allows the line ends to be adjusted by changing vertices rather than by adding vertices. Thus, in contrast with unconstrained topologies that rely on the OPC process, the dynamic array significantly reduces the cost and risk of mask production. Also, because the line end gap interactions in the dynamic array can be accurately predicted in the design phase, compensation for the predicted line end gap interactions during the design phase does not increase risk of design failure.

In conventional unconstrained topologies, designers are required to have knowledge of the physics associated with the manufacturing process due to the presence of design dependent failures. With the grid-based system of the dynamic array as disclosed herein, the logical design can be separated from the physical design. More specifically, with the regular architecture of the dynamic array, the limited number of light interactions to be evaluated within the dynamic array, and the design independent nature of the dynamic array, designs can be represented using a grid point based netlist, as opposed to a physical netlist.

With the dynamic array, the design is not required to be represented in terms of physical information. Rather, the design can be represented as a symbolic layout. Thus, the designer can represent the design from a pure logic perspective without having to represent physical characteristics, e.g., sizes, of the design. It should be understood that the grid-based netlist, when translated to physical, matches the optimum design rules exactly for the dynamic array platform. When the grid-based dynamic array moves to a new technology, e.g., smaller technology, a grid-based netlist can be moved directly to the new technology because there is no physical data in the design representation. In one embodiment, the grid-based dynamic array system includes a rules database, a grid-based (symbolic) netlist, and the dynamic array architecture.

It should be appreciated that the grid-based dynamic array eliminates topology related failures associated with conventional unconstrained architectures. Also, because the manufacturability of the grid-based dynamic array is design independent, the yield of the design implemented on the dynamic array is independent of the design. Therefore, because the validity and yield of the dynamic array is preverified, the grid-based netlist can be implemented on the dynamic array with preverified yield performance.

Figure 14:
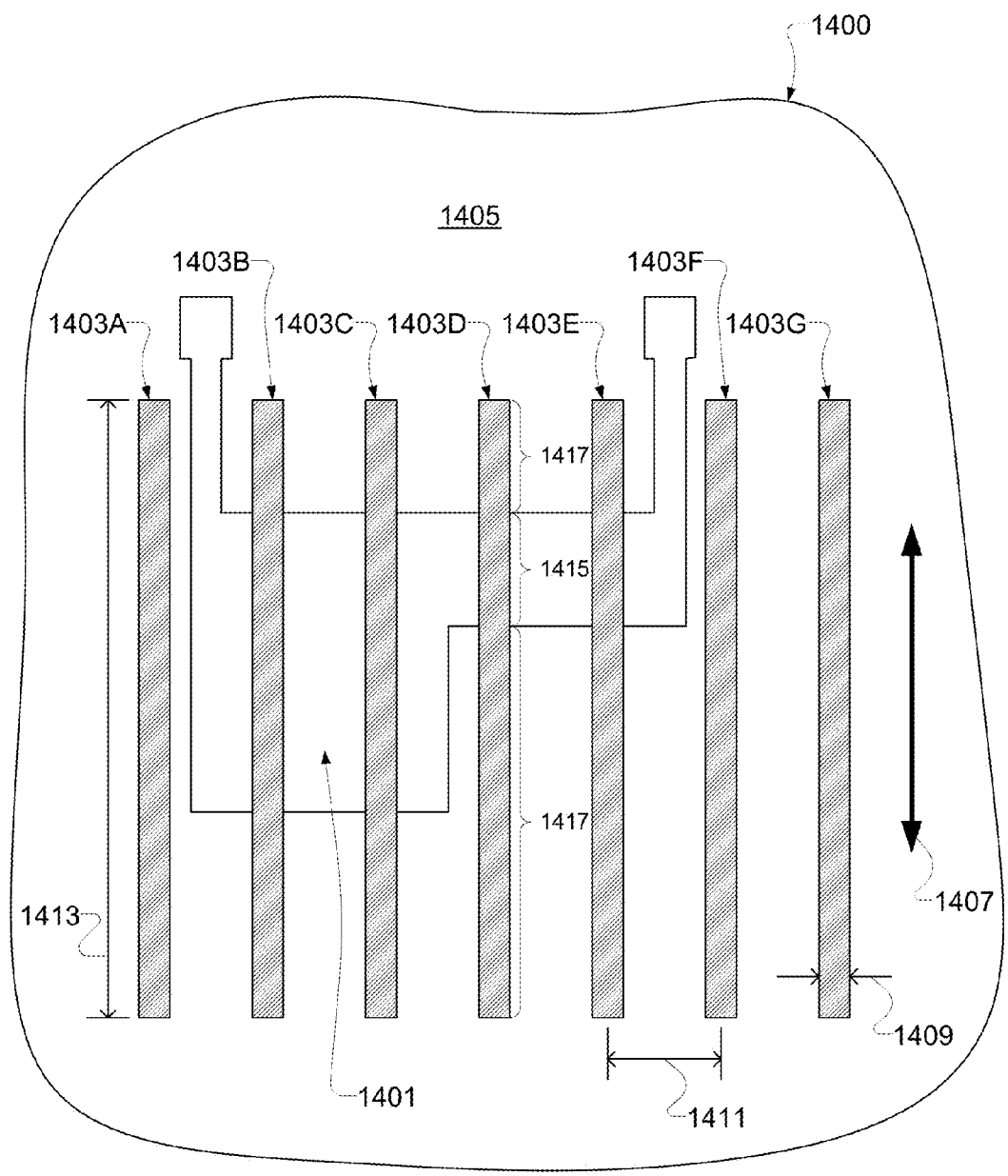
FIG. 14 is an illustration showing a semiconductor chip structure, in accordance with one embodiment of the present invention.

FIG. 14 is an illustration showing a semiconductor chip structure 1400, in accordance with one embodiment of the present invention. The semiconductor chip structure 1400 represents an exemplary portion of a semiconductor chip, including a diffusion region 1401 having a number of conductive lines 1403A-1403G defined thereover. The diffusion region 1401 is defined in a substrate 1405, to define an active region for at least one transistor device. The diffusion region 1401 can be defined to cover an area of arbitrary shape relative to the substrate 1405 surface.

The conductive lines 1403A-1403G are arranged to extend over the substrate 1405 in a common direction 1407. It should also be appreciated that each of the number of conductive lines 1403A-1403G are restricted to extending over the diffusion region 1401 in the common direction 1407. In one embodiment, the conductive lines 1403A-1403G defined immediately over the substrate 1405 are polysilicon lines. In one embodiment, each of the conductive lines 1403A-1403G is defined to have essentially the same width 1409 in a direction perpendicular to the common direction 1407 of extension. In another embodiment, some of the conductive lines 1403A-1403G are defined to have different widths relative to the other conductive lines. However, regardless of the width of the conductive lines 1403A-1403G, each of the conductive lines 1403A-1403G is spaced apart from adjacent conductive lines according to essentially the same center-to-center pitch 1411.

As shown in FIG. 14, some of the conductive lines (1403B-1403E) extend over the diffusion region 1401, and other conductive lines (1403A, 1403F, 1403G) extend over non-diffusion portions the substrate 1405. It should be appreciated that the conductive lines 1403A-1403G maintain their width 1409 and pitch 1411 regardless of whether they are defined over diffusion region 1401 or not. Also, it should be appreciated that the conductive lines 1403A-1403G maintain essentially the same length 1413 regardless of whether they are defined over diffusion region 1401 or not, thereby maximizing lithographic reinforcement between the conductive lines 1403A-1403G across the substrate. In this manner, some of the conductive lines, e.g., 1403D, defined over the diffusion region 1401 include a necessary active portion 1415, and one or more uniformity extending portions 1417.

It should be appreciated that the semiconductor chip structure 1400 represents a portion of the dynamic array described above with respect to FIGS. 2-13D. Therefore, it should be understood that the uniformity extending portions 1417 of the conductive lines (1403B-1403E) are present to provide lithographic reinforcement of neighboring conductive lines 1403A-1403G. Also, although they may not be required for circuit operation, each of conductive lines 1403A, 1403F, and 1403G are present to provide lithographic reinforcement of neighboring conductive lines 1403A-1403G.

The concept of the necessary active portion 1415 and the uniformity extending portions 1417 also applies to higher level interconnect layers. As previously described with regard to the dynamic array architecture, adjacent interconnect layers traverse over the substrate in transverse directions, e.g., perpendicular or diagonal directions, to enable routing/connectivity required by the logic device implemented within the dynamic array. As with the conductive lines 1403A-1403G, each of the conductive lines within an interconnect layer may include a required portion (necessary active portion) to enable required routing/connectivity, and a non-required portion (uniformity extending portion) to provide lithographic reinforcement to neighboring conductive lines. Also, as with the conductive lines 1403A-1403G, the conductive lines within an interconnect layer extend in a common direction over the substrate, have essentially the same width, and are spaced apart from each other according to an essentially constant pitch.

In one embodiment, conductive lines within an interconnect layer follow essentially the same ratio between line width and line spacing. For example, at 90 nm the metal 4 pitch is 280 nm with a line width and line spacing equal to 140 nm. Larger conductive lines can be printed on a larger line pitch if the line width is equal to the line spacing.

The dynamic array architecture as described herein represents a semiconductor device design paradigm in which linear conductive features are defined along a virtual grate in each of a plurality of levels. The plurality of levels are defined above a portion of a semiconductor substrate that may have one or more diffusion regions defined therein. The virtual grate of a given level is oriented to be substantially perpendicular to the virtual grate in an adjacent level. Also, the linear conductive features are defined along each line of each virtual grate so as to be devoid of a substantial change in direction. It should be appreciated that each conductive feature within each of the plurality of levels is defined by one of the linear conductive features. Therefore, the dynamic array architecture specifically avoids the use of non-linear conductive features, wherein a non-linear conductive feature includes one or more bends within a plane of the associated level.

In one embodiment the plurality of levels of the dynamic array architecture extends upward from the substrate through the entire chip to the outer packaging of the chip. In another embodiment, the plurality of levels of the dynamic array architecture extends upward from the substrate through a number of levels that is less than the total number of levels within the entire chip. In this embodiment, the number of levels defined according to the dynamic array architecture includes those levels which benefit from or require the high probability of accurate manufacturing prediction as afforded by the dynamic array architecture. For example, the dynamic array architecture may be used to define each level above the substrate through a third interconnect level. Then, due to the increased size and spacing of features and/or decreased number of features above the third interconnect level, an arbitrary layout technique may be used to define the features above the third interconnect level. It should be appreciated that any portion of a chip that employs the dynamic array architecture in any number of levels thereof is considered to represent a dynamic array architecture region.

Within a given level defined according to the dynamic array architecture, proximate ends of adjacent linear conductive features may be separated from each other by a substantially uniform gap. More specifically, adjacent ends of linear conductive features defined along a common line of a virtual grate are separated by a gap, and such gaps within the level associated with the virtual grate may be defined to span a substantially uniform distance. Also, within the dynamic array architecture, vias and contacts are defined to interconnect a number of the linear conductive features in various levels so as to form a number of functional electronic devices, e.g., transistors, and electronic circuits. Thus, a number of the linear conductive features in the plurality of levels form functional components of an electronic circuit. Additionally, some of the linear conductive features within the plurality of levels may be non-functional with respect to an electronic circuit, but are manufactured nonetheless so as to reinforce manufacturing of neighboring linear conductive features. It should be understood that the dynamic array architecture is defined to enable accurate prediction of semiconductor device manufacturability with a high probability.

Figure 15:
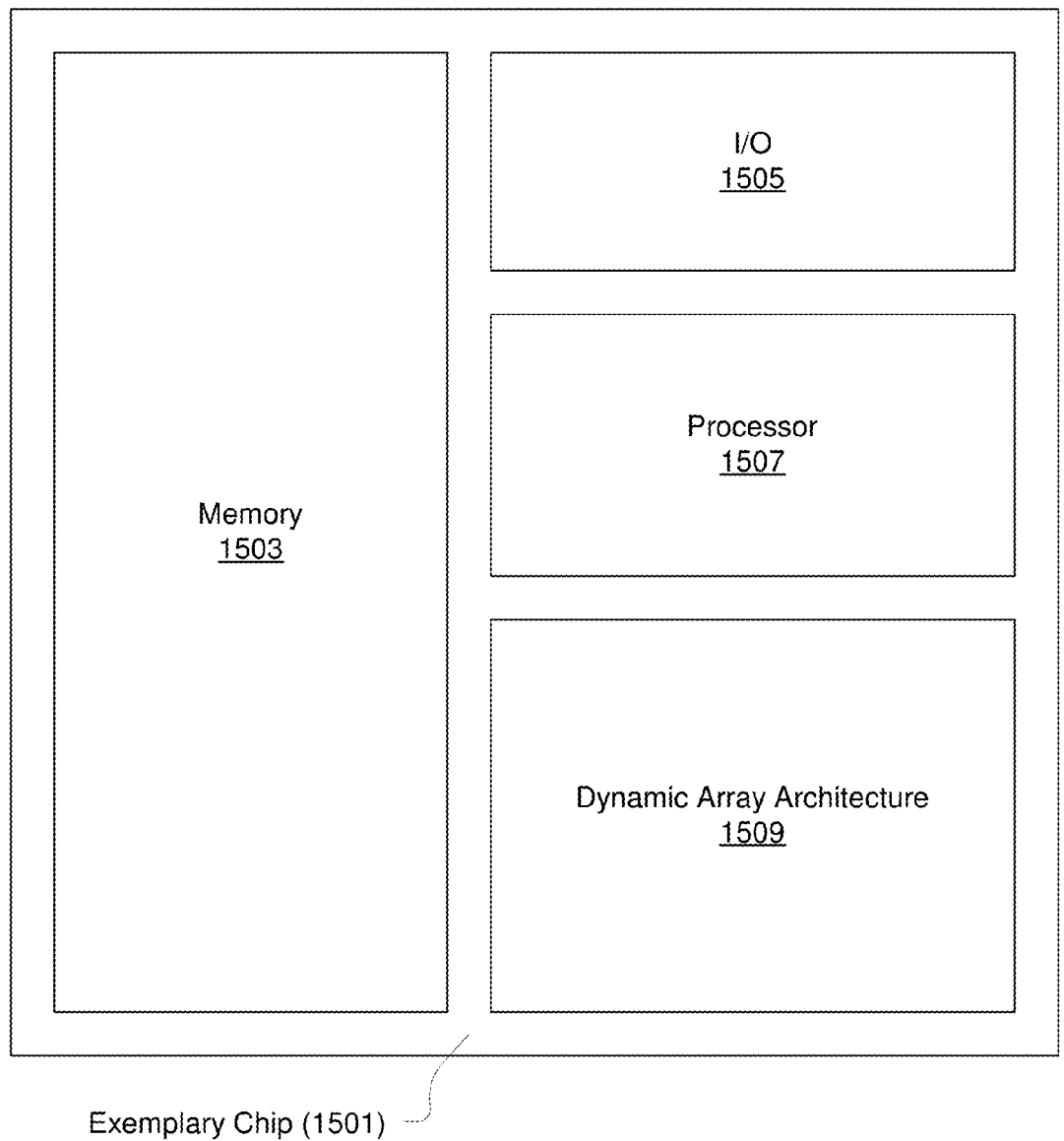
FIG. 15 is an illustration showing an exemplary chip implementing the dynamic array architecture, in accordance with one embodiment of the present invention.

FIG. 15 is an illustration showing an exemplary chip 1501 implementing the dynamic array architecture, in accordance with one embodiment of the present invention. The exemplary chip includes a dynamic array architecture region 1509. The exemplary chip 1501 also includes a memory region 1503, an input/output (I/O) region 1505, and a processor region 1507. It should be understood that the memory region 1503, the I/O region 1505, and the processor region 1507 are shown by way of example and are not intended to represent required portions of a chip, required chip architecture, or required accompaniments to the dynamic array architecture.

It should be also be understood that in one embodiment, such as that of FIG. 15, the dynamic array architecture can be used to define one or more portions of a larger chip, i.e., die, wherein the circuitry defined within the one or more dynamic array architecture portions is defined to interface, as necessary, with circuitry in other portions of the chip. In another embodiment, an entire chip can be defined according to the dynamic array architecture. In this embodiment, although the entire chip is defined according to the dynamic array architecture, the chip can be partitioned into a number of distinct regions, where each distinct region is defined according to the dynamic array architecture. In accordance with the foregoing, a semiconductor chip can be configured to include one or more dynamic array architecture regions defined over a portion of the substrate of the chip, wherein each dynamic array architecture region includes one or more distinct but functionally interfaced dynamic array sections.

Figure 16:
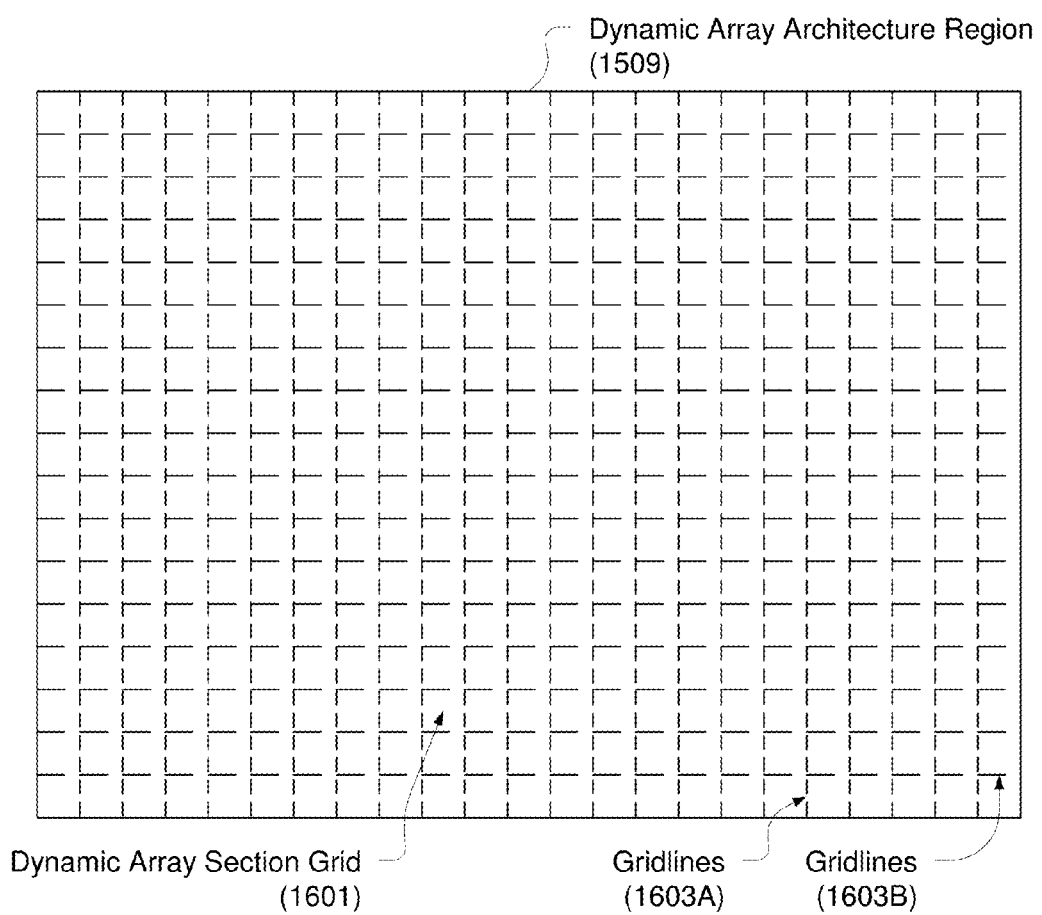
FIG. 16 is an illustration showing a blank canvas of the dynamic array architecture region, in accordance with one embodiment of the present invention.

FIG. 16 is an illustration showing a blank canvas of the dynamic array architecture region 1509, in accordance with one embodiment of the present invention. A dynamic array section (DAS) grid 1601 is defined across the blank canvas of the dynamic array architecture region 1509 to facilitate placement and alignment of dynamic array sections. The DAS grid 1601 is defined by a virtual network of perpendicular lines 1603A/1603B, i.e., gridlines, for locating dynamic array sections (DASs) on the substrate. As previously discussed, the DAS grid 1601 may be defined on a portion of a die, or over an entire die. The virtual network of perpendicular lines 1603A/1603B that represent the DAS grid 1601 are present in effect, although not present as physical entities. The DAS grid 1601 is defined within a plane substantially coincident with an upper surface of the substrate upon which the DASs are built. Thus, the DAS grid 1601 is defined within a plane that is parallel with a top surface of the substrate of the chip. The spacing between the lines 1603A/1603B of the DAS grid 1601 in each of the two perpendicular directions, respectively, can be the same or different. However, in one embodiment, the lines 1603A/1603B of the DAS grid 1601 having a common direction are uniformly spaced.

The spacing between adjacent parallel lines (1603A or 1603B) of the DAS grid 1601 is defined as a pitch of the adjacent parallel lines (1603A or 1603B). In one embodiment, the pitch of the DAS grid 1601 lines (1603A or 1603B) that run parallel with gate electrode features is defined to be equal to one-half of the minimum center-to-center separation between adjacent contacted gate electrode features. For ease of discussion, one-half of the minimum center-to-center separation between adjacent contacted gate electrode features is referred to as the gate electrode half-pitch. In the present embodiment, a DAS boundary that is coincident with a DAS grid line defined based on the gate electrode half-pitch will itself lie on the gate electrode half-pitch. Therefore, a cell defined within and at the edge of such a DAS will have a cell boundary that falls on the gate electrode half-pitch.

The dynamic array section (DAS) is defined as a subdivision of dynamic array architecture in which the features present in each vertically delineated level of the subdivision are defined with consideration of other features in the subdivision according to a set of rules, wherein the rules are established to govern relationships between features in a given level of the subdivision and between features in separate levels of the subdivision. A DAS can be defined to occupy a substrate area of arbitrary shape and size. A DAS can also be defined to occupy an area of arbitrary shape and size above the substrate. Also, the perpendicular lines 1603A/1603B of the DAS grid 1601 can be used to define DAS boundaries.

Figure 17A:
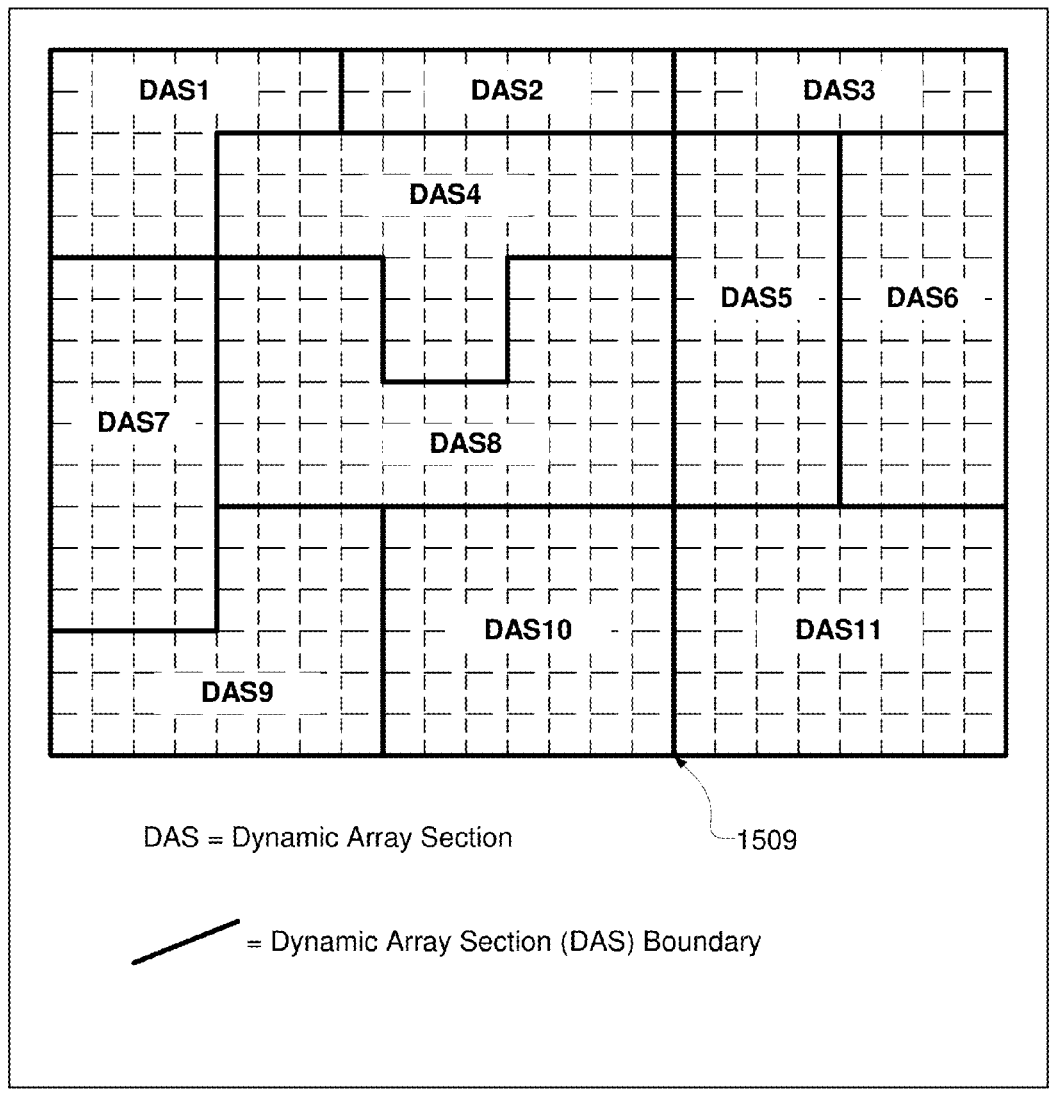
FIG. 17A is an illustration showing a number of exemplary dynamic array sections defined within the dynamic array architecture region, in accordance with one embodiment of the present invention.

FIG. 17A is an illustration showing a number of exemplary dynamic array sections (DAS1-DAS11) defined within the dynamic array architecture region 1509, in accordance with one embodiment of the present invention. Each boundary of each DAS (DAS1-DAS11) is defined along on a gridline 1603A/1603B of the DAS grid 1601, as described with regard to FIG. 16. It should be appreciated that the uniformity of the DAS grid 1601 facilitates placement and functional interfacing of the various DASs. The particular shapes of the exemplary DASs (DAS1-DAS11) are defined for descriptive purposes and should not be considered limiting with regard to the potential shape of a given DAS. More specifically, a given DAS can be defined to have essentially any shape and size as is necessary to define the devices and circuitry present within the DAS, so long as the DAS is compliant with the dynamic array architecture.

It should also be understood that a DAS is not required to include the substrate portion of the chip, or be defined immediately above and in contact with the substrate portion of the chip. More specifically, a DAS can be vertically defined to occupy a number of layers of the chip over a particular substrate area, but not immediately above and in contact with the substrate of the chip. In this regard, one embodiment can include a number of stacked DASs, wherein each stacked DAS is defined independently from an adjacent DAS present either thereabove or therebelow. Also, vertically stacked DASs can be defined to have different sizes and shapes relative to each other. In this regard, a higher vertically positioned DAS may cover: 1) more than a single lower vertically positioned DAS, or 2) portions of multiple lower vertically positioned DASs, or 3) a portion of a single lower vertically positioned DAS.

Figure 17B:
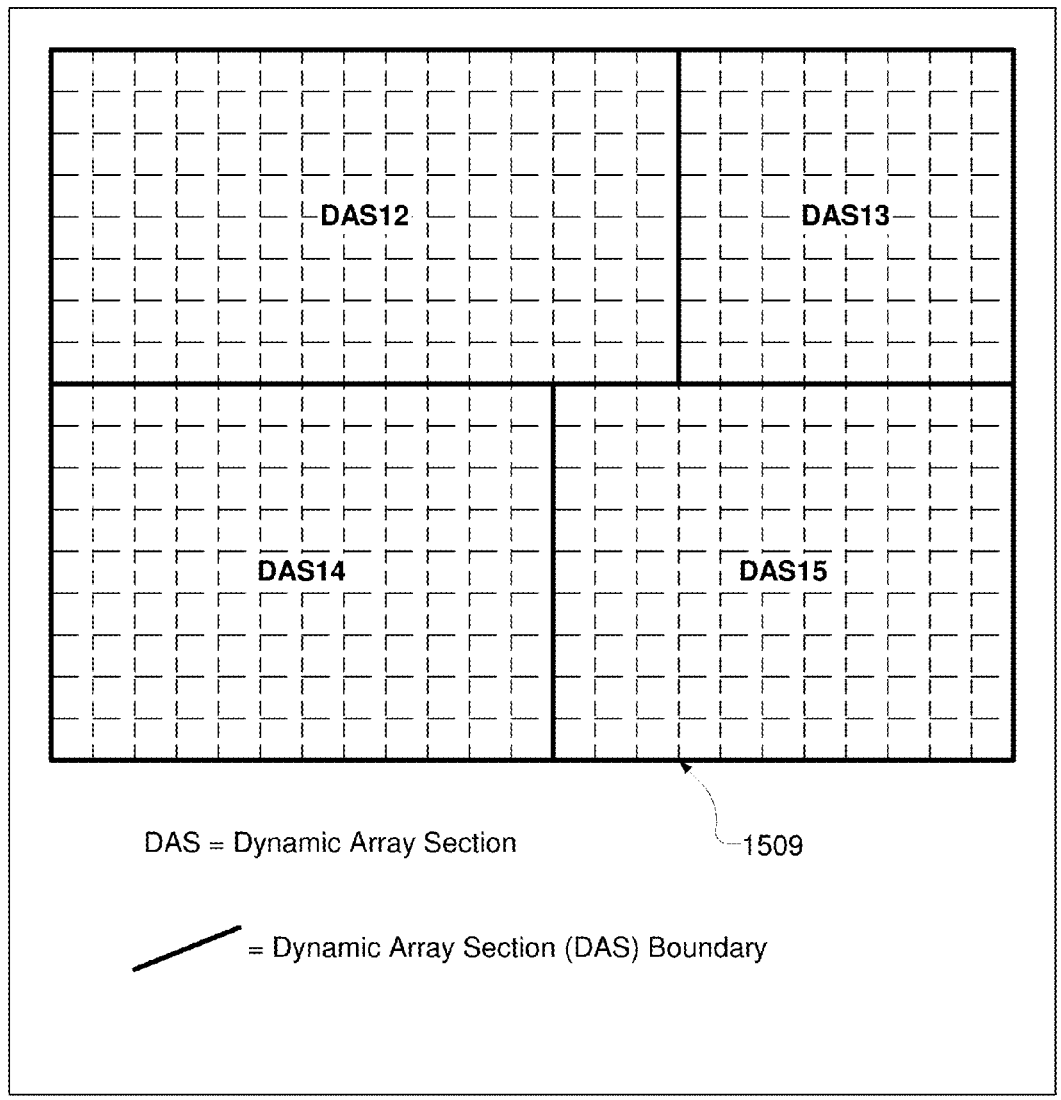
FIG. 17B is an illustration showing a number of dynamic array sections defined at a higher vertical position within the dynamic array architecture region, in accordance with one embodiment of the present invention.
Figure 17C:
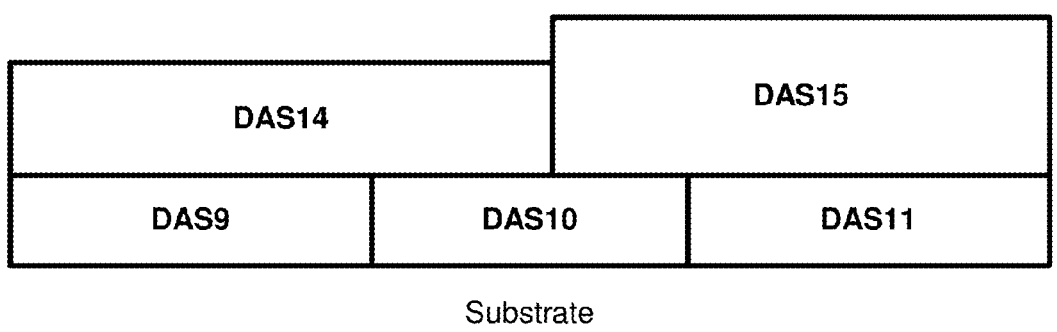
FIG. 17C is an illustration showing a side view of the DAS stack of FIG. 17B, in accordance with one embodiment of the present invention.

FIG. 17B is an illustration showing a number of dynamic array sections (DAS12-DAS15) defined at a higher vertical position within the dynamic array architecture region 1509, in accordance with one embodiment of the present invention. In the example of FIG. 17B, the collection of DAS12-DAS15 is positioned above the collection of DAS1-DAS11 of FIG. 17A. FIG. 17C is an illustration showing a side view of the DAS stack of FIG. 17B, in accordance with one embodiment of the present invention. It should be understood that the DAS arrangement depicted in FIGS. 17A-17C is provided for discussion purposes, and is not intended to represent an inclusive set of possible DAS arrangements. Also, it should be appreciated that in various embodiments DASs can be horizontally and vertically arranged over a portion of a substrate in essentially any manner consistent with the dynamic array architecture.

Figure 18:
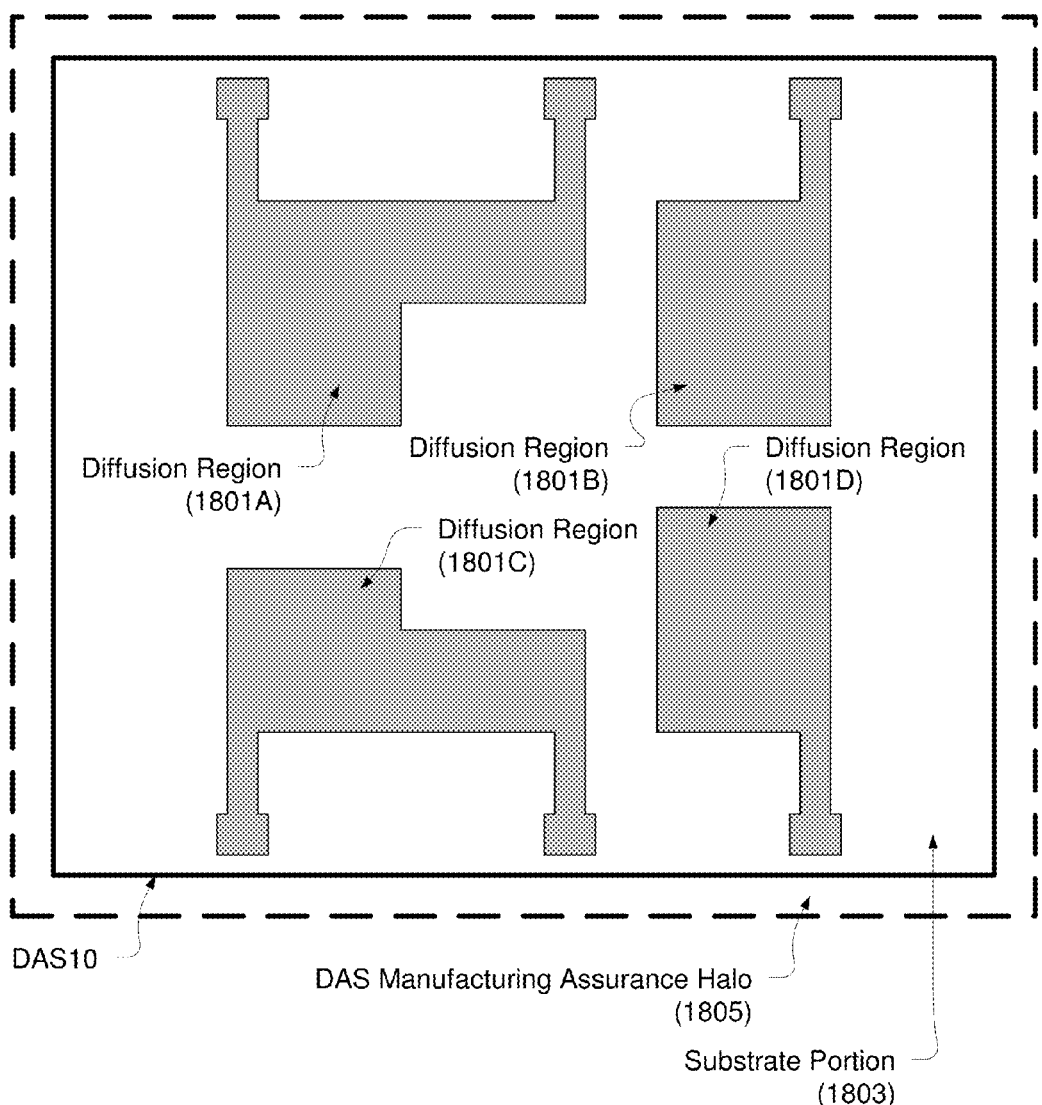
FIG. 18 is an illustration showing a substrate level of DAS10, in accordance with one embodiment of the present invention.

To enable a more detailed description of the dynamic array architecture, an exemplary implementation of the dynamic array architecture with regard to DAS10 of FIG. 17A is described in FIGS. 18-24D. FIG. 18 is an illustration showing a substrate level of DAS10, in accordance with one embodiment of the present invention. The substrate level of a DAS can include any number of diffusion regions. For example, DAS10 includes diffusion regions 1801A-1801D defined within the substrate portion 1803 over which DAS10 is built. The shape of each diffusion region within the substrate portion of the DAS is defined based on knowledge of the devices, i.e., transistors, that are to be formed within the DAS, and based on knowledge of the higher level linear conductive feature spacings and orientations that are to be utilized. It should be understood that the diffusion layer layout as previously described with regard to FIG. 4 is equally applicable to the substrate level of any DAS, including the DAS10 example. Thus, each diffusion region within a given DAS can be defined to have an arbitrary two-dimensional shape. However, in one embodiment, the diffusion regions are defined to not include extraneous jogs or corners, so as to improve lithographic resolution and enable more accurate device extraction.

Each DAS is defined to have a surrounding DAS manufacturing assurance halo (DAS halo). For example, in FIG. 18, DAS10 is shown to have a DAS halo 1805. The DAS halo is defined as a region surrounding a given DAS within a given level of the chip, wherein the manufacture of features within the DAS halo may impact the manufacturing predictability of features within the given DAS. The DAS halo is sized and managed to ensure that the manufacturing predictability of features within the associated DAS is preserved or enhanced. Upon placement of the DAS on the DAS grid, a portion of the associated DAS halo may represent a buffer region devoid of features from a neighboring DAS. Also, upon placement of the DAS on the DAS grid, a portion of the associated DAS halo may include a portion of a neighboring DAS, wherein the manufacture of features within the portion of the neighboring DAS does not adversely affect the manufacture of features within the DAS about which the DAS halo exists, vice-versa. Thus, a DAS halo or portion thereof is allowed to overlap a neighboring DAS halo or encroach within a neighboring DAS, so long as the function of the DAS halo for each of the neighboring DASs is satisfied to ensure that the manufacturing predictability of features within each of the neighboring DAS s is preserved or enhanced. The DAS halo is described in more detail with regard to FIGS. 25-27.

A gate electrode level is defined above the substrate level of the DAS10 example. The gate electrode level is defined to include a number linear conductive features defined according to a virtual grate associated with the gate electrode level. A virtual grate of any DAS level, including the gate electrode level, is defined as a virtual network of parallel lines for locating linear conductive features within a DAS level. The virtual network of parallel lines that represent a virtual grate for a given DAS level are present in effect, although not present as physical entities. The virtual grate for any DAS level is defined within a plane that is substantially parallel to an upper surface of an underlying substrate upon which the DAS is built. Also, in one embodiment, the parallel lines of the virtual grate for a given DAS level are spaced according to a constant pitch. The constant pitch used to defined the virtual grate for a given DAS level can be set at essentially any value required to facilitate appropriate placement of linear conductive features within the given DAS level.

Generally speaking, in each DAS level, linear conductive features are defined along the lines of the virtual grate associated with the DAS level. Each linear conductive feature is defined along a particular line of a virtual grate such that a centerline of the linear conductive feature is substantially centered upon the particular line of the virtual grate. A linear conductive feature is considered to be substantially centered upon a particular line of a virtual grate when a deviation in alignment between of the centerline of the linear conductive feature and the particular line of the virtual grate is sufficiently small so as to not reduce a manufacturing process window from what would be achievable with a true alignment between of the centerline of the linear conductive feature and the line of the virtual grate. In one embodiment, the above-mentioned manufacturing process window is defined by a lithographic domain of focus and exposure that yields an acceptable fidelity of the linear conductive feature. In one embodiment, the fidelity of a linear conductive feature is defined by a characteristic dimension of the linear conductive feature. Also, it should be understood that the centerline of a given linear conductive feature as referenced above is defined as a virtual line that passes through the cross-sectional centroid of the linear conductive feature at all points along its length, wherein the cross-sectional centroid of the linear conductive feature at any given point along its length is the centroid of its vertical cross-section area at the given point.

It should be appreciated that each linear conductive feature defined within a given DAS level will have associated sidewall profiles corresponding to the shape contours of the sidewalls of the linear conductive feature. The sidewalls of the linear conductive feature in this regard are defined as the sides of the linear conductive feature when viewed as a vertical cross-section cut perpendicular to the centerline of the linear conductive feature. The DAS architecture accommodates variation in the sidewall profiles of a given linear conductive feature along its length, so long as the sidewall profile variation is predictable from a manufacturing perspective and does not adversely impact the manufacture of the given linear conductive feature or its neighboring linear conductive features. It should be appreciated that sidewall variation along the length of a linear conductive feature will correspond to width variation along the length of the linear conductive feature. Therefore, the DAS architecture also accommodates variation in the width of a given linear conductive feature along its length, so long as the width variation is predictable from a manufacturing perspective and does not adversely impact the manufacture of the given linear conductive feature or its neighboring linear conductive features.

In additional to the foregoing, it should be understood that each linear conductive feature, or segment thereof, in each level of the dynamic array architecture is defined to be devoid of a substantial change in direction along its length. Thus, the lack of substantial change in direction of a linear conductive feature is considered relative to the line of the virtual grate along which the linear conductive feature is defined. In one embodiment, a substantial change in direction of a linear conductive feature exists when the width of the linear conductive feature at any point thereon changes by more than 50% of the nominal width of the linear conductive feature along its entire length. In another embodiment, a substantial change in direction of a linear conductive feature exists when the width of the linear conductive feature changes from any first location on the linear conductive feature to any second location on the linear conductive feature by more that 50% of the linear conductive feature width at the first location.

In the dynamic array architecture, each DAS level can be defined to have any number of the lines of its virtual grate occupied by any number of linear conductive features. In one example, a given DAS level may be defined such that all lines of its virtual grate are occupied by at least one linear conductive feature. In another example, a given DAS level may be defined such that some lines of its virtual grate are occupied by at least one linear conductive feature, and other lines of its virtual grate are vacant, i.e., not occupied by any number of linear conductive features. Furthermore, in a given DAS level, any number of successively adjacent virtual grate lines can be left vacant. Additionally, in a given DAS level, any number of successively adjacent virtual grate lines can be respectively occupied by any number of linear conductive features. Also, in some DAS level instances, the occupancy versus vacancy of the virtual grate lines, with regard the presence of linear conductive features thereon, may follow a pattern or repeating pattern across the DAS level.

Additionally, different linear conductive features within a given level of the DAS can be designed to have the same width or different widths. Also, the widths of a number of linear conductive features defined along adjacent lines of a given virtual grate can be designed such that the number of linear conductive features contact each other so as to form a single linear conductive feature having a width equal to the sum of the widths of the number of linear conductive features.

Figure 19A:
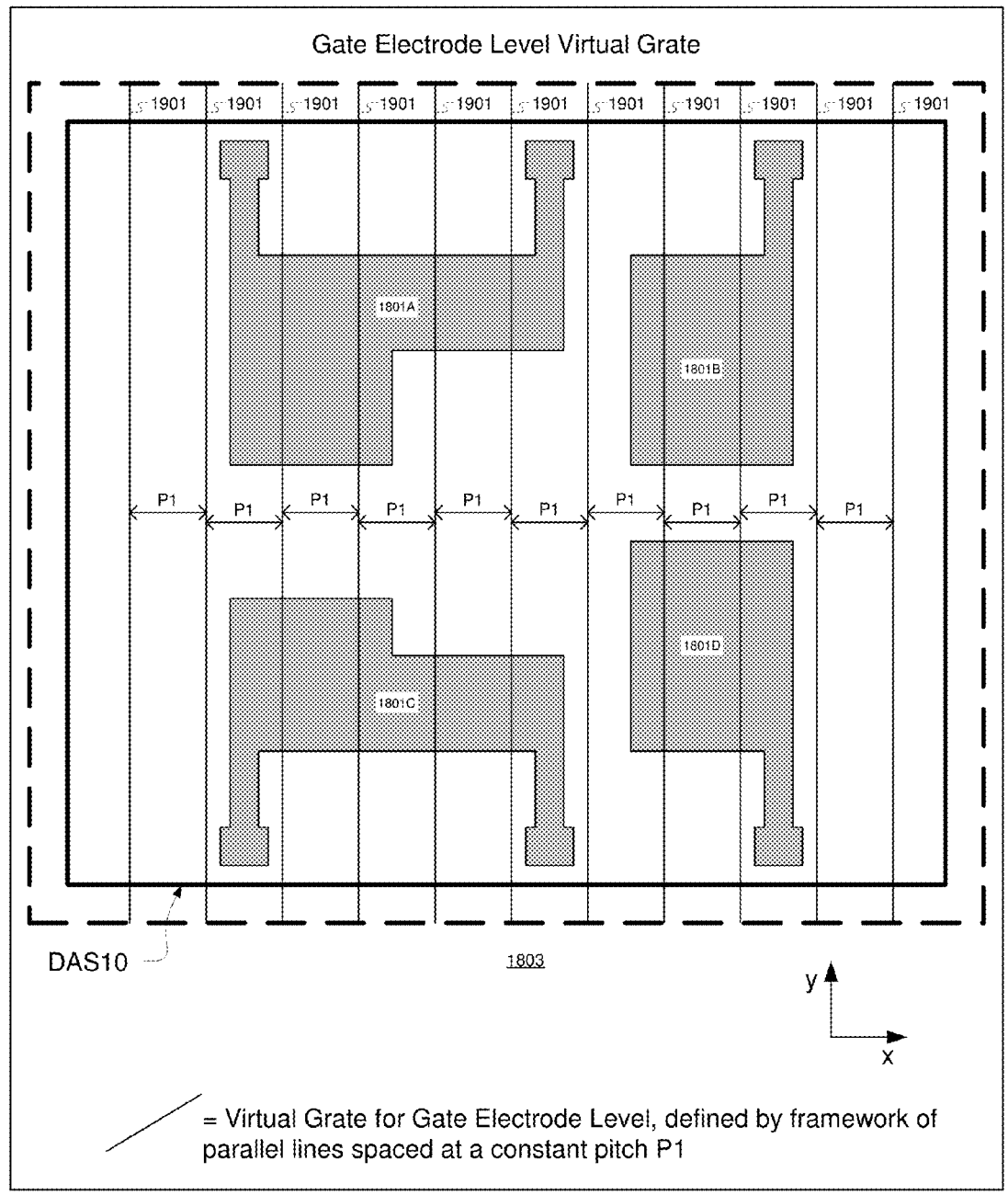
FIG. 19A is an illustration showing a gate electrode level virtual grate for the DAS10 example, in accordance with one embodiment of the present invention.

FIG. 19A is an illustration showing a gate electrode level virtual grate for the DAS10 example, in accordance with one embodiment of the present invention. The gate electrode level virtual grate is defined by a framework of parallel lines 1901 spaced at a constant pitch P1. The gate electrode level virtual grate is oriented such that the lines thereof extend in a first direction, i.e., y direction, over the substrate portion 1803 upon which DAS10 is built. The position of the gate electrode level virtual grate (in a second direction, i.e., x direction) and the associated pitch P1 are established to ensure that lines of the virtual grate along which linear conductive features are to be defined will be properly positioned relative to the underlying diffusion regions 1801A-1801D such that a number of the linear conductive features defined within the gate electrode level can serve as gate electrode components of transistor devices.

In the exemplary embodiment of FIG. 19A, the pitch P1 of the virtual grate is equal to a minimum center-to-center spacing to be used between adjacent contacted gate electrode features. However, it should be understood that in other embodiments, the pitch P1 of the gate electrode level virtual grate can be set at essentially any value deemed appropriate for the particular DAS. For example, FIG. 19A1 shows a virtual grate of the gate electrode level set at a pitch P1A equal to one-half of the minimum center-to-center spacing between adjacent contacted gate electrode features. As previously mentioned, one-half of the minimum center-to-center separation between adjacent contacted gate electrode features is referred to as the gate electrode half-pitch.

In one embodiment, the pitch that defines the virtual grate of the gate electrode level is set to optimize lithographic reinforcement during manufacture of linear conductive features defined along the lines of the virtual grate. In another embodiment, the pitch that defines the virtual grate of the gate electrode level is set to optimize a density of the linear conductive features defined along the lines of the virtual grate. It should be appreciated that optimization of the density of the linear conductive features, as defined along the lines of the virtual grate, may not correspond to feature-to-feature lithographic reinforcement during manufacturing. Also, in another embodiment, the pitch that defines the virtual grate of the gate electrode level can be set based on optimization of circuit performance, manufacturability, or reliability.

Figure 19B:
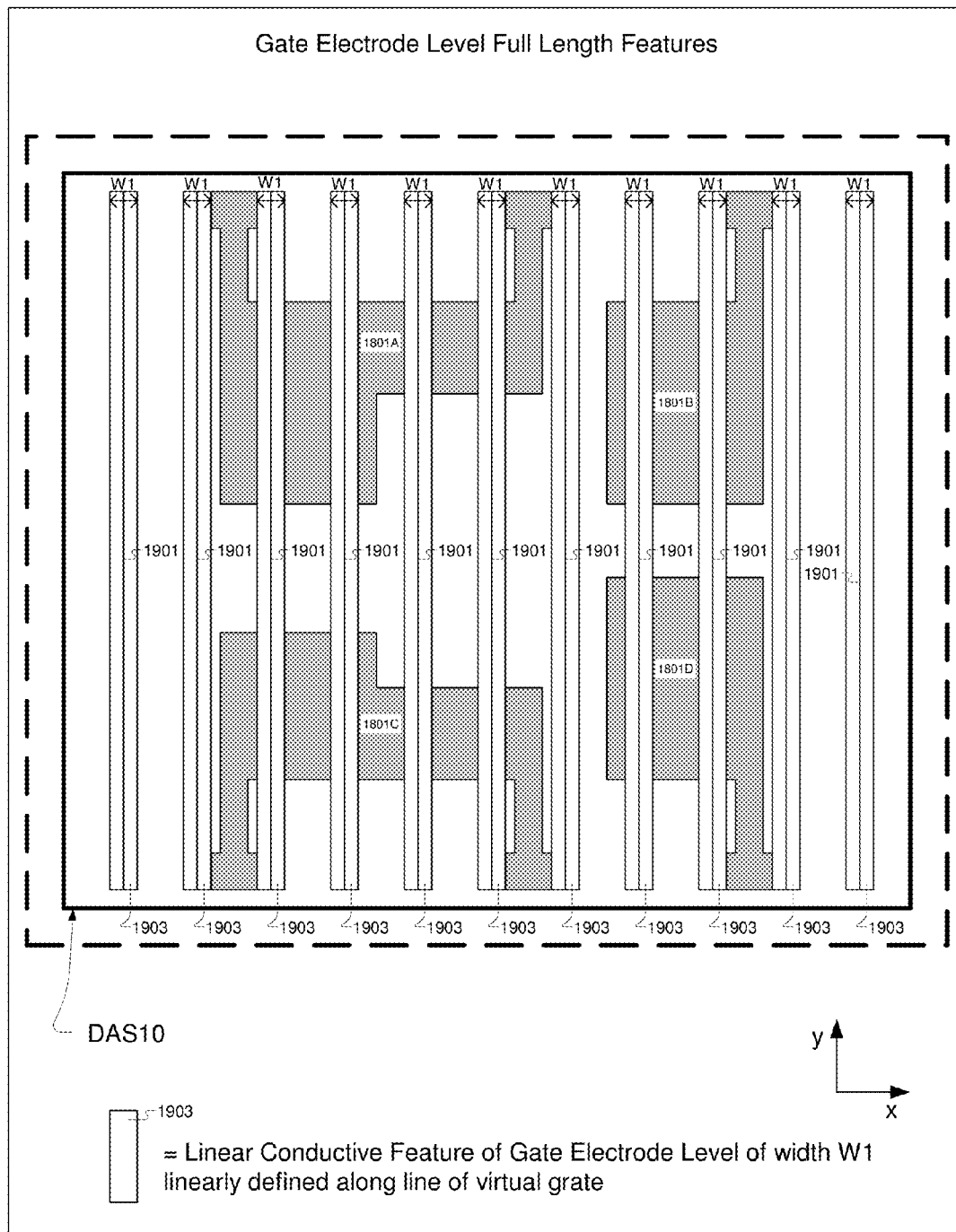
FIG. 19B is an illustration showing full-length linear conductive features defined along each line of the gate electrode level virtual grate of FIG. 19A, in accordance with one embodiment of the present invention.
Figure 19C:
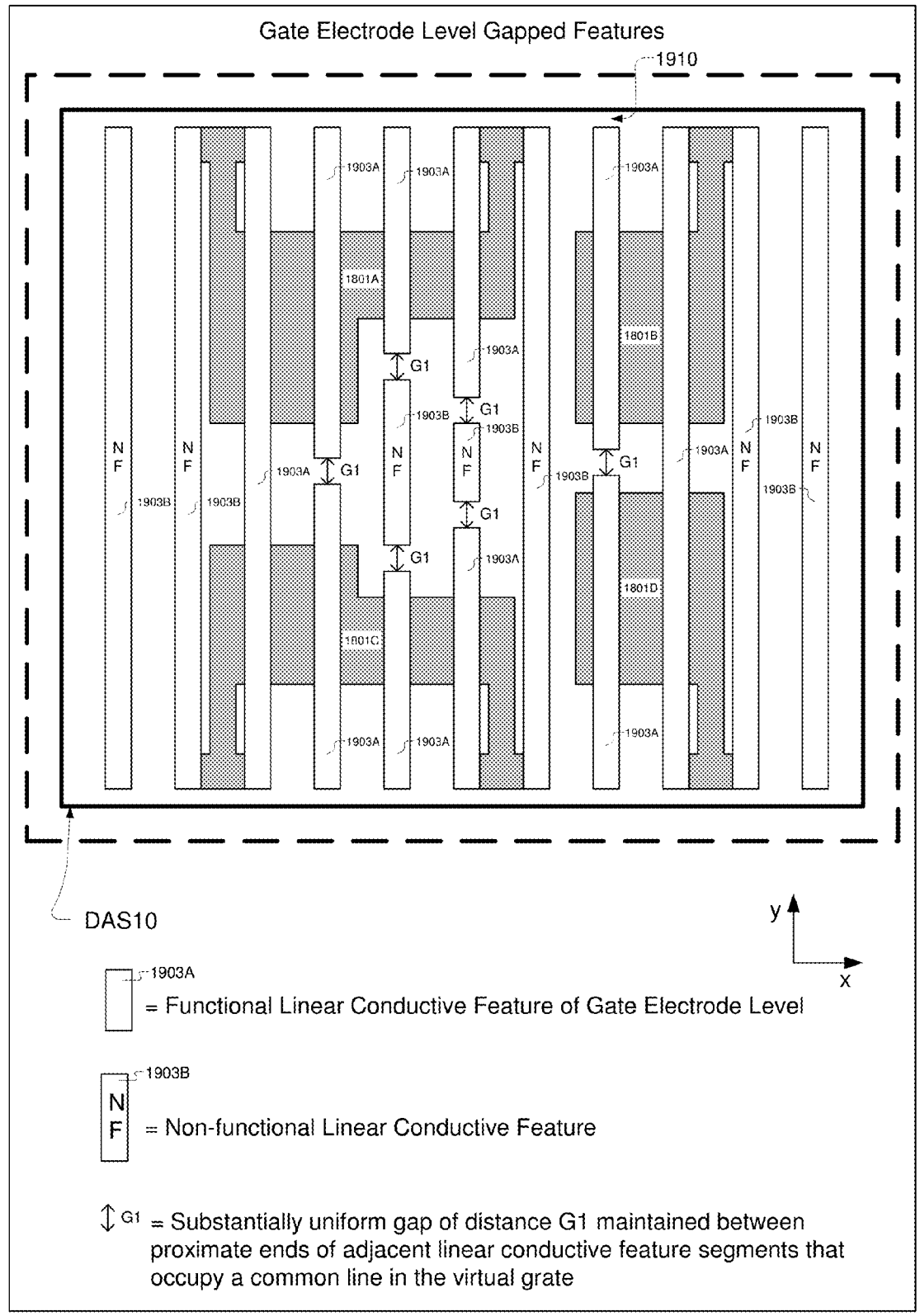
FIG. 19C is an illustration showing a segmentation of the linear conductive features of FIG. 19B, in accordance with one embodiment of the present invention.

FIG. 19B is an illustration showing full-length linear conductive features 1903 defined along each line 1901 of the gate electrode level virtual grate of FIG. 19A, in accordance with one embodiment of the present invention. It should be understood that while the example of FIG. 19B shows each line of the gate electrode level virtual grate occupied by a linear conductive feature, there is no requirement that every line of the gate electrode level virtual grate, or any virtual grate for that matter, be occupied by a linear conductive feature. It should be further appreciated that each line of a virtual grate, in any given DAS level, represents a potential linear conductive feature track along which one or more linear conductive features can be defined. Each full-length linear conductive feature 1903 represents a maximum feature occupancy of a given line 1901 of the virtual grate. However, some of the full-length linear conductive features 1903 in the gate electrode level may need to be segmented to enable creation of transistor devices. FIG. 19C is an illustration showing a segmentation of the linear conductive features 1903 of FIG. 19B, in accordance with one embodiment of the present invention.

Each linear conductive feature, or segment thereof, in each level of the dynamic array architecture is defined to have a substantially uniform width along its length. For example, with regard to the gate electrode level of FIG. 19B, each linear conductive feature 1903, or segment thereof, is defined to have a substantially uniform width W1 along its length. The width of each linear conductive feature within the dynamic array architecture is measured in a coplanar and perpendicular relationship relative to the framework of parallel lines that define the virtual grate along which the linear conductive feature is defined. Correspondingly, the length of each linear conductive feature within the dynamic array architecture is measured in the direction of the line of the virtual grate along which the linear conductive feature is defined.

In one embodiment, such as that shown in FIG. 19B, each linear conductive feature within a given DAS level is defined to have a substantially equal width. However, in another embodiment, linear conductive features defined along various lines of the virtual grate within a given DAS level can be defined to have different widths. For example, FIG. 19B1 is an illustration showing linear conductive features 1904A, 1904B, 1904C defined along various lines 1902 of the gate electrode level virtual grate of FIG. 19A1, in accordance with one embodiment of the present invention. FIG. 19B1 demonstrates several of the previously mentioned options with regard to defining linear conductive features along a virtual grate. In particular, areas 1906 in FIG. 19B1 demonstrate leaving a number of virtual grate lines vacant. FIG. 19B1 also demonstrates how linear conductive features within a given DAS level can be defined to have different widths, e.g., W1A, W1B, W1C. Areas 1908 in FIG. 19B1 also demonstrate how widths of a number of adjacent linear conductive features can be defined such that the number of adjacent linear conductive features combine to form a single linear conductive feature.

As shown in FIG. 19C, the actual layout of the gate electrode level is achieved by segmenting a number of the full-length linear conductive features 1903 of FIG. 19B. Segmentation of full-length linear conductive features in any given DAS level is performed by placing a number of gaps along its length. For example, in the gate electrode level example of FIG. 19C a number of gaps of distance G1 are placed along various full-length linear conductive features 1903. In various embodiments, the size of the gaps used to separate adjacent ends of co-aligned linear conductive feature segments may be either uniform or non-uniform across a given DAS level. In one embodiment, each gap used to segment the full-length linear conductive features in a given level of the dynamic array architecture is defined to be substantially uniform. Thus, in this embodiment, a substantially uniform gap is maintained between proximate ends of adjacent linear conductive feature segments that occupy a common line in the virtual grate. Also in this embodiment, the substantially uniform gap between the proximate ends of adjacent linear conductive feature segments is maintained within each line in the virtual grate that is occupied by multiple linear conductive feature segments.

In one embodiment, the size of the gap maintained between proximate ends of adjacent linear conductive features in a given level of the dynamic array architecture is minimized within electrical performance constraints so as to maximize an overall linear conductive feature occupancy amount of the lines that define the virtual grate of the given level. In another embodiment, size of the gap maintained between proximate ends of adjacent linear conductive features in a given level of the dynamic array architecture is defined to ensure that the manufacturability of the adjacent linear conductive features and neighboring linear conductive features can be accurately predicted. In another embodiment, the gaps maintained between proximate ends of adjacent linear conductive features in a given level of the dynamic array architecture are placed to avoid adjacent gaps in adjacent lines that define the virtual grate of the given level. Also, in another embodiment, the gaps between proximate ends of adjacent linear conductive feature in a given DAS level are defined for circuit performance, manufacturability, or reliability purposes.

Upon segmentation of the linear conductive features in a given level of the dynamic array architecture, some of the linear conductive feature segments may represent non-functional linear conductive features. A non-functional linear conductive feature is defined as a linear conductive feature that is not required for circuit functionality, but is manufactured nonetheless so as to assist with the manufacture of neighboring linear conductive features. In one embodiment, some of the non-functional linear conductive features are defined to enhance prediction of semiconductor chip manufacturability. For example, FIG. 19C shows a number of non-functional linear conductive features 1903B and a number of functional linear conductive features 1903A, following segmentation of the full-length conductive features 1903 to form the gate electrode level layout of DAS10.

Figure 19D:
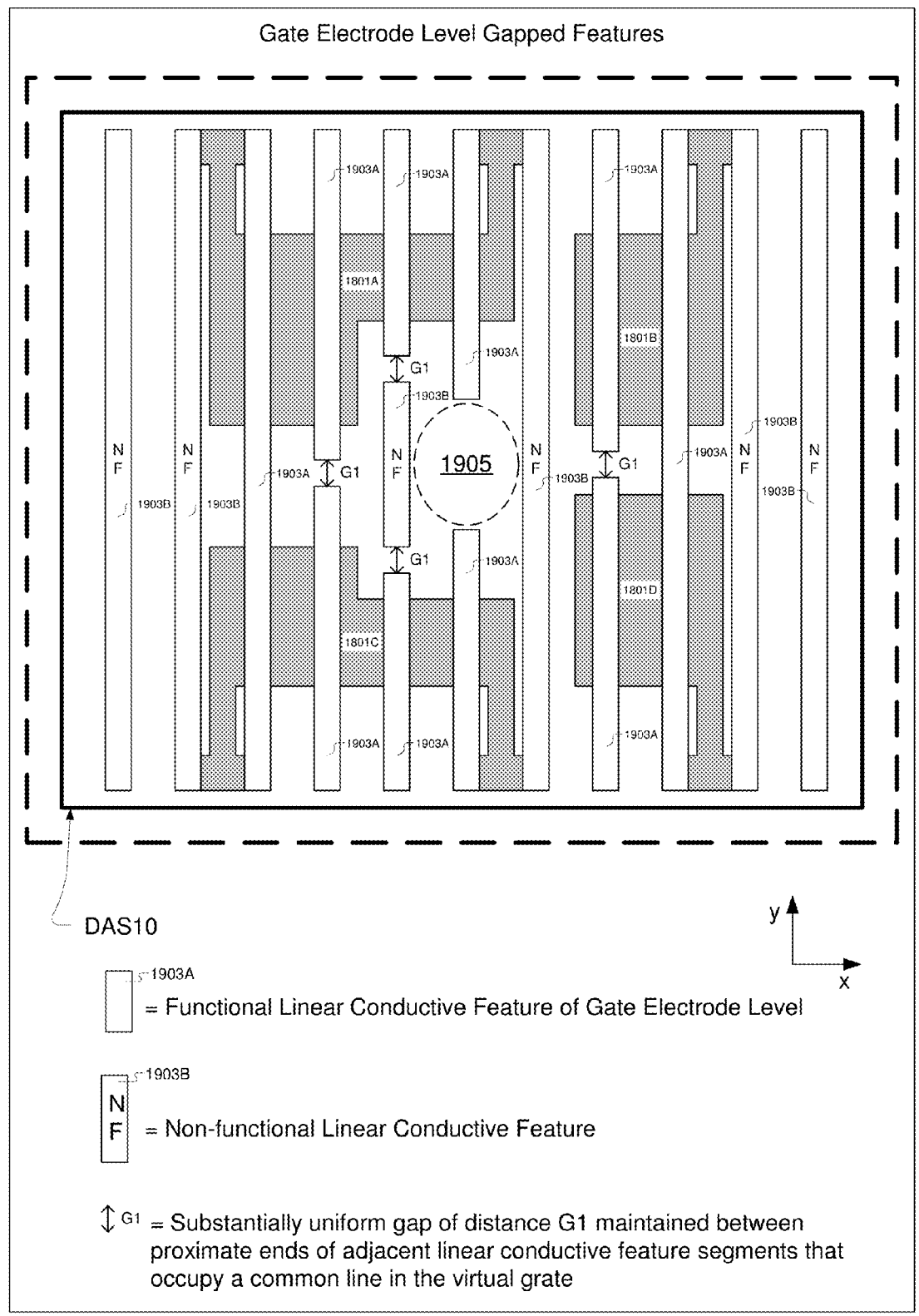
FIG. 19D is an illustration showing the gate electrode level segmented features of FIG. 19C with a region within which a non-functional linear conductive feature has been eliminated.

It should be understood that the dynamic array architecture does not strictly require the retention of all non-functional linear conductive feature segments, when such retention is not necessary to enhance manufacturing of neighboring linear conductive feature segments. For example, within a given level of the dynamic array architecture, one or more non-functional linear conductive features that do not positively impact or support the manufacture of adjacent functional linear conductive features can be removed from the layout. For example, FIG. 19D is an illustration showing the gate electrode level segmented features of FIG. 19C with a region 1905 within which a non-functional linear conductive feature has been eliminated. The eliminated non-functional linear conductive feature in the example of FIG. 19D was deemed unnecessary with regard to supporting the manufacture of neighboring functional linear conductive features.

Further with regard to FIG. 19C, it should be noted that the linear conductive features 1903 of the gate electrode level are defined to end at a location inside the boundary of the DAS, as identified by location 1910. By having each of the linear conductive features of the gate electrode level end inside the boundary of the DAS, a gap will exist between colinearly aligned gate electrode level linear conductive features within two adjacent DAS's. In this instance, one half of the gap between the colinearly aligned gate electrode level linear conductive features within the two adjacent DAS's will reside in each of the two adjacent DAS's. Also, although not explicitly depicted, is should be understood that the segmentation and functional versus non-functional feature concepts of FIGS. 19C and 19D are equally applicable to the exemplary embodiments of FIGS. 19A1 and 19B1.

As previously discussed with regard to FIG. 7B, the dynamic array architecture includes a number of gate electrode contacts defined to electrically connect the linear conductive features defined to serve as gate electrodes of transistor devices to conductive features defined in one or more layers of the semiconductor chip. Each of the number of gate electrode contacts is defined to perpendicularly overlap a linear conductive feature defined to serve as a gate electrode of a transistor device. As shown in the exemplary embodiment of FIG. 7B, the gate electrode contact 601 can be defined to have a rectangular shape. In another embodiment, the gate electrode contact can be defined to have a substantially square shape.

Figure 20A:
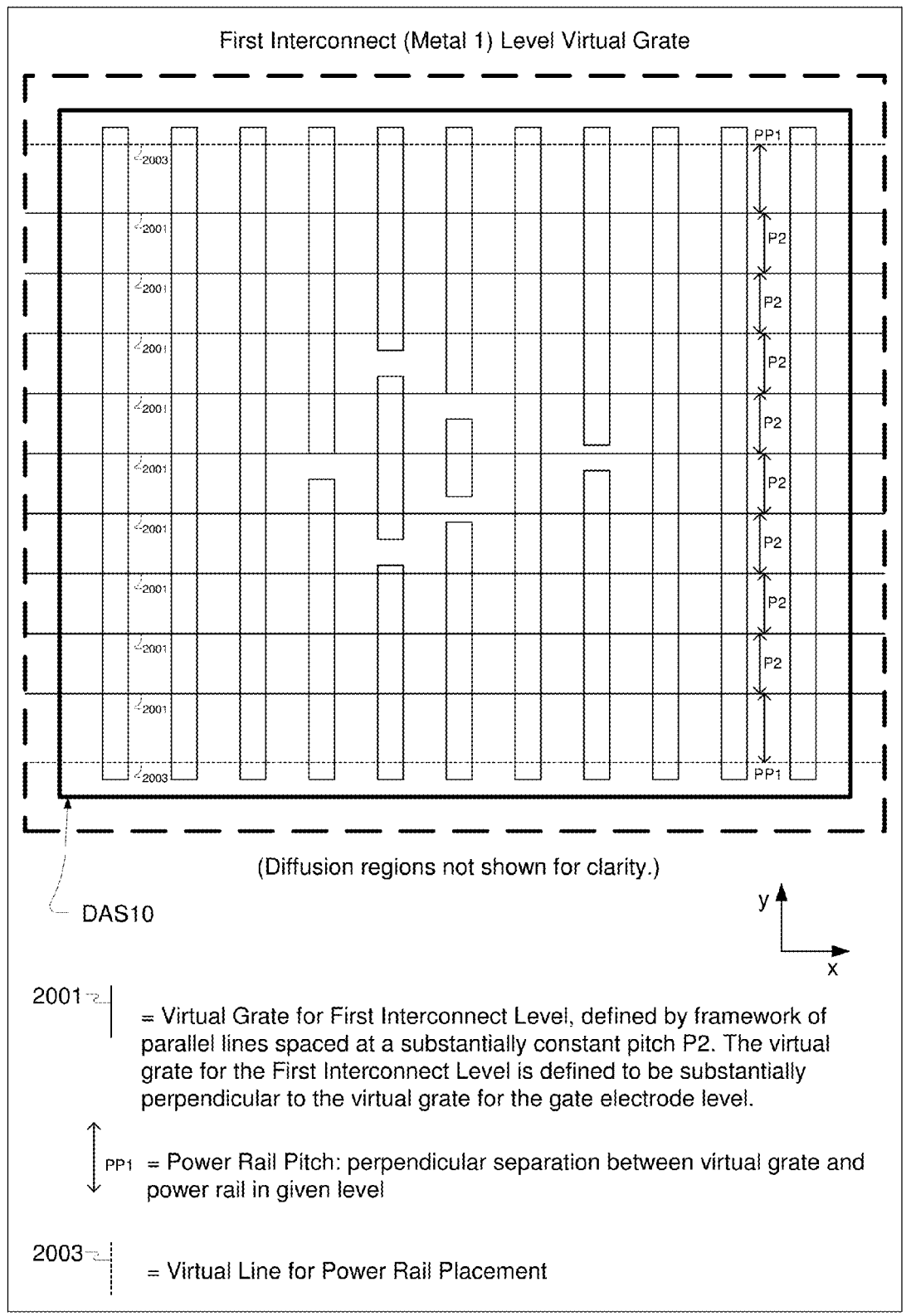
FIG. 20A is an illustration showing a first interconnect level virtual grate for the DAS10 example, in accordance with one embodiment of the present invention.

FIG. 20A is an illustration showing a first interconnect level virtual grate for the DAS10 example, in accordance with one embodiment of the present invention. The first interconnect level virtual grate is defined by a framework of parallel lines 2001 spaced at a constant pitch P2. The first interconnect level virtual grate is oriented such that the lines thereof extend in a direction (x direction) over the substrate portion 1803 upon which DAS10 is built, so as to extend in a direction perpendicular to the virtual grate of the gate electrode level. The position of the first interconnect level virtual grate in the y direction and the associated pitch P2 are established to ensure that lines of the first interconnect level virtual grate along which linear conductive features are to be defined will be properly positioned relative to the underlying gate electrode features such that the associated transistor devices can be interconnected to form a functional electronic circuit.

In the exemplary embodiment of FIG. 20A, the pitch P2 of the virtual grate is equal to a minimum center-to-center spacing to be used between adjacent contacted linear conductive features of the first interconnect level. However, it should be understood that in other embodiments, the pitch P2 of the first interconnect level virtual grate can be set at essentially any value deemed appropriate for the particular DAS. For example, FIG. 20A1 shows a virtual grate of the first interconnect level set at a pitch P2A equal to one-half of the minimum center-to-center spacing between adjacent contacted linear conductive features of the first interconnect level. For discussion purposes, one-half of the minimum center-to-center spacing between adjacent contacted linear conductive features of the first interconnect level is referred to as the metal one half-pitch. Also, in the example of FIG. 20A1, the power rail features are replaced by linear conductive features defined along the virtual grate of the first interconnect level, as opposed to being defined along power rail virtual lines defined separate from the first interconnect level virtual grate.

In one embodiment, the pitch that defines the virtual grate of the first interconnect level is set to optimize lithographic reinforcement during manufacture of linear conductive features defined along the lines of the virtual grate. In another embodiment, the pitch P2 that defines the virtual grate of the first interconnect level is set to optimize a density of the linear conductive features defined along the lines of the virtual grate. It should be appreciated that optimization of the density of the linear conductive features, as defined along the lines of the virtual grate, may not correspond to feature-to-feature lithographic reinforcement during manufacturing. Also, in another embodiment, the pitch that defines the virtual grate of the first interconnect level can be set based on optimization of circuit performance, manufacturability, or reliability.

FIG. 20A also shows virtual lines 2003 for power rail placement. The virtual lines 2003 are defined in a manner similar to the lines 2001 of the first interconnect level virtual grate. Each of the power rail virtual lines 2003 is spaced apart from its neighboring virtual grate line by a distance referred to as the power rail pitch PP1. As with the virtual grate lines 2001, the power rail virtual lines 2003 are defined to have linear conductive features defined thereon. It should be understood that the power rail pitch PP1 is defined independently from the pitch P2 of the first interconnect level virtual grate.

In one embodiment, the power rail pitch PP1 is the same as the pitch P2 of the first interconnect level virtual grate. For example, when the first interconnect level virtual grate pitch P2 is equal to the third interconnect level virtual grate pitch P5, the power rail pitch PP1 may be equal to the first interconnect level virtual grate pitch P2. In another example, when the third interconnect level virtual grate pitch P5 is greater than the first interconnect level virtual grate pitch P2, the power rail pitch PP1 may different than the first interconnect level virtual grate pitch P2 to make up for a difference in virtual grate line count between the first and third interconnect levels, thereby allowing the first and third interconnect level virtual grates to be aligned at the boundary of the DAS.

Figure 20B:
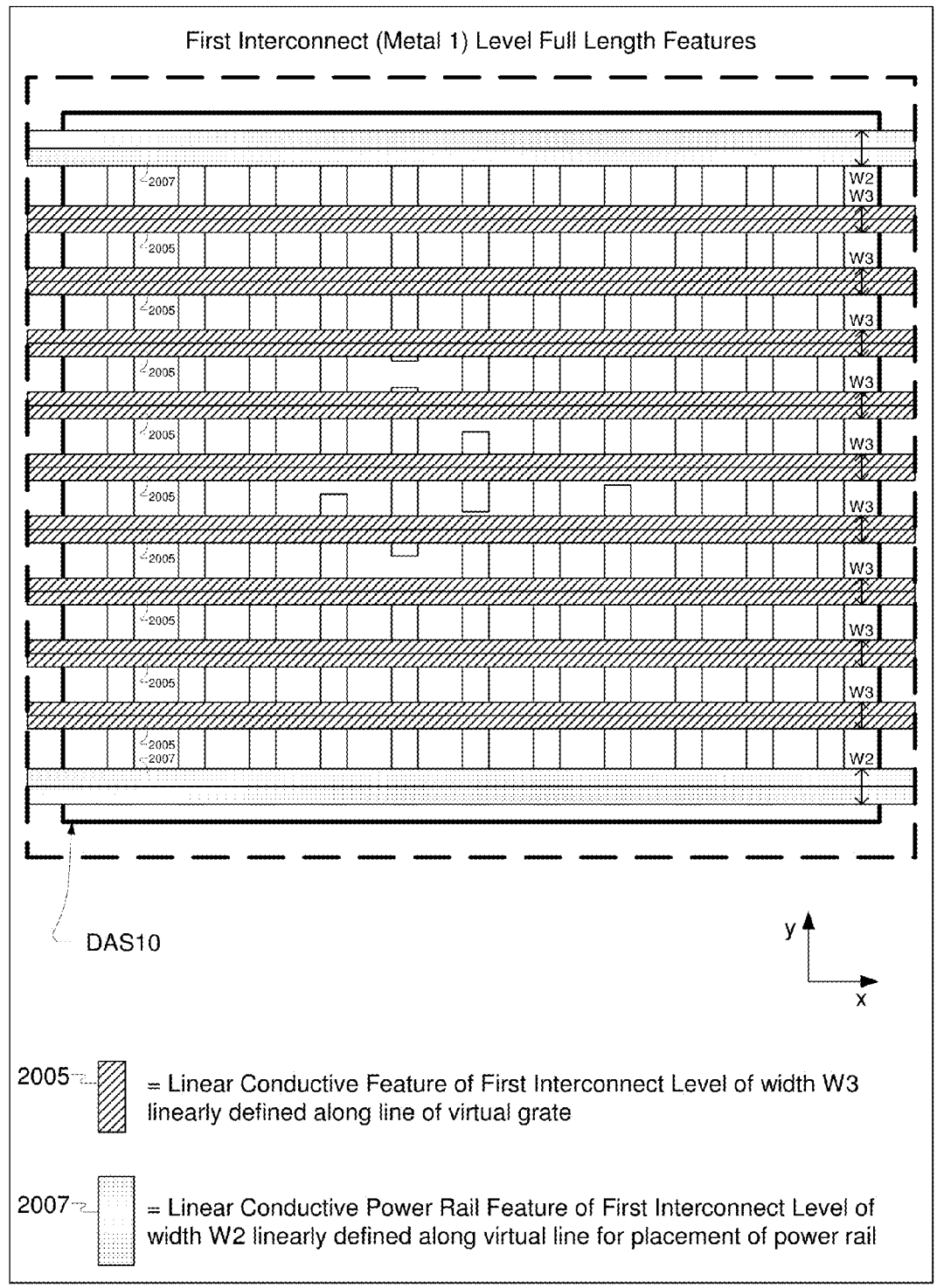
FIG. 20B is an illustration showing full-length linear conductive features defined along each line of the first interconnect level virtual grate of FIG. 20A, in accordance with one embodiment of the present invention.

FIG. 20B is an illustration showing full-length linear conductive features 2005 defined along each line 2001 of the first interconnect level virtual grate of FIG. 20A, in accordance with one embodiment of the present invention. It should be understood that while the example of FIG. 20B shows each line of the first interconnect level virtual grate occupied by a linear conductive feature, there is no requirement that every line of the first interconnect level virtual grate, or any virtual grate for that matter, be occupied by a linear conductive feature. Each linear conductive feature 2005, or segment thereof, is defined to have a substantially uniform width W3 along its length. The first interconnect level also includes linear conductive power rail features 2007 defined along the power rail virtual lines 2003. Each linear conductive power rail feature 2007 is defined to have a substantially uniform width W2 along its length. Within the first interconnect level, each full-length linear conductive feature 2005 represents a maximum feature occupancy of a given line 2001 of the virtual grate. However, some of the full-length linear conductive features 2005 in the first interconnect level may need to be segmented to enable interconnection of transistor devices and other electronic components (e.g., resistors, diodes, capacitors, etc.) to form a functional electronic circuit.

It should be understood that while the DAS10 example of FIGS. 18-24D shows the linear conductive features of a given level extending into the DAS halo region, the presence of linear conductive features within the DAS halo region represents the content of the DAS halo region following placement of the DAS on the DAS grid. In various embodiments, the specific content of the DAS halo region may be defined before or after placement of the DAS on the DAS grid. This is discussed further with regard to FIGS. 25A-26D-2.

In one embodiment, such as that shown in FIG. 20B, each linear conductive feature within a given DAS level is defined to have a substantially equal width. However, as previously mentioned, linear conductive features defined along various lines of the virtual grate within a given DAS level can be defined to have different widths. For example, FIG. 20B1 is an illustration showing linear conductive features 2004A, 2004B, 2004C defined along various lines 2002 of the first interconnect level virtual grate of FIG. 20A1, in accordance with one embodiment of the present invention. FIG. 20B1 demonstrates several of the previously mentioned options with regard to defining linear conductive features along a virtual grate. In particular, areas 2006 in FIG. 20B1 demonstrate leaving a number of virtual grate lines vacant. FIG. 20B1 also demonstrates how linear conductive features within a given DAS level can be defined to have different widths, e.g., W3A, W3B, W3C. Areas 2008 in FIG. 20B1 also demonstrate how widths of a number of adjacent linear conductive features can be defined such that the number of adjacent linear conductive features combine to form a single linear conductive feature.

Figure 20C:
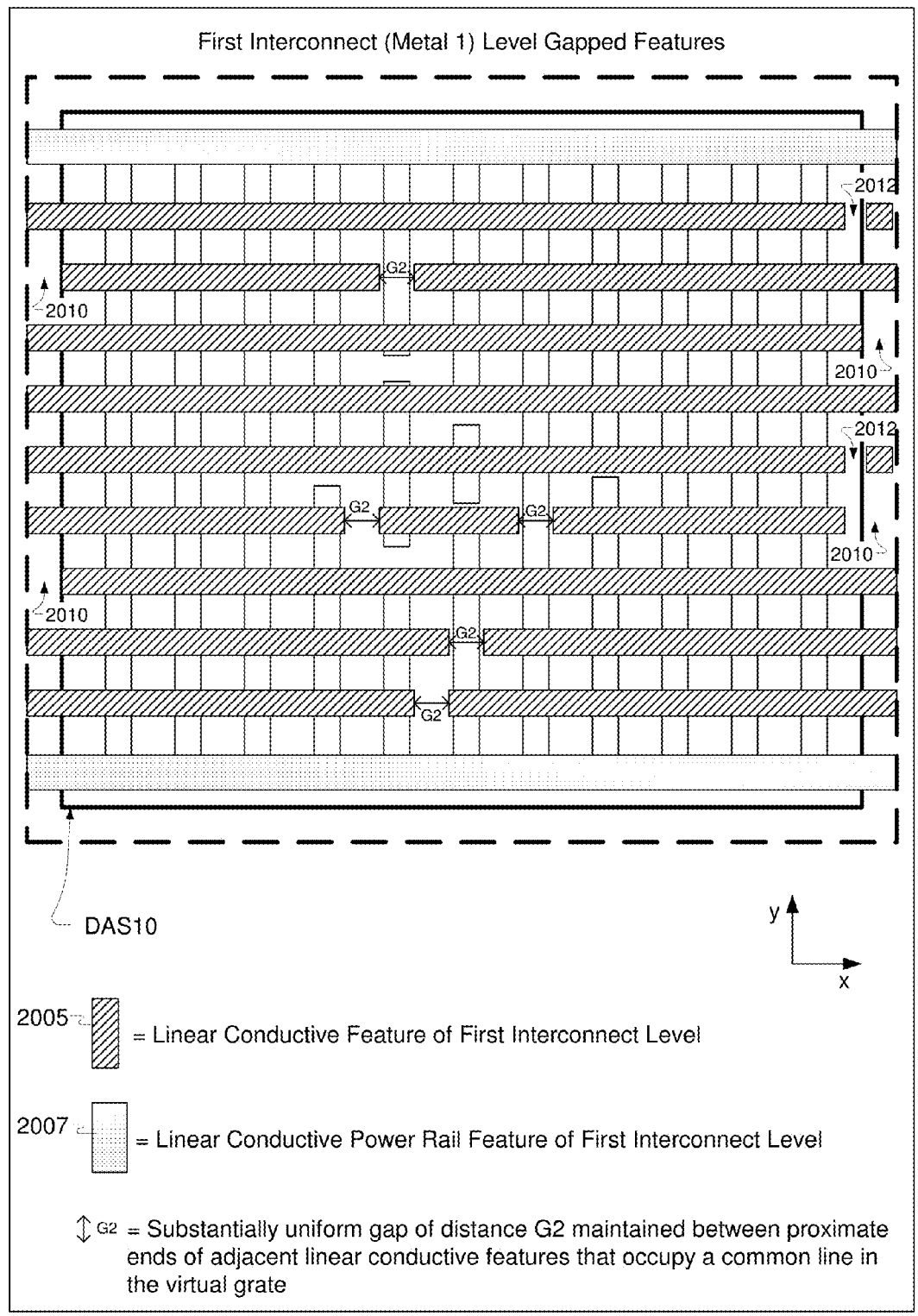
FIG. 20C is an illustration showing a segmentation of the linear conductive features of FIG. 20B, in accordance with one embodiment of the present invention.

FIG. 20C is an illustration showing a segmentation of the linear conductive features 2005 of FIG. 20B, in accordance with one embodiment of the present invention. As shown in FIG. 20C, the actual layout of the first interconnect level is achieved by segmenting a number of the full-length linear conductive features defined therein. For example, a number of gaps of distance G2 are placed along various full-length linear conductive features 2005. In one embodiment, each gap of distance G2 used to segment the full-length linear conductive features in the first interconnect level of the dynamic array architecture is defined to be substantially uniform. In another embodiment, the gaps used to segment the full-length linear conductive features in the first interconnect level can vary in size as necessary to ensure manufacturability.

With regard to FIG. 20C, it should be understood that segmentation of the linear conductive features 2005 can also include removal of a portion of a linear conductive feature 2005 at a location near the boundary of the DAS, as illustrated at locations 2012. In one embodiment, removal of a portion of a given linear conductive feature 2005 at the boundary of the DAS is performed when continuity of the given linear conductive feature 2005 from the DAS to a neighboring DAS is not desired. In another embodiment, removal of a portion of a given linear conductive feature 2005 at the boundary of the DAS is performed to satisfy functional requirements of the circuitry to be defined within the DAS. In yet another embodiment, removal of a portion of a given linear conductive feature 2005 at the boundary of the DAS is performed to support manufacturability of one or more features within the DAS. In one embodiment a portion of a given linear conductive feature 2005 is removed at the boundary of the DAS while leaving a portion of the linear conductive feature 2005 in the DAS halo region, as illustrated at locations 2012. It should be appreciated that the length of the portion of the linear conductive features 2005 removed at the location near the boundary of the DAS can vary depending on the DAS requirements or DAS-to-DAS interface requirements. However, it should also be understood that removal of the portion of the linear conductive feature 2005 at the boundary of the DAS should be done so as to avoid adversely impacting the manufacturability of neighboring linear conductive features 2005 within the DAS.

Figure 21A:
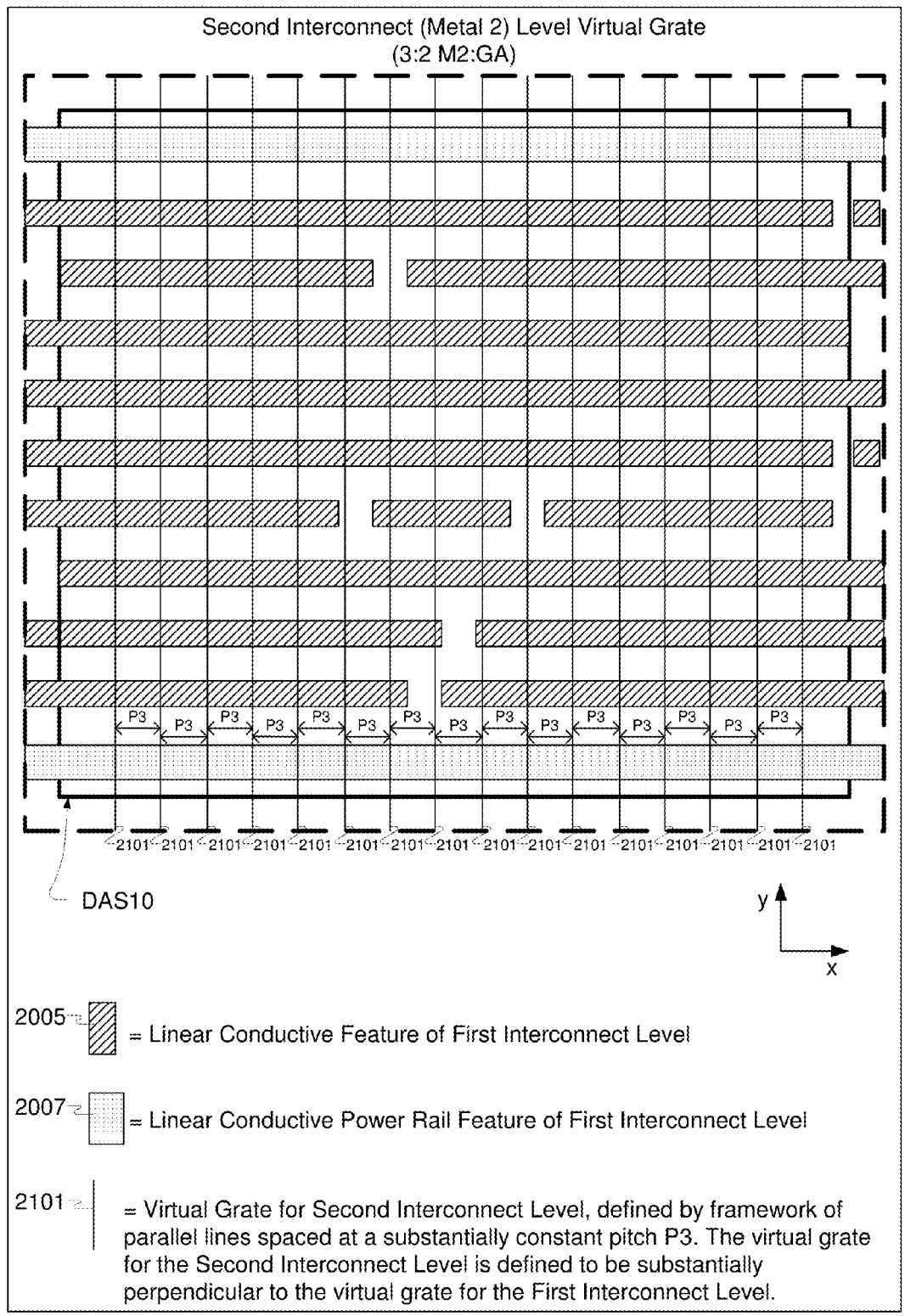
FIG. 21A is an illustration showing a second interconnect level virtual grate for the DAS10 example, in accordance with one embodiment of the present invention.

FIG. 21A is an illustration showing a second interconnect level virtual grate for the DAS10 example, in accordance with one embodiment of the present invention. The second interconnect level virtual grate is defined by a framework of parallel lines 2101 spaced at a constant pitch P3. The second interconnect level virtual grate is oriented such that the lines thereof extend in a direction (y direction) over the substrate portion 1803 upon which DAS10 is built, so as to extend in a direction perpendicular to the virtual grate of the first interconnect level.

Figure 21B:
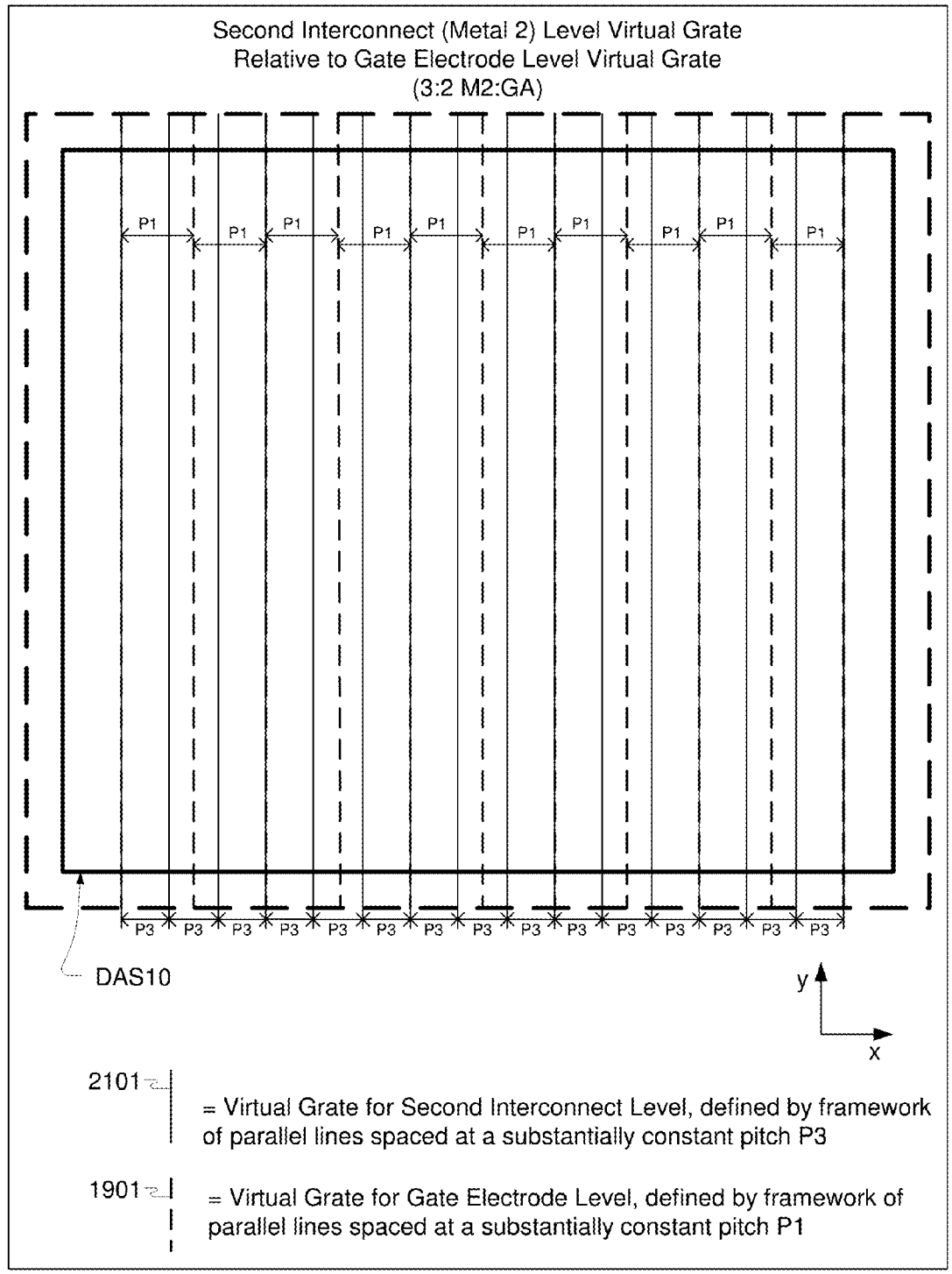
FIG. 21B is an illustration showing the spatial relationship between the second interconnect level and gate electrode level virtual grates for the DAS10 example, as defined based on a 3-to-2 pitch relationship between second interconnect level and gate electrode level conductive features, in accordance with one embodiment of the present invention.

The position of the second interconnect level virtual grate in the x direction and the associated pitch P3 are established based upon a relationship between the virtual grates of the gate electrode level and second interconnect level. FIG. 21B is an illustration showing the spatial relationship between the second interconnect level and gate electrode level virtual grates for the DAS10 example, as defined based on a 3-to-2 pitch relationship between second interconnect level and gate electrode level conductive features, in accordance with one embodiment of the present invention. The virtual grate of the second interconnect level of DAS10 is defined such that the pitch ratio of second interconnect level virtual grate lines 2101 to gate electrode level virtual grate lines 1901 is 3-to-2. In this example, the pitch P3 of the second interconnect level virtual grate is defined such that three pitches of the virtual grate lines 2101 of the second interconnect level are provided for every two pitches of the virtual grate lines 1901 of the gate electrode level.

It should be appreciated that the 3-to-2 virtual grate pitch ratio between the second interconnect level and gate electrode level of the dynamic array architecture is provided as an example for one particular embodiment. In other embodiments a different virtual grate pitch ratio can be defined between the second interconnect level and gate electrode level of the dynamic array architecture. Generally speaking, the virtual grate pitch ratio between the second interconnect level and the gate electrode level can be represented by an integer ratio (a/b), where the integer (a) represents a number of second interconnect level conductive feature pitches and the integer (b) represents a number of gate electrode level conductive feature pitches that occur between successive alignments of the second interconnect level and gate electrode level conductive features. In one embodiment, an attempt is made to set the virtual grate pitch ratio (a/b) as close to one as possible. In this embodiment, an alignment pattern between the second interconnect level and gate electrode level conductive features will repeat at a minimum interval across the DAS. However, regardless of the particular embodiment, the point to be understood is that a specific spatial relationship in terms of pitch and alignment exists between the second interconnect level virtual grate and the gate electrode level virtual grate.

Figure 21C:
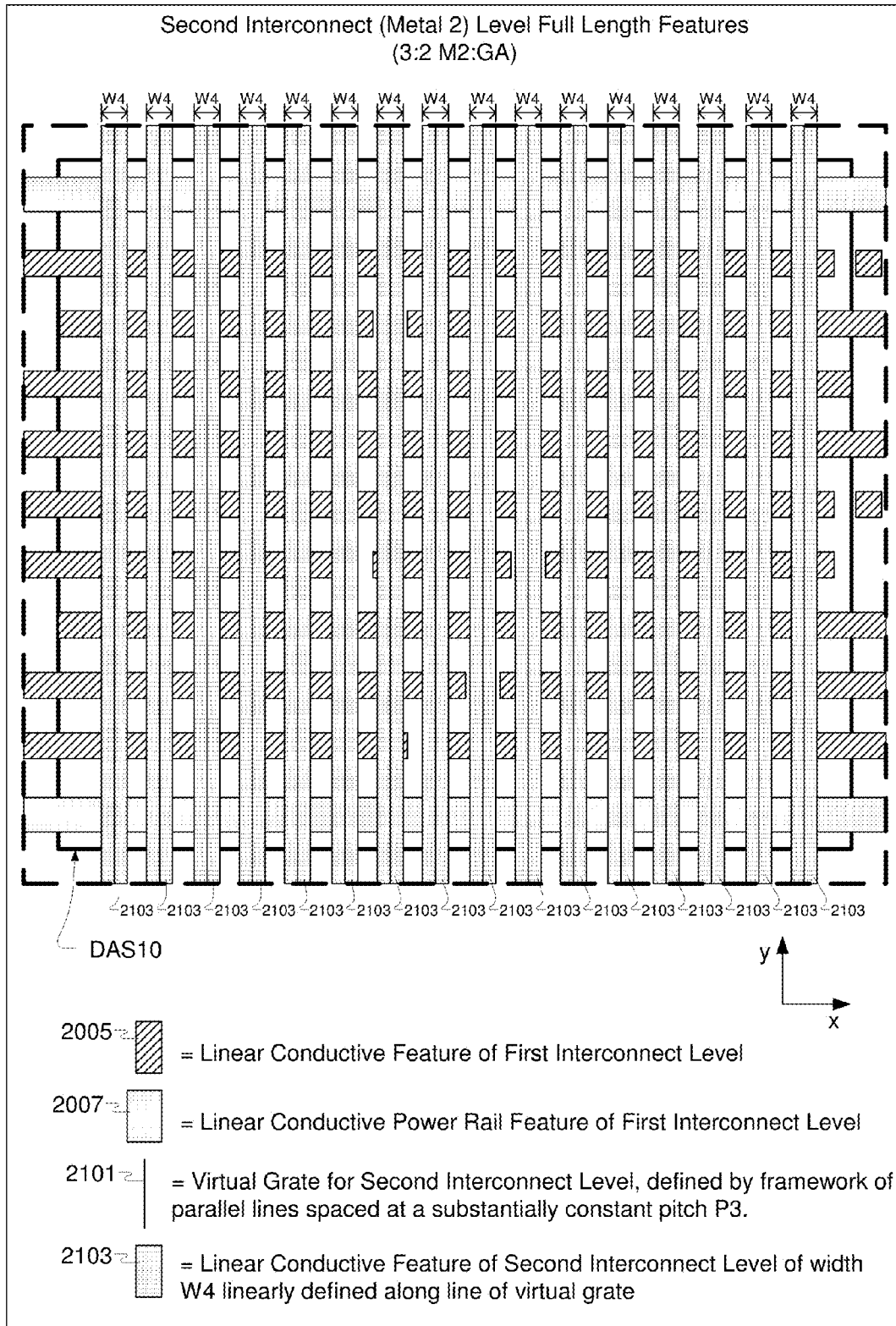
FIG. 21C is an illustration showing full-length linear conductive features defined along each line of the second interconnect level virtual grate, in accordance with one embodiment of the present invention.

FIG. 21C is an illustration showing full-length linear conductive features 2103 defined along each line 2101 of the second interconnect level virtual grate, in accordance with one embodiment of the present invention. It should be understood that while the example of FIG. 21C shows each line of the second interconnect level virtual grate occupied by a linear conductive feature, there is no requirement that every line of the second interconnect level virtual grate, or any virtual grate for that matter, be occupied by a linear conductive feature. In the example of FIG. 21C, each linear conductive feature 2103, or segment thereof, is defined to have a substantially uniform width W4 along its length. However, it should be understood that in other embodiments the various linear conductive features defined across the second interconnect level of the DAS can be defined to have different widths, with the width of a given linear conductive feature along its length being substantially uniform. Also, within the second interconnect level, each full-length linear conductive feature 2103 represents a maximum feature occupancy of a given line 2101 of the virtual grate. However, some of the full-length linear conductive features 2103 in the second interconnect level may need to be segmented to enable interconnection of transistor devices and other electronic components (e.g., resistors, diodes, capacitors, etc.) to form a functional electronic circuit.

Figure 21D:
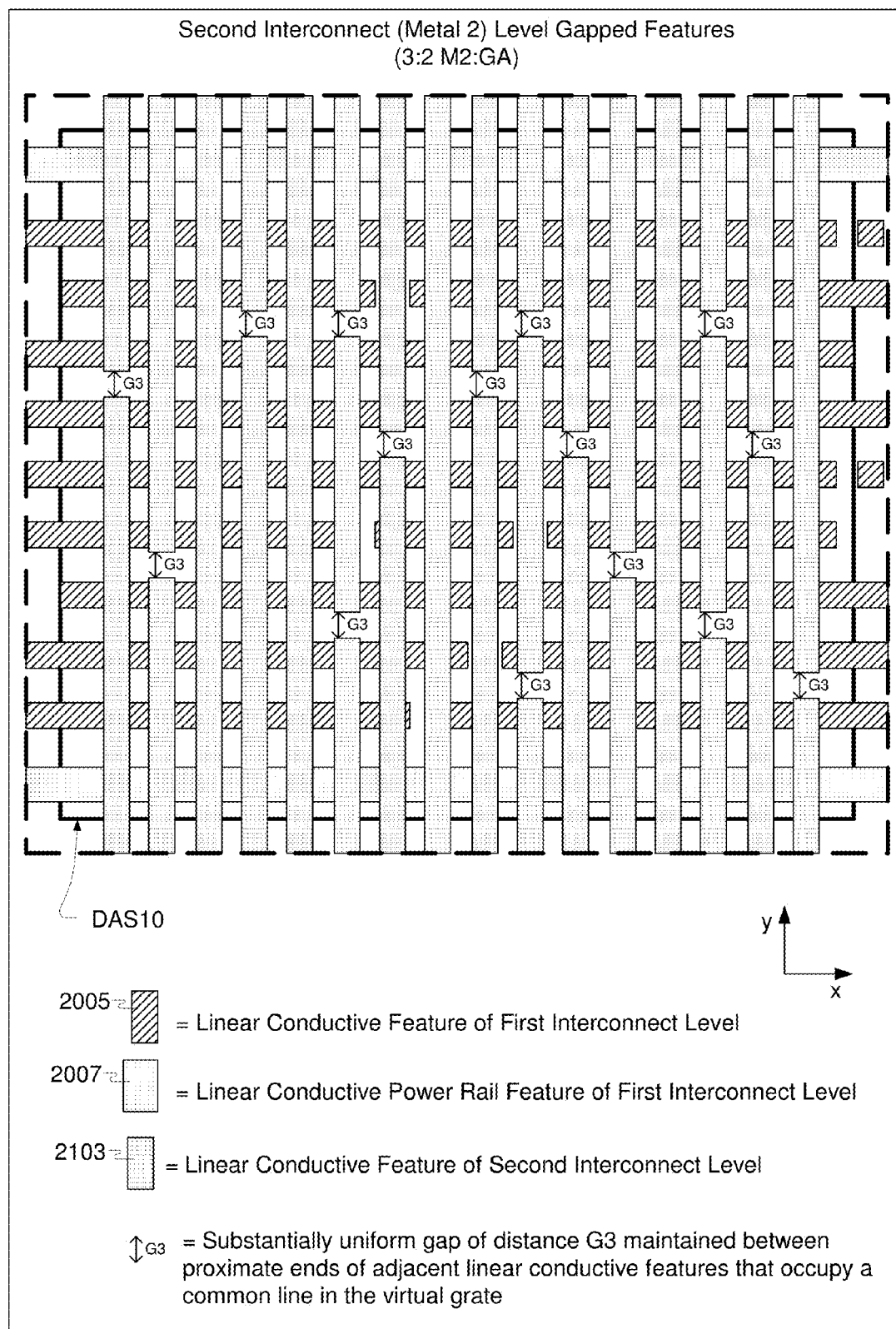
FIG. 21D is an illustration showing a segmentation of the linear conductive features within the second interconnect level, in accordance with one embodiment of the present invention.

FIG. 21D is an illustration showing a segmentation of the linear conductive features 2103 within the second interconnect level, in accordance with one embodiment of the present invention. As shown in FIG. 21D, the actual layout of the second interconnect level is achieved by segmenting a number of the full-length linear conductive features 2103. For example, a number of gaps of distance G3 are placed along various full-length linear conductive features 2103. In one embodiment, each gap of distance G3 used to segment the full-length linear conductive features in the second interconnect level of the dynamic array architecture is defined to be substantially uniform. In another embodiment, the gaps used to segment the full-length linear conductive features in the second interconnect level can vary in size as necessary to ensure manufacturability.

Figure 22A:
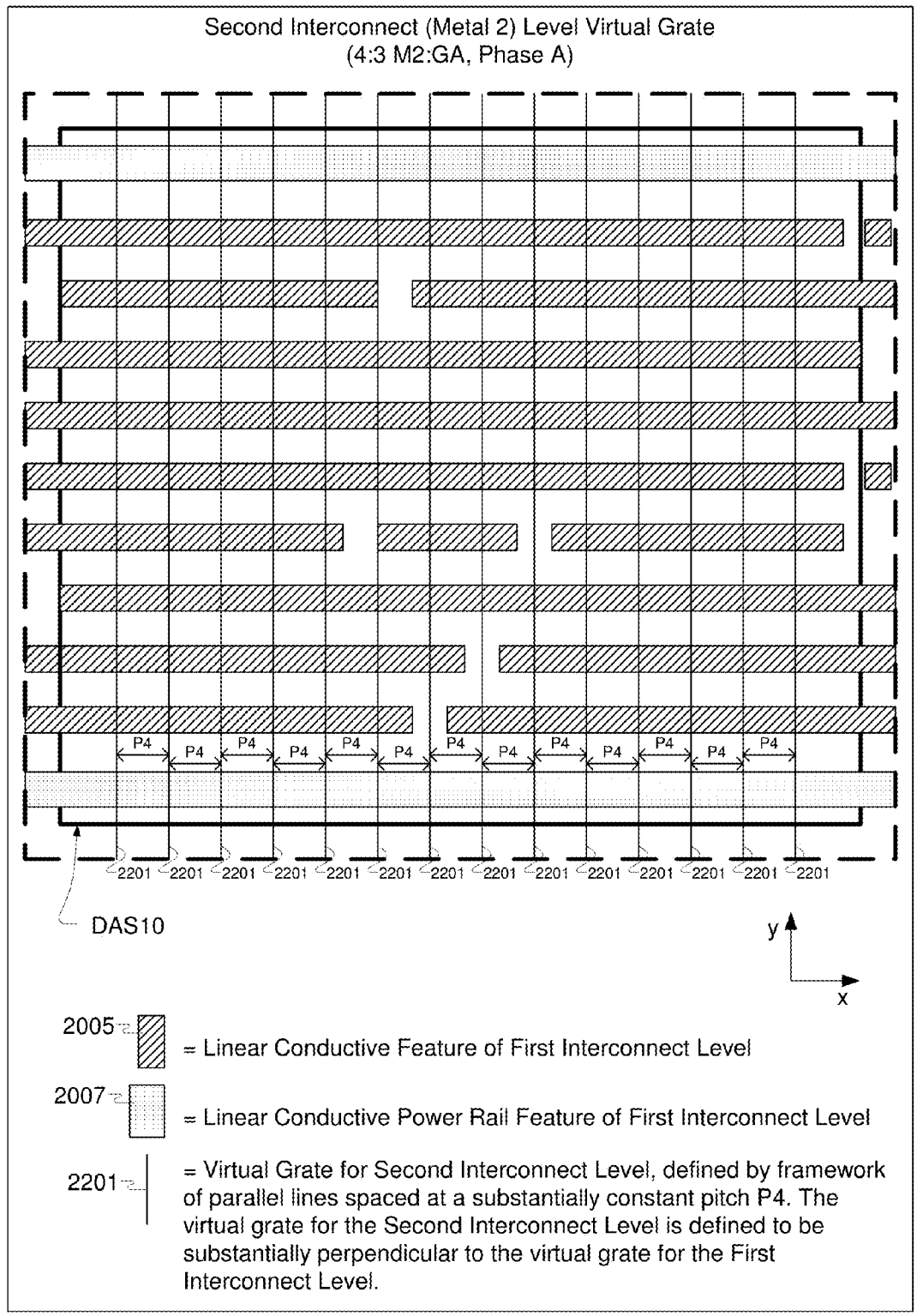
FIG. 22A is an illustration showing a second interconnect level virtual grate for the DAS10 example, as defined based on a 4-to-3 pitch relationship between second interconnect level and gate electrode level conductive features, in accordance with one embodiment of the present invention.

FIG. 22A is an illustration showing a second interconnect level virtual grate for the DAS10 example, as defined based on a 4-to-3 pitch relationship between second interconnect level and gate electrode level conductive features, in accordance with one embodiment of the present invention. The second interconnect level virtual grate in the example of FIG. 22A is defined by a framework of parallel lines 2201 spaced at a constant pitch P4. The second interconnect level virtual grate of FIG. 22A is oriented such that the lines thereof extend in the direction perpendicular to the virtual grate of the first interconnect level.

Figure 22B:
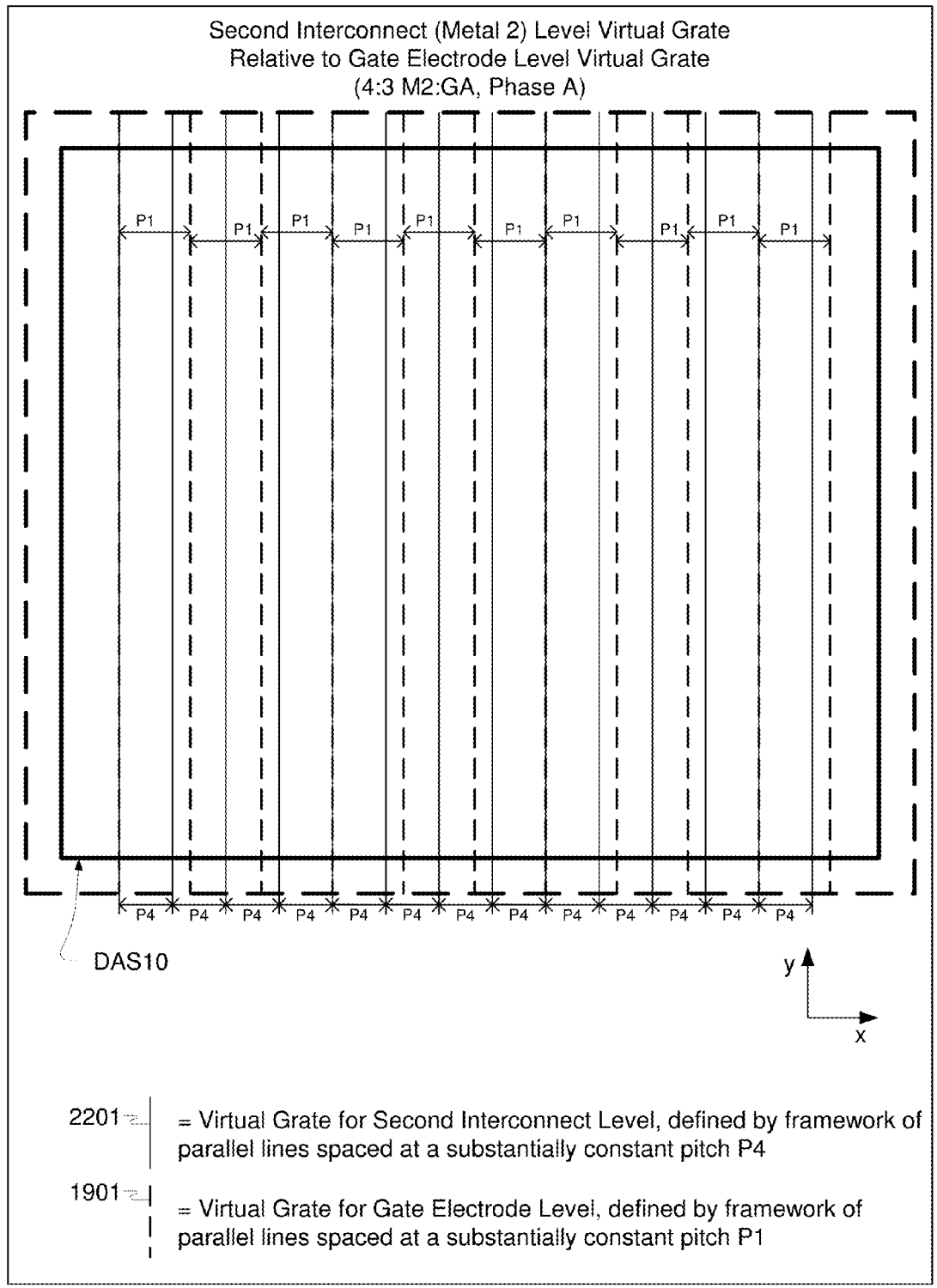
FIG. 22B is an illustration showing the spatial relationship between the second interconnect level and gate electrode level virtual grates for the dynamic array section, as defined based on a 4-to-3 pitch relationship between second interconnect level and gate electrode level conductive features, in accordance with one embodiment of the present invention.

The position of the second interconnect level virtual grate in the x direction and the associated pitch P4 are established based on a 4-to-3 pitch relationship between second interconnect level and gate electrode level conductive features. FIG. 22B is an illustration showing the spatial relationship between the second interconnect level and gate electrode level virtual grates for the dynamic array section, as defined based on a 4-to-3 pitch relationship between second interconnect level and gate electrode level conductive features, in accordance with one embodiment of the present invention. As shown in FIG. 22B, the pitch P4 of the second interconnect level virtual grate is defined such that four virtual grate line pitches of the second interconnect level are provided for every three virtual grate line pitches of the gate electrode level.

Figure 22C:
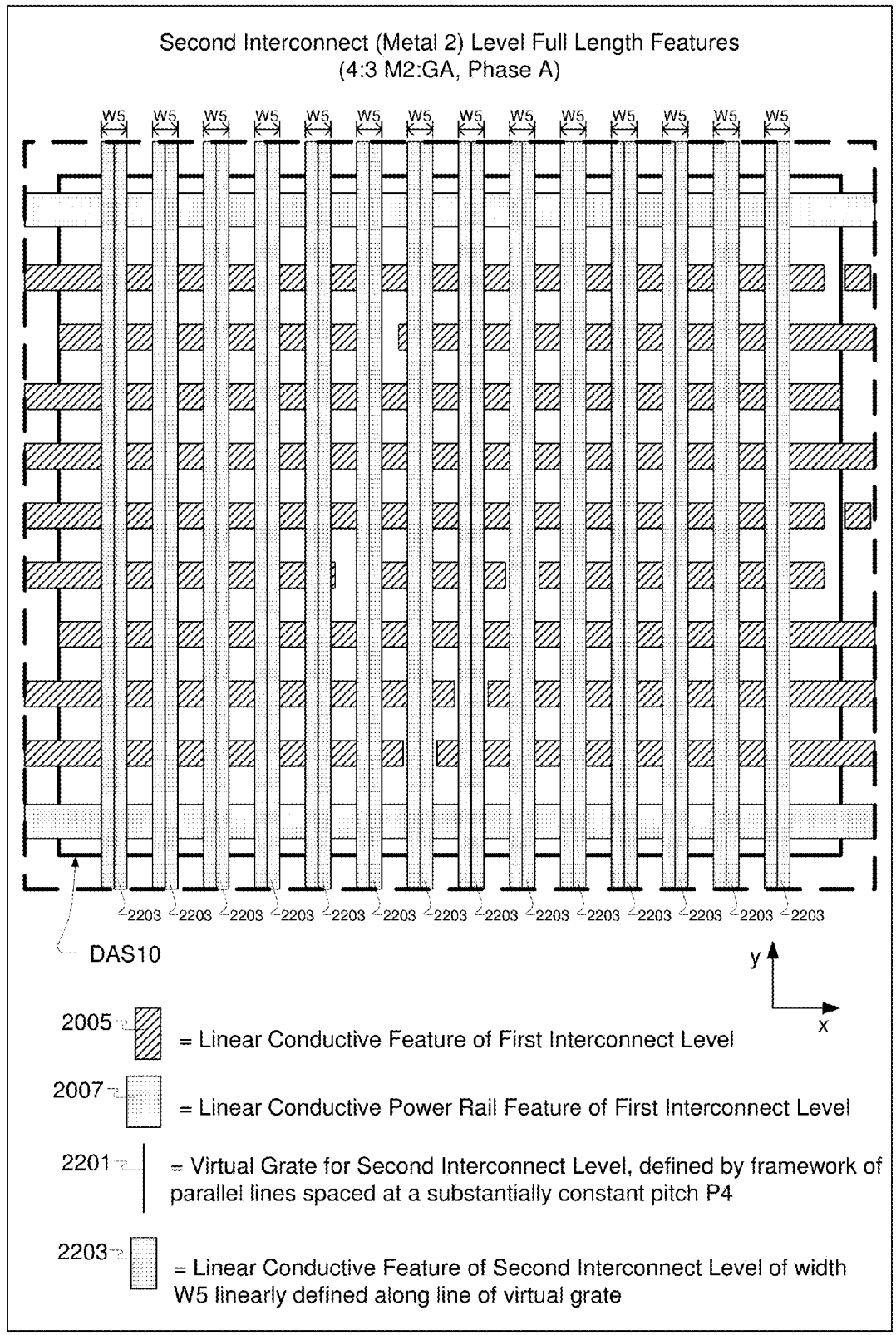
FIG. 22C is an illustration showing full-length linear conductive features defined along each line of the second interconnect level virtual grate, in accordance with one embodiment of the present invention.

FIG. 22C is an illustration showing full-length linear conductive features 2203 defined along each line 2201 of the second interconnect level virtual grate, in accordance with one embodiment of the present invention. Each linear conductive feature 2203, or segment thereof, is defined to have a substantially uniform width W5 along its length. Within the second interconnect level, each full-length linear conductive feature 2203 represents a maximum feature occupancy of a given line 2201 of the virtual grate. However, some of the full-length linear conductive features 2203 in the second interconnect level may need to be segmented to enable interconnection of transistor devices and other electronic components (e.g., resistors, diodes, capacitors, etc.) to form a functional electronic circuit.

Figure 22D:
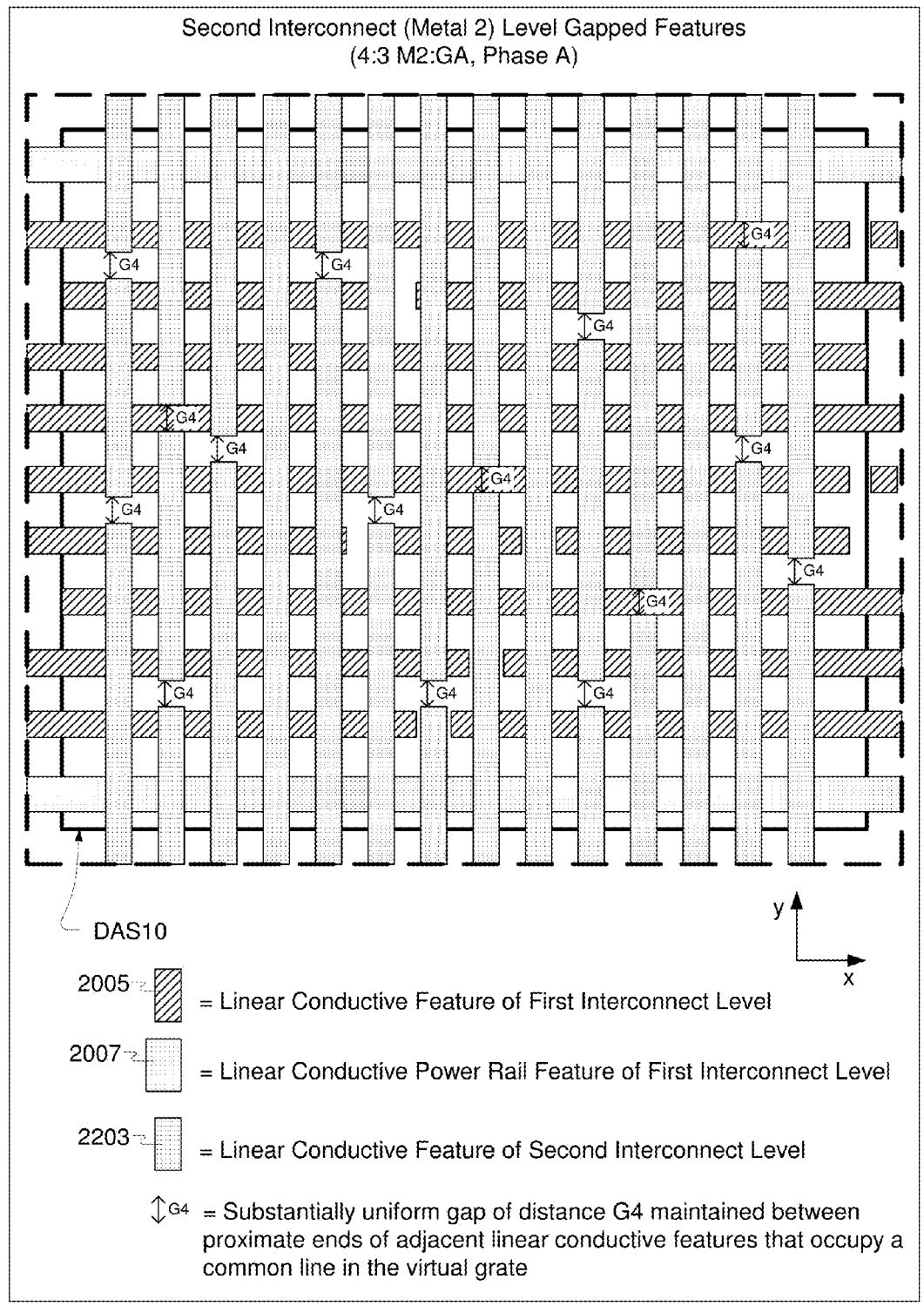
FIG. 22D is an illustration showing a segmentation of the linear conductive features of FIG. 22C within the second interconnect level, in accordance with one embodiment of the present invention.

FIG. 22D is an illustration showing a segmentation of the linear conductive features 2203 of FIG. 22C within the second interconnect level, in accordance with one embodiment of the present invention. As shown in FIG. 22D, the actual layout of the second interconnect level is achieved by segmenting a number of the full-length linear conductive features 2203. For example, a number of gaps of distance G4 are placed along various full-length linear conductive features 2203. In one embodiment, each gap of distance G4 used to segment the full-length linear conductive features in the second interconnect level of the dynamic array architecture is defined to be substantially uniform. In another embodiment, the gaps used to segment the full-length linear conductive features in the second interconnect level can vary in size as necessary to ensure manufacturability.

Figure 23:
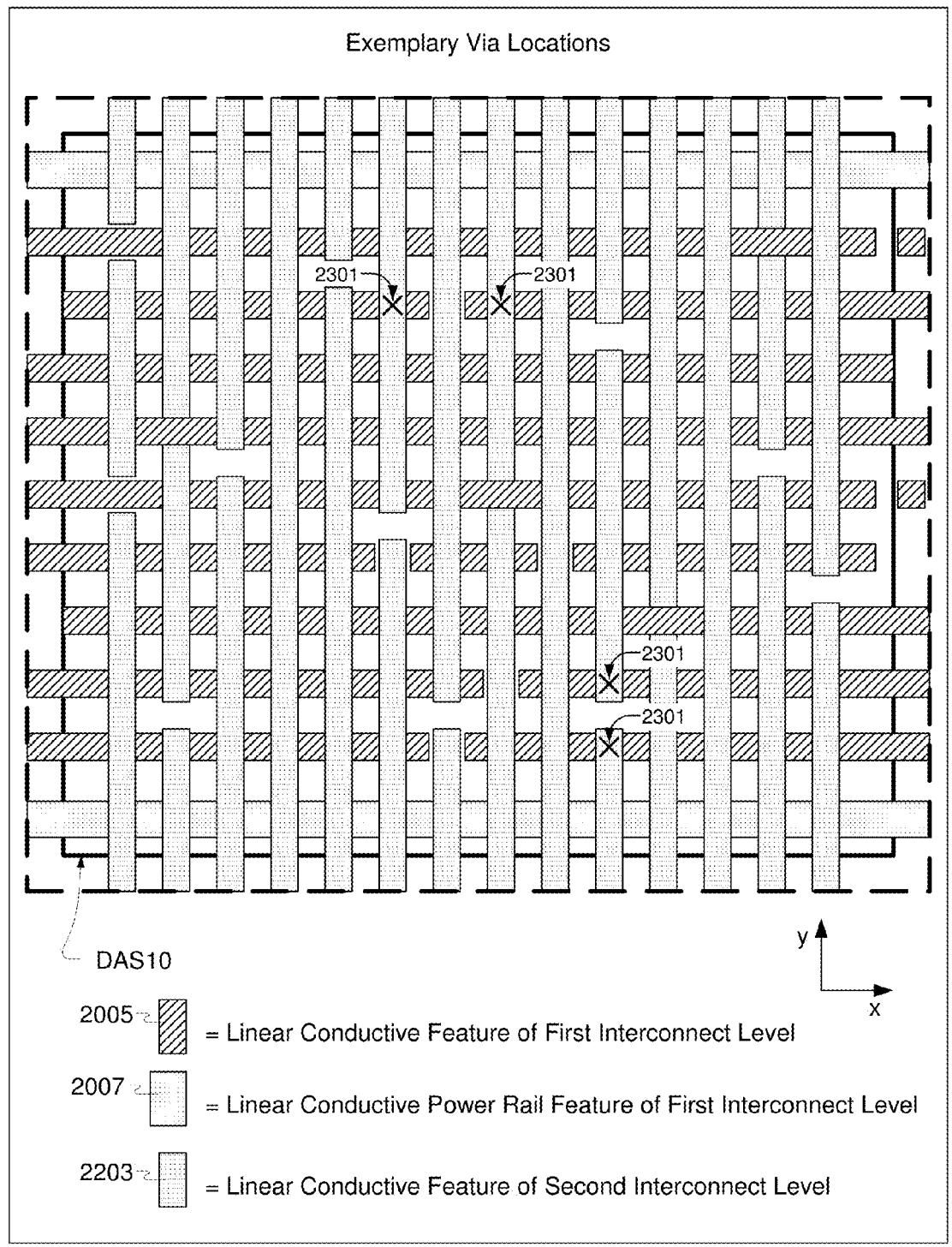
FIG. 23 is an illustration showing the second interconnect level of FIG. 22D with a number of exemplary via locations identified thereon, in accordance with one embodiment of the present invention.

FIG. 23 is an illustration showing the second interconnect level of FIG. 22D with a number of exemplary via locations 2301 identified thereon, in accordance with one embodiment of the present invention. Within each DAS, each location at which virtual grate lines cross each other is a potential via location. Therefore, a virtual via grid is defined by the various locations at which virtual grate lines of two different DAS levels cross each other, where each of the crossing locations represents a potential via location. For example, the exemplary via locations 2301 are defined at locations where virtual grate lines of the second interconnect level cross virtual grate lines of the first interconnect level. To ensure full seating of a via on the underlying conductive feature, it is may be necessary to extend the underlying conductive feature a distance beyond the actual via location. This extension distance, i.e., end overlap, of the underlying conductive feature ensures that a line-end shortening effect associated with the underlying conductive feature will not preclude a full seating of the via on the underlying conductive feature. To illustrate this point the gap G2 between the linear conductive features of the first interconnect level beneath the exemplary via locations 2301 is positioned so as to allow extension, i.e., end overlap, of each of the linear conductive features upon which vias are seated at the exemplary via locations 2301.

Figure 24A:
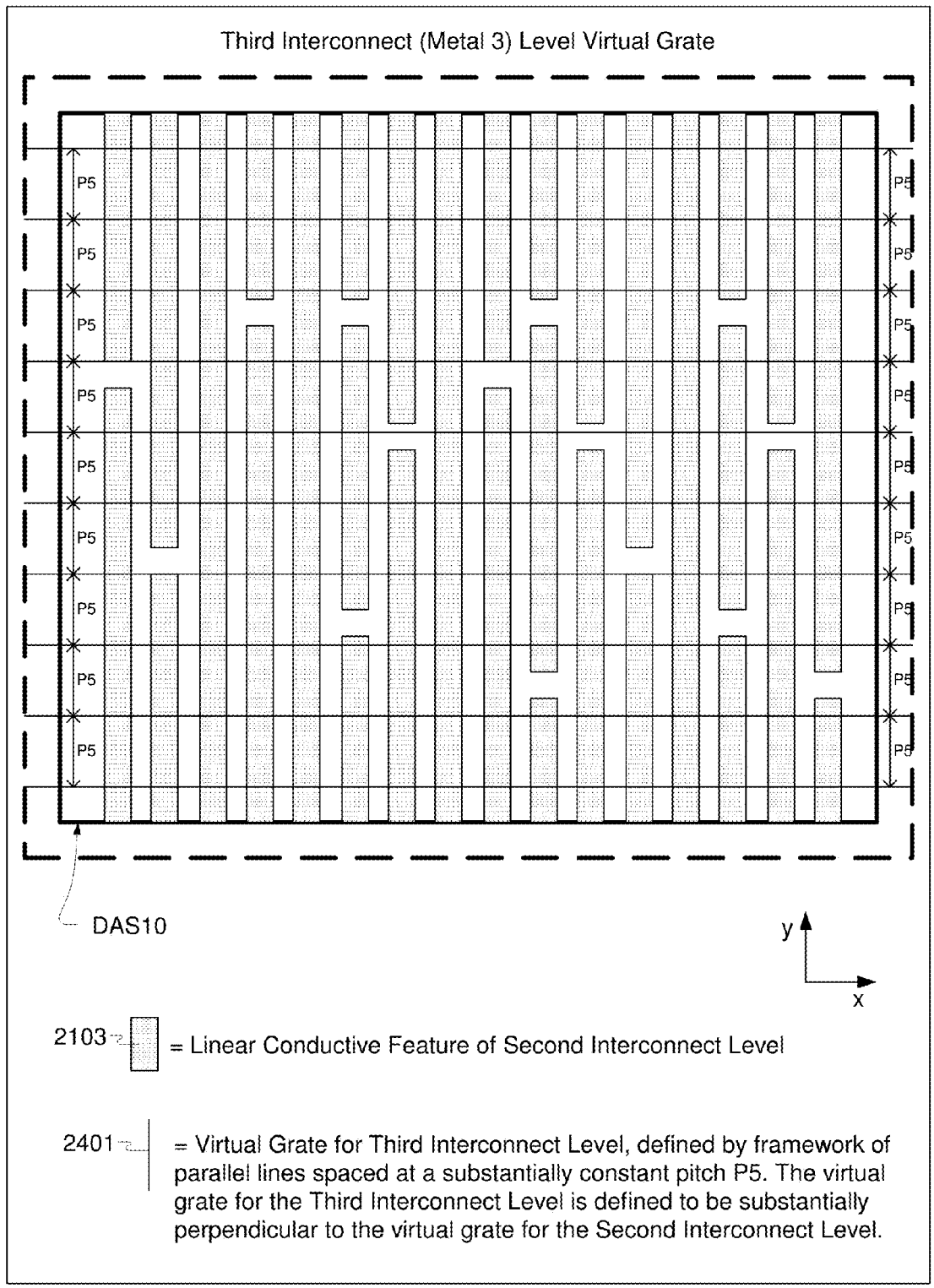
FIG. 24A is an illustration showing a third interconnect level virtual grate for the DAS10 example, in accordance with one embodiment of the present invention.

FIG. 24A is an illustration showing a third interconnect level virtual grate for the DAS10 example, in accordance with one embodiment of the present invention. The third interconnect level virtual grate is defined by a framework of parallel lines 2401 spaced at a constant pitch P5. The third interconnect level virtual grate is oriented such that the lines thereof extend in the x direction over the substrate portion 1803 upon which DAS10 is built, so as to extend in a direction perpendicular to the virtual grate of the second interconnect level.

Figure 24B:
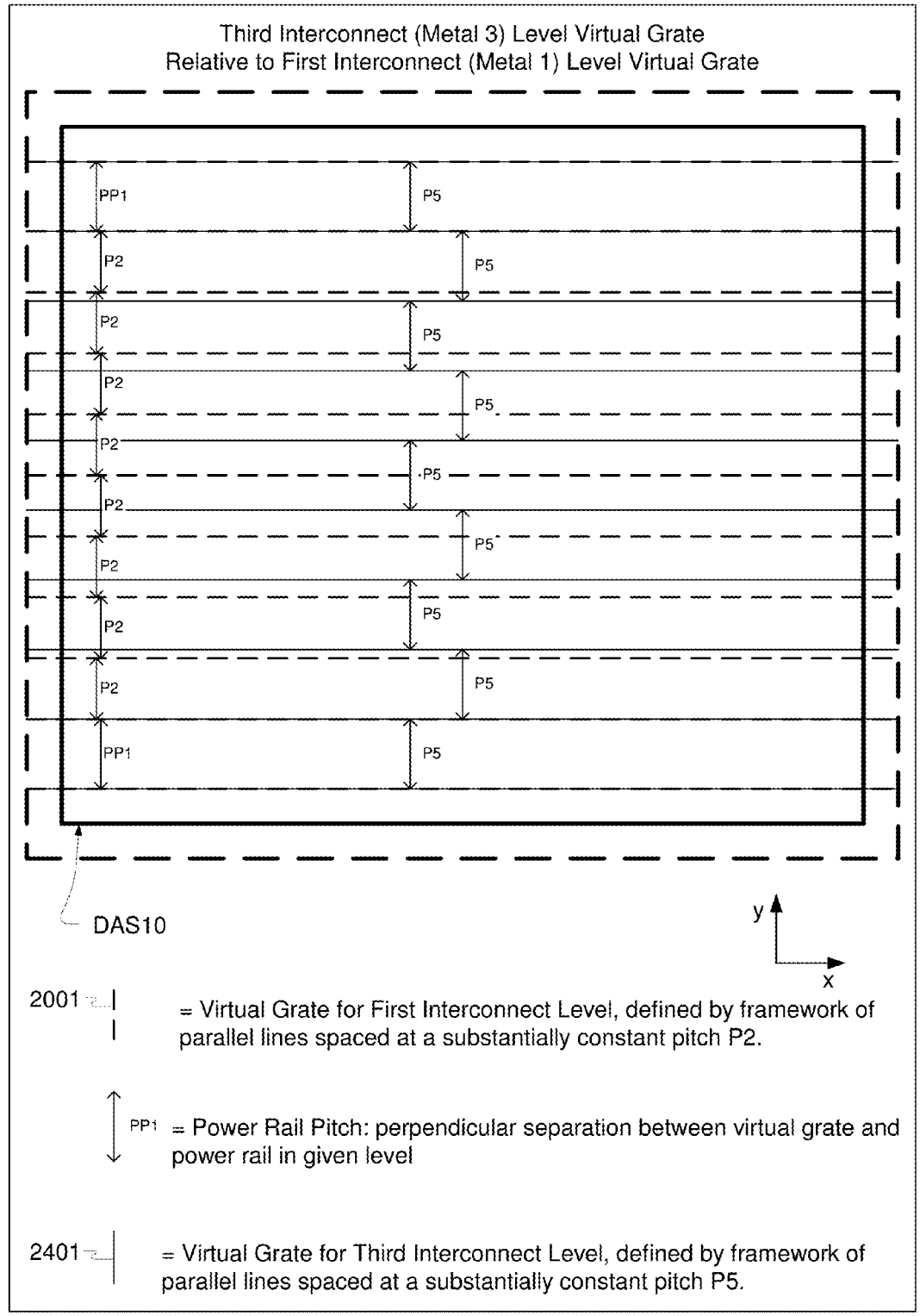
FIG. 24B is an illustration showing a spatial relationship between the third interconnect level and first interconnect level virtual grates for the DAS10 example, in accordance with one embodiment of the present invention.

The position of the third interconnect level virtual grate in the y direction and the associated pitch P5 are established based upon a relationship between the virtual grates of the first interconnect level (see FIGS. 20A through 20C) and third interconnect level. FIG. 24B is an illustration showing a spatial relationship between the third interconnect level and first interconnect level virtual grates for the DAS10 example, in accordance with one embodiment of the present invention. In one embodiment, the spatial relationship between the third interconnect level and first interconnect level virtual grates of a DAS is defined as follows:

$$P5 = \frac{[(2)(PP1)] + [(b-1)(P2)]}{(a-1)}. \qquad \text{Equation 1}$$

where P5 is the pitch of the third interconnect level virtual grate, P2 is the pitch of the first interconnect level virtual grate, PP1 is the power rail pitch used in the first interconnect level, (a) is the number of parallel lines defined within the virtual grate of the third interconnect level, and (b) is the number of parallel lines defined within the virtual grate of the first interconnect level not including the number of power rail virtual lines of the first interconnect level. In the DAS10 example, (a) is 10 and (b) is 9. Therefore, in the example of DAS10, P5 is defined as a function of PP1 and P2 by the following: P5=(1/9)[(2*PP1)±(8*P2)].

It should be appreciated that while Equation 1 defines a relationship between the virtual grates of the third and first interconnect levels for one DAS embodiment, other DAS embodiments may utilize a different relationship between the virtual grates of the third and first interconnect levels. Regardless of the particular embodiment, the point to be understood is that a specific spatial relationship in terms of pitch and alignment exists between the third interconnect level virtual grate and the first interconnect level virtual grate.

Figure 24C:
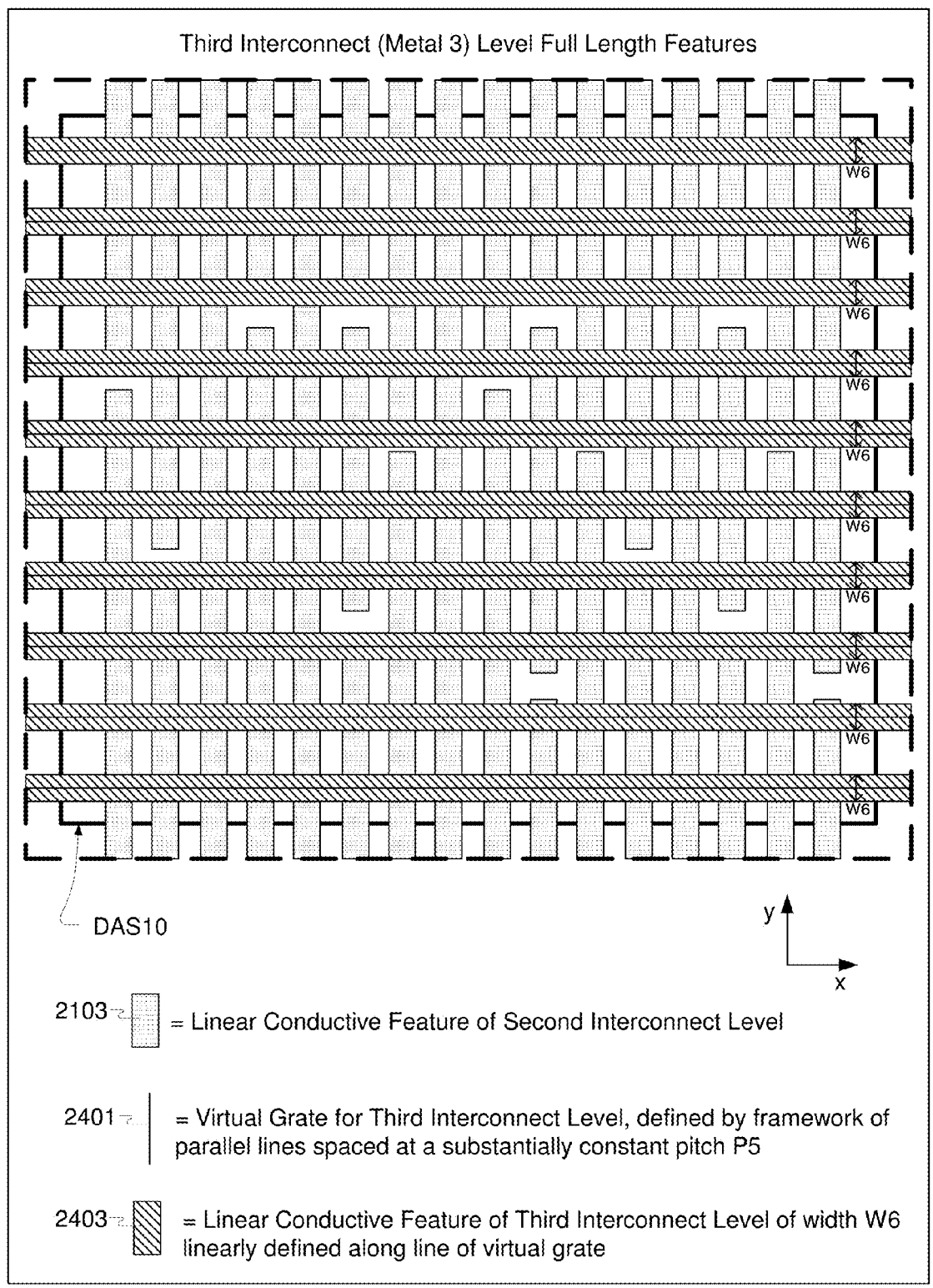
FIG. 24C is an illustration showing full-length linear conductive features defined along each line of the third interconnect level virtual grate, in accordance with one embodiment of the present invention.

FIG. 24C is an illustration showing full-length linear conductive features 2403 defined along each line 2401 of the third interconnect level virtual grate, in accordance with one embodiment of the present invention. It should be understood that while the example of FIG. 24C shows each line of the third interconnect level virtual grate occupied by a linear conductive feature, there is no requirement that every line of the third interconnect level virtual grate, or any virtual grate for that matter, be occupied by a linear conductive feature. Each linear conductive feature 2403, or segment thereof, is defined to have a substantially uniform width W6 along its length. However, it should be understood that in other embodiments the various linear conductive features defined across the third interconnect level of the DAS can be defined to have different widths, with the width of a given linear conductive feature along its length being substantially uniform. Also, within the third interconnect level, each full-length linear conductive feature 2403 represents a maximum feature occupancy of a given line 2401 of the virtual grate. However, some of the full-length linear conductive features 2403 in the third interconnect level may need to be segmented to enable interconnection of transistor devices and other electronic components (e.g., resistors, diodes, capacitors, etc.) to form a functional electronic circuit.

Figure 24D:
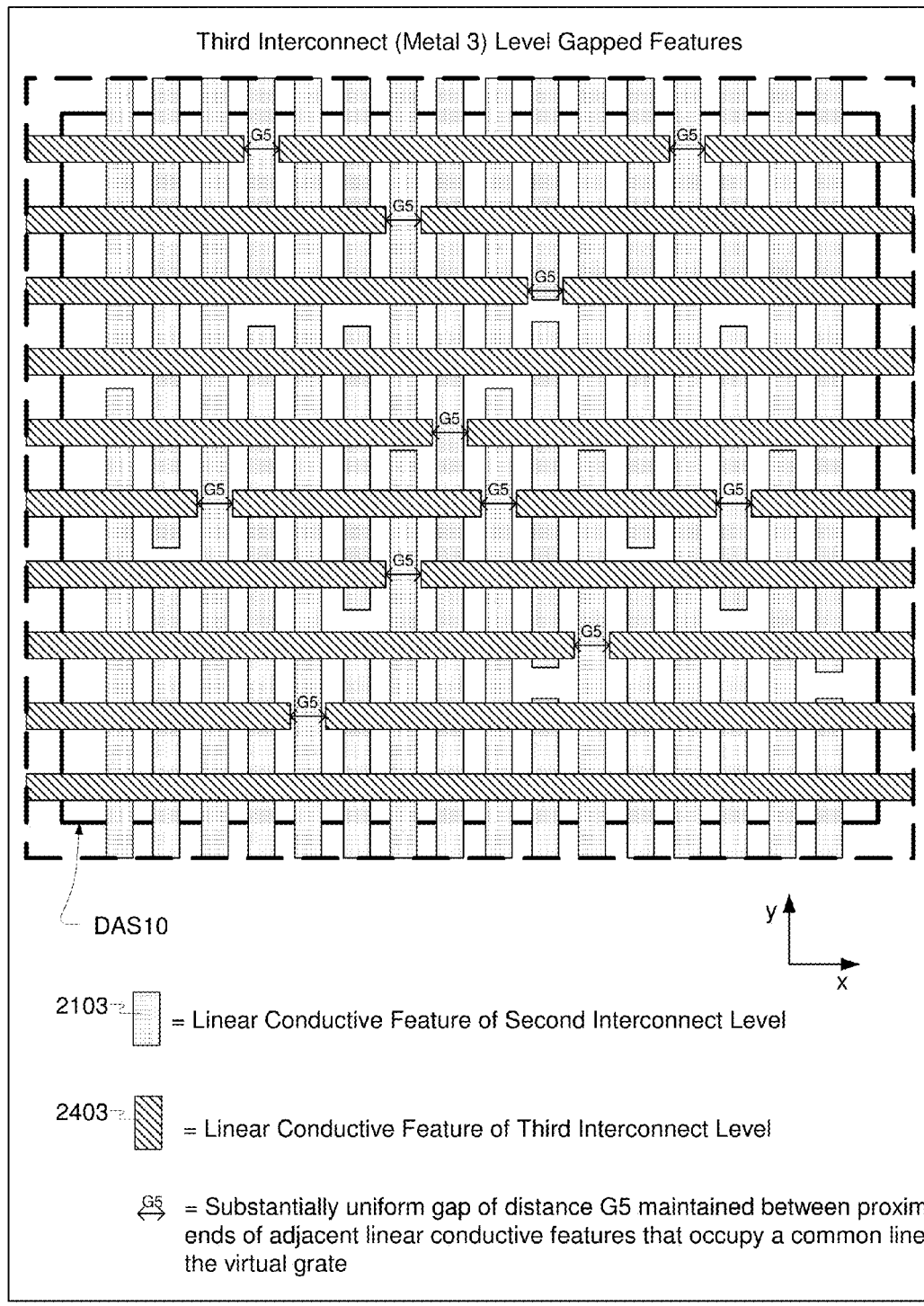
FIG. 24D is an illustration showing a segmentation of the linear conductive features within the third interconnect level, in accordance with one embodiment of the present invention.

FIG. 24D is an illustration showing a segmentation of the linear conductive features 2403 within the third interconnect level, in accordance with one embodiment of the present invention. As shown in FIG. 24D, the actual layout of the third interconnect level is achieved by segmenting a number of the full-length linear conductive features 2403. For example, a number of gaps of distance G5 are placed along various full-length linear conductive features 2403. In one embodiment, each gap of distance G5 used to segment the full-length linear conductive features in the third interconnect level of the dynamic array architecture is defined to be substantially uniform. In another embodiment, the gaps used to segment the full-length linear conductive features in the third interconnect level can vary in size as necessary to ensure manufacturability.

With regard to FIGS. 21D, 22D, and 24D, it should be understood that segmentation of a given linear conductive feature 2103, 2203, 2403 can also include removal of a portion of the given linear conductive feature at a location near the boundary of the DAS. In one embodiment, removal of a portion of a given linear conductive feature 2103, 2203, 2403 at the boundary of the DAS is performed when continuity of the given linear conductive feature from the DAS to a neighboring DAS is not desired. It should be appreciated that the length of the portion of the given linear conductive feature 2103, 2203, 2403 removed at the location near the boundary of the DAS can vary depending on DAS-to-DAS interface requirements. However, it should also be understood that removal of the portion of the given linear conductive feature 2103, 2203, 2403 at the boundary of the DAS should be done so as to avoid adversely impacting the manufacturability of neighboring linear conductive features within the DAS.

As previously mentioned with regard to FIG. 18, each DAS has an associated manufacturing assurance halo (DAS halo). Each DAS halo is defined to facilitate placement of its associated DAS on the DAS grid (see FIG. 17) such that functional features within the associated DAS will be protected from adverse manufacturing impact caused by neighboring DASs, and such that characteristics of the associated DAS can be appropriately considered with regard to their impact on the manufacture of each neighboring DAS. In other words, the DAS halo defines a mechanism by which the proximate placement of a DAS to another DAS can be controlled to ensure the manufacturability of each DAS, while enabling optimization of chip area utilization.

The DAS halo for a given DAS can be segmented to include a number of compatibility designations. For example, given the linear characteristics of the dynamic array architecture in each level of the DAS, it can be expected that in one embodiment different compatibility designations may be applied to segments of the DAS halo about the boundaries of a given DAS, depending upon whether the particular boundary runs parallel to a first direction of the DAS grid or a second direction of the DAS grid (the second direction being perpendicular to the first direction). Additionally, in one embodiment, each DAS halo segment defined along a boundary of the DAS that runs in the first direction of the DAS grid may have a common compatibility designation. Similarly, each DAS halo segment defined along a boundary of the DAS that runs in the second direction of the DAS grid may have a common compatibility designation.

Figure 25A:
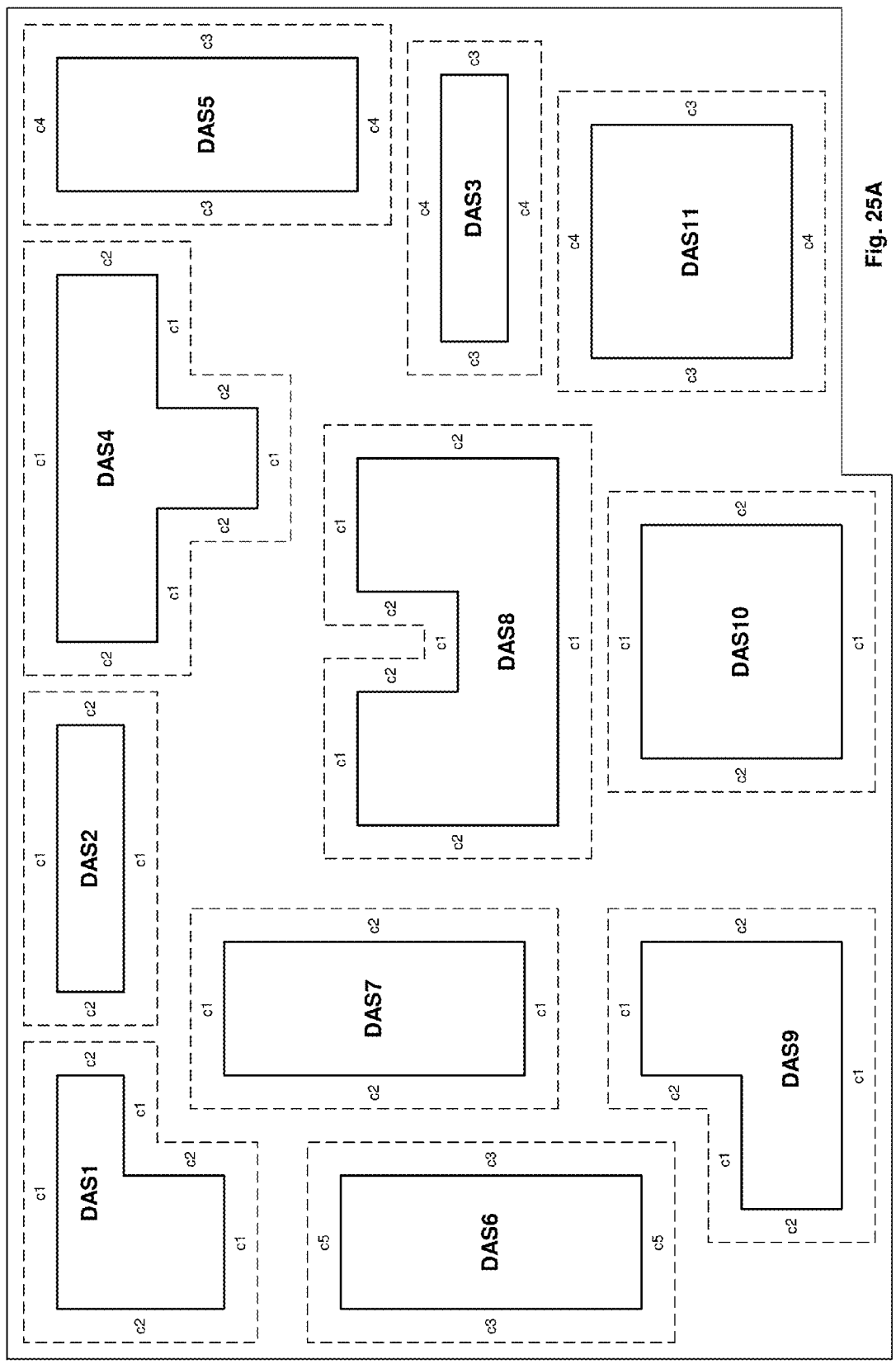
FIG. 25A is an illustration showing a number of exemplary DASs with their respective manufacturing assurance boundary compatibility designations, in accordance with one embodiment of the present invention.

FIG. 25A is an illustration showing a number of exemplary DASs (DAS1-DAS11) with their respective boundary compatibility designations (c1-c5), in accordance with one embodiment of the present invention. With regard to FIG. 25A, the dashed lines around each DAS (DAS1-DAS11) represents the DAS halo for the DAS. The boundary compatibility designations for each DAS halo are identified by labels c1, c2, c3, c4, or c5. In one embodiment, each boundary segment of a DAS is given a boundary compatibility designation. Thus, by way of the DAS boundary compatibility designations, the placement of each boundary of each DAS can be considered relative to each boundary of each DAS proximate thereto.

In one embodiment, a number of DASs may be defined to form a DAS library. A given DAS library may be defined to include a number of DASs that form various electronic logic gates, devices, circuits, or components, wherein each DAS in the given DAS library is defined to have similar characteristics such that a common DAS boundary compatibility designation can be applied to each DAS in the given DAS library. Also, in this embodiment, a common DAS boundary compatibility designation can be applied to each boundary of each DAS in the given DAS library that extends in a common direction. Furthermore, different DAS boundary compatibility designations can be commonly applied to the given DAS library such that each boundary of each DAS that extends in a first direction is assigned a first DAS boundary compatibility designation, and each boundary of each DAS that extends in a second direction is assigned a second DAS boundary compatibility designation.

Figure 25B:
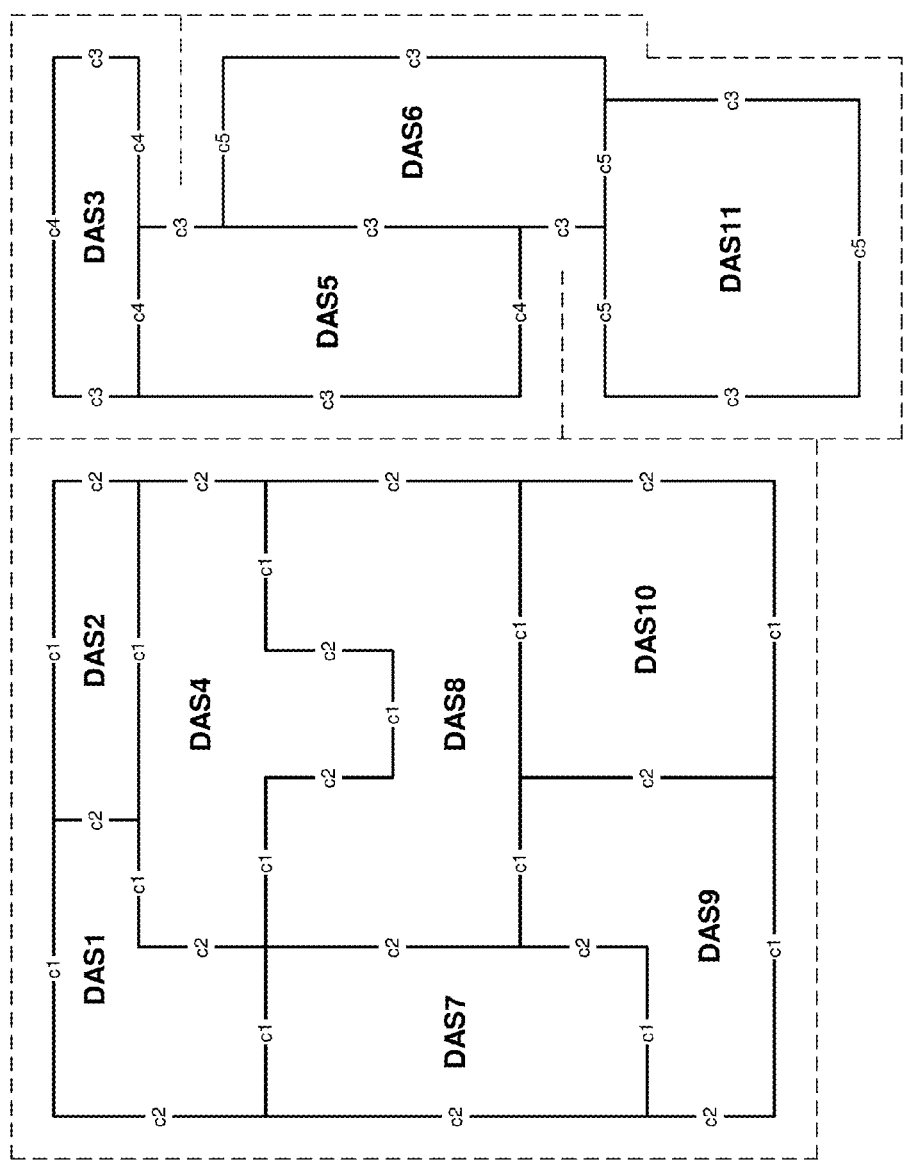
FIG. 25B is an illustration showing an exemplary assembly of the DASs of FIG. 25A on a DAS grid according to their respective manufacturing assurance boundary compatibility designations, in accordance with one embodiment of the present invention.

FIG. 25B is an illustration showing an exemplary assembly of the DASs of FIG. 25A on a DAS grid according to their respective DAS boundary compatibility designations, in accordance with one embodiment of the present invention. A DAS cluster is defined as an assembly of DASs on the DAS grid, wherein each DAS in the assembly of DASs shares at least a portion of one DAS boundary with another DAS in the assembly of DASs. In following, with regard to FIG. 25B, a first DAS cluster is defined by DAS1, DAS3, DAS4, DAS7, DAS8, DAS9, and DAS10. Also, with regard to FIG. 25B, a second DAS cluster is defined by DAS3, DAS5, DAS6, and DAS11. In one embodiment, like DAS boundary compatibility designations for particular boundaries of separate DASs indicates that the separate DASs can be placed on the DAS grid such that the particular boundaries thereof having like DAS boundary compatibility designations can be aligned in a colinear manner. For example, DAS1 and DAS2 each have an adjacent boundary with a DAS boundary compatibility designation of c2. Therefore, DAS1 and DAS2 can be placed on the DAS grid with respect to each other such that their adjacent boundaries having the DAS boundary compatibility designation of c2 are aligned in a colinear manner. In this manner other DAS boundaries can be colinearly aligned on the DAS grid, as exemplified by DAS1 and DAS4, DAS1 and DAS7, DAS4 and DAS8, DAS7 and DAS8, DAS7 and DAS9, DAS8 and DAS9, DAS9 and DAS10, DAS3 and DAS5, DAS5 and DAS6, and DAS6 and DAS11.

In one embodiment, different DAS boundary compatibility designations for particular boundaries of separate DASs indicates that the separate DASs should be placed on the DAS grid such that the particular boundaries thereof having different DAS boundary compatibility designations are separated from each other to ensure that the manufacture of the separate DASs does not adversely impact each other. In one embodiment, adjacent boundaries of separate DASs having different DAS boundary compatibility designations are spaced apart from each other such that the DAS halo portions associated with the adjacent boundaries of the separate DASs do not overlap. For example, DAS2 and DAS3 have adjacent boundaries with DAS boundary compatibility designations of c2 and c3, respectively. Therefore, DAS2 and DAS3 are placed on the DAS grid with respect to each other such that their DAS halo portions associated with their adjacent boundaries do not overlap. In this manner other DAS boundaries having incompatible DAS boundary designations are separated from each other, as exemplified by DAS41 and DAS5, DAS8 and DAS5, DAS10 and DAS11, DAS3 and DAS6, and DAS5 and DAS11.

Figure 25C:
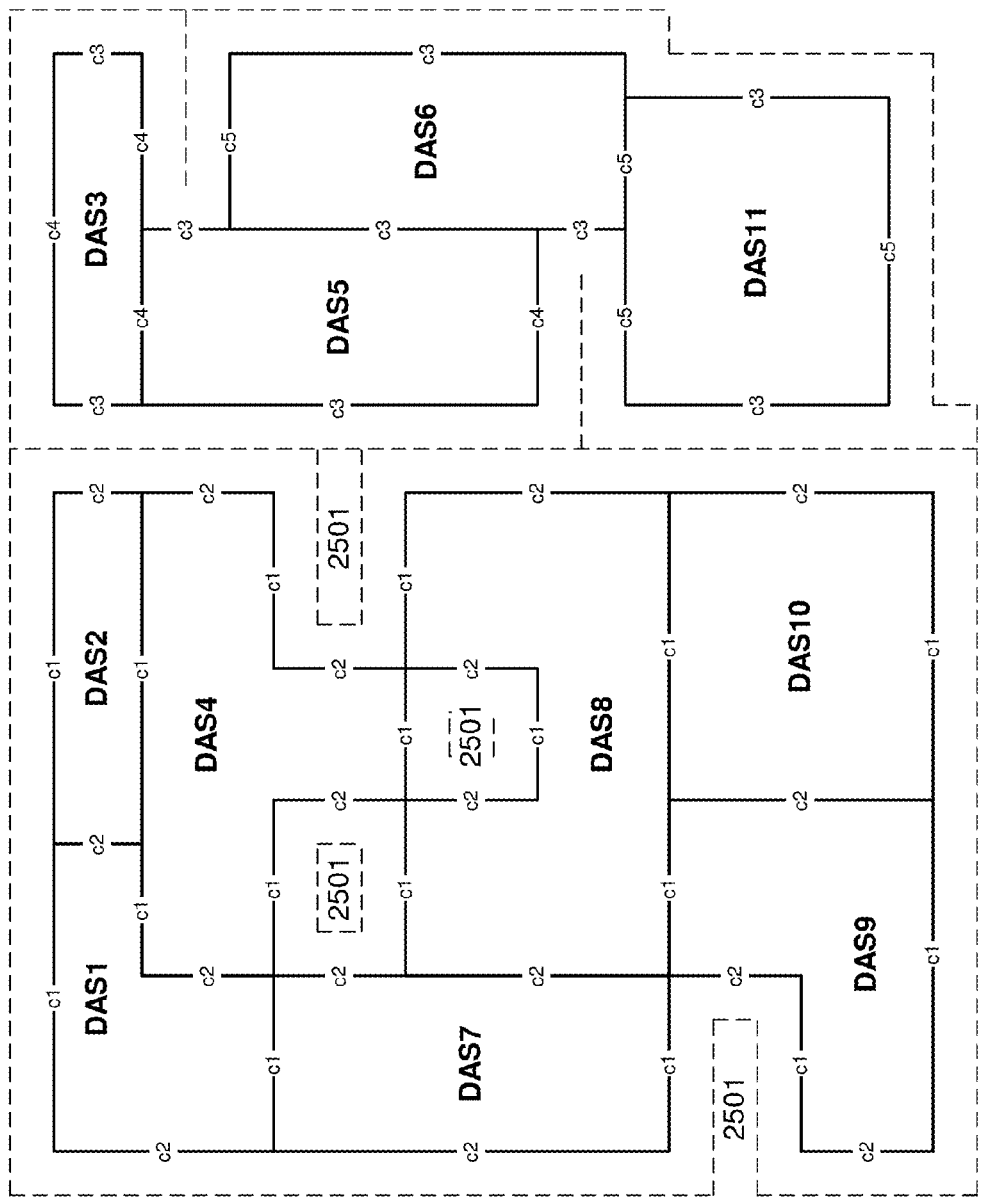
FIG. 25C is an illustration showing an exemplary assembly of the DASs of FIG. 25A on a DAS grid according to their respective manufacturing assurance boundary compatibility designations with intentionally defined empty areas, in accordance with one embodiment of the present invention.

It should be understood that although boundaries of separate DASs having like DAS boundary compatibility designations can be aligned in a colinear manner on the DAS grid, such colinear alignment is not strictly required. For example, DASs having like DAS boundary compatibility designations on proximate boundaries may be placed on the DAS grid so as to intentionally provide separation between the proximate boundaries. FIG. 25C is an illustration showing an exemplary assembly of the DASs of FIG. 25A on a DAS grid according to their respective DAS boundary compatibility designations with intentionally defined empty areas 2501, in accordance with one embodiment of the present invention. Specifically, in the example of FIG. 25C, although the DAS boundary compatibility designations for the upper boundaries of DAS8 and the lower boundaries of DAS4 allow their colinear placement on the DAS grid, DAS8 is placed on the DAS grid so as to be separated from DAS4, thereby forming empty areas 2501. Because chip area is usually at a premium, intentional formation of such empty areas 2501 may not be a common occurrence. However, it should be appreciated that the dynamic array architecture is flexible enough to enable the intentional formation of such empty areas 2501, if necessary.

FIG. 26A-1 is an illustration showing a level of an exemplary DAS 2600, in accordance with one embodiment of the present invention. The exemplary DAS 2600 has an associated DAS boundary 2601 and an associated DAS halo boundary 2603, thereby forming a DAS halo region 2605 outside the DAS boundary 2601. A number of linear conductive features 2607 are shown within the level of the DAS 2600. In one embodiment, an initial content of a DAS halo region, e.g., DAS halo region 2605, for a given level of a DAS is pre-defined along with the given level of the DAS prior to placement of the DAS on the DAS grid. FIG. 26A-2 is an illustration showing the exemplary DAS 2600 with its DAS halo region 2605 pre-defined to include a number of reinforcement features 2609. It should be understood that the reinforcement features 2609 are shown by way of example, and are not intended to convey a particular requirement with regard to length, placement, number, or segmentation of reinforcement features to be defined within a DAS halo region.

Figures 1, 26B:
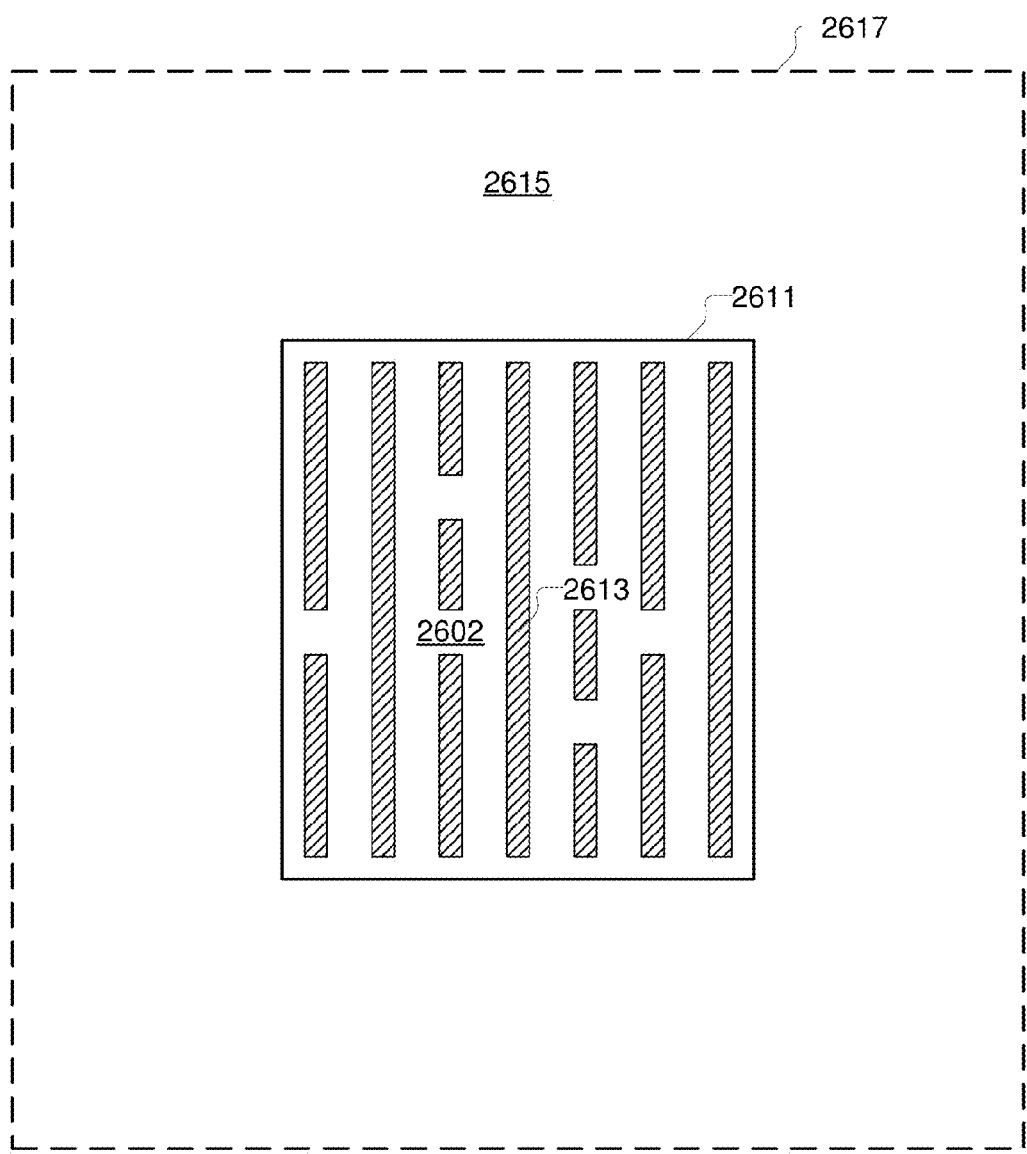
Figures 2, 26B:
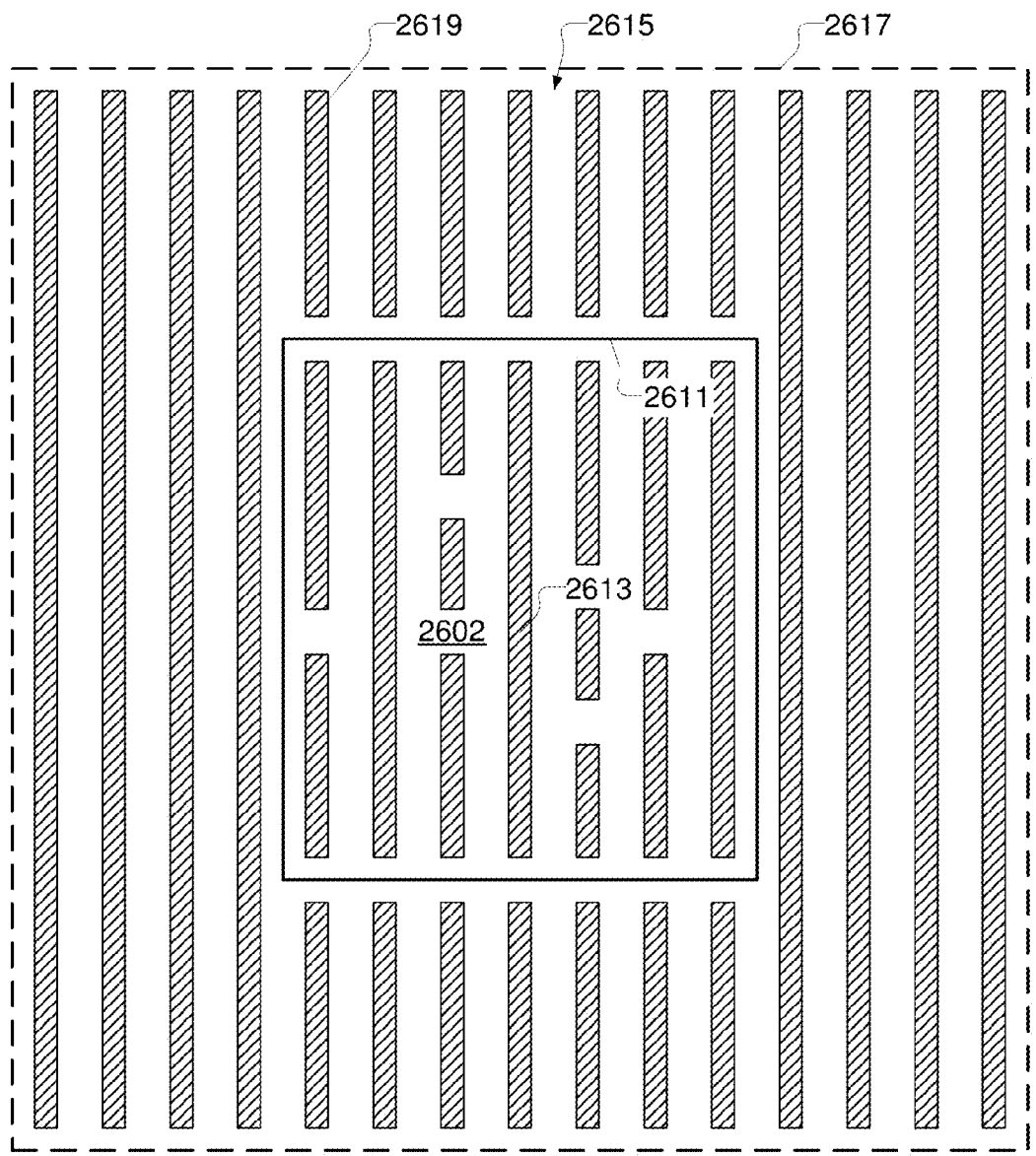

FIG. 26B-1 is an illustration showing a level of another exemplary DAS 2602, in accordance with one embodiment of the present invention. The exemplary DAS 2602 has an associated DAS boundary 2611 and an associated DAS halo boundary 2617, thereby forming a DAS halo region 2615 outside the DAS boundary 2611. A number of linear conductive features 2613 are shown within the level of the DAS 2602. FIG. 26B-2 is an illustration showing the exemplary DAS 2602 with its DAS halo region 2615 pre-defined to include a number of reinforcement features 2619. It should be understood that the reinforcement features 2619 are shown by way of example, and are not intended to convey a particular requirement with regard to length, placement, number, or segmentation of reinforcement features to be defined within a DAS halo region.

In one embodiment, a number of DASs are placed on a DAS grid along with their respective DAS halo region contents to form a DAS cluster. In this embodiment, the pre-defined content of the DAS halo region for a given level of each DAS is subject to change upon placement of the DAS on the DAS grid. More specifically, upon placement of the given DAS on the DAS grid, a portion of the DAS halo region associated with the given DAS can be eliminated through occupancy of the location of the portion of the DAS halo region by a neighboring DAS. Additionally, in this embodiment, the pre-defined content of a portion of a DAS halo region is subject to change depending on the context in which the DAS halo region finds itself upon placement of the DAS on the DAS grid.

Figures 1, 26C:
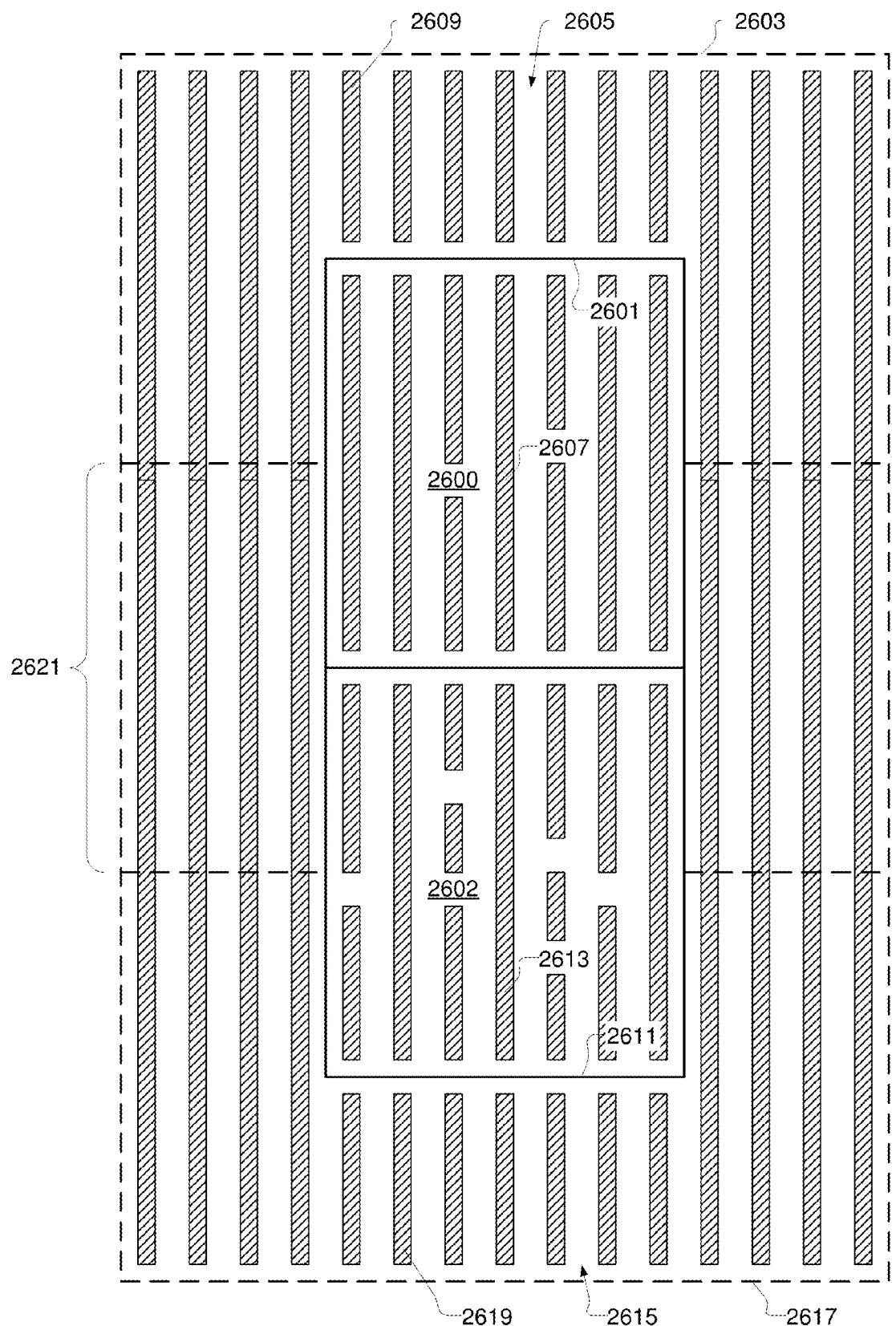
Figures 2, 26C:
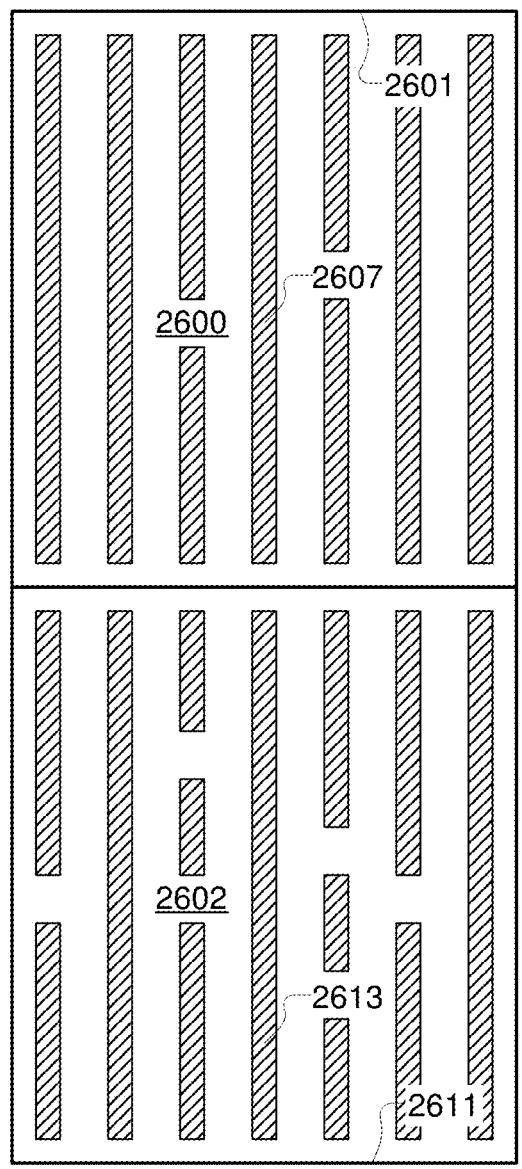

FIG. 26C-1 is an illustration showing an exemplary placement of DAS 2600 of FIG. 26A-2 and DAS 2602 of FIG. 26B-2 on a DAS grid, in accordance with one embodiment of the present invention. In the embodiment of FIG. 26C-1, the pre-defined content of the DAS halo region 2605 is placed on the DAS grid along with the DAS 2600. Also, in the embodiment of FIG. 26C-1, the pre-defined content of the DAS halo region 2615 is placed on the DAS grid along with the DAS 2602. Each of DASs 2600 and 2602 are placed on the DAS grid such that the bottom boundary of DAS 2600 and the top boundary of DAS 2602 are colinearly aligned, wherein the bottom boundary of DAS 2600 and the top boundary of DAS 2602 are referenced relative to the illustrated orientations of the DASs 2600 and 2602. Thus, the bottom boundary of DAS 2600 and the top boundary of DAS 2602 share a common DAS boundary compatibility designation.

Because the central lower portion of the DAS halo region 2605 of DAS 2600 is occupied by DAS 2602, the central lower portion of the DAS halo region 2605 of DAS 2600 is eliminated. Similarly, because the central upper portion of the DAS halo region 2615 of DAS 2602 is occupied by DAS 2600, the central upper portion of the DAS halo region 2615 of DAS 2602 is eliminated. Also, upon placement of DASs 2600 and 2602 on the DAS grid, as shown in FIG. 26C-1, a DAS halo overlap region 2621 results. Specifically, in the overlap region 2621, the outer lower portions of DAS halo region 2605 of DAS 2600 and the outer upper portions of DAS halo region 2615 of DAS 2602 overlap each other.

In one embodiment, placement of multiple DASs on the DAS grid is controlled such that the pre-defined content of DAS halo region portions within the DAS halo overlap region are compatible so as to not adversely impact the manufacturability of features in any of the multiple DASs. For example, with regard to FIG. 26C-1, the content of the DAS halo region 2605 and the DAS halo region 2615 within the DAS halo overlap region 2621 actually aligns so as to maintain the original pre-defined content of DAS halo regions 2605 and 2615. However, it should be understood that the resulting content of a DAS halo overlap region is not strictly required to maintain the original pre-defined content of the respective DAS halo regions involved in the overlap, so long as the resulting content of the DAS halo overlap region does not adversely impact the manufacturability of features within a neighboring DAS.

In another embodiment, a number of DASs are placed on a DAS grid without their respective DAS halo region contents to form a DAS cluster. In this embodiment, the various DASs are placed according to their DAS boundary compatibility designations without regard to associated DAS halo contents. For example, FIG. 26C-2 is an illustration showing an exemplary placement of DAS 2600 and DAS 2602 on a DAS grid without regard to their respective DAS halos, in accordance with one embodiment of the present invention. In the embodiment of FIG. 26C-2, each of DASs 2600 and 2602 are placed on the DAS grid such that the bottom boundary of DAS 2600 and the top boundary of DAS 2602 are colinearly aligned, in accordance with their common DAS boundary compatibility designation. The assembly of DAS 2600 and DAS 2602 represents a DAS cluster.

Figures 3, 26C:
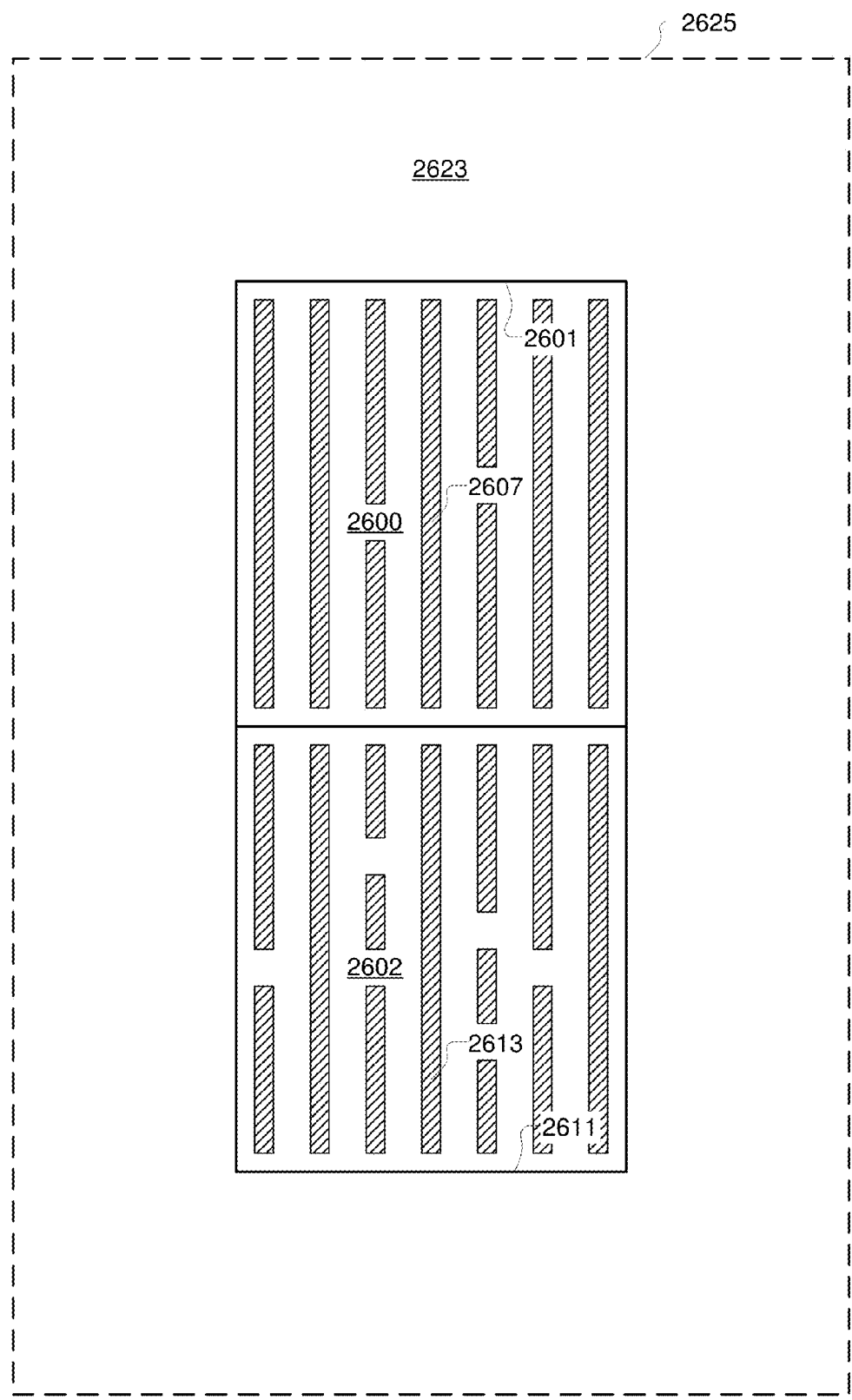
Figures 4, 26C:
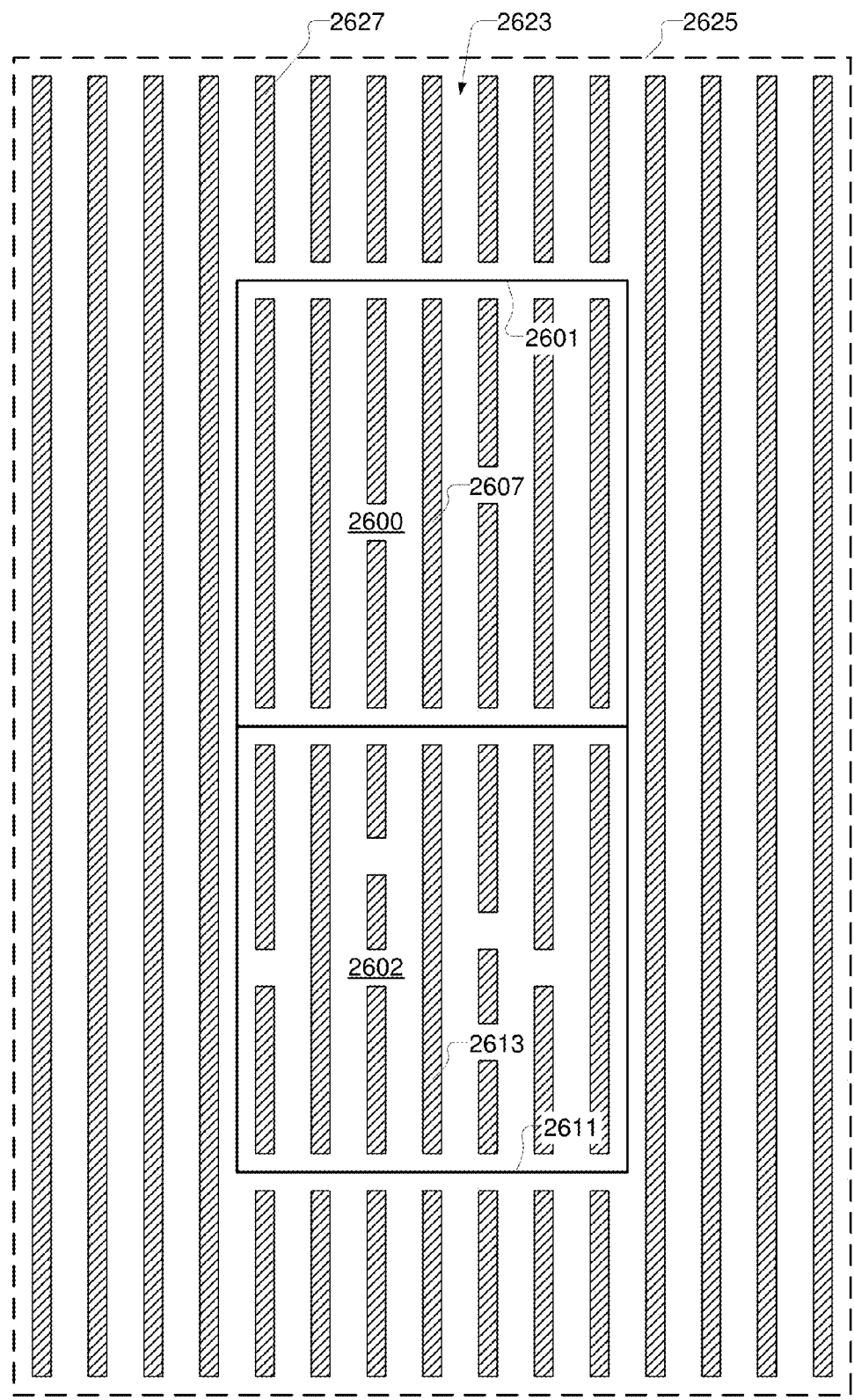
Figures 5, 26C:
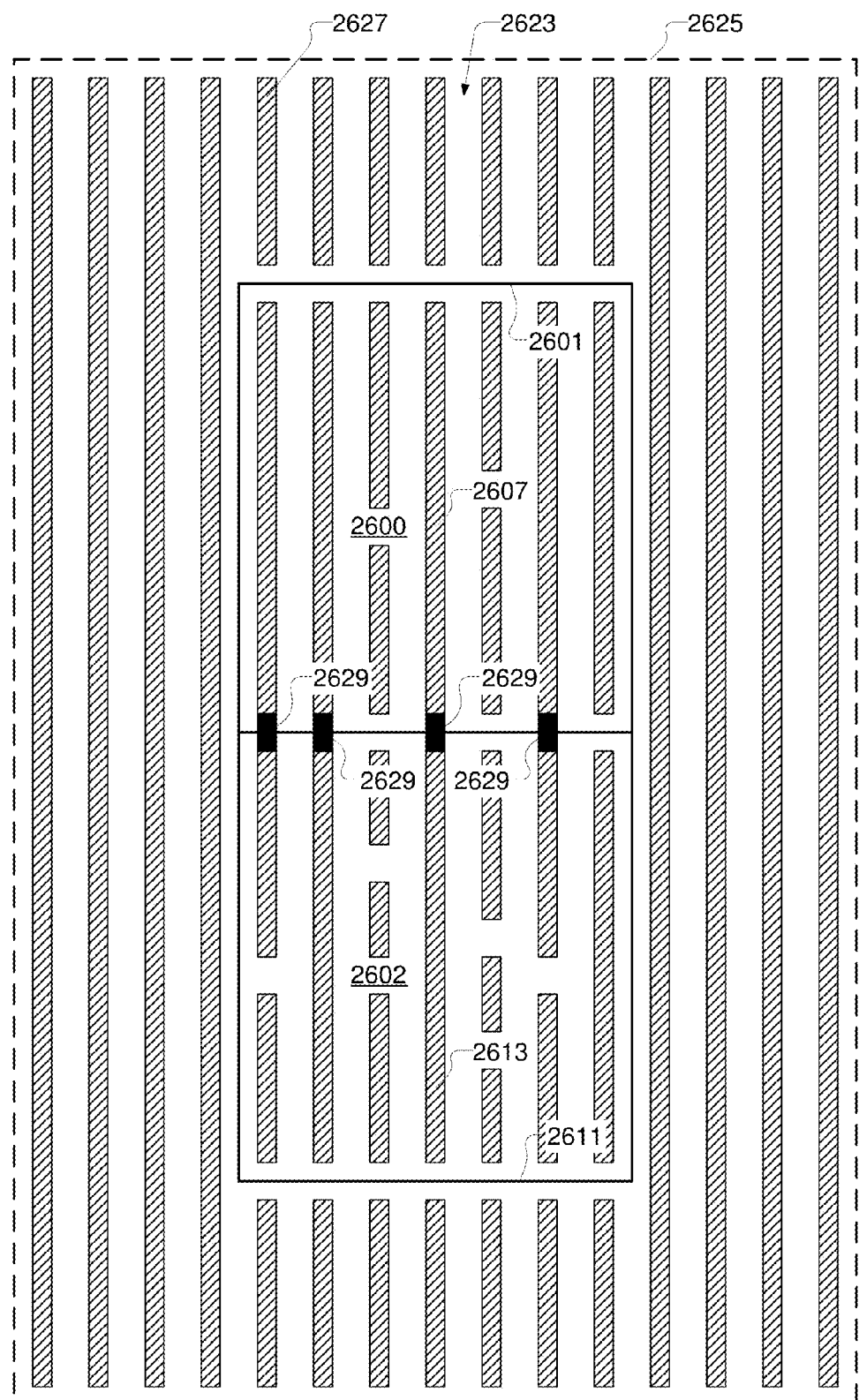

Following placement of the various DASs according to their DAS boundary compatibility designations to form a DAS cluster, a DAS halo boundary can be placed around a periphery of the DAS cluster. For example, FIG. 26C-3 is an illustration showing the DAS cluster of FIG. 26C-2 having a DAS halo boundary 2625 defined around the periphery of the DAS cluster to form a DAS halo region 2623. The content of the DAS halo region 2623 can then be defined as necessary to reinforce/support manufacturability of the various features in the DASs that make up the DAS cluster. For example, FIG. 26C-4 is an illustration showing the defined content of the DAS halo region 2623. A number of reinforcement features 2627 are shown within the DAS halo region 2623. It should be understood that the reinforcement features 2627 are shown by way of example, and are not intended to convey a particular requirement with regard to length, placement, number, or segmentation of reinforcement features to be defined within a DAS halo region. In another embodiment, all or a portion of a DAS halo region defined around a periphery of the DAS cluster can be left empty, if appropriate for the successful manufacture of features within the DASs of the DAS cluster. For example, in this embodiment, all or a portion of the DAS halo region 2623 may be left empty, i.e., without reinforcement features 2627.

Once the DASs are placed on the DAS grid, it may be necessary to functionally interconnect linear conductive features from one DAS to another DAS. In one embodiment, a number of DAS interconnection segments are defined during a place and route process, wherein each DAS interconnection segment is defined to connect a linear conductive feature in a given level of a first DAS to a coaligned linear conductive feature in the given level of a second DAS adjacent to the first DAS. For example, FIG. 26C-5 is an illustration showing the particular level of the DAS cluster of FIG. 26C-4 having a number of DAS interconnection segments 2629 defined therein. It should be understood that the DAS interconnection segments 2629 are shown by way of example, and are not intended to convey a particular requirement with regard to length, placement, or number of DAS interconnection segments to be defined between DASs.

Figures 1, 26D:
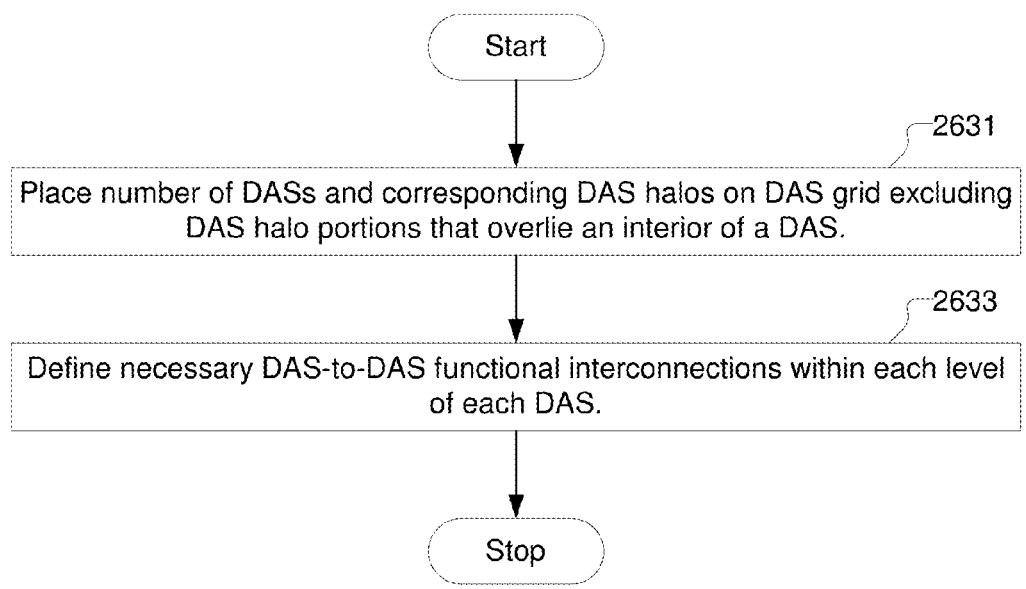
Figures 2, 26D:
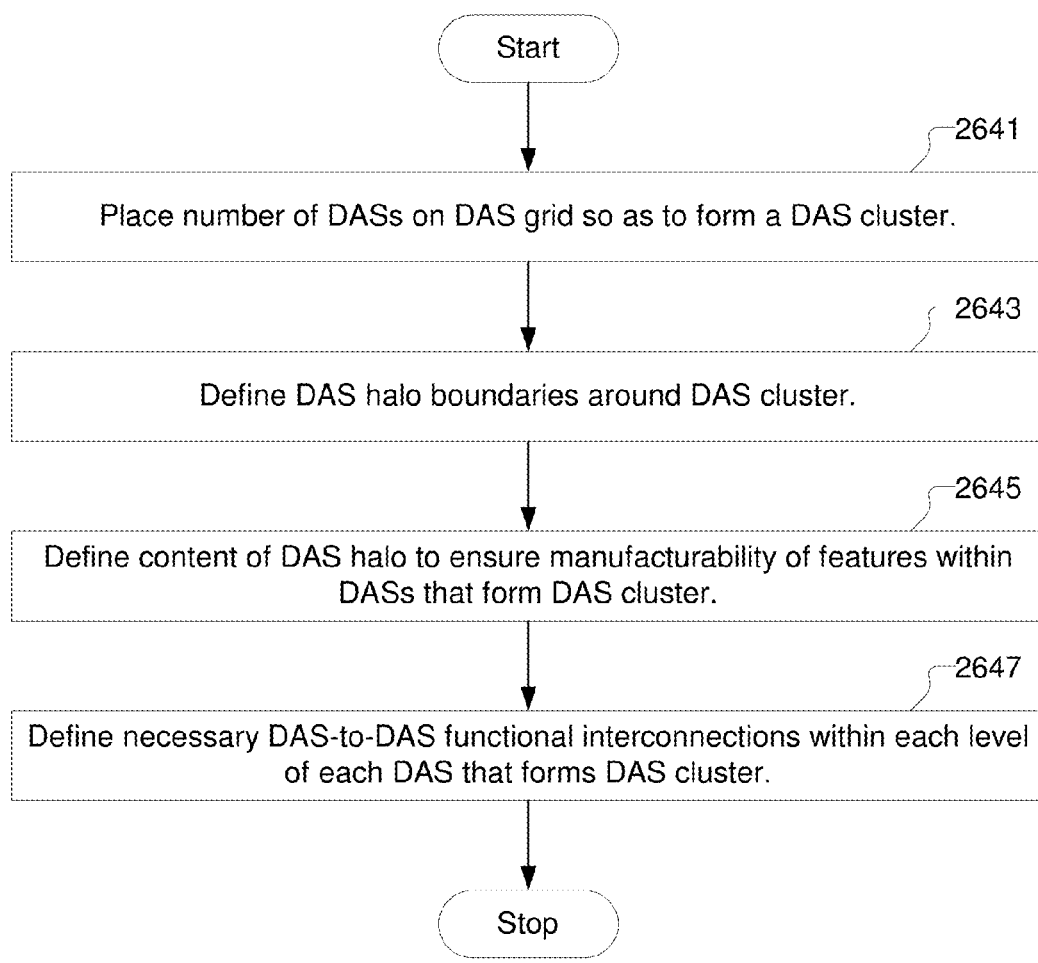

FIG. 26D-1 is an illustration showing a flowchart of a method for defining a dynamic array architecture region of a semiconductor chip, in accordance with one embodiment of the present invention. The method includes an operation 2631 for placing a number of DASs with their corresponding DAS halos on a DAS grid to form a DAS cluster. When placing the number of DASs on the DAS grid, each DAS halo portion that would overlie an interior region of another DAS is excluded. Thus, each location on the DAS grid can be occupied by either a DAS interior region or a DAS halo region, but not both. This concept is previously described with regard to FIG. 26C-1. Upon placement of the DASs with their corresponding DAS halos on the DAS grid, the remaining portions of the DAS halos and their respective contents in a given level of the chip are adopted to form the DAS halo for the DAS cluster in the given level of the chip.

The method also includes an operation 2633 for defining necessary DAS-to-DAS functional interconnections within each level of the DAS cluster. The DAS-to-DAS functional interconnections correspond to the DAS interconnections as previously described with regard to FIG. 26C-5. In one embodiment, operation 2633 for defining the necessary DAS interconnections is performed during a place and route process. However, in other embodiments, operation 2633 can be performed outside of a place and route process.

FIG. 26D-2 is an illustration showing a flowchart of a method for defining a dynamic array architecture region of a semiconductor chip, in accordance with one embodiment of the present invention. The method includes an operation 2641 for placing a number of DASs on a DAS grid to form a DAS cluster, without regard to the various DAS halos associated with the number of DASs. The method also includes an operation 2643 for defining a DAS halo boundary around a periphery of the DAS cluster, so as to form a DAS halo region outside the periphery of the DAS cluster. An operation 2645 is then performed to define the contents of the DAS halo region to ensure manufacturability of features within the DASs than form the DAS cluster. In various embodiments, the contents of the DAS halo region can include a number of reinforcement features defined with regard to orientation, size, and spacing, so as to reinforce the manufacture of features within the DASs of the DAS cluster. Also, in some embodiments, one or more portions of the DAS halo region can be left empty, i.e., without reinforcement features.

The method further includes an operation 2647 for defining necessary DAS-to-DAS functional interconnections within each level of each DAS that forms the DAS cluster. The DAS-to-DAS functional interconnections correspond to the DAS interconnections as previously described with regard to FIG. 26C-5. In one embodiment, operation 2647 for defining the necessary DAS interconnections is performed during a place and route process. However, in other embodiments, operation 2647 can be performed outside of a place and route process.

It should be understood that a DAS can be defined to form a portion of one or more logic cells, one or more complete logic cells, or a combination of complete and partial logic cells. In one embodiment, logic cell boundaries contain an integer multiple of gate electrode features. More specifically, in this embodiment, logic cell boundaries that run parallel to the gate electrode features fall on the gate electrode half-pitch. Thus, in this embodiment, logic cell boundaries are defined based on the gate electrode level virtual grate, such that the logic cell boundaries fall on the gate electrode half-pitch. Each logic cell is defined to have a cell height and a cell width when viewed in a direction perpendicular to the plane of the substrate. In one embodiment, the relationship between the conductive feature spacings in the first and third interconnect levels allows for a selection of the logic cell height so that the conductive features of the first and third interconnect levels align at the height-defining logic cell borders.

The conductive features in a given level of the logic cell, i.e., in a given level of the DAS containing the logic cell, are indexed relative to an origin of the logic cell. For discussion purposes, the origin of the logic cell in a given level is considered to be located at a lower left corner of the logic cell when viewed in a direction perpendicular to the plane of the substrate. Because logic cell widths are variable, a logic cell boundary in the width direction may not always fall on a conductive feature pitch or half-pitch within a given DAS level (above the gate electrode level). Therefore, depending on the origin of the logic cell relative to the virtual grate of the given DAS level, the conductive features in the given DAS level may need to be shifted relative to the logic cell origin in order to align with the virtual grate of the given DAS level. The shifting of conductive features in a given level of a logic cell relative of the origin of the logic cell is called phasing. Therefore, phasing provides for alignment of conductive features in a given level of a logic cell to the virtual grate of the DAS for the given level, depending on the location of the origin of the logic cell. For example, in the case where the gate electrode virtual grate extends across logic cell boundaries, phasing may be required to maintain alignment of second interconnect level conductive features in a given logic cell to the second interconnect level virtual grate.

Figure 33:
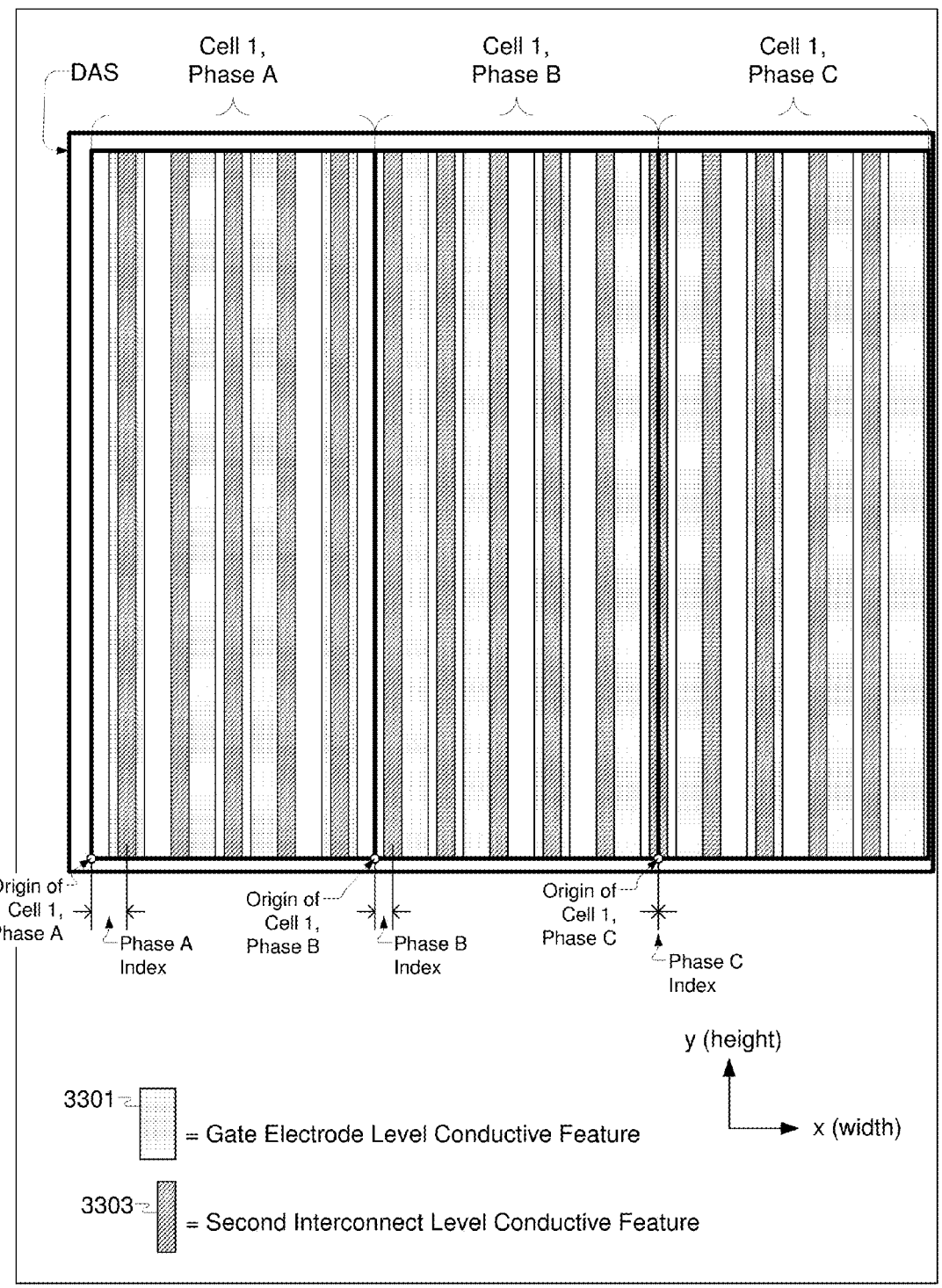
FIG. 33 is an illustration showing an example of different phasings in a second interconnect level of adjacently disposed logic cells defined within a DAS, in accordance with one embodiment of the present invention.

FIG. 33 is an illustration showing an example of different phasings in a second interconnect level of adjacently disposed logic cells defined within a DAS, in accordance with one embodiment of the present invention. FIG. 33 shows three exemplary cells (Cell 1, Phase A; Cell 1, Phase B; and Cell 1, Phase C) disposed adjacent to each other in a DAS. Therefore, each of the three cells share a virtual grate in each level of the DAS. To facilitate description of the phasing concept, the second interconnect level conductive features 3303 of each cell are shown superimposed over the gate electrode level conductive features 3301 of each cell. The cell boundaries in the width direction fall on the gate electrode half-pitch. Also, the second interconnect level and gate electrode level conductive features spacings are defined based on a 4:3 pitch ratio, such that four second interconnect level conductive feature pitches are provided for every three gate electrode level conductive feature pitches. The original of each cell is shown to reside at the cell's lower left corner.

Each phasing of Cell 1 for the second interconnect level is defined by an indexing of the second interconnect level conductive features to the origin of the cell. As shown in the example of FIG. 33, the index, i.e., spacing, of the second interconnect level conductive features relative to the origin is consecutively reduced for each of Phases A, B, and C. By defining each level of each logic cell to have an appropriate phase, it is possible to place logic cells next to one another in a common DAS such that conductive features defined within the various logic cells within a given DAS level can be aligned to a common virtual grate associated with the given DAS level. Additionally, it should be appreciated that adjacent cells within a DAS can be defined and placed so as to share conductive features in one or more levels of the DAS. For example, the Phase B and C instances of Cell 1 in FIG. 33 are depicted as sharing gate electrode level and second interconnect level conductive features.

Figure 27A:
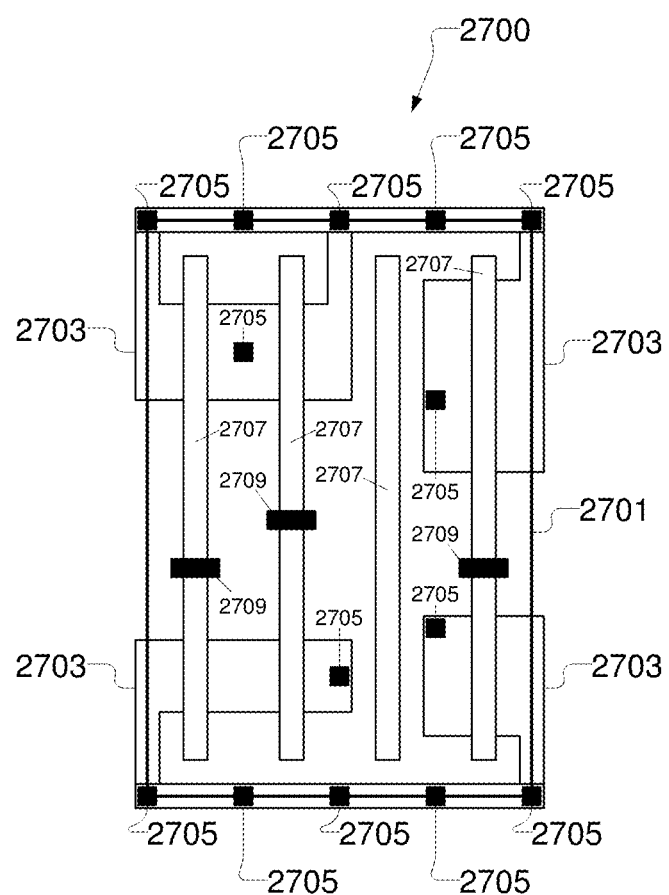
FIG. 27A is an illustration showing an exemplary DAS that defines a logic cell, in accordance with one embodiment of the present invention.

FIG. 27A is an illustration showing an exemplary DAS 2700 that defines a logic cell, in accordance with one embodiment of the present invention. By way of example, the DAS 2700 defines a complete logic cell. The view of DAS 2700 in FIG. 27A shows a number of diffusion regions 2703 defined within a portion of a substrate, a number of diffusion contacts 2705, a number of gate electrode linear conductive features 2707, and a number gate electrode contacts 2709. A DAS boundary 2701 is defined about the periphery of the DAS 2700. In some embodiments, such as the DAS10 example previously described with regard to FIGS. 18-24D, each component of the DAS is defined within the DAS boundary. However, in some embodiments, DAS interior features such as diffusion regions and diffusion contacts can be defined to extend beyond the DAS boundary and continue to be considered an integral component of the DAS. For example, in the DAS 2700, the diffusion regions 2703 and a number of the diffusion contacts 2705 are defined to extend beyond the DAS boundary 2701. The portions of the diffusion regions 2703 and diffusion contacts 2705 that extend outside of the DAS boundary 2701 remain integral components of the DAS 2700.

Figure 27B:
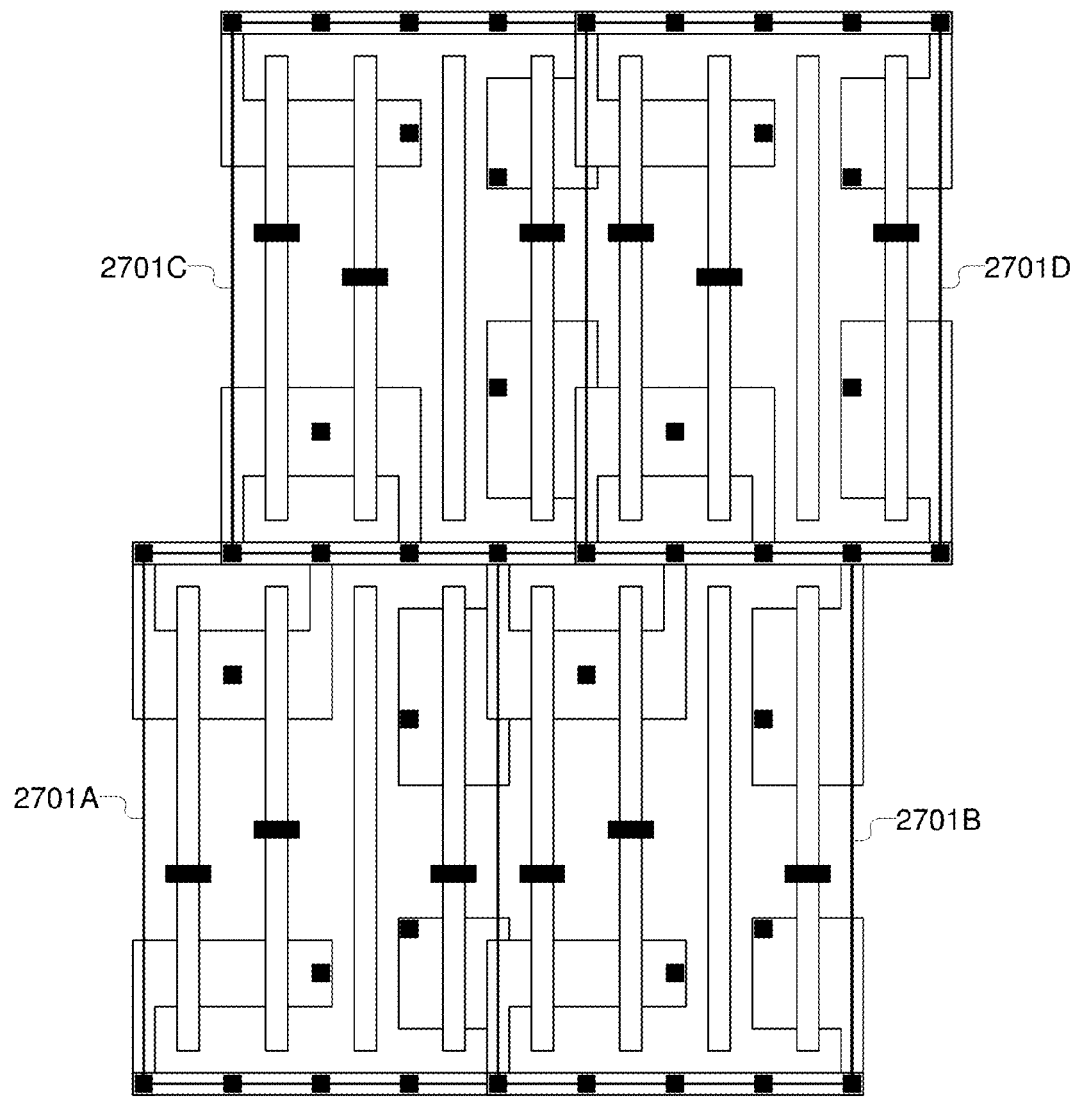
FIG. 27B shows a number of instances of the example DAS of FIG. 27A placed adjacent to each other so as to share DAS components that extend beyond the DAS boundary, in accordance with one embodiment of the present invention.

Extension of DAS components beyond the DAS boundary may enable sharing of the extended DAS components by one or more neighboring DASs. For example, FIG. 27B shows a number of instances of the example DAS 2700 placed adjacent to each other so as to share DAS components that extend beyond the DAS boundary. More specifically, DAS instances 2701A and 2701B are oriented in the same way as the example DAS 2700, and are placed next to each other such that their neighboring boundary segments are colinear. The placement of DAS instances 2701A and 2701B enables a sharing of diffusion region portions and diffusion contact portions between the DAS instances 2701A and 2701B. Each of DAS instances 2701C and 2701D represents the example DAS 2700 having been flipped in the y-direction. Each of DAS instances 2701C and 2701D are placed next to each other such that their neighboring boundary segments are colinear. The placement of DAS instances 2701C and 2701D enables a sharing of diffusion region portions and diffusion contact portions between the DAS instances 2701C and 2701D. Also, placement of DAS instances 2701C and 2701D enables sharing of diffusion region portions and diffusion contact portions between the DAS instances 2701C and 2701A, between the DAS instances 2701C and 2701B, and between the DAS instances 2701D and 2701B.

Figure 28A:
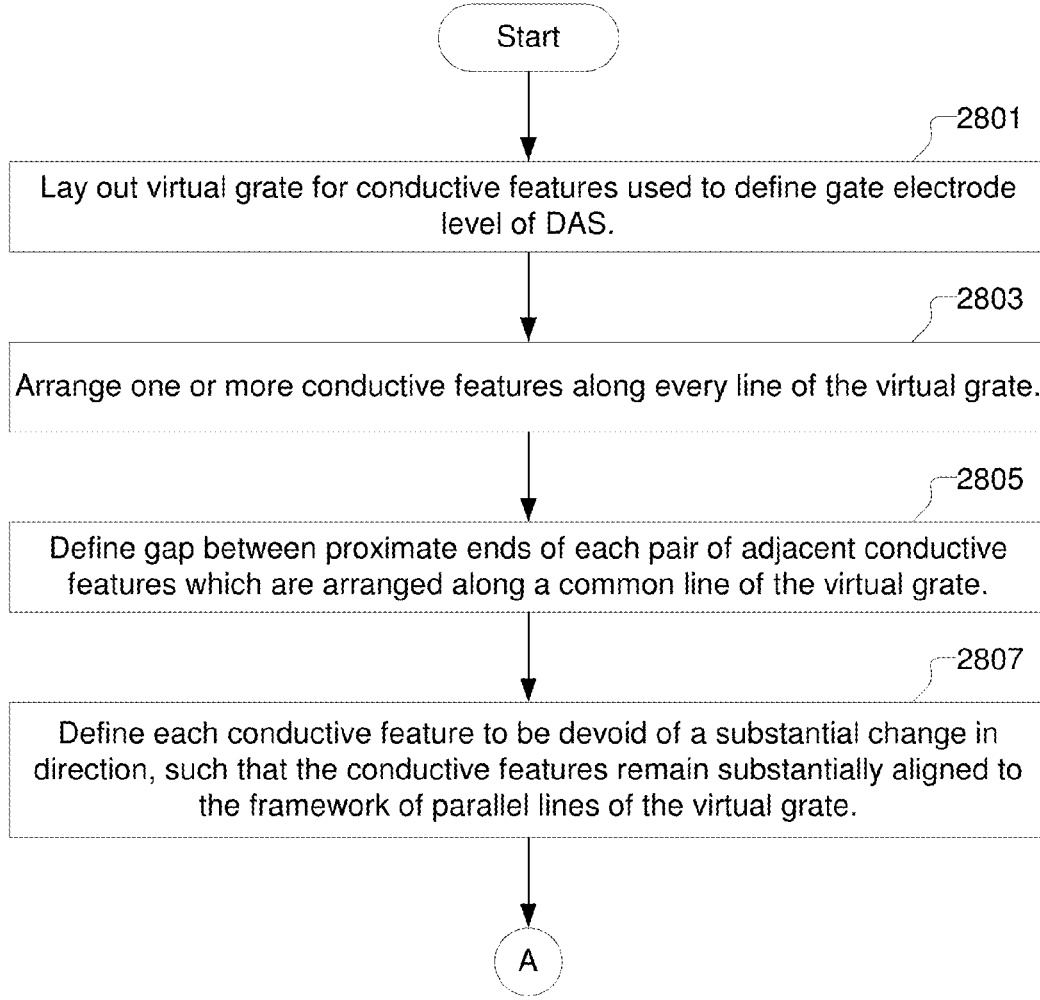
FIG. 28A is an illustration showing a flowchart of a method for designing a semiconductor chip having one or more functionally interfaced dynamic array sections, in accordance with one embodiment of the present invention.

FIG. 28A is an illustration showing a flowchart of a method for designing a semiconductor chip having one or more functionally interfaced dynamic array sections (DASs), in accordance with one embodiment of the present invention. The method includes an operation 2801 for laying out a virtual grate for conductive features used to define a gate electrode level of a DAS. The virtual grate is defined by a framework of parallel lines defined at a substantially constant pitch. An operation 2803 is provided for arranging one or more conductive features along every line of the virtual grate. Each conductive feature is arranged on a given line of a given virtual grate such that a width of the conductive feature is substantially centered upon the given line of the given virtual grate. As previously mentioned, the width of the conductive feature is measured in a coplanar and perpendicular relationship relative to the framework of parallel lines that define the virtual grate along which the conductive feature is arranged.

It should be appreciated that the arrangement of conductive features in operation 2803 is performed to form transistor devices and enable interconnection of the transistor devices and other electronic components (e.g., resistors, diodes, capacitors, etc.) to form a functional electronic circuit. For each line of the virtual grate, an operation 2805 is performed to define a gap between proximate ends of each pair of adjacent conductive features which are arranged along a common line of the virtual grate. Each gap is defined to maintain a substantially consistent separation between proximate ends of conductive features. Within the gate electrode level of the DAS, some of the conductive features are designed to define gate electrodes of transistor devices. In one embodiment, a size of each gap defined between proximate ends of each pair of adjacent conductive features in a given level of the dynamic array section is minimized within electrical performance constraints so as to maximize an overall conductive feature occupancy of the lines that define the virtual grate of the given level. Also, in one embodiment, arrangement of the one or more conductive features along every line of the virtual grate of a given level of the DAS is performed to avoid adjacent gaps in adjacent lines that define the virtual grate of the given level.

The method further includes an operation 2807 for defining each conductive feature to be devoid of a substantial change in direction, such that the conductive features remain substantially aligned to the framework of parallel lines of the virtual grate. In one embodiment, a substantial change in direction of any given conductive feature exists when a width of the given conductive feature at any point thereon changes by more than 50% of a nominal width of the given conductive feature. In another embodiment, a substantial change in direction of any given conductive feature exists when a width of the given conductive feature changes from any first location on the given conductive feature to any second location on the given conductive feature by more than 50% of the given conductive feature width at the first location.

Figure 28B:
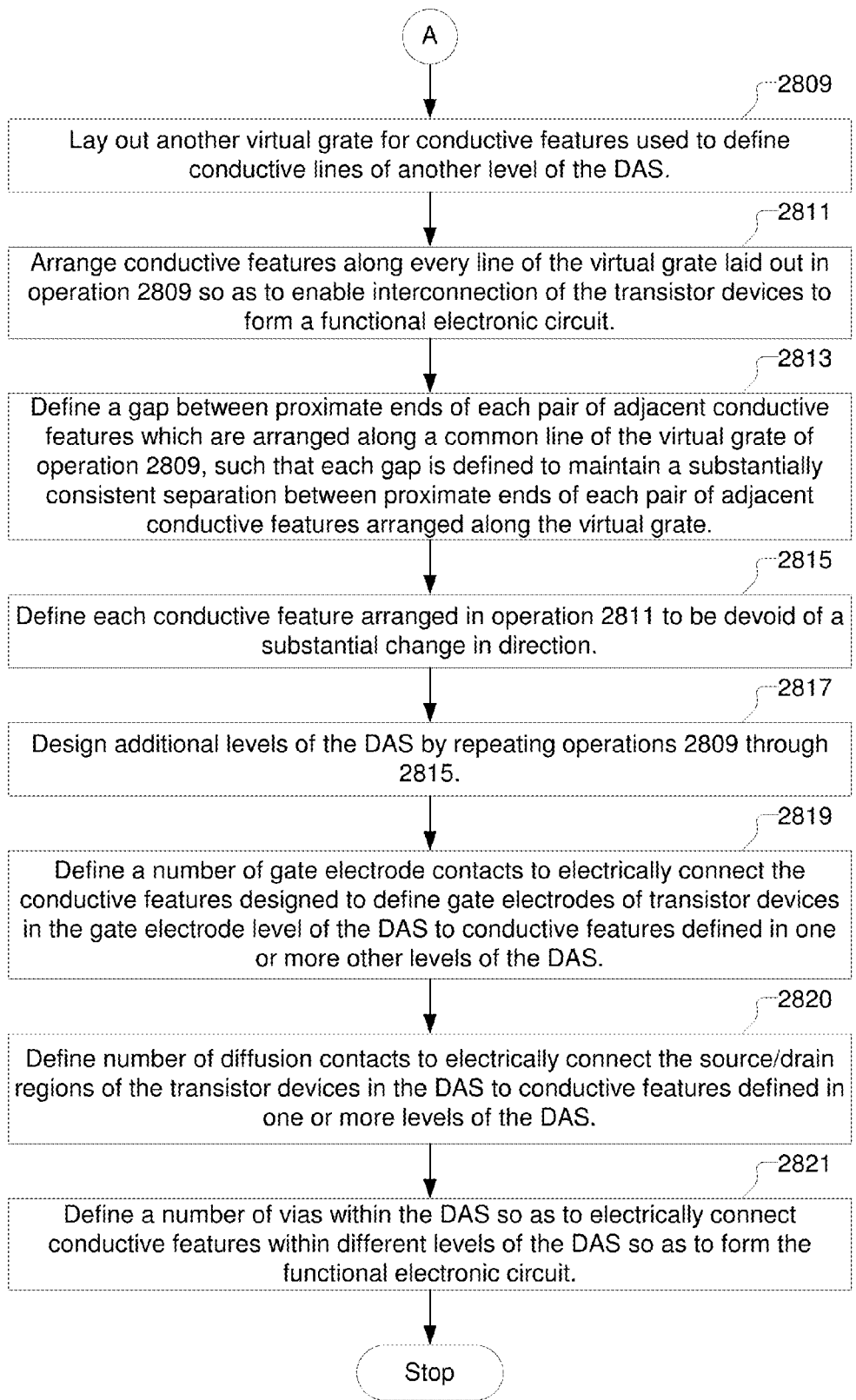
FIG. 28B is an illustration showing a continuation of the flowchart of the method of FIG. 28A, in accordance with one embodiment of the present invention.

FIG. 28B is an illustration showing a continuation of the flowchart of the method of FIG. 28A, in accordance with one embodiment of the present invention. An operation 2809 is performed to lay out another virtual grate for conductive features used to define conductive lines of another level of the DAS. The other virtual grate of operation 2809 is defined by a framework of parallel lines defined at a substantially constant pitch. Also, the other virtual grate of operation 2809 is defined such that each virtual grate of the DAS is perpendicular to an adjacent level virtual grate. An operation 2811 is performed to arrange one or more conductive features along every line of the other virtual grate laid out in operation 2809. In operation 2811, the conductive features are arranged along every line of the virtual grate laid out in operation 2809 so as to enable interconnection of the transistor devices and other electronic components (e.g., resistors, diodes, capacitors, etc.) to form a functional electronic circuit.

For each line of the virtual grate laid out in operation 2809, an operation 2813 is performed to define a gap between proximate ends of each pair of adjacent conductive features which are arranged along a common line of the virtual grate, such that each gap is defined to maintain a substantially consistent separation between proximate ends of each pair of adjacent conductive features arranged along the virtual grate. Also, in an operation 2815 each conductive feature arranged in operation 2811 is defined to be devoid of a substantial change in direction, such that the conductive features remain substantially aligned to the framework of parallel lines of the virtual grate. The method further includes an operation 2817 for designing additional levels of the DAS by repeating operations 2809 through 2815.

Additionally, the method includes an operation 2819 for defining a number of gate electrode contacts to electrically connect the conductive features designed to define gate electrodes of transistor devices in the gate electrode level of the DAS to conductive features defined in one or more other levels of the DAS. Each gate electrode contact is defined to perpendicularly overlap a conductive feature designed to define a gate electrode of a transistor device in the gate electrode level of the DAS. An operation 2820 is also provided for defining a number of diffusion contacts to electrically connect the source/drain regions of the transistor devices in the DAS to conductive features defined in one or more levels of the DAS. An operation 2821 is also provided for defining a number of vias within the DAS so as to electrically connect conductive features within different levels of the DAS so as to form the functional electronic circuit.

Figure 28C:
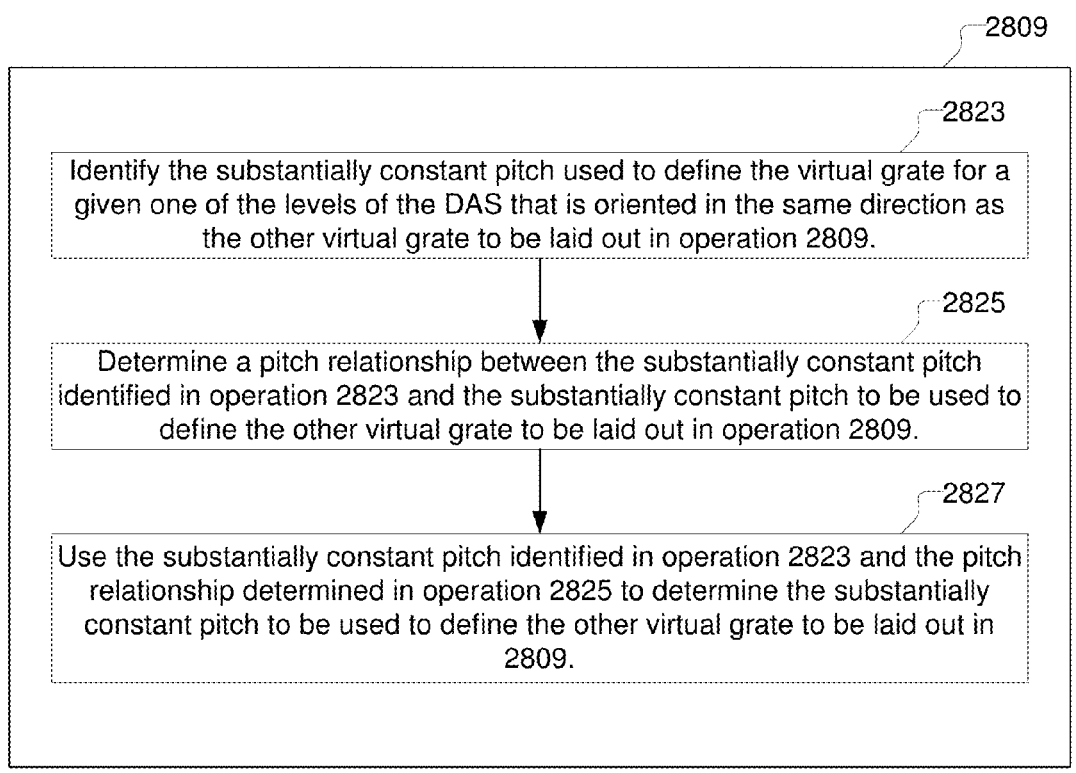
FIG. 28C is an illustration showing an expansion of the operation 2809 of FIG. 28B, in accordance with one embodiment of the present invention.

FIG. 28C is an illustration showing an expansion of the operation 2809 of FIG. 28B, in accordance with one embodiment of the present invention. An operation 2823 is provided to identify the substantially constant pitch used to define the virtual grate for a given one of the levels of the DAS that is oriented in the same direction as the other virtual grate to be laid out in operation 2809. An operation 2825 is then performed to determine a pitch relationship between the substantially constant pitch identified in operation 2823 and the substantially constant pitch to be used to define the other virtual grate to be laid out in operation 2809. An operation 2827 is then performed to use the substantially constant pitch identified in operation 2823 and the pitch relationship determined in operation 2825 to determine the substantially constant pitch to be used to define the other virtual grate to be laid out in 2809.

In one embodiment, the pitch relationship determined in operation 2825 defines a pitch multiplier by which the substantially constant pitch identified in operation 2823 is to be multiplied to determine the substantially constant pitch to be used to define the other virtual grate laid out in operation 2809. In one embodiment, considering that the level of the DAS for which the substantially constant pitch is identified in operation 2823 is the first interconnect level of the dynamic array section (above the gate electrode level of the DAS), and considering that the other level of the DAS defined by the other virtual grate to be laid out in 2809 is a third interconnect level of the DAS, the pitch relationship determined in operation 2825 is given by, $$3\text{rd\_level\_pitch} = \frac{[(2)(1\text{st\_level\_power\_pitch})] + [(b-1)(1\text{st\_level\_pitch})]}{(a-1)}. \quad \text{Equation 2}$$

wherein (3rd_level_pitch) is the substantially constant pitch by which the virtual grate of the third interconnect level is defined,
wherein (1st_level_power_pitch) is a center-to-center separation between a power rail in the first interconnect level and an adjacent conductive feature in the first interconnect level, wherein the power rail is a conductive feature used to supply either power or ground to the dynamic array section,
wherein (1st_level_pitch) is the substantially constant pitch by which the virtual grate of the first interconnect level is defined, wherein (a) is the number of parallel lines defined within the virtual grate of the third interconnect level, and
wherein (b) is the number of parallel lines defined within the virtual grate of the first interconnect level not including the virtual lines for power rails.

In one embodiment, the substantially constant pitch that defines the framework of parallel lines of the virtual grate for a given level is set to optimize lithographic reinforcement during manufacture of the conductive features arranged along the lines of the virtual grate for the given level. In another embodiment, the substantially constant pitch that defines the framework of parallel lines of the virtual grate for a given level is set to optimize a density of the conductive features arranged along the lines of the virtual grate for the given level. In yet another embodiment, the substantially constant pitch that defines the framework of parallel lines of the virtual grate for a given level is set to enable accurate prediction of the manufacturability of the conductive features arranged along the lines of the virtual grate for the given level.

It should be understood that some of the conductive features in one or more levels of the dynamic array section can be non-functional features with respect to electrical circuit functionality. Such non-functional features are defined to enhance manufacturability of other conductive features. In one embodiment, some of the non-functional features are omitted in locations where enhancement of manufacturability of other conductive features by the non-functional features is not required. Additionally, it should be understood that a given line of a virtual grate used to define any of the levels of the DAS can have arranged thereon one or more non-functional features such that the given line is completely occupied by the one or more non-functional features. Also, it should be understood that a given line of a virtual grate used to define any of the levels of the DAS can have arranged thereon one or more conductive features that do not include any non-functional features. It should be further understood that a given line of a virtual grate used to define any of the levels of the DAS can have arranged thereon a number of conductive features that are functional features with respect to electrical circuit functionality, and a number of non-functional features.

Figure 29A:
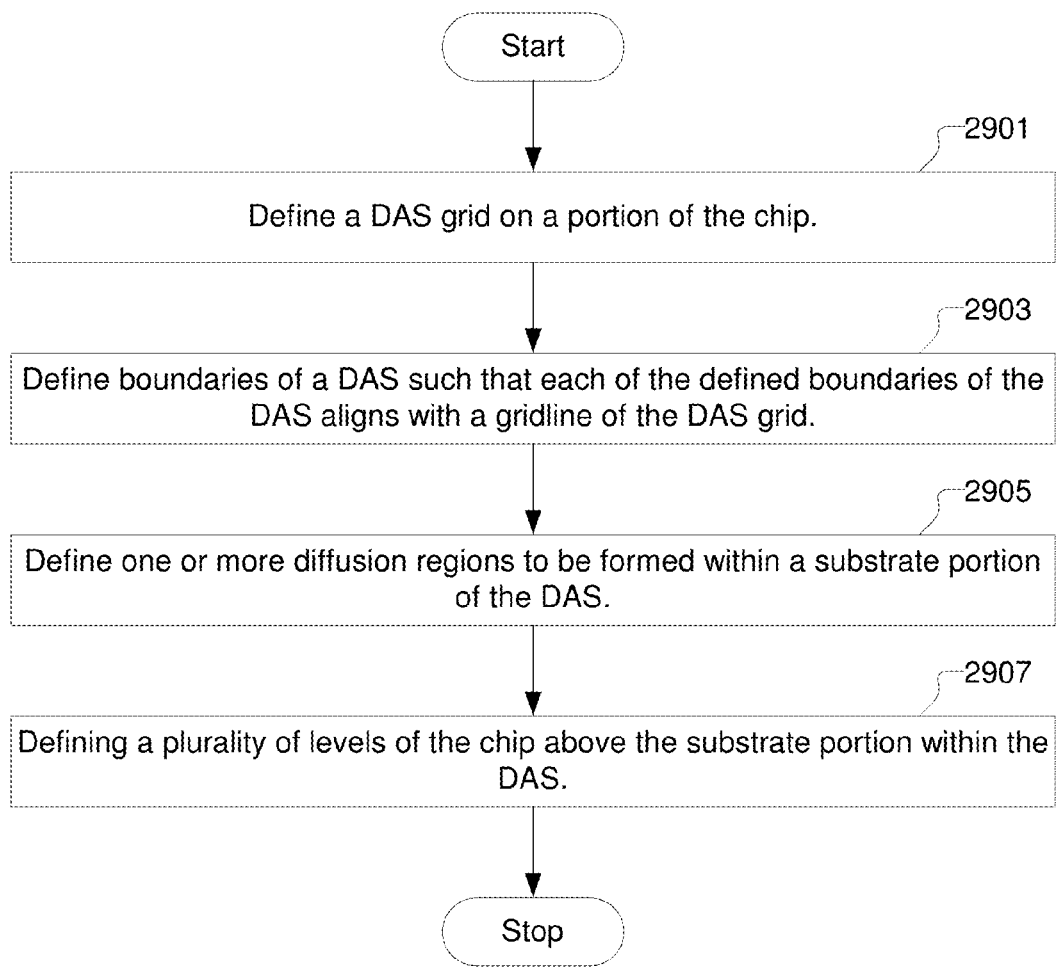
FIG. 29A is an illustration showing a flowchart of a method for designing a semiconductor chip having one or more functionally interfaced dynamic array sections, in accordance with one embodiment of the present invention.

FIG. 29A is an illustration showing a flowchart of a method for designing a semiconductor chip having one or more functionally interfaced dynamic array sections, in accordance with one embodiment of the present invention. The method includes an operation 2901 for defining a DAS grid on a portion of the chip. The DAS grid is defined by a virtual network of perpendicular gridlines projected upon the portion of the chip. An operation 2903 is performed to define boundaries of a DAS, such that each of the defined boundaries of the DAS aligns with a gridline of the DAS grid. The DAS represents a portion of the chip defined according to the dynamic array architecture. It should be understood that the DAS can be defined to have essentially any two-dimensional shape having each boundary thereof defined along a gridline of the DAS grid. The method also includes an operation 2905 for defining one or more diffusion regions to be formed within a substrate portion of the DAS. An operation 2907 is further provided for defining a plurality of levels of the chip above the substrate portion within the DAS.

Figure 29B:
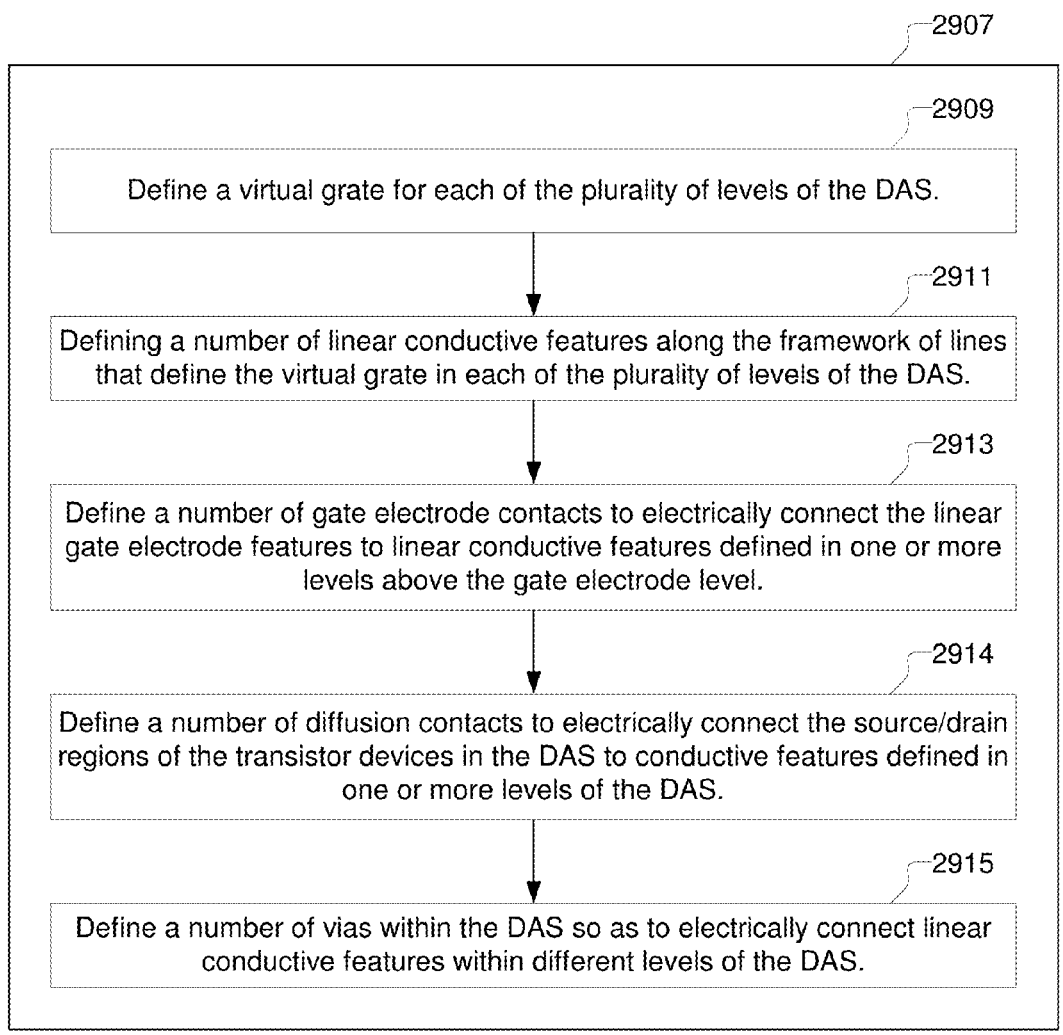
FIG. 29B is an illustration showing an expansion of the operation 2907 of FIG. 29A, in accordance with one embodiment of the present invention.

FIG. 29B is an illustration showing an expansion of the operation 2907 of FIG. 29A, in accordance with one embodiment of the present invention. An operation 2909 is provided for defining a virtual grate for each of the plurality of levels of the DAS. The virtual grate of operation 2909 is defined by a framework of parallel lines spaced at a substantially constant pitch, such that the framework of parallel lines that define the virtual grate for a particular level of the DAS are oriented to be substantially perpendicular to the framework of parallel lines that define the virtual grate for either a level above or a level below the particular level. In one embodiment, the substantially constant pitch used to define the virtual grate for a particular level of the DAS is determined by a relationship with the substantially constant pitch used to define the virtual grate for another level of the DAS having a same orientation as the virtual grate for the particular level. Also, in one embodiment, the substantially constant pitch that defines the framework of parallel lines of the virtual grate for a given level of the DAS is set to enable accurate prediction of the manufacturability of the linear conductive features defined along the framework of lines that define the virtual grate for the given level.

The method further includes an operation 2911 for defining a number of linear conductive features along the framework of lines that define the virtual grate in each of the plurality of levels of the DAS. Each of the linear conductive features is defined to be devoid of a substantial change in direction relative to the line of the virtual grate along which the linear conductive feature is defined. Some of the lines that define the virtual grates in the plurality of levels of the DAS have defined thereon multiple linear conductive features having proximate ends separated by a gap. In one embodiment, each of these gaps is defined to maintain a substantially uniform distance between proximate ends of linear conductive features within a given level of the chip within the DAS.

Within a gate electrode level of the DAS, a number of linear gate electrode features are formed by some of the linear conductive features defined over one or more of the diffusion regions formed within the substrate portion. The method further includes an operation 2913 for defining a number of gate electrode contacts to electrically connect the linear gate electrode features to linear conductive features defined in one or more levels above the gate electrode level. In one embodiment, each of the gate electrode contacts is defined to perpendicularly overlap a linear gate electrode feature. An operation 2914 is also provided for defining a number of diffusion contacts to electrically connect the source/drain regions of the transistor devices in the DAS to conductive features defined in one or more levels of the DAS. The method also includes an operation 2915 for defining a number of vias within the DAS so as to electrically connect linear conductive features within different levels of the DAS.

Figure 30:
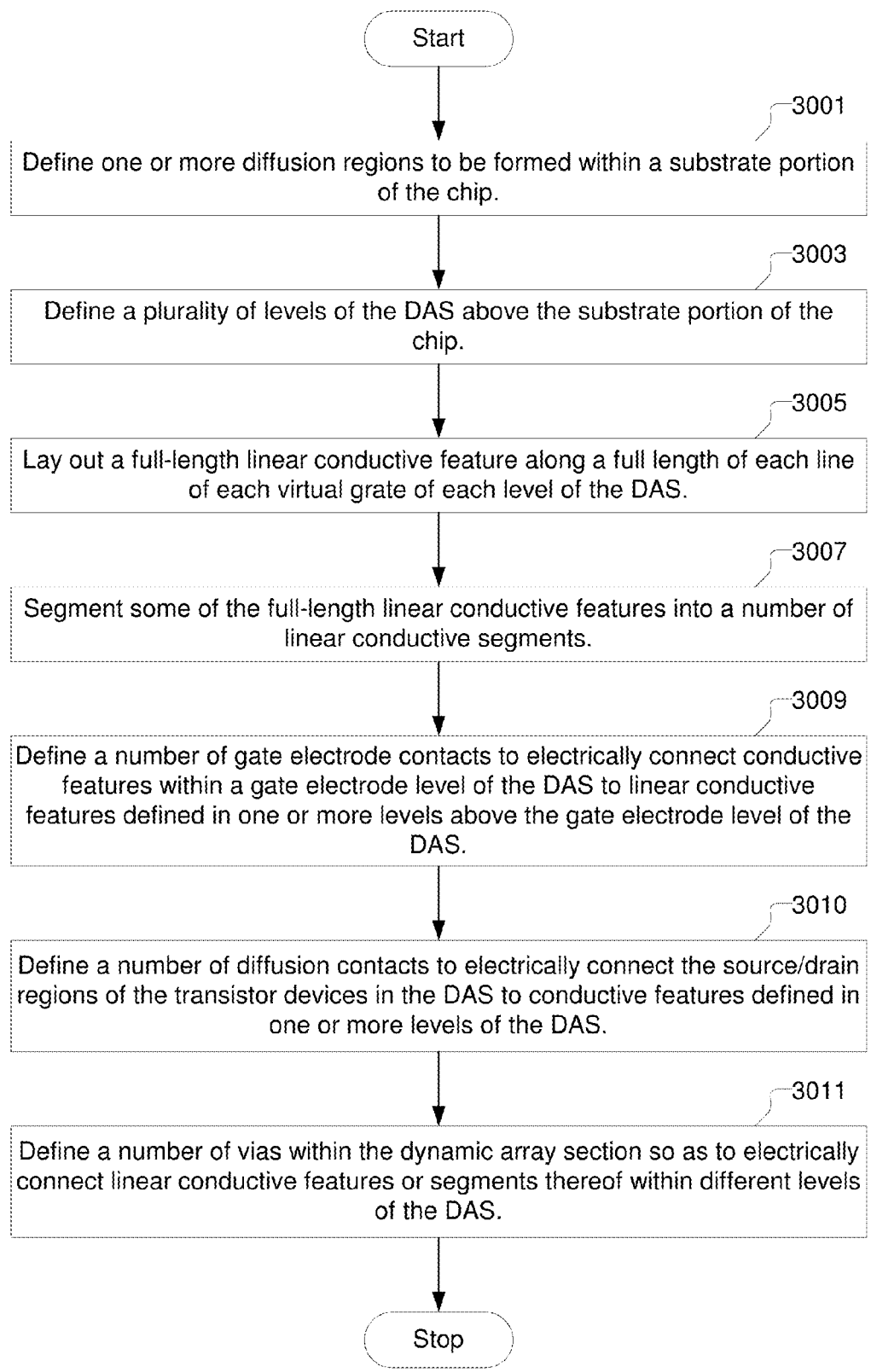
FIG. 30 is an illustration showing a flowchart of a method for designing a DAS of a semiconductor chip, in accordance with one embodiment of the present invention.

FIG. 30 is an illustration showing a flowchart of a method for designing a DAS of a semiconductor chip, in accordance with one embodiment of the present invention. The method includes an operation 3001 for defining one or more diffusion regions to be formed within a substrate portion of the chip. The method also includes an operation 3003 for defining a plurality of levels of the DAS above the substrate portion of the chip. Each level of the DAS is defined to include linear conductive features arranged along a virtual grate associated with the level. The virtual grate of each level of the DAS is defined by a framework of parallel lines spaced at a substantially constant pitch. The virtual grates in adjacent levels of the DAS are oriented to be perpendicular to each other.

The method also includes an operation 3005 for laying out a full-length linear conductive feature along a full length of each line of each virtual grate of each level of the DAS. In an operation 3007, some of the full-length linear conductive features are segmented into a number of linear conductive segments. Segmenting of a given full-length linear conductive feature is performed by placing one or more gaps along the full-length linear conductive feature. In one embodiment, gaps placed along the full-length conductive features within a given level of the DAS are uniformly defined.

Throughout the DAS, a first portion of the linear conductive segments are defined to form conductive elements of an electronic circuit. Correspondingly, a remaining portion of the linear conductive segments are defined to support manufacturing of the first portion and do not form conductive elements of the electronic circuit. Additionally, each linear conductive segment throughout the DAS is defined to be devoid of a substantial change in direction relative to the line of the virtual grate along which the linear conductive segment is laid out.

The method further includes an operation 3009 for defining a number of gate electrode contacts to electrically connect conductive features within a gate electrode level of the DAS, i.e., linear gate electrode features, to linear conductive features defined in one or more levels above the gate electrode level of the DAS. In one embodiment, each of the gate electrode contacts is defined to perpendicularly overlap a linear gate electrode feature. An operation 3010 is also provided for defining a number of diffusion contacts to electrically connect the source/drain regions of the transistor devices in the DAS to conductive features defined in one or more levels of the DAS. The method further includes an operation 3011 for defining a number of vias within the dynamic array section so as to electrically connect linear conductive features or segments thereof within different levels of the DAS.

Figure 31:
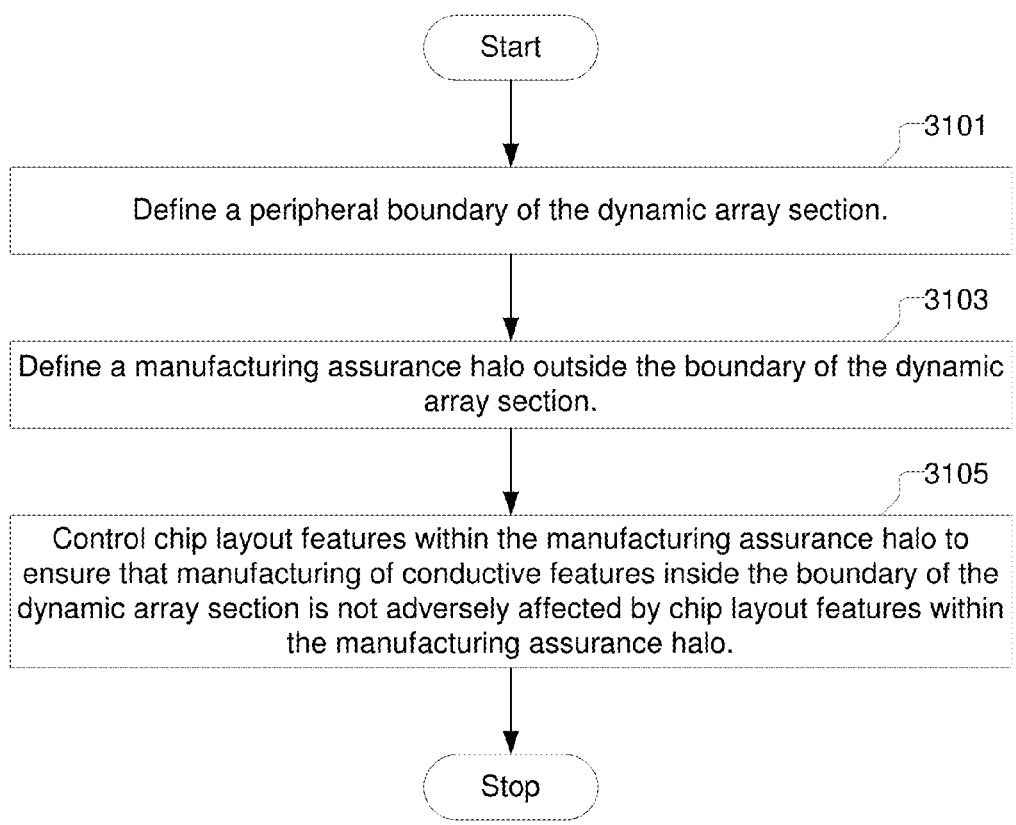
FIG. 31 is an illustration showing a flowchart of a method for defining a dynamic array section to be manufactured on a semiconductor chip, in accordance with one embodiment of the present invention.

FIG. 31 is an illustration showing a flowchart of a method for defining a dynamic array section to be manufactured on a semiconductor chip, in accordance with one embodiment of the present invention. The method includes an operation 3101 for defining a peripheral boundary of the dynamic array section. The method also includes an operation 3103 for defining a manufacturing assurance halo outside the boundary of the dynamic array section. An extent of the manufacturing assurance halo in a perpendicular direction away from the peripheral boundary of the dynamic array section is defined to ensure that each chip layout feature defined outside of the manufacturing assurance halo is not capable of adversely affecting the manufacturing of conductive features inside the boundary of the dynamic array section. In one embodiment, a number of the conductive features inside the boundary of the dynamic array section are defined to extend beyond the boundary of the dynamic array section through the manufacturing assurance halo. Also, in one embodiment, an outer periphery of the manufacturing assurance halo aligns with gridlines of a dynamic array section grid used to align the peripheral boundary of the dynamic array section. Also in one embodiment, the dynamic array section is defined by a plurality of levels of the chip within the boundary of the dynamic array section, and a separate manufacturing assurance halo is independently and respectively defined for each of the plurality of levels of the dynamic array section.

The method further includes an operation 3105 for controlling chip layout features within the manufacturing assurance halo to ensure that manufacturing of conductive features inside the boundary of the dynamic array section is not adversely affected by chip layout features within the manufacturing assurance halo. In one embodiment, controlling chip layout features within the manufacturing assurance halo is performed by placing the dynamic array section on the chip such that chip layout features not associated with the dynamic array section are only allowed to encroach within the manufacturing assurance halo when such encroachment does not adversely affect manufacturing of conductive features inside the boundary of the dynamic array section.

In one embodiment, the boundary of the dynamic array section is defined by a circuitous arrangement of boundary segments. Each boundary segment has an associated manufacturing assurance halo segment. Also, each manufacturing assurance halo segment is assigned a manufacturing compatibility identifier. In this embodiment, controlling chip layout features within the manufacturing assurance halo is performed by placing the dynamic array section on the chip such that each manufacturing assurance halo segment is allowed to overlap a manufacturing assurance halo segment of a neighboring dynamic array section having a same manufacturing compatibility identifier. Also in this embodiment, controlling chip layout features within the manufacturing assurance halo is performed by placing the dynamic array section on the chip such that each manufacturing assurance halo segment is not allowed to overlap a manufacturing assurance halo segment of a neighboring dynamic array section having a different manufacturing compatibility identifier.

Figure 32:
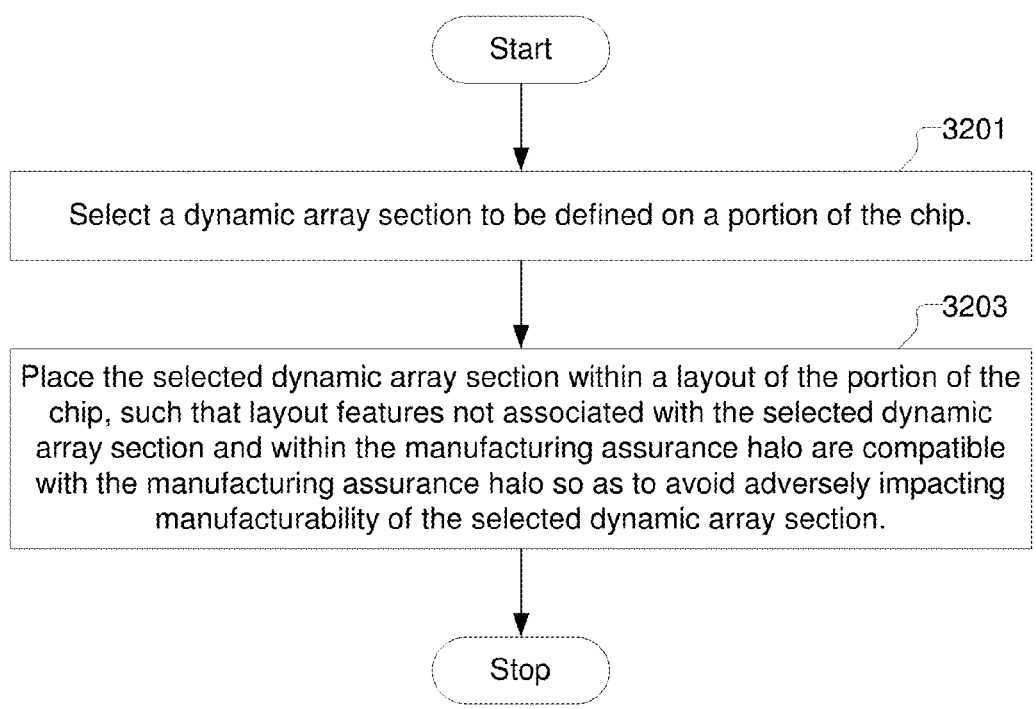
FIG. 32 is an illustration showing a flowchart of a method for designing a semiconductor chip having one or more functionally interfaced dynamic array sections, in accordance with one embodiment of the present invention.

FIG. 32 is an illustration showing a flowchart of a method for designing a semiconductor chip having one or more functionally interfaced dynamic array sections, in accordance with one embodiment of the present invention. The method includes an operation 3201 for selecting a dynamic array section to be defined on a portion of the chip. The selected dynamic array section has an associated manufacturing assurance halo defined outside a boundary of the selected dynamic array section. The method also includes an operation 3203 for placing the selected dynamic array section within a layout of the portion of the chip, such that layout features not associated with the selected dynamic array section and within the manufacturing assurance halo are compatible with the manufacturing assurance halo so as to avoid adversely impacting manufacturability of the selected dynamic array section.

In one embodiment, the selected dynamic array section is defined by a plurality of levels of the chip within the boundary of the selected dynamic array section. In this embodiment, a separate manufacturing assurance halo is independently and respectively associated with each of the plurality of levels of the selected dynamic array section. An extent of each manufacturing assurance halo in a perpendicular direction away from the boundary of the selected dynamic array section is defined to ensure that each chip layout feature defined outside of the manufacturing assurance halo is not capable of adversely affecting the manufacturing of conductive features inside the boundary of the selected dynamic array section.

In one embodiment of the method of FIG. 32, the boundary of the selected dynamic array section is defined by a circuitous arrangement of boundary segments, and each boundary segment has an associated manufacturing assurance halo segment. Each manufacturing assurance halo segment is assigned a manufacturing compatibility identifier. In this embodiment, operation 3203 is performed by placing the selected dynamic array section within the layout of the portion of the chip such that each manufacturing assurance halo segment is allowed to overlap a manufacturing assurance halo segment of a neighboring dynamic array section having a same manufacturing compatibility identifier. Also in this embodiment, operation 3203 is performed by placing the selected dynamic array section within the layout of the portion of the chip such that each manufacturing assurance halo segment is not allowed to overlap a manufacturing assurance halo segment of a neighboring dynamic array section having a different manufacturing compatibility identifier.

In one embodiment, operation 3203 is performed by placing the selected dynamic array section within the layout of the portion of the chip such that a number of manufacturing assurance halo segments are separated from a number of manufacturing assurance halo segments of one or more neighboring dynamic array sections having a same manufacturing compatibility identifier, thereby leaving a space between the selected dynamic array section and the one or more neighboring dynamic array sections. In a further instance of this embodiment, a chip layout feature not associated with a dynamic array section is defined within the space between the selected dynamic array section and the one or more neighboring dynamic array sections.

The invention described herein can be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Additionally, a graphical user interface (GUI) implemented as computer readable code on a computer readable medium can be developed to provide a user interface for performing any embodiment of the present invention.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A semiconductor chip, comprising:
a region including at least nine linear-shaped conductive structures oriented to extend lengthwise in a first direction, the at least nine linear-shaped conductive structures positioned such that a distance as measured in a second direction perpendicular to the first direction between any two lengthwise-oriented centerlines of the at least nine linear-shaped conductive structures is substantially equal to an integer multiple of a gate electrode pitch,
the at least nine linear-shaped conductive structures including a first linear-shaped conductive structure that forms a gate electrode of a first transistor of a first transistor type and a gate electrode of a first transistor of a second transistor type,
the at least nine linear-shaped conductive structures including a second linear-shaped conductive structure that forms a gate electrode of a second transistor of the first transistor type and a gate electrode of a second transistor of the second transistor type,
the at least nine linear-shaped conductive structures including a third linear-shaped conductive structure that forms a gate electrode of a third transistor of the first transistor type and a gate electrode of a third transistor of the second transistor type,
the at least nine linear-shaped conductive structures including a fourth linear-shaped conductive structure that forms a gate electrode of a fourth transistor of the first transistor type and a gate electrode of a fourth transistor of the second transistor type,
the first and second linear-shaped conductive structures positioned such that their lengthwise-oriented centerlines are separated by a distance as measured in the second direction substantially equal to the gate electrode pitch,
the third and fourth linear-shaped conductive structures positioned such that their lengthwise-oriented centerlines are separated by a distance as measured in the second direction substantially equal to the gate electrode pitch,
the first and third linear-shaped conductive structures positioned such that their lengthwise-oriented centerlines are substantially co-aligned in the first direction, the first and third linear-shaped conductive structures separated from each other by a first end-to-end spacing as measured in the second direction,
the second and fourth linear-shaped conductive structures positioned such that their lengthwise-oriented centerlines are substantially co-aligned in the first direction, the second and fourth linear-shaped conductive structures separated from each other by a second end-to-end spacing as measured in the second direction,
the first end-to-end spacing substantially equal to the second end-to-end spacing.

2. A semiconductor chip as recited in claim 1, wherein the first and second transistors of the first transistor type are collectively separated from the first and second transistors of the second transistor type by a first portion of the region that does not include a source or a drain of any transistor.

3. A semiconductor chip as recited in claim 2, wherein the third and fourth transistors of the first transistor type are collectively separated from the third and fourth transistors of the second transistor type by a second portion of the region that does not include a source or a drain of any transistor.

4. A semiconductor chip as recited in claim 3, wherein the first and second transistors of the second transistor type are collectively separated from the third and fourth transistors of the first transistor type by a third portion of the region that does not include a source or a drain of any transistor.

5. A semiconductor chip as recited in claim 1, further comprising:
a first contact structure in physical contact with the first linear-shaped conductive structure at a location on the first linear-shaped conductive structure between the gate electrode of the first transistor of the first transistor type and the gate electrode of the first transistor of the second transistor type.

6. A semiconductor chip as recited in claim 5, further comprising:
a second contact structure in physical contact with the second linear-shaped conductive structure at a location on the second linear-shaped conductive structure between the gate electrode of the second transistor of the first transistor type and the gate electrode of the second transistor of the second transistor type.

7. A semiconductor chip as recited in claim 6, wherein the first contact structure has a second direction-oriented centerline extending in the second direction, wherein the second contact structure has a second direction-oriented centerline extending in the second direction, wherein the second direction-oriented centerline of the first contact structure is offset in the first direction from the second direction-oriented centerline of the second contact structure.

8. A semiconductor chip as recited in claim 6, wherein the first contact structure has a second direction-oriented centerline extending in the second direction, wherein the second contact structure has a second direction-oriented centerline extending in the second direction, wherein a second direction-oriented centerline of the first contact structure is substantially co-aligned with a second direction-oriented centerline of the second contact structure.

9. A semiconductor chip as recited in claim 6, further comprising:
a third contact structure in physical contact with the third linear-shaped conductive structure at a location on the third linear-shaped conductive structure between the gate electrode of the third transistor of the first transistor type and the gate electrode of the third transistor of the second transistor type; and
a fourth contact structure in physical contact with the fourth linear-shaped conductive structure at a location on the fourth linear-shaped conductive structure between the gate electrode of the fourth transistor of the first transistor type and the gate electrode of the fourth transistor of the second transistor type.

10. A semiconductor chip as recited in claim 1, wherein a size of the first transistor of the first transistor type as measured in the first direction is different than a size of the second transistor of the first transistor type as measured in the first direction, and wherein a size of the first transistor of the second transistor type as measured in the first direction is different than a size of the second transistor of the second transistor type as measured in the first direction.

11. A semiconductor device, comprising:
a first transistor of a first transistor type;
a second transistor of the first transistor type;
a first transistor of a second transistor type;
a second transistor of the second transistor type,
wherein the first and second transistors of the first transistor type share a diffusion region of a first diffusion type,
wherein the first and second transistors of the second transistor type share a diffusion region of a second diffusion type,
wherein the first transistor of the first transistor type includes a gate electrode formed from a first conductive structure, and wherein the first transistor of the second transistor type includes a gate electrode formed from the first conductive structure, wherein the first conductive structure has a linear-shape when viewed from above such that the first conductive structure is devoid of a substantial change in direction along its length, and
wherein the second transistor of the first transistor type includes a gate electrode formed from a second conductive structure, and wherein the second transistor of the second transistor type also includes a gate electrode formed from the second conductive structure, wherein the second conductive structure has a linear-shape when viewed from above such that the second conductive structure is devoid of a substantial change in direction along its length;
a first contact structure in physical contact with the first conductive structure, the first contact structure configured to extend past at least one side the first conductive structure; and
a second contact structure in physical contact with the second conductive structure, the second contact structure configured to extend past at least one side the second conductive structure.

12. A semiconductor device as recited in claim 11, wherein the first conductive structure is formed to extend lengthwise in a substantially straight manner in a first direction along its entire length, and wherein the second conductive structure is formed to extend lengthwise in a substantially straight manner in the first direction along its entire length.

13. A semiconductor device as recited in claim 12, wherein a size of the first transistor of the first transistor type as measured in the first direction is different than a size of the second transistor of the first transistor type as measured in the first direction.

14. A semiconductor device as recited in claim 13, wherein a size of the first transistor of the second transistor type as measured in the first direction is different than a size of the second transistor of the second transistor type as measured in the first direction.

15. A semiconductor device as recited in claim 12, wherein the first conductive structure includes a first end positioned at a first coordinate of the first direction, and wherein the second conductive structure includes a first end positioned substantially at the first coordinate of the first direction.

16. A semiconductor device as recited in claim 15, wherein the first conductive structure includes a second end positioned at a second coordinate of the first direction, and wherein the second conductive structure includes a second end positioned substantially at the second coordinate of the first direction.

17. A semiconductor device as recited in claim 12, wherein the first contact structure is in physical contact with the first conductive structure at a location on the first conductive structure between the gate electrode of the first transistor of the first transistor type and the gate electrode of the first transistor of the second transistor type, and
wherein the second contact structure is in physical contact with the second conductive structure at a location on the second conductive structure between the gate electrode of the second transistor of the first transistor type and the gate electrode of the second transistor of the second transistor type.

18. A semiconductor device as recited in claim 17, wherein the first contact structure has a second direction-oriented centerline extending in a second direction perpendicular to the first direction, wherein the second contact structure has a second direction-oriented centerline extending in the second direction, wherein the second direction-oriented centerline of the first contact structure is offset in the first direction from the second direction-oriented centerline of the second contact structure.

19. A semiconductor device as recited in claim 17, wherein the first contact structure has a second direction-oriented centerline extending in a second direction perpendicular to the first direction, wherein the second contact structure has a second direction-oriented centerline extending in the second direction, wherein the second direction-oriented centerline of the first contact structure is substantially co-aligned with the second direction-oriented centerline of the second contact structure.

20. A semiconductor device as recited in claim 17, wherein the first conductive structure and the second conductive structure are located in a same integrated circuit logic cell.

21. A semiconductor device as recited in claim 17, wherein the first conductive structure and the second conductive structure are located in different integrated circuit logic cells.

* * * * *